US012562376B2

(12) United States Patent
Zafiropoulos et al.

(10) Patent No.: US 12,562,376 B2
(45) Date of Patent: Feb. 24, 2026

(54) POLYIMIDE BEAD MATERIALS AND METHODS OF MANUFACTURE THEREOF

(71) Applicant: Aspen Aerogels, Inc., Northborough, MA (US)

(72) Inventors: Nicholas A. Zafiropoulos, Northborough, MA (US); Roxana Trifu, Shrewsbury, MA (US); Redouane Begag, Hudson, MA (US); Harris R. Miller, Sharon, MA (US); Wendell E. Rhine, Belmont, MA (US); Nicholas Leventis, Worcester, MA (US); George L. Gould, Mendon, MA (US); Alexei A. Erchak, Easton, MA (US)

(73) Assignee: Aspen Aerogels, Inc., Northborough, MA (US)

( * ) Notice: Subject to any disclaimer, the term of this patent is extended or adjusted under 35 U.S.C. 154(b) by 0 days.

(21) Appl. No.: 18/676,606

(22) Filed: May 29, 2024

(65) Prior Publication Data

US 2024/0429369 A1     Dec. 26, 2024

Related U.S. Application Data

(63) Continuation of application No. 17/408,841, filed on Aug. 23, 2021, now Pat. No. 12,034,151.

(Continued)

(51) Int. Cl.
*H01M 4/36* (2006.01)
*C01B 32/05* (2017.01)
(Continued)

(52) U.S. Cl.
CPC ............. *H01M 4/364* (2013.01); *C01B 32/05* (2017.08); *H01M 4/386* (2013.01); *H01M 4/587* (2013.01);
(Continued)

(58) Field of Classification Search
CPC ...... H01M 4/364; H01M 4/386; H01M 4/587; H01M 10/0525; H01M 2004/021;
(Continued)

(56) References Cited

U.S. PATENT DOCUMENTS 5,908,896 A     6/1999  Mayer et al.
7,074,880 B2    7/2006  Rhine et al.
(Continued)

FOREIGN PATENT DOCUMENTS

KR        101785064 B1    10/2017
WO        2012092210 A1    7/2012
(Continued)

OTHER PUBLICATIONS

Machine Translation of KR 101785064 B1. (Year: 2017).*
(Continued)

*Primary Examiner* — Coris Fung
*Assistant Examiner* — Catriona M Corallo
(74) *Attorney, Agent, or Firm* — WOMBLE BOND DICKINSON (US) LLP; Deborah M. Vernon; Scott R. Breining

(57) ABSTRACT

Nanoporous carbon-based scaffolds or structures, and specifically carbon aerogels and their manufacture and use thereof are provided. Embodiments include a silicon-doped anode material for a lithium-ion battery, where the anode material includes beads of a polyimide-derived carbon aerogel. The carbon aerogel may further include silicon particles and accommodates expansion of the silicon particles during lithiation. The anode material provides optimal properties for use within the lithium-ion battery.

19 Claims, 76 Drawing Sheets

Related U.S. Application Data

(60) Provisional application No. 63/070,230, filed on Aug. 25, 2020.

(51) Int. Cl.

| | | |
|---|---|---|
| *H01M 4/38* | (2006.01) | |
| *H01M 4/587* | (2010.01) | |
| *H01M 10/0525* | (2010.01) | |
| *H01M 4/02* | (2006.01) | |

(52) U.S. Cl.
CPC ..... *H01M 10/0525* (2013.01); *C01P 2004/61* (2013.01); *C01P 2006/10* (2013.01); *C01P 2006/11* (2013.01); *C01P 2006/12* (2013.01); *C01P 2006/14* (2013.01); *C01P 2006/16* (2013.01); *C01P 2006/40* (2013.01); *H01M 2004/021* (2013.01)

(58) Field of Classification Search
CPC .. C01B 32/05; C01P 2004/61; C01P 2006/10; C01P 2006/11; C01P 2006/12; C01P 2006/14; C01P 2006/16; C01P 2006/40
USPC ..................................................... 429/231.8
See application file for complete search history.

(56) References Cited

U.S. PATENT DOCUMENTS

| | | | |
|---|---|---|---|
| 11,648,521 | B2 | 5/2023 | Zafiropoulos et al. |
| 2006/0084707 | A1 | 4/2006 | Ou et al. |
| 2007/0289974 | A1 | 12/2007 | Blair et al. |
| 2012/0081838 | A1 | 4/2012 | Costantino et al. |
| 2013/0209348 | A1 | 8/2013 | Ludvik et al. |
| 2014/0272592 | A1 | 9/2014 | Thompkins et al. |
| 2015/0111976 | A1 | 4/2015 | Leventis et al. |
| 2015/0283534 | A1 | 10/2015 | Costantino et al. |

FOREIGN PATENT DOCUMENTS

| | | | |
|---|---|---|---|
| WO | 2013106782 | A2 | 7/2013 |
| WO | 2013120011 | A1 | 8/2013 |
| WO | 2014082086 | A1 | 5/2014 |
| WO | 2014201275 | A2 | 12/2014 |
| WO | 2015137980 | A1 | 9/2015 |
| WO | 2016127084 | A1 | 8/2016 |
| WO | 2020176756 | A1 | 9/2020 |

OTHER PUBLICATIONS

Zhang et al. "Graphene/carbon aerogels derived from graphene crosslinked polyimide as electrode materials for supercapacitors". RSC Adv., 2015, 5, 1301-1308. (Year: 2015).*

Zuo et al. "Polymer/Carbon-Based Hybrid Aerogels: Preparation, Properties and Applications". Materials, 2015, 8, 6806-6848. (Year: 2015).*

Cheng et al. "Poroud titania/carbon hybrid microspheres templated byin situformed poylstyrene colloids." J. Colloid Interface Sci. 469(2016): 242-256.

Horikawa et al. "Size control and characterization of spherical carbon aerogel particles from resorcinol-formaldehyde resin." Carbon. 42(2004): 169-175.

International Search Report and Written Opinion in International Patent Application No. PCT/US2021/047168 dated Mar. 25, 2022.

Invitation to Pay Additional Fees and, Where Applicable, Protest Fee issued in International Application No. PCT/US2021/047168 dated Dec. 13, 2021.

Ren et al. "Preparation of porous silicon/carbon microspheres as high performance anode materials for lithium ion batteries." J. Mater. Chem. A. 3.11(2015): 5859-5865.

Sharma et al. "Synthesis of carbon xerogel particles and fractal-like structures." Chem. Eng. Sci. 64(2009): 1536-1543.

Wang et al. "Hard-templating synthesis of mesoporous carbon spheres with controlled particle size and mesoporous structure for enzyme immobilization." Mater. Chem. Phys. 129(2011): 1035-1041.

Yamamoto et al. "Porous properties of carbon gel microspheres as adsorbents for gas separation." Carbon. 42(2004): 1671-1676.

Zapata-Benabithe et al. "Synthesis, surface characteristics, and electrochemical capacitance of Cu-doped carbon xerogel microspheres." Carbon. 55(2013): 260-268.

* cited by examiner

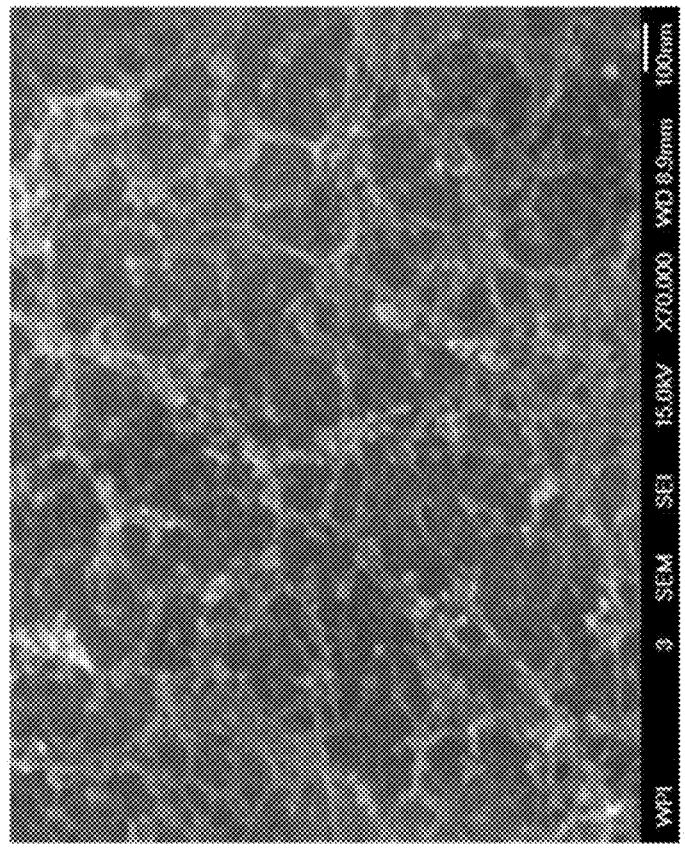
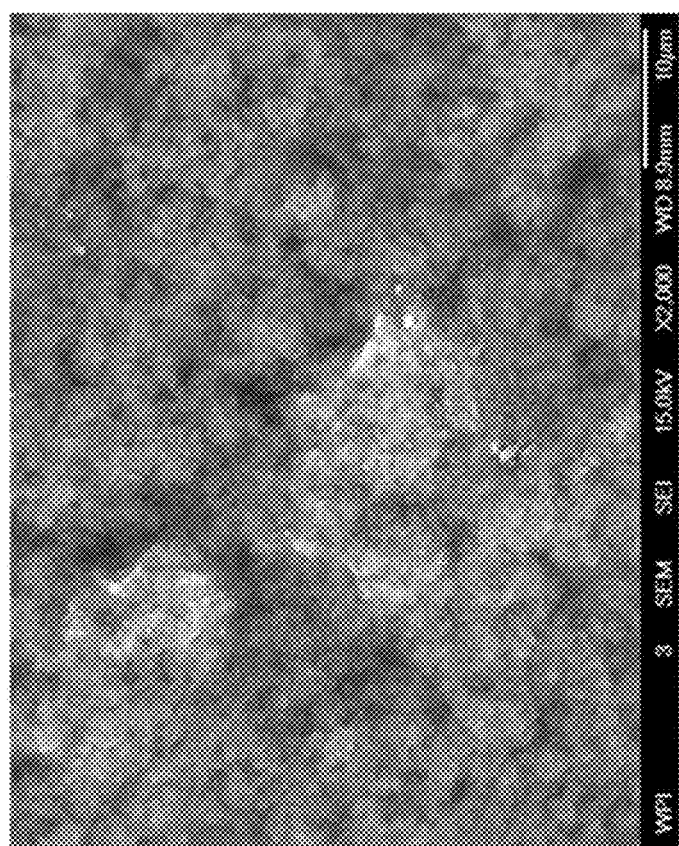
*FIG. 13B*

4,4'-Oxydianiline

FIG. 20

| | Si (%) in PI | PI + Si (%) | Carbon fiber (%) | Si (%) in system | Density |
|---|---|---|---|---|---|
| Green PI aerogel | 19.00% | 69.59% | 30.41% | 13.22% | 0.1025 |
| Carbon aerogel | After 2 hours @ 1050C | | | 20.73% | 0.149631 |

| | Si (%) in PI | PI + Si (%) | Carbon fiber (%) | Si (%) in system | Density |
|---|---|---|---|---|---|
| Green PI aerogel | 19.00% | 76.88% | 23.13% | 14.61% | 0.144116 |
| Carbon aerogel | | | 23.71% | 0.118381 |
After 2 hours @ 1050C
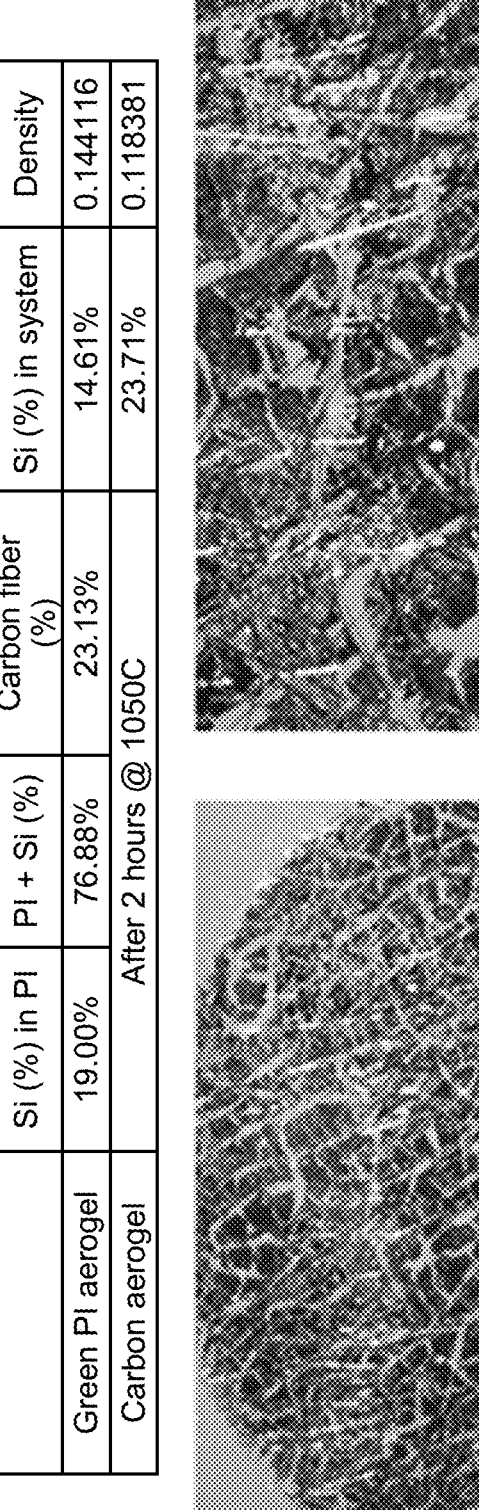
*FIG. 28*

| | Si (%) in PI | PI + Si (%) | Carbon fiber (%) | Si (%) in system | Density |
|---|---|---|---|---|---|
| Green PI aerogel | 19.00% | 84.17% | 15.83% | 15.99% | 0.140195 |
| Carbon aerogel | After 2 hours @ 1050C | | | 26.54% | 0.084476 |
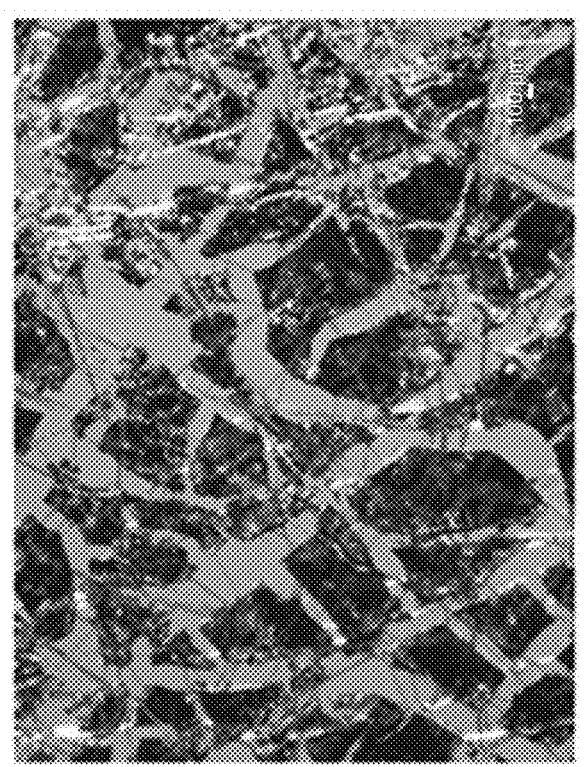
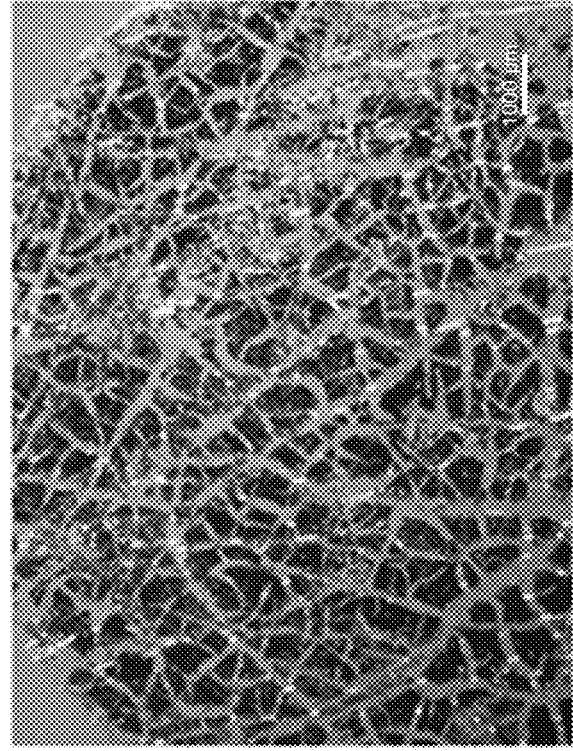
*FIG. 29*

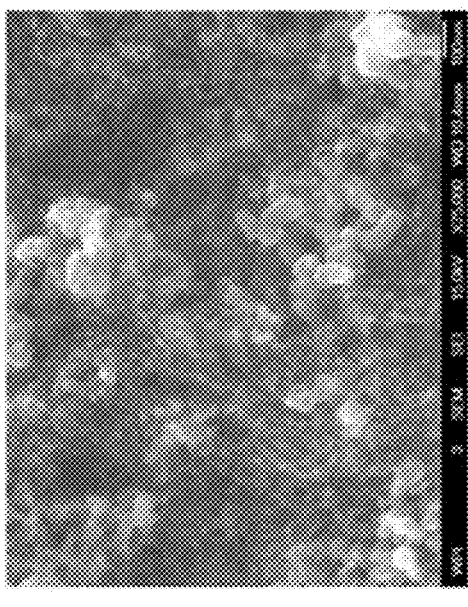
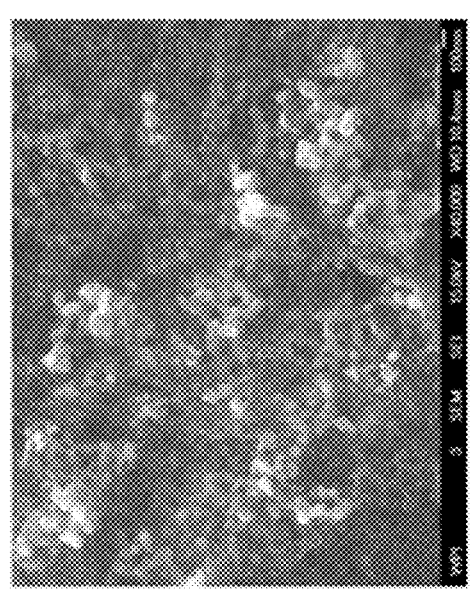
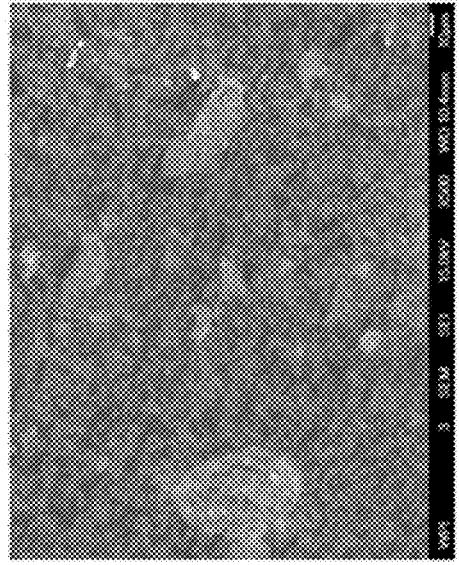
*FIG. 32*

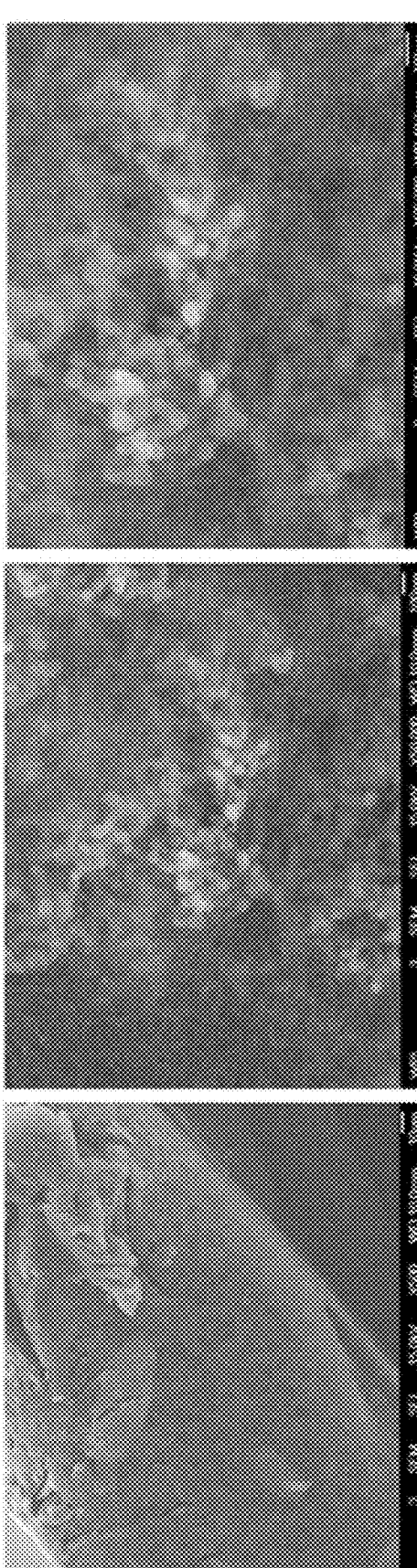
*FIG. 33*

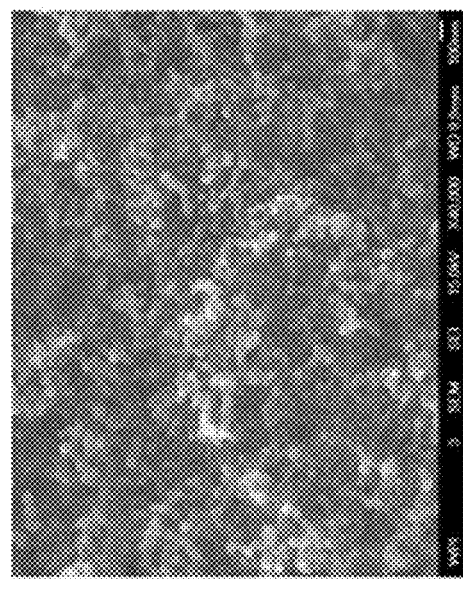
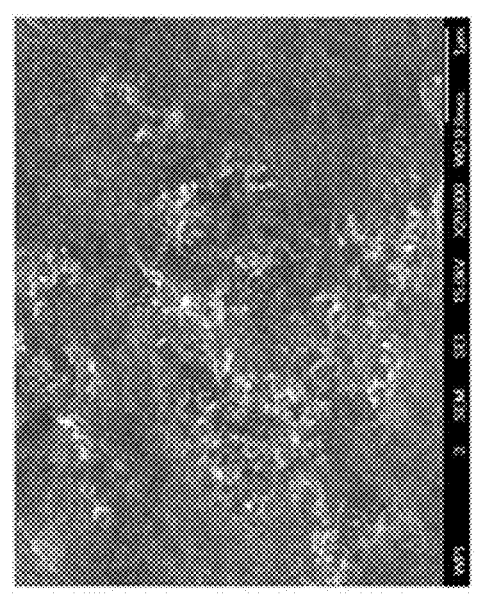
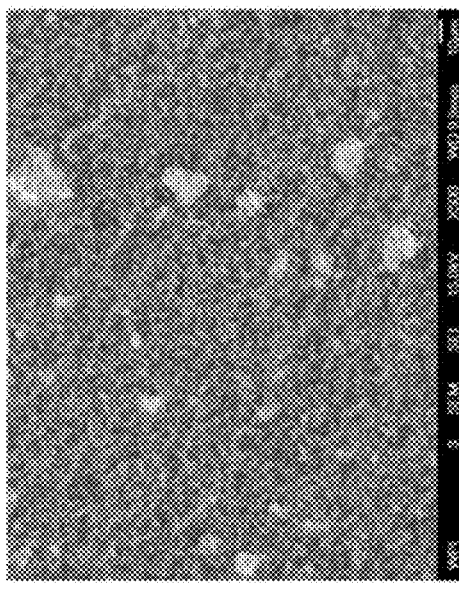
*FIG. 34*

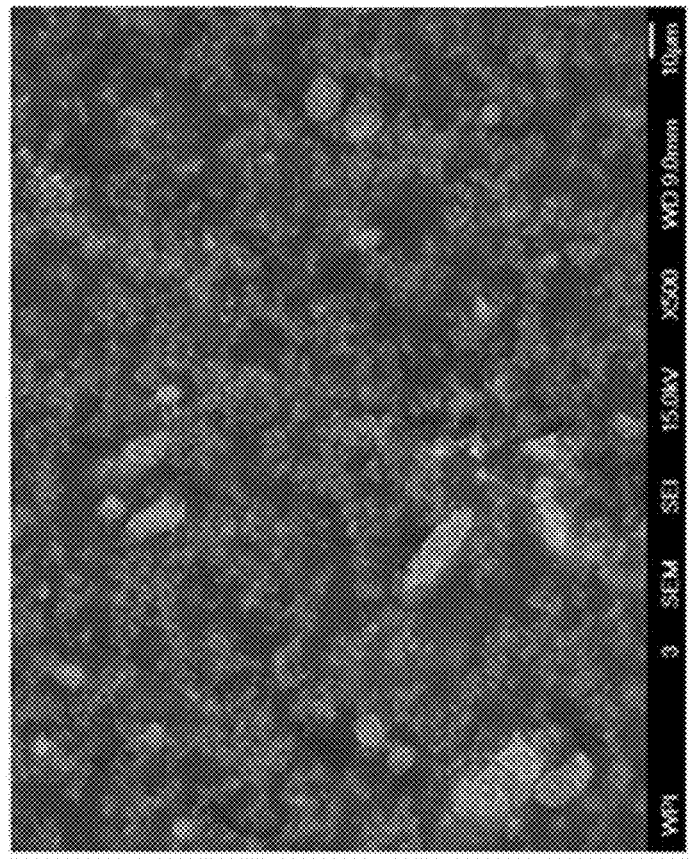
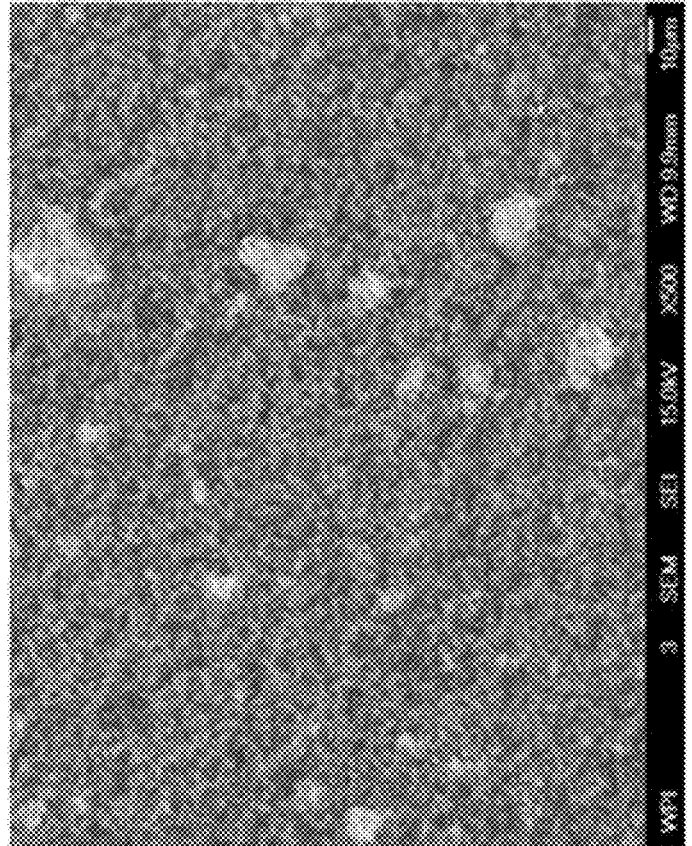
*FIG. 35*

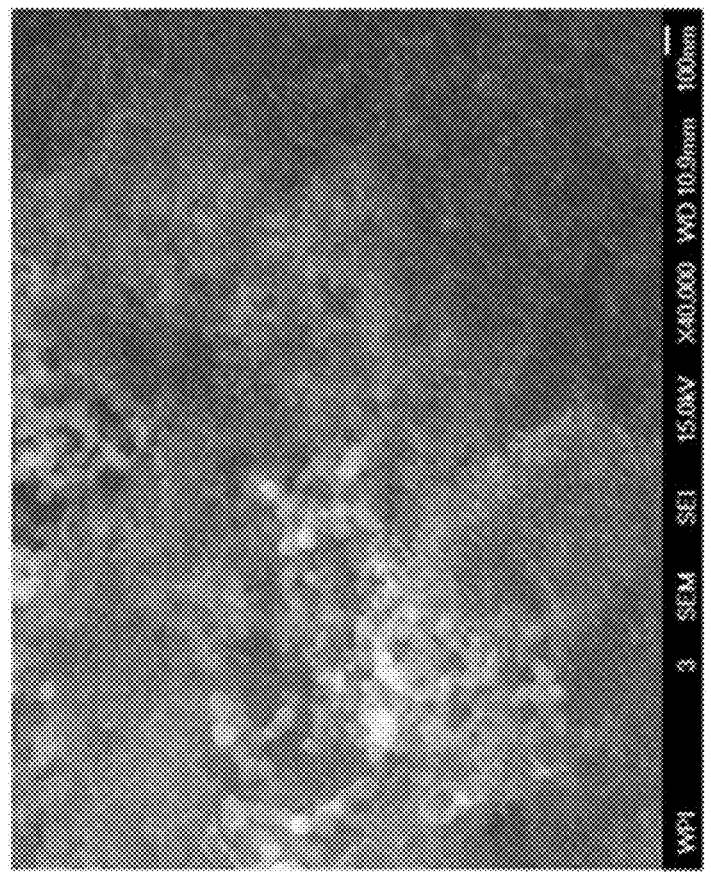
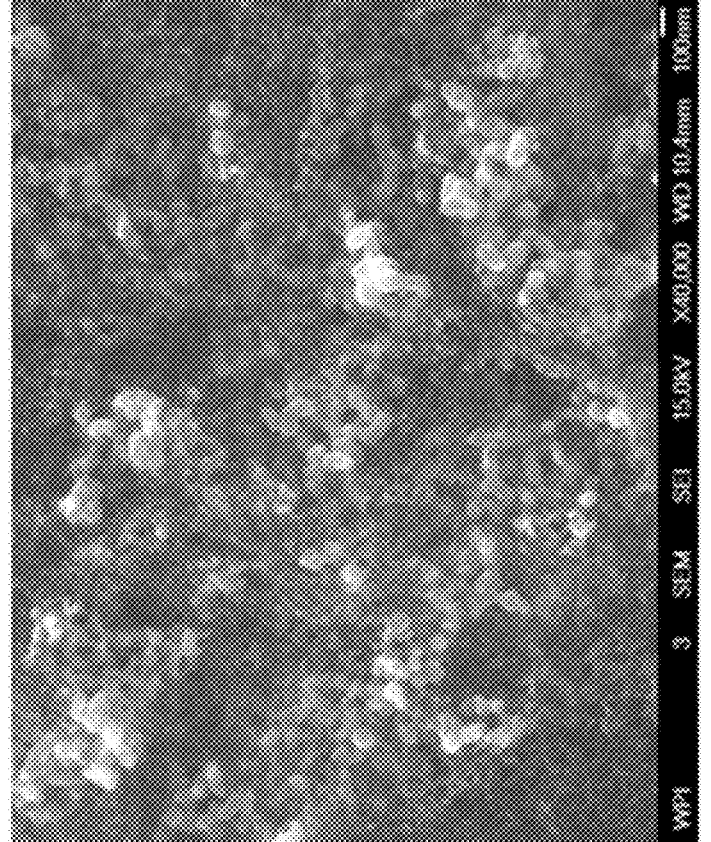
*FIG. 36*

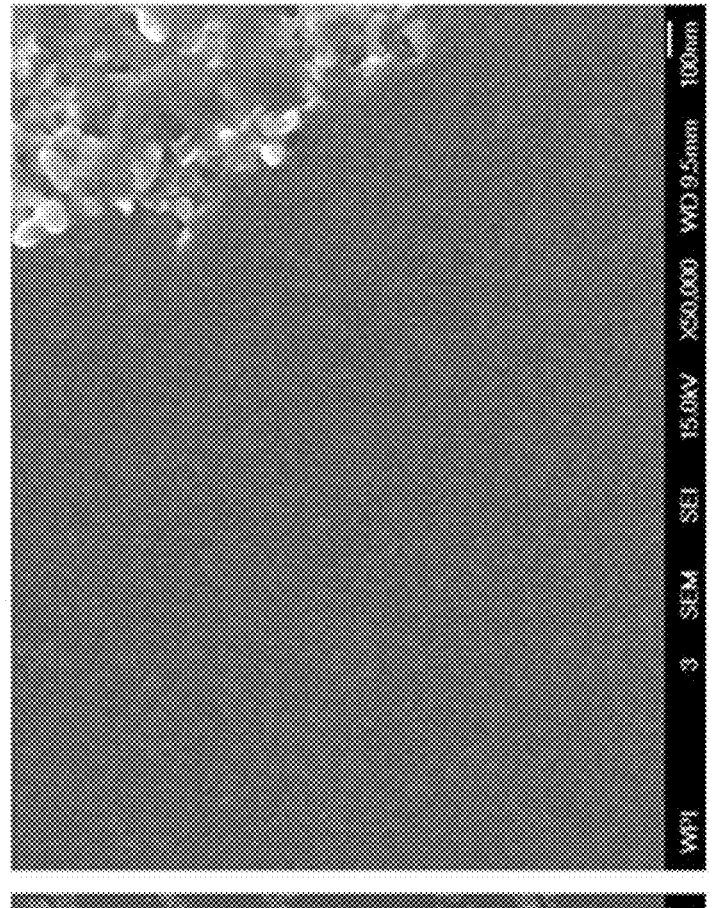
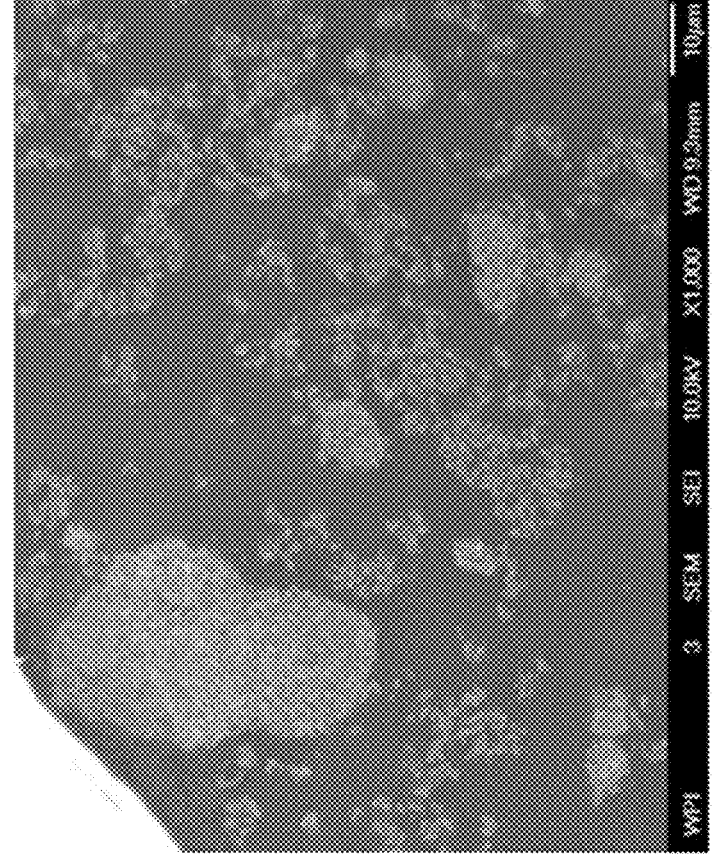
*FIG. 43*

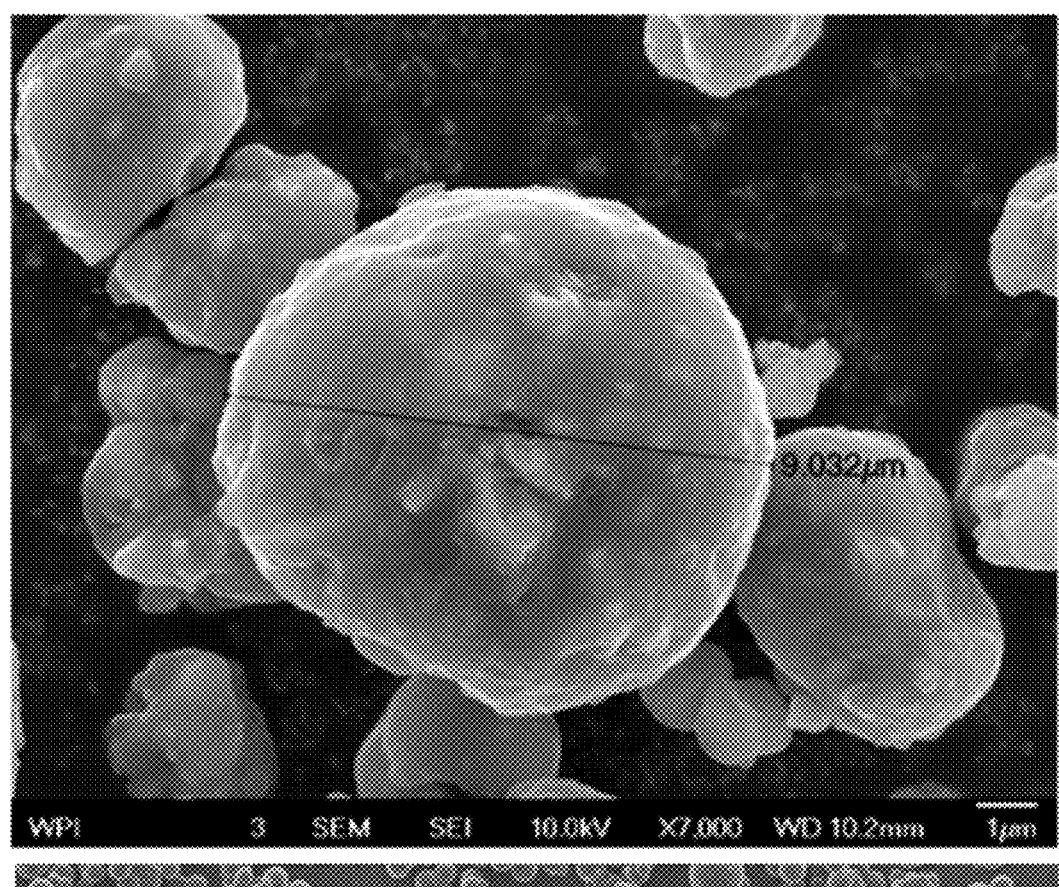
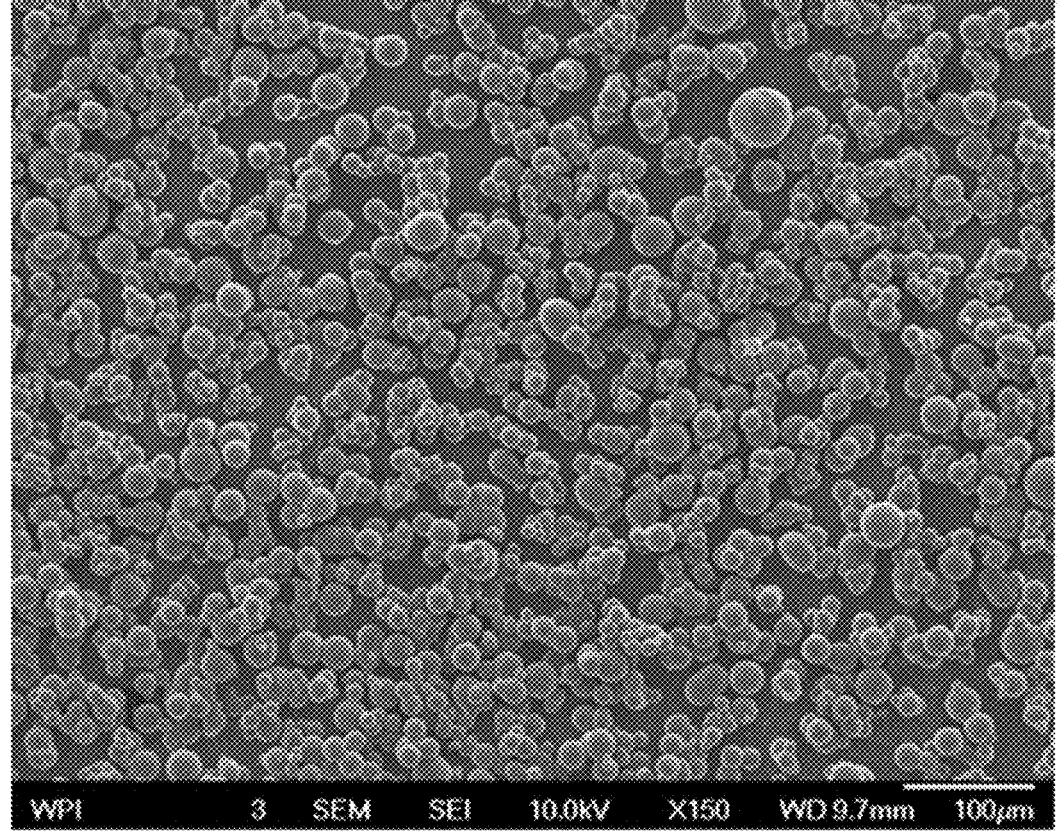
*FIG. 47*

*FIG. 49B*

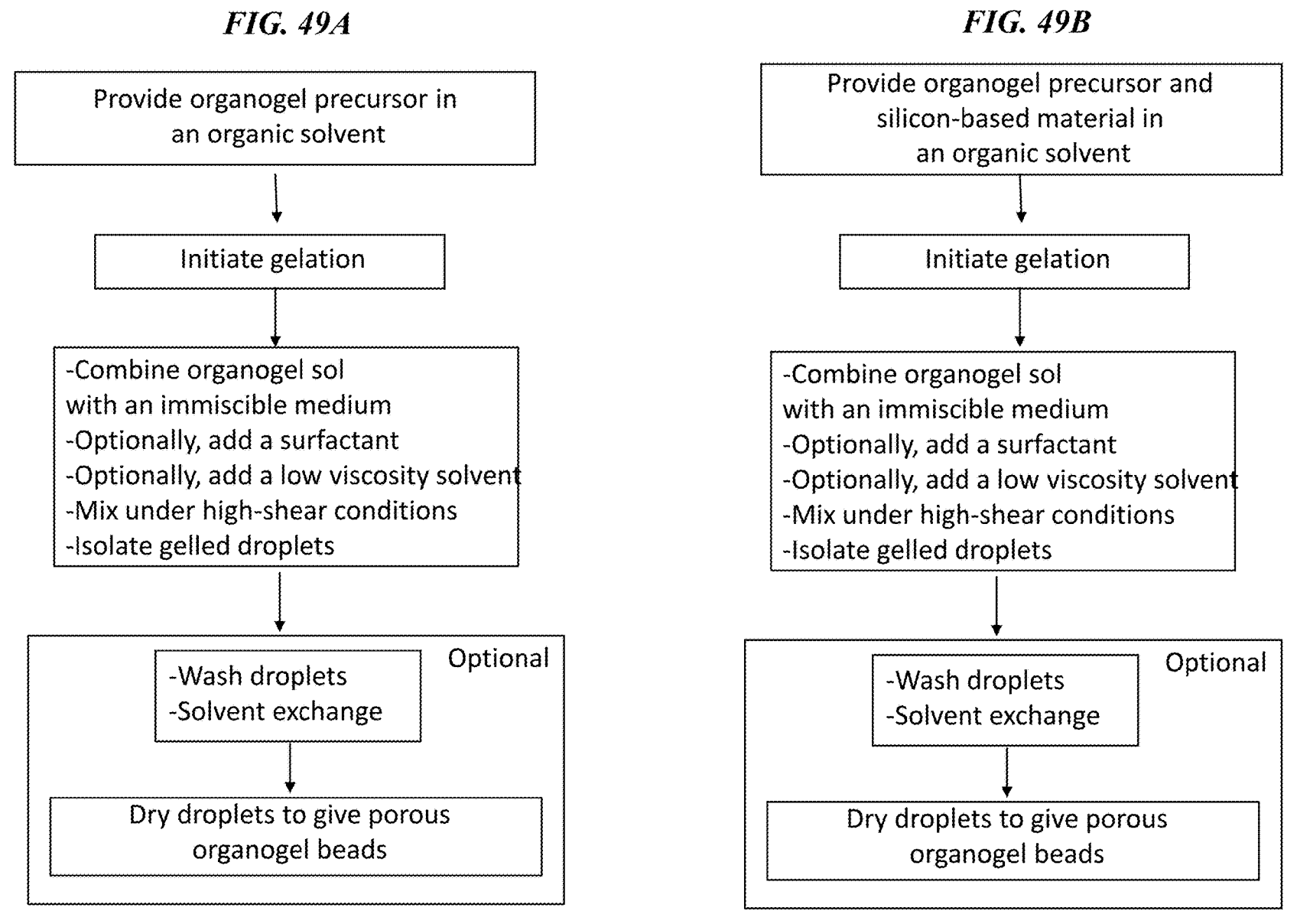

Provide organogel precursor and silicon-based material in an organic solvent

→

Initiate gelation

→

-Combine organogel sol with an immiscible medium
-Optionally, add a surfactant
-Optionally, add a low viscosity solvent
-Mix under high-shear conditions
-Isolate gelled droplets

→

Optional

-Wash droplets
-Solvent exchange

→

Dry droplets to give porous organogel beads

*FIG. 49A*

Provide organogel precursor in an organic solvent

→

Initiate gelation

→

-Combine organogel sol with an immiscible medium
-Optionally, add a surfactant
-Optionally, add a low viscosity solvent
-Mix under high-shear conditions
-Isolate gelled droplets

→

Optional

-Wash droplets
-Solvent exchange

→

Dry droplets to give porous organogel beads

POLYIMIDE BEAD MATERIALS AND METHODS OF MANUFACTURE THEREOF

CROSS REFERENCES TO RELATED APPLICATIONS

This application is a continuation of U.S. patent application Ser. No. 17/408,841 filed Aug. 23, 2021 which claims priority to U.S. Provisional Patent Application No. 63/070,230 filed Aug. 25, 2020, and is related to U.S. patent application Ser. No. 16/803,348 filed Feb. 27, 2020 (U.S. Pat. No. 11,648,521, granted May 16, 2023), which claims priority to U.S. Provisional Patent Application No. 62/811,230 filed Feb. 27, 2019, each of which applications are hereby incorporated by reference in their entirety, with any definitions of terms in the present application controlling.

TECHNICAL FIELD

The present disclosure relates generally to nanoporous carbon-based materials and processes for making the same.

BACKGROUND

Aerogels are solid materials that include a highly porous network of micro-sized and meso-sized pores. Depending on precursor materials used and processing undertaken, the pores of an aerogel can frequently account for over 90% of the volume when the density of the aerogel about 0.05 g/cc. Aerogels are generally prepared by removing the solvent from a gel (a solid network that contains its solvent) in a manner that minimal or no contraction of the gel can be brought by capillary forces at its surface. Methods of solvent removal include, but are not limited to, supercritical drying (or drying using supercritical fluids, such that the low surface tension of the supercritical fluid exchanges with the transient solvent within the gel), exchange of solvent with supercritical fluid, exchange of solvent with fluid that subsequently transformed to supercritical state, sub- or near-critical drying, and sublimating a frozen solvent in a freeze-drying process, see for example, PCT Patent Application Publication No. WO2016127084A1. It should be noted that when drying in ambient conditions, gel contraction may take place with solvent evaporation, and a xerogel can form. Therefore, aerogel preparation through a sol-gel process or other polymerization processes typically proceeds in the following series of steps: dissolution of the solute in a solvent, formation of the sol/solution/mixture, formation of the gel (may involve additional cross-linking), and solvent removal by either supercritical drying technique or any other method that removes solvent from the gel without causing pore collapse.

Aerogels can be formed of inorganic materials and/or organic materials. When formed of organic materials-such as phenols, resorcinol-formaldehyde (RF), phloroglucinol furfuraldehyde (PF), polyacrylonitrile (PAN), polyimide (PI), polyurethane (PU), polybutadiene, polydicyclopentadiene, and precursors or polymeric derivatives thereof, for example—the aerogel may be carbonized (e.g., by pyrolysis) to form a carbon aerogel, which can have properties (e.g., pore volume, pore size distribution, morphology, etc.) that differ or overlap from each other, depending on the precursor materials and methodologies used.

However, in all cases, there have been certain deficiencies based on material and application, for example low pore volume, wide pore size distribution, low mechanical strength, etc. Recently, there has been effort devoted to the development and characterization of carbon aerogels as electrode materials with improved performance for applications in energy storage devices, such as lithium-ion batteries (LIBs).

LIBs have seen widespread use in a variety of applications, from handheld electronics to automobiles. They are a type of rechargeable battery in which lithium ions travel from an anode to a cathode during discharge and from the cathode to the anode during charge. Conventionally, the cathode is formed of lithium metal (e.g., cobalt, nickel, manganese) oxide, and the anode is formed of graphite, where lithium ions intercalate within graphite layers during charge (energy storage). Graphite is widely used because lithium intercalation is higher with graphite than other known carbons.

A major drawback of conventional LIBs when there is an increasing demand for higher capacity anode and cathode materials is the limited capacity of graphite; in other words, graphite can accommodate only limited amounts of lithium. It is known that silicon has a greater affinity for lithium compared to graphite (carbon) and is capable of storing significantly higher amounts of lithium than graphite during charging, theoretically resulting in higher capacity on the anode side of the LIB. By comparison, graphite has a theoretical capacity of 372 mAh/g in combination with lithium, whereas silicon has a theoretical capacity of 4200 mAh/g. These numbers have resulted in a desire to dispose as much silicon as possible within the anode. A considerable problem with silicon, however, is that its volume expands 3-4× when fully lithiated (and often breaks or cracks), which drastically limits the amount of silicon that can be disposed within the electrode.

Accordingly, it would be desirable in the art to provide an improved nanoporous carbon material that includes a functional morphology and optimal pore structure, while resolving at least one of the issues discussed above.

While certain aspects of conventional technologies have been discussed to facilitate disclosure of the invention, Applicants in no way disclaim these technical aspects, and it is contemplated that the claimed invention may encompass one or more of the conventional technical aspects discussed herein, especially in combination with the innovative aspects described herein.

The present invention may address one or more of the problems and deficiencies of the art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY

The long-standing but heretofore unfulfilled need for an improved nanoporous carbon material is now met by embodiments of the present disclosure.

A first general aspect relates to methods of forming or manufacturing a particulate carbon composition. In an exemplary embodiment, a method includes providing a mixture of a polyimide precursor and a silicon-based material, initiating imidization of the mixture chemically or thermally, e.g., by adding an imidization catalyst or through heating; combining the mixture with a medium that is non-miscible with the mixture, thereby forming droplets of the imidized mixture, drying the droplets of the imidized mixture to yield a particulate porous polyimide silicon composite; and carbonizing, e.g., pyrolyzing, the particulate porous polyimide silicon composite to yield a particulate carbon composition that is greater than about 10% by weight silicon and with a porosity between about 10% and about 90%. In some embodiments, the medium that is non-miscible with the mixture, e.g., a dispersion medium, can form an emulsion with the imidized mixture as the dispersed phase. In any embodiment, the carbon composition can include a carbon aerogel and can be formed as a monolith or as particles.

In exemplary embodiments, the step of initiating imidization occurs before the step of combining the mixture with the medium that is non-miscible with the mixture. In other embodiments, the step of imidization can occur after the mixture is combined with the non-miscible medium, e.g., imidization of the mixture when it is in the non-miscible medium. In exemplary embodiments, the method can further include aging the particulate porous polyimide silicon composite before carbonizing.

Another general aspect relates to particulate carbon compositions, e.g., powders. In exemplary embodiments, the particulate carbon composition includes a composite material including a silicon-based material and carbon. Exemplary embodiments include a silicon-doped nanoporous carbon material including a pore structure, the pore structure including a fibrillar morphology and an array of pores that surround elemental silicon.

In any embodiment, the particulate carbon composition can have a particle size in the range of about 1 μm to about 15 μm. In some embodiments, the particulate carbon composition can have a particle size in the range of about 5 μm to about 10 μm.

In some embodiments, the particulate carbon composition can have a tap density in the range of about 0.3 g/cm$^3$ to about 1.3 g/cm$^3$. In some embodiments, the particulate carbon composition can have a tap density of about 0.7 g/cm$^3$.

In some embodiments, the composite material includes greater than about 10% by weight of the silicon-based material. In certain embodiments, the composite material includes about 20% to about 60% by weight of the silicon-based material. In some embodiments, the composite material includes about 10% to about 90% by weight of the silicon-based material. For example, the composite material can include an amount by weight of the silicon-based material of about 10%, about 15%, about 20%, about 30%, about 35%, about 40%, about 45%, about 50%, about 55%, about 60%, about 65%, about 70%, about 75%, about 80%, about 85%, about 90%, or in a range between any two of these values.

In some embodiments, the particulate carbon composition comprises a particulate carbon aerogel, e.g., a polyimide-derived carbon aerogel. In other embodiments, the particulate carbon composition comprises a particulate carbon xerogel, e.g., a polyimide-derived carbon xerogel. In any embodiment, the particles can have a diameter in a range of about 1 micrometer to about 50 micrometers.

In any embodiment, the pore structure of the carbon composition may be characterized by pores of the carbon material partially, substantially, or completely surrounding the silicon-based material, for example by forming interconnected structures around the silicon characterized by multiple connection points between the silicon and pore walls. For example, the silicon-based material can be present at least partially within the pore structure of the carbon composition. For another example, the pore structure can include a fibrillar morphology and an array of pores that surround the silicon-based material.

In exemplary embodiments, the carbon material has one or more of a pore structure comprising a fibrillar morphology, a Young modulus of at least about 0.2 GPa, an electrical conductivity of at least about 10 S/cm, and a density between about 0.15 g/cc and about 1.5 g/cc.

In another exemplary embodiment, the carbon composition includes a silicon-doped nanoporous carbon material having a silicon utilization of at least about 20%, wherein the carbon material is doped with greater than about 25% of silicon by weight of the carbon material. Optionally, the carbon material can have an electrical conductivity of at least about 10 S/cm. Optionally, the carbon material can have a Young modulus of at least about 0.2 GPa.

In a further exemplary embodiment, the particulate carbon composition includes a silicon-doped nanoporous carbon material having the following properties: a pore structure comprising a fibrillar morphology, a Young modulus of at least about 0.2 GPa, a density between about 0.15 g/cc and about 1.5 g/cc, and a silicon utilization of at least about 20%. Optionally, the carbon material can have an electrical conductivity of at least about 10 S/cm.

In another exemplary embodiment, the particulate carbon composition includes a silicon-doped nanoporous carbon material having the following properties: a pore structure comprising a fibrillar morphology, an electrical conductivity of at least 10 S/cm, a density between about 0.15 g/cc and about 1.5 g/cc, and a silicon utilization of at least about 20%. Optionally, the carbon material can have a Young modulus of at least about 0.2 GPa.

In any embodiment, the nanoporous carbon material can be doped with about 5%-80% of silicon by weight of the carbon material. For example, the carbon material can include about 25% to about 65% of silicon by weight of the carbon material.

In any embodiment, the nanoporous carbon material can have a pore volume of at least 0.3 cc/g.

In any embodiment, the nanoporous carbon material can have a pre-lithiation porosity between about 10% and about 80%.

In any embodiment, the carbon material, e.g., the nanoporous carbon material, can include residual nitrogen of at least about 4 wt %.

In any embodiment, the silicon-doped nanoporous carbon material can have a capacity of at least about 800 mAh/g. For example, the silicon-doped nanoporous carbon material can have a capacity up to about 2000 mAh/g.

In any embodiment, the pore structure of the nanoporous carbon material can include a full width at half max of about 50 nm or less (i.e., a narrow pore size distribution).

In any embodiment, the pore structure of the nanoporous carbon material can include a pore size at max peak from distribution of about 100 nm or less.

In any embodiment, the fibrillar morphology of the nanoporous carbon material can include an average strut width of about 2-10 nm, or even more specifically about 2-5 nm.

A further embodiment provides an electrode comprising the particulate carbon composition as described. This electrode may be the anode. Another embodiment provides an electrochemical cell comprising the particulate carbon composition, nanoporous carbon material, and/or the electrode as described. A further embodiment provides an energy storage device, such as a battery or more specifically a lithium-ion battery, comprising the particulate carbon composition, nanoporous carbon material, and/or the electrochemical cell as described.

In another aspect is provided a method of forming a porous carbon composition in bead form, the method comprising:

providing an organogel precursor in an organic solvent;

initiating gelation of the organogel precursor to provide an organogel sol;

combining the organogel sol with a medium that is non-miscible with the organic solvent, thereby forming droplets of organogel;

isolating the droplets of the organogel;

drying the droplets to yield porous organogel composite beads; and pyrolyzing the porous organogel composite beads to yield the porous carbon composition, wherein the porous carbon composition has a porosity between about 10% and about 90%.

In some embodiments, initiating gelation occurs before combining the organogel sol with the medium.

In some embodiments, the organogel precursor is a polyamic acid. In some embodiments, the polyamic acid comprises a tetracarboxylic acid and a multifunctional amine.

In some embodiments, the tetracarboxylic acid is selected from the group consisting of benzene-1,2,4,5-tetracarboxylic acid, [1,1'-biphenyl]-3,3',4,4'-tetracarboxylic acid, 4,4'-oxydiphthalic acid, 4,4'-sulfonyldiphthalic acid, 4,4'-carbonyldiphthalic acid, 4,4'-(propane-2,2-diyl)diphthalic acid, 4,4'-(perfluoropropane-2,2-diyl)diphthalic acid, naphthalene-1,4,5,8-tetracarboxylic acid, 4-(2-(4-(3,4-dicarboxyphenoxy)phenyl) propan-2-yl) phthalic acid, perylene tetracarboxylic acid, and combinations thereof.

In some embodiments, the multifunctional amine is an alkane diamine or an aryl diamine. In some embodiments, the alkane diamine is ethylenediamine, 1,3-diaminopropane, 1,4-diaminobutane, 1,5-diaminopentane, 1,6-diaminohexane, or a combination thereof. In some embodiments, the aryl diamine is 1,4-phenylenediamine, 4,4'-diaminodiphenyl ether, 4,4'-methylenedianiline, or a combination thereof.

In some embodiments, the gelation is chemical imidization, thermal imidization, or a combination of chemical and thermal imidization. In some embodiments, the chemical imidization comprises adding a dehydrating agent and an amine base. In some embodiments, the dehydrating agent is acetic anhydride. In some embodiments, the amine base is pyridine.

In some embodiments, the organic solvent is N,N-dimethylacetamide, N,N-dimethylformamide, N-methylpyrrolidone, tetrahydrofuran, or ethyl acetate. In some embodiments, the organic solvent is N,N-dimethylacetamide.

In some embodiments, the organic solvent further comprises water in an amount from about 100 to about 1500 parts per million (ppm). In some embodiments, the organic solvent further comprises water in an amount from about 500 to about 1200 ppm, or about 500 to about 700 ppm.

In some embodiments, the medium has a viscosity of about 100 to about 150 cP.

In some embodiments, the medium is mineral oil, a silicone oil, or a C5-C12 hydrocarbon.

In some embodiments, the method further comprises adding one or more surfactants to the medium.

In some embodiments, the organogel precursor solution has a viscosity of about 5 to about 30 cP.

In some embodiments, a ratio of the viscosity of the medium to the viscosity of the organogel precursor solution is from about 3 to about 30, or from about 5 to about 20.

In some embodiments, the method further comprises adding a low-viscosity solvent to the medium. In some embodiments, the low-viscosity solvent is added in a single portion in an amount up to about 10% by volume of the medium. In some embodiments, the low-viscosity solvent is added in two or more portions, comprising a first portion in an amount up to about 10% by volume of the medium, and a further one or more portions, wherein a total amount of the low viscosity solvent added is up to about 50% by volume of the medium. In some embodiments, the low-viscosity solvent is added in a continuous manner, wherein a total amount of the low viscosity solvent added is up to about 50% by volume of the medium. In some embodiments, the low-viscosity solvent is a C1 to C3 alcohol.

In some embodiments, the combining comprises stirring the organogel precursor solution under high-shear conditions.

In some embodiments, drying comprises lyophilizing the organogel, exposing the organogel to elevated temperature conditions, or contacting the organogel with supercritical fluid $CO_2$, or contacting the organogel with liquid $CO_2$ and evaporating the liquid $CO_2$ as a gas.

In some embodiments, the method further comprises aging the porous organogel composite before pyrolyzing.

In some embodiments, the porous carbon composition comprises a carbon aerogel. In some embodiments, the porous carbon composition comprises a carbon xerogel.

In some embodiments, the porous carbon composition beads have a diameter in a range from about 1 micrometer to about 50 micrometers, or from about 1 to about 15 micrometers.

In some embodiments, the porous carbon composition is a porous carbon-silicon composition, the porous carbon-silicon composition comprising greater than about 10% by weight of silicon, based on the total weight of the composition, the method further comprising providing a mixture of the organogel precursor and silicon in the organic solvent.

In some embodiments, the porous carbon-silicon composition comprises from about 20% to about 65% by weight of silicon, based on the total weight of the composition.

In some embodiments, the porous carbon-silicon composition comprises a pore structure, and the silicon is present at least partially within the pore structure. In some embodiments, the pore structure comprises a fibrillar morphology and an array of pores that surround the silicon.

In some embodiments, the porous carbon-silicon composition has a capacity of at least about 800 mAh/g.

In some embodiments, the porous carbon-silicon composition has a silicon utilization efficiency of at least about 20%.

In another aspect is provided a porous carbon composition in the form of beads, the porous carbon composition comprising a composite material including carbon, the beads having a diameter in a range of about 1 μm to about 15 μm, and a tap density in the range of about 0.3 g/cm³ to about 1.3 g/cm³.

In some embodiments, the carbon comprises a carbon aerogel or a carbon xerogel.

In some embodiments, the composite material further comprises silicon in an amount greater than about 10% by weight, based on the total weight of the composite material.

In some embodiments, the composite material comprises from about 25% to about 65% by weight of silicon, based on the total weight of the composite material.

In some embodiments, the carbon has a pore structure, and the silicon is present at least partially within the pore structure.

In some embodiments, the composite material has a silicon utilization efficiency of at least about 20%.

In some embodiments, the silicon has a particle size less than about 150 nm. In some embodiments, the silicon has a particle size in the range of about 150 nm to about 500 nm. In some embodiments, the silicon has a particle size greater than about 500 nm.

In some embodiments, the composite material comprises silicon in a range from about 25 to about 65% by weight, based on the total weight of the composite material, wherein the silicon has a particle size in a range from about 100 nm to about 800 nm; and wherein the beads have a tap density in a range of about 0.2 $g/cm^3$ to about 1.5 $g/cm^3$; a diameter in a range of about 1 μm to about 15 μm; an average pore diameter in a range from about 10 nm to about 50 nm; and a BET surface area in a range from about 0 to about 500 $m^2/g$.

In some embodiments, the porous carbon-silicon composition has a capacity of at least about 800 mAh/g.

In another aspect is provided an energy storage device comprising the porous carbon composition as disclosed herein. In some embodiments, the energy storage device is a lithium-ion battery.

The disclosure includes, without limitations, the following embodiments.

Embodiment 1: A method of forming a porous carbon composition in bead form, the method comprising:

providing an organogel precursor in an organic solvent;

initiating gelation of the organogel precursor to provide an organogel sol;

combining the organogel sol with a medium that is non-miscible with the organogel sol, thereby forming droplets of organogel;

isolating the droplets of the organogel;

drying the droplets to yield porous organogel beads; and pyrolyzing the porous organogel beads to yield the porous carbon composition in bead form, wherein the porous carbon composition has a porosity between about 10% and about 90%.

Embodiment 2: The method of embodiment 1, wherein initiating gelation occurs before combining the mixture with the medium.

Embodiment 3: The method of embodiment 1 or 2, wherein the organogel precursor is a polyamic acid.

Embodiment 4: The method of any one of embodiments 1-3, wherein gelation is chemical imidization, thermal imidization, or a combination of chemical and thermal imidization.

Embodiment 5: The method of any one of embodiments 1-4, wherein the polyamic acid comprises a tetracarboxylic acid and a multifunctional amine.

Embodiment 6: The method of any one of embodiments 1-5, wherein the tetracarboxylic acid is selected from the group consisting of benzene-1,2,4,5-tetracarboxylic acid, [1,1'-biphenyl]-3,3',4,4'-tetracarboxylic acid, 4,4'-oxydiphthalic acid, 4,4'-sulfonyldiphthalic acid, 4,4'-carbonyldiphthalic acid, 4,4'-(propane-2,2-diyl)diphthalic acid, 4,4'-(perfluoropropane-2,2-diyl)diphthalic acid, naphthalene-1,4,5,8-tetracarboxylic acid, 4-(2-(4-(3,4-dicarboxyphenoxy) phenyl) propan-2-yl) phthalic acid, perylene tetracarboxylic acid, and combinations thereof.

Embodiment 7: The method of any one of embodiments 1-6, wherein the multifunctional amine is an alkane diamine or an aryl diamine.

Embodiment 8: The method of any one of embodiments 1-7, wherein the alkane diamine is ethylenediamine, 1,3-diaminopropane, 1,4-diaminobutane, 1,5-diaminopentane, 1,6-diaminohexane, or a combination thereof.

Embodiment 9: The method of any one of embodiments 1-8, wherein the aryl diamine is 1,4-phenylenediamine, 4,4'-diaminodiphenyl ether, 4,4'-methylenedianiline, or a combination thereof.

Embodiment 10: The method of any one of embodiments 1-9, wherein the chemical imidization comprises adding a dehydrating agent and an amine base.

Embodiment 11: The method of any one of embodiments 1-10, wherein the dehydrating agent is acetic anhydride.

Embodiment 12: The method of any one of embodiments 1-11, wherein the amine base is pyridine.

Embodiment 13: The method of any one of embodiments 1-12, wherein the organic solvent is N,N-dimethylacetamide, N,N-dimethylformamide, N-methylpyrrolidone, tetrahydrofuran, or ethyl acetate.

Embodiment 14: The method of any one of embodiments 1-13, wherein the organic solvent is N,N-dimethylacetamide.

Embodiment 15: The method of any one of embodiments 1-14, wherein the organic solvent further comprises water in an amount from about 100 to about 1500 parts per million (ppm).

Embodiment 16: The method of any one of embodiments 1-3, wherein the organic solvent further comprises water in an amount from about 500 to about 1200 ppm, or about 500 to about 700 ppm.

Embodiment 17: The method of any one of embodiments 1-16, wherein the medium has a viscosity of about 100 to about 150 cP.

Embodiment 18: The method of any one of embodiments 1-17, wherein the medium is mineral oil, silicone oil, or a C5-C12 hydrocarbon.

Embodiment 19: The method of any one of embodiments 1-18, further comprising adding one or more surfactants to the medium.

Embodiment 20: The method of any one of embodiments 1-19, wherein the organogel sol has a viscosity of about 5 to about 30 cP.

Embodiment 21: The method of any one of embodiments 1-20, wherein a ratio of the viscosity of the medium to the viscosity of the organogel sol is from about 3 to about 30, or from about 5 to about 20.

Embodiment 22: The method of any one of embodiments 1-21, further comprising adding a low-viscosity solvent to the medium.

Embodiment 23: The method of any one of embodiments 1-22, wherein the low-viscosity solvent is added in a single portion in an amount up to about 10% by volume of the medium.

Embodiment 24: The method of any one of embodiments 1-23, wherein the low-viscosity solvent is added in two or more portions, comprising a first portion in an amount up to about 10% by volume of the medium, and a further one or more portions, wherein a total amount of the low viscosity solvent added is up to about 50% by volume of the medium.

Embodiment 25: The method of any one of embodiments 1-24, wherein the low-viscosity solvent is added in a continuous manner, wherein a total amount of the low viscosity solvent added is up to about 50% by volume of the medium.

Embodiment 26: The method of any one of embodiments 1-25, wherein the low-viscosity solvent is a C1 to C3 alcohol.

Embodiment 27: The method of any one of embodiments 1-26, wherein combining comprises stirring under high-shear conditions.

Embodiment 28: The method of any one of embodiments 1-27, wherein drying comprises lyophilizing the organogel beads, exposing the organogel beads to elevated temperature conditions, contacting the organogel beads with supercritical fluid $CO_2$, or contacting the organogel beads with liquid $CO_2$ and evaporating the $CO_2$ as a gas.

Embodiment 29: The method of any one of embodiments 1-28, further comprising aging the porous organogel beads before pyrolyzing.

Embodiment 30: The method of any one of embodiments 1-29, wherein the porous carbon composition comprises a carbon aerogel.

Embodiment 31: The method of any one of embodiments 1-30, wherein the porous carbon composition comprises a carbon xerogel.

Embodiment 32: The method of any one of embodiments 1-31, wherein beads of the porous carbon composition have a diameter in a range from about 1 micrometer to about 50 micrometers.

Embodiment 33: The method of any of embodiments 1-32, wherein the porous carbon composition is a porous carbon-silicon composition comprising greater than about 10% by weight of silicon based on the total weight of the composition, the method further comprising providing silicon in a mixture with the organogel precursor in the organic solvent.

Embodiment 34: The method of any of embodiments 1-33, wherein the porous carbon-silicon composition comprises from about 20% to about 65% by weight of silicon, based on the total weight of the composition.

Embodiment 35: The method of any of embodiments 1-34, wherein the porous carbon-silicon composition comprises a pore structure, and wherein the silicon is present at least partially within the pore structure.

Embodiment 36: The method of any of embodiments 1-35, wherein the pore structure comprises a fibrillar morphology and an array of pores that surround the silicon.

Embodiment 37: The method of any of embodiments 1-36, wherein the porous carbon-silicon composition has a capacity of at least about 800 mAh/g.

Embodiment 38: The method of any one of embodiments 1-37, wherein the porous carbon-silicon composition has a silicon utilization efficiency of at least about 20%.

Embodiment 39: A porous carbon composition in the form of beads, the porous carbon composition comprising a composite material including carbon, wherein the beads have a diameter in a range of about 1 μm to about 15 μm, and a tap density in a range of about 0.3 g/cm³ to about 1.3 g/cm³.

Embodiment 40: The porous carbon composition of embodiment 39, wherein the carbon comprises a carbon aerogel or a carbon xerogel.

Embodiment 41: The porous carbon composition of embodiment 39 or 40, wherein the composite material further comprises silicon in an amount greater than about 10% by weight, based on the total weight of the composition.

Embodiment 42: The porous carbon composition of any one of embodiments 39-41, wherein the composite material comprises from about 25% to about 65% by weight of silicon, based on the total weight of the composition.

Embodiment 43: The porous carbon composition of any one of embodiments 39-42, wherein the carbon comprises a pore structure, and wherein the silicon is present at least partially within the pore structure.

Embodiment 44: The porous carbon composition of any one of embodiments 39-43, wherein the composite material has a silicon utilization efficiency of at least about 20%.

Embodiment 45: The porous carbon composition of any one of embodiments 39-44, wherein the silicon has a particle size less than about 150 nm.

Embodiment 46: The porous carbon composition of any one of embodiments 39-45, wherein the silicon has a particle size in the range of about 150 nm to about 500 nm.

Embodiment 47: The porous particulate carbon composition of any of embodiments 39-46, wherein the silicon has a particle size greater than about 500 nm.

Embodiment 48: The porous carbon composition of any one of embodiments 39-47, wherein the composite material comprises silicon in a range from about 25 to about 65% by weight, the silicon having a particle size in a range from about 30 nm to about 800 nm; and wherein the beads have:
    a tap density in the range of about 0.2 g/cm³ to about 1.5 g/cm³;
    a diameter in the range of about 1 μm to about 15 μm;
    an average pore diameter in a range from about 10 nm to about 50 nm; and
    a BET surface area in a range from about 0 to about 500 m²/g.

Embodiment 49: The porous carbon composition of any one of embodiments 39-49, having a capacity of at least about 800 mAh/g.

Embodiment 50: An energy storage device comprising the porous carbon composition of any one of embodiments 39-49.

Embodiment 51: The energy storage device of embodiment 50, which is a lithium-ion battery.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

In order to provide an understanding of embodiments of the technology, reference is made to the appended drawings, which are not necessarily drawn to scale. The drawings are exemplary only, and should not be construed as limiting the technology. The disclosure described herein is illustrated by way of example and not by way of limitation in the accompanying figures.

FIG. 13B is SEM images of CPI composites with a thickness of about 180 micrometers.

FIG. 20 is a schematic depicting polyamic acid formation.

FIG. 28 depicts properties and microscopy pictures of carbon/Si infiltrated in carbon fiber (4 g/m$^2$).

FIG. 29 depicts properties and microscopy pictures of carbon/Si infiltrated in carbon fiber (2 g/m$^2$).

FIG. 32 is SEM images of thick composite (~0.6 mm), where Si and PI were mixed for 16 hrs.

FIG. 33 is SEM images of thin composite (~0.12 mm), where Si and PI were mixed for 16 hrs.

FIG. 34 is SEM images of a monolith sample, where Si and PI were mixed for 16 hrs.

FIG. 35 is SEM cross-sectional images of C/Si monoliths, where Si and PI mixed for 16 hrs in the left image, Si and PI mixed for 4-6 min in the right image.

FIG. 36 is SEM cross-sectional images of C/Si composites, where Si and PI mixed for 16 hrs in the left image, Si and PI mixed for 4-6 min in the right image.

FIG. 43 depicts SEM images of C/Si aerogel (resulting from PF/Si aerogel).

FIG. 47 is SEM images of particulate C/Si aerogel samples according to embodiments disclosed herein.

FIG. 49A is a flow diagram illustrating a non-limiting process for formation of an organogel material in bead form according to an embodiment of the disclosure.

FIG. 49B is a flow diagram illustrating a non-limiting process for formation of an organogel-silicon composite material in bead form according to an embodiment of the disclosure.

FIG. 50 is an SEM image of a C/Si aerogel bead according to embodiments disclosed herein.

FIG. 52 is an SEM image of a C/Si xerogel bead according to embodiments disclosed herein.

DETAILED DESCRIPTION

Figure 1:
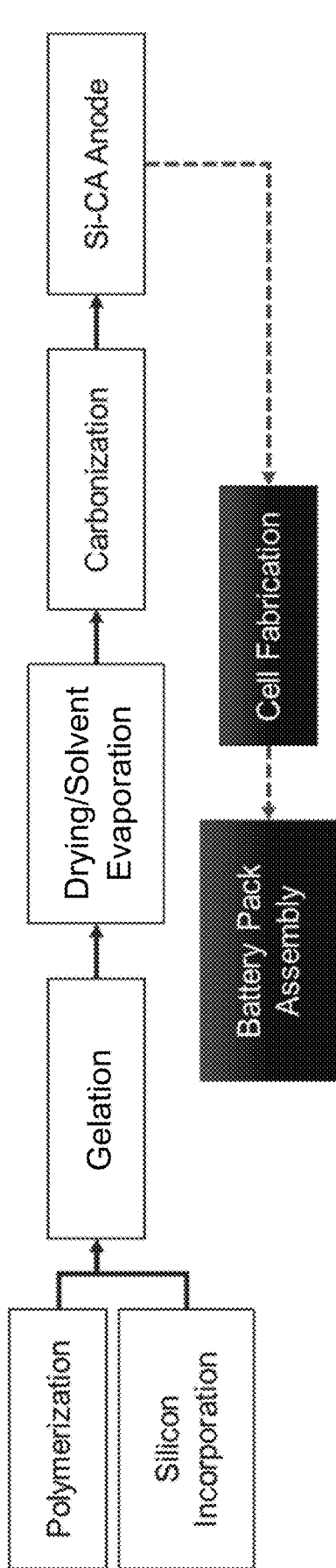
FIG. 1 is a flow diagram illustrating formation of a carbon aerogel for use within a battery application.

In the following detailed description of the invention, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

Definitions

With respect to the terms used in this disclosure, the following definitions are provided. This application will use the following terms as defined below unless the context of the text in which the term appears requires a different meaning.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

As used herein, "about" means approximately or nearly and in the context of a numerical value or range set forth means ±15% of the numerical. In an embodiment, the term "about" can include traditional rounding according to significant figures of the numerical value. In addition, the phrase "about 'x' to 'y'" includes "about 'x' to about 'y'".

Within the context of the present disclosure, the terms "framework" or "framework structure" refer to the network of interconnected oligomers, polymers, or colloidal particles that form the solid structure of a gel, an aerogel, or a xerogel. The polymers or particles that make up the framework structures typically have a diameter of about 100 Angstroms. However, framework structures of the present disclosure can also include networks of interconnected oligomers, polymers, or colloidal particles of all diameter sizes that form the solid structure within in a gel, an aerogel, or a xerogel.

As used herein, the term "aerogel" or "aerogel material" refers to a solid object, irrespective of shape or size, comprising a framework of interconnected solid structures, with a corresponding network of interconnected pores integrated within the framework, and containing gases such as air as a dispersed interstitial medium. As such, aerogels are open non-fluid colloidal or polymer networks that are expanded throughout their whole volume by a gas, and are formed by the removal of all swelling agents from a corresponding wet-gel without substantial volume reduction or network compaction. Aerogels are generally characterized by the following physical and structural properties (according to nitrogen porosimetry testing and helium pycnometry) attributable to aerogels: (a) an average pore diameter ranging from about 2 nm to about 100 nm; (b) a porosity of at least 60% or more, and (c) a surface area of about 100 $m^2$/g or more, such as from about 100 to about 600 $m^2$/g as measured by nitrogen sorption analysis. It can be understood that the inclusion of additives, such as a reinforcement material or an electrochemically active species, for example, silicon, may decrease porosity and the surface area of the resulting aerogel composite. Densification may also decrease porosity of the resulting aerogel composite. Aerogel materials of the present disclosure (e.g., polyimide and carbon aerogels) include any aerogels which satisfy the defining elements set forth in the previous paragraph.

Aerogel materials of the present disclosure thus include any aerogels or other open-celled compounds, which satisfy the defining elements set forth in previous paragraphs, including compounds, which can be otherwise categorized as xerogels, cryogels, ambigels, microporous materials, and the like.

Within the context of the present disclosure, the term "aerogel composition" refers to any composite material that includes aerogel material as a component of the composite. Examples of aerogel compositions include, but are not limited to, fiber-reinforced aerogel composites; aerogel composites including additive elements such as opacifiers and electrochemically active species; aerogel-foam composites; aerogel-polymer composites; and composite materials incorporating aerogel particulates, particles, granules, beads, or powders into a solid or semi-solid material, such as binders, resins, cements, foams, polymers, or similar solid materials.

Within the context of the present disclosure, the term "reinforced aerogel composition" refers to aerogel compositions comprising a reinforcing phase within the aerogel material, which either is not part of the aerogel framework or can be modified in a manner to covalently bond to the aerogel framework. The reinforcing phase can be any material that provides increased flexibility, resilience, conformability, or structural stability to the aerogel material. Examples of well-known reinforcing materials include, but are not limited to, open-cell foam reinforcement materials, closed-cell foam reinforcement materials, open-cell membranes, honeycomb reinforcement materials, polymeric reinforcement materials, and fiber reinforcement materials such as discrete fibers, woven materials, non-woven materials, battings, webs, mats, and felts. Additionally, reinforcements may be combined with one or more of the other reinforcing materials and can be oriented continuously throughout or in limited preferred parts of the composition. In other embodiments, no reinforcement phase may be used at all, if the aerogel material and/or aerogel framework is structurally stable on its own (i.e., self-sustaining). This self-sustaining nature of certain carbon aerogels will become clearer as this specification continues.

As used herein, the term "xerogel" refers to a gel comprising an open, non-fluid colloidal or polymer networks that is formed by the removal of all swelling agents from a corresponding gel without any precautions taken to avoid substantial volume reduction or to retard compaction. In contrast to an aerogel, a xerogel generally comprises a compact structure. Xerogels suffer substantial volume reduction during ambient pressure drying, and have surface areas of 0-100 $m^2/g$, such as from about 0 to about 20 $m^2/g$ as measured by nitrogen sorption analysis.

As used herein, the term "gelation" or "gel transition" refers to the formation of a wet-gel from a polymer system, e.g., a polyimide or polyamic acid as described herein. At a point in the polymerization or dehydration reactions as described herein, which is defined as the "gel point," the sol loses fluidity. Without intending to be bound to any particular theory, the gel point may be viewed as the point where the gelling solution exhibits resistance to flow. In the present context, gelation proceeds from an initial sol state, where the solution comprises primarily the amine salt of the polyamic acid, through a fluid colloidal dispersion state, until sufficient polyimide has formed to reach the gel point. Gelation may continue thereafter, producing a polyimide wet-gel dispersion of increasing viscosity. The amount of time it takes for the polymer (i.e., polyamic acid and/or polyimide) in solution to transform into a gel in a form that can no longer flow is referred to as the "phenomenological gelation time." Formally, gelation time is measured using rheology. At the gel point, the elastic property of the solid gel starts dominating over the viscous properties of the fluid sol. The formal gelation time is near the time at which the real and imaginary components of the complex modulus of the gelling sol cross. The two moduli are monitored as a function of time using a rheometer. Time starts counting from the moment the last component of the sol is added to the solution. See, for example, discussions of gelation in H. H. Winter "Can the Gel Point of a Cross-linking Polymer Be Detected by the G'-G" Crossover?" Polym. Eng. Sci., 1987, 27, 1698-1702; S.-Y. Kim, D.-G. Choi and S.-M. Yang "Rheological analysis of the gelation behavior of tetraethylorthosilane/vinyltricthoxysilane hybrid solutions" Korean J. Chem. Eng., 2002, 19, 190-196; and M. Muthukumar "Screening effect on viscoelasticity near the gel point" Macromolecules, 1989, 22, 4656-4658.

Within the context of the present disclosure, the term "wet gel" refers to a gel in which the mobile interstitial phase within the network of interconnected pores is primarily comprised of a liquid phase such as a conventional solvent, liquefied gases such as liquid carbon dioxide, or a combination thereof. Aerogels typically require the initial production of a wet gel, followed by processing and extraction to replace the mobile interstitial liquid phase in the gel with air or another gas. Examples of wet gels include, but are not limited to: alcogels, hydrogels, ketogels, carbonogels, and any other wet gels known to those in the art.

Within the context of the present disclosure, the terms "additive" or "additive element" refer to materials that can be added to a composition before, during, or after the production of the composition. Additives can be added, for example, to alter or improve desirable properties in an aerogel composition, or to counteract or mitigate undesirable properties in an aerogel composition. Additives are typically added to an aerogel composition either prior to or during gelation. Additives can also be added to the aerogel composition via atomic layer deposition or chemical vapor deposition (CVD). A particular example of an additive is an electrochemically active species, such as silicon, e.g., silicon particles.

Within the context of the present disclosure, the term "average particle size" is synonymous with D50, meaning half of the population of particles has a particle size above this point, and half below. Particle size may be measured by laser light scattering techniques or by microscopic techniques. D90 particle size distribution indicates that 90% of the particles (by number) have a Feret diameter below a certain size as measured by Scanning Electron Microscopy (SEM) or Transmission Electron Microscopy (TEM). D10 particle size distribution indicates that 10% of the particles (by number) have a Feret diameter below a certain size as measured by Scanning Electron Microscopy (SEM) or Transmission Electron Microscopy (TEM).

Within the context of the present disclosure, the term "electrical conductivity" refers to a measurement of the ability of a material to conduct an electric current or other allow the flow of electrons therethrough or therein. Electrical conductivity is specifically measured as the electric conductance/susceptance/admittance of a material per unit size of the material. It is typically recorded as S/m (Siemens/meter) or S/cm (Seimens/centimeter). The electrical conductivity or resistivity of a material may be determined by methods known in the art, for example including, but not limited to: In-line Four Point Resistivity (using the Dual Configuration test method of ASTM F84-99). Within the context of the present disclosure, measurements of electrical conductivity are acquired according to ASTM F84-resistivity (R) measurements obtained by measuring voltage (V) divided by current (I), unless otherwise stated. In certain embodiments, aerogel materials or compositions of the present disclosure have an electrical conductivity of about 10 S/cm or more, 20 S/cm or more, 30 S/cm or more, 40 S/cm or more, 50 S/cm or more, 60 S/cm or more, 70 S/cm or more, 80 S/cm or more, or in a range between any two of these values.

Within the context of the present disclosure, the term "electrochemically active species" refers to an additive that is capable of accepting and releasing ions within an energy storage device. Using LIBs as an example, an electrochemically active species within the anode accepts lithium ions during charge and releases lithium ions during discharge. The electrochemically active species can be stabilized within the anode by having a direct/physical connection with the nanoporous carbon (e.g., carbon-silicon composite aerogel beads). In certain embodiments, the nanoporous carbon network forms interconnected structures around the electrochemically active species. The electrochemically active species is connected to the nanoporous carbon at a plurality of points. An example of an electrochemically active species is silicon, which expands upon lithiation and can crack or break, as previously noted. However, because silicon has multiple connection points with the nanoporous carbon (e.g., a carbon aerogel), silicon can be retained and remain active within the nanoporous structure, e.g., within the pores or otherwise encased by the structure, even upon breaking or cracking.

Within the context of the present disclosure, the terms "compressive strength", "flexural strength", and "tensile strength" refer to the resistance of a material to breaking or fracture under compression forces, flexure or bending forces, and tension or pulling forces, respectively. These strengths are specifically measured as the amount of load/force per unit area resisting the load/force. It is typically recorded as pounds per square inch (psi), megapascals (MPa), or gigapascals (GPa). Among other factors, the compressive strength, flexural strength, and tensile strength of a material collectively contribute to the material's structural integrity, which is beneficial, for example, to withstand volumetric expansion of silicon particles during lithiation in a LIB. Referring specifically to Young's modulus, which is an indication of mechanical strength, the modulus may be determined by methods known in the art, for example including, but not limited to: Standard Test Practice for Instrumented Indentation Testing (ASTM E2546, ASTM International, West Conshocken, PA); or Standardized Nanoindentation (ISO 14577, International Organization for Standardization, Switzerland). Within the context of the present disclosure, measurements of Young's modulus are acquired according to ASTM E2546 and ISO 14577, unless otherwise stated. In certain embodiments, aerogel materials or compositions of the present disclosure have a Young's modulus of about 0.2 GPa or more, 0.4 GPa or more, 0.6 GPa or more, 1 GPa or more, 2 GPa or more, 4 GPa or more, 6 GPa or more, 8 GPa or more, or in a range between any two of these values.

Within the context of the present disclosure, the term "pore size distribution" refers to the statistical distribution or relative amount of each pore size within a sample volume of a porous material. A narrower pore size distribution refers to a relatively large proportion of pores at a narrow range of pore sizes, thus optimizing the amount of pores that can surround the electrochemically active species and maximizing use of the pore volume. Conversely, a broader pore size distribution refers to relatively small proportion of pores at a narrow range of pore sizes. As such, pore size distribution is typically measured as a function of pore volume and recorded as a unit size of a full width at half max of a predominant peak in a pore size distribution chart. The pore size distribution of a porous material may be determined by methods known in the art, for example including, but not limited to, surface area and porosity analyzer by nitrogen adsorption and desorption from which pore size distribution can be calculated. Within the context of the present disclosure, measurements of pore size distribution are acquired according to this method, unless otherwise stated. In certain embodiments, aerogel materials or compositions of the present disclosure have a relatively narrow pore size distribution (full width at half max) of about 50 nm or less, 45 nm or less, 40 nm or less, 35 nm or less, 30 nm or less, 25 nm or less, 20 nm or less, 15 nm or less, 10 nm or less, 5 nm or less, or in a range between any two of these values.

Within the context of the present disclosure, the term "pore volume" refers to the total volume of pores within a sample of porous material. Pore volume is specifically measured as the volume of void space within the porous material, where that void space may be measurable and/or may be accessible by another material, for example an electrochemically active species such as silicon particles. It is typically recorded as cubic centimeters per gram (cm$^3$/g or cc/g). The pore volume of a porous material may be determined by methods known in the art, for example including, but not limited to, surface area and porosity analyzer by nitrogen adsorption and desorption from which pore volume can be calculated. Within the context of the present disclosure, measurements of pore volume are acquired according to this method, unless otherwise stated. In certain embodiments, aerogel materials or compositions of the present disclosure (without incorporation of electrochemically active species, e.g., silicon) have a relatively large pore volume of about 1 cc/g or more, 1.5 cc/g or more, 2 cc/g or more, 2.5 cc/g or more, 3 cc/g or more, 3.5 cc/g or more, 4 cc/g or more, or in a range between any two of these values. In other embodiments, aerogel materials or compositions of the present disclosure (with incorporation of electrochemically active species, e.g., silicon) have a pore volume of about 0.3 cc/g or more, 0.6 cc/g or more, 0.9 cc/g or more, 1.2 cc/g or more, 1.5 cc/g or more, 1.8 cc/g or more, 2.1 cc/g or more, 2.4 cc/g or more, 2.7 cc/g or more, 3.0 cc/g or more, 3.3 cc/g or more, 3.6 cc/g or more, or in a range between any two of these values.

Within the context of the present disclosure, the term "porosity" when used with respect to the porous carbon and carbon-silicon composite materials disclosed herein, refers to a volumetric ratio of pores that does not contain another material (e.g., an electrochemically active species such as silicon particles) bonded to the walls of the pores. For clarification and illustration purposes, it should be noted that within the specific implementation of silicon-doped carbon aerogel as the primary anodic material in a LIB, porosity refers to the void space after inclusion of silicon particles. As such, porosity may be, for example, about 10%-70% when the anode is in a pre-lithiated state (to accommodate for ion transport and silicon expansion) and about 1%-50% when the anode is in a post-lithiated state (to accommodate for ion transport). More generally, porosity may be determined by methods known in the art, for example including, but not limited to, the ratio of the pore volume of the aerogel material to its bulk density. Within the context of the present disclosure, measurements of porosity are acquired according to this method, unless otherwise stated. In certain embodiments, aerogel materials or compositions of the present disclosure have a porosity of about 80% or less, 70% or less, 60% or less, 50% or less, 40% or less, 30% or less, 20% or less, 10% or less, or in a range between any two of these values.

It should be noted that pore volume and porosity are different measures for the same property of the pore structure, namely the "empty space" within the pore structure. For example, when silicon is used as the electrochemically active species contained within the pores of the nanoporous carbon material (e.g., a porous carbon-silicon composite bead as described herein), pore volume and porosity refer to the space that is "empty", namely the space not utilized by the silicon or the carbon. As will be seen, densification, e.g., by compression, of the pre-carbonized nanoporous material (e.g., a polyimide gel material) can also have an effect on pore volume and porosity, among other properties.

Within the context of the present disclosure, the term "pore size at max peak from distribution" refers to the value at the discernible peak on a graph illustrating pore size distribution. Pore size at max peak from distribution is specifically measured as the pore size at which the greatest percentage of pores is formed. It is typically recorded as any unit length of pore size, for example micrometers or nanometers (nm). The pore size at max peak from distribution may be determined by methods known in the art, for example including, but not limited to, surface area and porosity analyzer by nitrogen adsorption and desorption from which pore size distribution can be calculated and pore size at max peak can be determined. Within the context of the present disclosure, measurements of pore size at max peak from distribution are acquired according to this method, unless otherwise stated. In certain embodiments, aerogel materials or compositions of the present disclosure have a pore size at max peak from distribution of about 150 nm or less, 140 nm or less, 130 nm or less, 120 nm or less, 110 nm or less, 100 nm or less, 90 nm or less, 80 nm or less, 70 nm or less, 60 nm or less, 50 nm or less, 40 nm or less, 30 nm or less, 20 nm or less, 10 nm or less, 5 nm or less, 2 nm or less, or in a range between any two of these values.

Within the context of the present disclosure, the term "BET surface area" has its usual meaning of referring to the Brunauer-Emmett-Teller method for determining surface area by $N_2$ adsorption measurements. The BET surface area, expressed in $m^2/g$, is a measure of the total surface area of a porous material (e.g., a nanoporous carbon as described herein) per unit of mass. Unless otherwise stated, "surface area" refers to BET surface area. As an alternative to BET surface area, a geometric outer surface area of e.g., a polyimide or carbon bead may be calculated based on the diameter of the bead. Generally, such geometric outer surface areas for beads of the present disclosure are within a range from about 3 to about 700 $\mu m^2$.

Within the context of the present disclosure, the term "strut width" refers to the average diameter of nanostruts, nanorods, nanofibers, or nanofilaments that form an aerogel having a fibrillar morphology. It is typically recorded as any unit length, for example micrometers or nm. The strut width may be determined by methods known in the art, for example including, but not limited to, scanning electron microscopy image analysis. Within the context of the present disclosure, measurements of strut width are acquired according to this method, unless otherwise stated. In certain embodiments, aerogel materials or compositions of the present disclosure have a strut width of about 10 nm or less, 9 nm or less, 8 nm or less, 7 nm or less, 6 nm or less, 5 nm or less, 4 nm or less, 3 nm or less, 2 nm or less, or in a range between any two of these values. An exemplary range of strut widths found in the following examples (and in particular seen in the SEM images in the figures) is about 2-5 nm. Smaller strut widths, such as these, permit a greater amount of struts to be present within the network and thus contact the electrochemically active species, in turn allowing more of the electrochemically active species to be present within the composite. This increases electrical conductivity and mechanical strength.

Within the context of the present disclosure, the term "cycle life" refers to the number of complete charge/discharge cycles that an anode or a battery (e.g., LIB) is able to support before its capacity falls under about 80% of its original rated capacity. Cycle life may be affected by a variety of factors that are not significantly impacted over time, for example mechanical strength of the underlying substrate (e.g., carbon aerogel), connectivity of the silicon particles within the aerogel, and maintenance of interconnectivity of the aerogel. It is noted that these factors actually remaining relatively unchanged over time is a surprising aspect of certain embodiments of the current invention. Cycle life may be determined by methods known in the art, for example including, but not limited to, cycle testing, where battery cells are subject to repeated charge/discharge cycles at predetermined current rates and operating voltage. Within the context of the present disclosure, measurements of cycle life are acquired according to this method, unless otherwise stated. In certain embodiments of the present disclosure, energy storage devices, such as batteries, or electrode thereof, have a cycle life of about 25 cycles or more, 50 cycles or more, 75 cycles or more, 100 cycles or more, 200 cycles or more, 300 cycles or more, 500 cycles or more, 1000 cycles or more, or in a range between any two of these values.

Within the context of the present disclosure, the term "capacity" refers to the amount of specific energy or charge that a battery is able to store. Capacity is specifically measured as the discharge current that the battery can deliver over time, per unit mass. It is typically recorded as ampere-hours or milliampere-hours per gram of total electrode mass, Ah/g or mAh/g. The capacity of a battery (and an anode in particular) may be determined by methods known in the art, for example including, but not limited to: applying a fixed constant current load to a fully charged cell until the cell's voltage reaches the end of discharge voltage value; the time to reach end of discharge voltage multiplied by the constant current is the discharge capacity; by dividing the discharge capacity by the weight of electrode material or volume, specific and volumetric capacities can be determined. Within the context of the present disclosure, measurements of capacity are acquired according to this method, unless otherwise stated. In certain embodiments, aerogel materials or compositions of the present disclosure have a capacity of about 200 mAh/g or more, 300 mAh/g or more, 400 mAh/g or more, 500 mAh/g or more, 600 mAh/g or more, 700 mAh/g or more, 800 mAh/g or more, 900 mAh/g or more, 1000 mAh/g or more, 1200 mAh/g or more, 1400 mAh/g or more, 1600 mAh/g or more, 1800 mAh/g or more, 2000 mAh/g or more, 2400 mAh/g or more, 2800 mAh/g or more, 3200 mAh/g or more, or in a range between any two of these values. Unless otherwise noted, when the current nanoporous carbon material is used in a battery, capacity is reported at cycle 10 of the battery.

Within the context of the present disclosure, the term "silicon utilization efficiency" refers to the difference between the theoretical capacity of silicon to lithiate and the measured capacity of the electrode based on silicon weight. Silicon utilization efficiency is specifically measured as the efficiency of silicon use within an electrode. It is recorded herein as a percentage using the following equation:

$$\text{silicon utilization efficiency (\%)} =$$

$$\frac{\text{measured capacity of the nanoporous carbon material per gram of silicon in the material}}{\text{theoretical capacity of silicon per gram} \left[4200\,\dfrac{mAh}{g}\right]} \times 100$$

To calculate silicon utilization efficiency, capacity of the electrode and capacity of silicon is measured as discussed previously. In certain embodiments, aerogel materials or compositions of the present disclosure have a silicon utilization efficiency of about 20% or more, 30% or more, 40% or more, 50% or more, 60% or more, 70% or more, 80% or more, 90% or more, or in a range between any two of these values, where a higher percentage indicates better or more efficient silicon utilization. Unless otherwise noted, when the current nanoporous carbon material (e.g., a porous carbon-silicon composite bead) is used in a battery, silicon utilization efficiency is reported at cycle 10 of the battery.

The term "alkyl" as used herein refers to a straight chain or branched, saturated hydrocarbon generally having from 1 to 20 carbon atoms. Representative alkyl groups include, but are not limited to, methyl, ethyl, n-propyl, n-butyl, n-pentyl, and n-hexyl; while branched alkyls include, but are not limited to, isopropyl, sec-butyl, isobutyl, tert-butyl, isopentyl, and neopentyl. An alkyl group can be unsubstituted or substituted.

The term "alkenyl" as used herein refers to hydrocarbons containing normal, secondary, or tertiary carbon atoms, generally having from 1 to 20 carbon atoms, with at least one site of unsaturation, i.e., a carbon-carbon double bond. Examples include, but are not limited to: ethylene or vinyl, allyl, 1-butenyl, 2-butenyl, isobutylenyl, 1-pentenyl, 2-pentenyl, 3-methyl-1-butenyl, 2-methyl-2-butenyl, 2,3-dimethyl-2-butenyl, and the like. An alkenyl group can be unsubstituted or substituted.

The term "alkynyl" as used herein refers to a hydrocarbon containing normal, secondary, or tertiary carbon atoms, generally having from 1 to 20 carbon atoms, with at least one site of unsaturation, i.e., a carbon-carbon triple bond. Examples include, but are not limited to acetylene and propargyl. An alkynyl group can be unsubstituted or substituted.

The term "aryl" as used herein refers to a carbocyclic aromatic group generally having from 6 to 20 carbon atoms. Examples of aryl groups include, but are not limited to, phenyl, naphthyl, and anthracenyl. An aryl group can be unsubstituted or substituted.

The term "cycloalkyl" as used herein refers to a saturated carbocyclic radical, which may be mono- or bicyclic. Cycloalkyl groups include a ring having 3 to 7 carbon atoms as a monocycle, or 7 to 12 carbon atoms as a bicycle. Examples of monocyclic cycloalkyl groups include cyclopropyl, cyclobutyl, cyclopentyl, cyclohexyl, cycloheptyl, and cyclooctyl. A cycloalkyl group can be unsubstituted or substituted.

The term "substituted" as used herein and as applied to any of the above alkyl, alkenyl, alkynyl, aryl, cycloalkyl, and the like, means that one or more hydrogen atoms are each independently replaced with a substituent. Typical substituents include, but are not limited to, $-\lambda$, $-R$, $-OH$, $-OR$, $-SH$, $-SR$, $NH_2$, $-NHR$, $-N(R)_2$, $-N^+ (R)_3$, $-CX_3$, $-CN$, $-OCN$, $-SCN$, $-NCO$, $-NCS$, $-NO$, $-NO_2$, $-N_3$, $-NC(-O)$ H, $-NC(=O)R$, $-C(=O)$ H, $-C(=O)R$, $-C(=O)$ $NH_2$, $-C(=O)N(R)_2$, $-SO_3-$, $-SO_3H$, $-S(=O)_2R$, $-OS(=O)_2OR$, $-S(=O)_2NH_2$, $-S(=O)_2N(R)_2$, $-S(=O)R$, $-OP(=O)$ $(OH)_2$, $-OP(=O) (OR)_2$, $-P(=O) (OR)_2$, $-PO_3$, $-PO_3H_2$, $-C(=O)$ X, $-C(=S)R$, $-CO_2H$, $-CO_2R$, $-CO_2-$, $-C(=S) OR$, $-C(=O) SR$, $-C(=S) SR$, $-C(=O) NH_2$, $-C(=O)N(R)_2$, $-C(=S) NH_2$, $-C(=S)N(R)_2$, $-C(=NH) NH_2$, and $-C(=NR)N(R)_2$; wherein each X is independently selected for each occasion from F, Cl, Br, and I; and each R is independently selected for each occasion from $C_1$-$C_{20}$ alkyl and $C_6$-$C_{20}$ aryl. Wherever a group is described as "optionally substituted," that group can be substituted with one or more of the above substituents, independently for each occasion.

It is to be understood that certain radical naming conventions can include either a mono-radical or a di-radical, depending on the context. For example, where a substituent requires two points of attachment to the rest of the molecule, it is understood that the substituent is a di-radical. For example, a substituent identified as alkyl that requires two points of attachment includes di-radicals such as $-CH_2-$, $-CH_2CH_2-$, $-CH_2CH(CH_3)CH_2-$, and the like. Other radical naming conventions clearly indicate that the radical is a di-radical such as "alkylene," "alkenylene," "arylene," and the like.

Wherever a substituent is depicted as a di-radical (i.e., has two points of attachment to the rest of the molecule), it is to be understood that the substituent can be attached in any directional configuration unless otherwise indicated.

Within the context of the present disclosure, the term "self-supporting" refers to the ability of an aerogel material or composition to be flexible and/or resilient based primarily on the physical properties of the aerogel. Self-supporting aerogel materials or compositions of the present disclosure can be differentiated from other aerogel materials, such as coatings, which rely on an underlying substrate or reinforcement material to provide flexibility and/or resilience to the material.

Within the context of the present disclosure, the term "density" refers to a measurement of the mass per unit volume of an aerogel material or composition. The term "density" generally refers to the true density of an aerogel material, as well as the bulk density of an aerogel composition. Density is typically recorded as $kg/m^3$ or g/cc. The density of an aerogel material or composition may be determined by methods known in the art, including, but not limited to: Standard Test Method for Dimensions and Density of Preformed Block and Board-Type Thermal Insulation (ASTM C303, ASTM International, West Conshohocken, Pa.); Standard Test Methods for Thickness and Density of Blanket or Batt Thermal Insulations (ASTM C167, ASTM International, West Conshohocken, Pa.); or Determination of the apparent density of preformed pipe insulation (ISO 18098, International Organization for Standardization, Switzerland). Within the context of the present disclosure, density measurements are acquired according to ASTM C167 standards, unless otherwise stated. Preferably, aerogel materials or compositions of the present disclosure have a density of about 1.50 g/cc or less, about 1.40 g/cc or less, about 1.30 g/cc or less, about 1.20 g/cc or less, about 1.10 g/cc or less, about 1.00 g/cc or less, about 0.90 g/cc or less, about 0.80 g/cc or less, about 0.70 g/cc or less, about 0.60 g/cc or less, about 0.50 g/cc or less, about 0.40 g/cc or less, about 0.30 g/cc or less, about 0.20 g/cc or less, about 0.10 g/cc or less, or in a range between any two of these values, for example between about 0.15 g/cc and 1.5 g/cc or more particularly 0.50 g/cc and 1.30 g/cc.

Within the context of the present disclosure, the term "tap density" of a material or composition, such as a carbon-silicon composite material bead, refers to the maximum density achieved when a particulate material is vibrated or tapped under specific conditions. The tapped density reflects the empty space created between particles (e.g., beads) by their random dense packing. The tapped density is always lower than the bulk (or envelope) density of the particles. Tapped density can be calculated using the formula $M/V_f$, where M=mass in grams, and $V_f$=the tapped volume in milliliters. Tapped density is generally measured by first gently introducing a known sample mass into a graduated cylinder and carefully leveling the powder without compacting it. The cylinder is then mechanically tapped by raising the cylinder and allowing it to drop under its own weight using a suitable mechanical tapped density tester that provides a suitable fixed drop distance and nominal drop rate. Standard test methods for tap density measurements are described in MPIF-46, ASTM B-527, and ISO 3953. In some embodiments, materials and compositions of the present disclosure have a tap density of about 1.50 g/cc or less, about 1.40 g/cc or less, about 1.30 g/cc or less, about 1.20 g/cc or less, about 1.10 g/cc or less, about 1.00 g/cc or less, about 0.90 g/cc or less, about 0.80 g/cc or less, about 0.70 g/cc or less, about 0.60 g/cc or less, about 0.50 g/cc or less, about 0.40 g/cc or less, about 0.30 g/cc or less, or about 0.20 g/cc. In some embodiments, the tap density is between about 0.2 g/cc and about 1.5 g/cc Methods of Forming Organic Aerogel Beads Production of an aerogel, according to certain embodiments, generally includes the following steps: i) formation of a solution containing a gel precursor; ii) formation of a gel from the solution; and iii) extracting the solvent from the gel materials to obtain a dried aerogel material.

Production of aerogel beads, according to certain embodiments, follows the general process for production of an aerogel and generally includes the following steps: i) formation of a solution containing a gel precursor; ii) dispersing the gel precursor in a medium that is non-miscible with the gel precursor; iii) formation of gel beads within the non-miscible medium from the gel precursor solution; iv) removing the gel beads from the medium; and v) extracting the solvent from the gel beads to obtain a dried aerogel material. These processes are discussed below in greater detail, specifically in the context of forming organic aerogels, such as polyimide aerogels. However, the specific examples and illustrations provided herein are not intended to limit the present disclosure to any specific type of aerogel and/or method of preparation. The present disclosure can include any aerogel formed by any associated method of preparation known to those in the art.

An exemplary solution to produce an organic aerogel is formed by combining at least one organogel precursor with a solvent. Suitable solvents for use in forming a solution include lower alcohols with 1 to 6 carbon atoms, preferably 2 to 4, although other solvents can be used as known to those with skill in the art. Examples of useful solvents include, but are not limited to: methanol, ethanol, isopropanol, ethyl acetate, ethyl acetoacetate, acetone, dichloromethane, tetrahydrofuran, 1-methyl-2-pyrrolidone (NMP), dimethylacetamide (DMAC), formamide, and the like. Multiple solvents can also be combined to achieve a desired level of dispersion or to optimize properties of the gel material. Selection of optimal solvents for the polymerization and gel formation steps thus depends on the specific precursors, fillers, and additives being incorporated into the solution; as well as the target processing conditions for gelling and liquid phase extraction, and the desired properties of the final aerogel materials.

An exemplary solution to produce a polyimide aerogel is formed by combining at least one diamine and at least one dianhydride in a common polar aprotic solvent(s). In some embodiments, the dianhydride component(s) are dissolved in the solvent and then the diamine component(s) are added to the solution. Within the context of the present disclosure, the addition of diamine to the dianhydride solution is referred to as the "standard addition" process. In other embodiments, the diamine component(s) are dissolved in the solvent and then the dianhydride components are added. Within the context of the present disclosure, the addition of dianhydride to the diamine solution is referred to as the "reverse addition" process.

Additional details regarding polyimide gel/aerogel formation can be found in U.S. Pat. Nos. 7,074,880 and 7,071,287 to Rhine et al.; U.S. Pat. No. 6,399,669 to Suzuki et al.; U.S. Pat. No. 9,745,198 to Leventis et al.; Leventis et al., "Polyimide Aerogels by Ring-Opening Metathesis Polymerization (ROMP)," Chem. Mater. 2011, 23, 8, 2250-2261; Leventis et al., "Isocyanate-Derived Organic Aerogels: Polyureas, Polyimides, Polyamides," MRS Proceedings, 1306 (2011), Mrsf10-1306-bb03-01. doi: 10.1557/opl.2011.90; Chidambareswarapattar et al., "One-step room-temperature synthesis of fibrous polyimide aerogels from anhydrides and isocyanates and conversion to isomorphic carbons," J. Mater. Chem., 2010, 20, 9666-9678; Guo et al., "Polyimide Aerogels Cross-Linked through Amine Functionalized Polyoligomeric Silsesquioxane," ACS Appl. Mater. Interfaces 2011, 3, 546-552; Nguyen et al., "Development of High Temperature, Flexible Polyimide Aerogels," American Chemical Society, proceedings published 2011; Meador et al., "Mechanically Strong, Flexible Polyimide Aerogels Cross-Linked with Aromatic Triamine," ACS Appl. Mater. Interfaces, 2012, 4 (2), pp 536-544; Meador et al., "Polyimide Aerogels with Amide Cross-Links: A Low Cost Alternative for Mechanically Strong Polymer Aerogels," ACS Appl. Mater. Interfaces 2015, 7, 1240-1249; Pei et al., "Preparation and Characterization of Highly Cross-Linked Polyimide Aerogels Based on Polyimide Containing Trimethoxysilane Side Groups," Langmuir 2014, 30, 13375-13383, each of which is incorporated herein by reference in its entirety.

Triamines, tetramines, pentamines, hexamines, etc. can also be used instead of or in addition to diamines or a combination thereof in order to optimize the properties of the gel material. Trianhydrides, tetranhydrides, pentanhydrides, hexanhydrides, can also be used instead of or in addition to dianhydrides or a combination thereof in order to optimize the properties of the gel material. A dehydrating agent and a catalyst can be incorporated into the solution to initiate and drive imidization. The solution can include additional co-gelling precursors, as well as filler materials and other additives. Filler materials and other additives may be dispensed in the solution at any point before or during the formation of a gel. Filler materials and other additives may also be incorporated into the gel material after gelation through various techniques known to those in the art. Preferably, the solution comprising the gelling precursors, solvents, catalysts, water, filler materials, and other additives is a homogenous solution, which is capable of effective gel formation under suitable conditions.

Once a solution has been formed and optimized, the gel-forming components in the solution can be transitioned into a gel material. The process of transitioning gel-forming components into a gel material comprises an initial gel formation step wherein the gel solidifies up to the gel point of the gel material. The gel point of a gel material may be viewed as the point where the gelling solution exhibits resistance to flow and/or forms a substantially continuous polymeric framework throughout its volume. A range of gel-forming techniques is known to those in the art. Examples include, but are not limited to: maintaining the mixture in a quiescent state for a sufficient period of time; adjusting the concentration of a catalyst; adjusting the temperature of the solution; directing a form of energy onto the mixture (ultraviolet, visible, infrared, microwave, ultrasound, particle radiation, electromagnetic); or a combination thereof.

In some embodiment, the gel material (e.g., organo- or carbon aerogels and xerogels) may be in beaded form (i.e., a plurality of beads). As used herein, the term "beads" is meant to include discrete small units or pieces having a generally spherical shape. In some embodiments, the beads are substantially spherical. The beads are generally uniform in composition, such that each bead in a plurality of beads comprises the same components in approximately the same amounts within normal variations expected in preparing such beads. The size of the beads may vary according to the desired properties and method of preparing.

The process of forming gel beads from the gel solution can include combining the solution with a medium, e.g., a dispersion medium, that is non-miscible with the solution. For example, silicone oil or mineral oil can be used as the dispersion medium. The gel solution can be added, e.g., by pouring, or otherwise combined with the non-miscible dispersion medium. Agitation, e.g., by mixing, of the combined dispersion medium and gel precursor solution can be used to promote droplet, e.g., bead, formation before or during the process of transitioning gel-forming components into a gel material. For example, the combination of dispersion medium and gel precursor can form an emulsion with the gel precursor solution as the dispersed phase. Exemplary methods of gel bead production can be found in U.S. Patent Application Publication No. 2006/0084707 of Ou et al., which is incorporated herein by reference in its entirety.

Spherical droplets of gel precursor form in the dispersion medium by virtue of the interface tension. The droplets gel and strengthen during the time in the dispersion medium, e.g., silicone oil. Agitation of the mixture is typically used to prevent the droplets from agglomerating. For example, the mixture of gel precursor and dispersion medium can be stirred to prevent the droplets from agglomerating.

Heat or radiation may also be provided to the dispersion medium to induce or enhance gelation of the droplets or strengthen the gel beads so as to make them strong enough to resist collision. The production capacity of gel beads in a given space depends upon the precise control of the gelation process of the droplets.

The process further includes removing the gel beads from the dispersion medium, e.g., silicone oil, mineral oil, or mineral spirits. The gel beads are filtered from the dispersion medium and then washed or rinsed with fluids, e.g., alcohols such as ethanol, methanol, isopropanol, or higher alcohols. Hydrocarbon solvents such as heptane, hexane, or octane can also be used. A basic requirement for the rinsing liquid is that it can remove the oil (or other dispersing medium) while not reacting chemically with the gel. After removal of the excess amount of medium (e.g., silicone oil), the gel beads can be placed into a solvent for aging, as discussed in more detail below. For example, the gel beads can be aged in ethanol. The gel beads are amenable to interstitial solvent removal using, for example, supercritical fluid drying methods as discussed herein. They may also be dried at ambient conditions to make xerogels. The dried gel beads, e.g., aerogel or xerogel beads, are amenable to heat treatment and carbonization, as discussed in more detail below.

In exemplary embodiments, the organogel beads are polyimide beads, and the polyimide beads are prepared in a three step process including a step of preparing a polyamic acid sol; optionally, a step of incorporating an electroactive material, such as silicon, in the polyamic acid sol; and a step of imidizing the polyamic acid sol (optionally, in a mixture with silicon) while the mixture is under shear conditions, e.g., under high or low shear (or high or low rpm) mixing. In certain exemplary embodiments, polyamic acid sols are prepared at ambient temperature. N-methyl-2-pyrrolidinone (NMP), N, N-dimethylacetamide (DMAC), or N, N-dimethyl formamide (DMF) solvents can be used for preparing polyimide precursors.

The starting monomers, e.g., aromatic dianhydrides and aromatic diamines, can, in certain embodiments, be dissolved in the aforementioned solvent and stirred under ambient conditions. In a preferred embodiment, the monomer solution can be prepared under inert gas flow, e.g., nitrogen or argon.

In some embodiments, silicon particles are incorporated into the compositions disclosed herein during the sol-gel process. In a first embodiment, silicon particles are dispersed in the polyamic acid sol prior to imidization. In a second embodiment, silicon particles are dispersed in a solvent, e.g., DMAC or other solvents compatible with polyamic acid sols, before the solvent is combined with polyimide precursors. In a third embodiment, silicon particles are dispersed in the polyamic acid sol during the imidization process. In other embodiments, silicon particles are incorporated after imidization, or even after carbonization of the organogel.

In one aspect of the disclosure, a porous carbon composition in bead form is provided. In one embodiment, such a porous carbon composition is prepared according to a method generally comprising providing an organogel precursor in an organic solvent; initiating gelation of the organogel precursor to form an organogel sol; combining the organogel sol with a medium that is non-miscible with the organogel sol, thereby forming droplets of organogel; isolating the droplets of the organogel; drying the droplets to yield porous organogel beads; and pyrolyzing the porous organogel beads to yield the porous carbon composition beads. A general, non-limiting flow diagram for preparing the porous organogel beads is provided in FIG. 49A. With reference to FIG. 49A, an organogel precursor is provided in an organic solvent, gelation is initiated, and the gelling precursor (i.e., the organogel sol) is combined with a medium which is immiscible with the organogel sol. Gelled droplets are then produced by mixing under high shear conditions, and the droplets are isolated and optionally further processed (e.g., washed, solvent exchanged, dried, and pyrolyzed).

In some embodiments, the organogel is a resorcinol-formaldehyde polymer, a phloroglucinol-formaldehyde polymer, a cellulosic polymer, a polyurea, a polyurethane, an alginate, or polyacrylonitrile. Such organogel polymers are discussed further herein below.

In some embodiments, the organogel is a polyimide. In some embodiments, the organogel is a polyimide, and the organogel precursor is a polyamic acid. In some embodiments, a pre-formed polyamic acid may be provided. For example, a polyamic acid may be purchased. Alternatively, the polyamic acid may be prepared from reaction of a multifunctional amine and a multifunctional anhydride in an organic solvent. Accordingly, in some embodiments, the method comprises allowing a multifunctional amine and a multifunctional anhydride to react with each other, forming a polyamic acid as the organogel precursor.

As used herein, the term "multifunctional anhydride" refers to a molecule having at least two dicarboxylic acid anhydride groups available for reaction as described herein below. In some embodiments, the multifunctional anhydride is a tetracarboxylic acid dianhydride. In some embodiments, trianhydrides, tetraanhydrides, pentaanhydrides, hexaanhydrides, and the like may be used instead of or in addition to the tetracarboxylic acid dianhydride in order to optimize the properties of the gel material.

In such embodiments, one of skill in the art will recognize that the polyamic acid includes amide units comprising amino groups of the multifunctional amine and carboxylic acid groups corresponding to the tetracarboxylic anhydride. Accordingly, such a polyamic acid may be described herein as "comprising a tetracarboxylic acid" and "comprising a multifunctional amine" (e.g., a diamine).

The structure of the tetracarboxylic acid dianhydride may vary. In some embodiments, the tetracarboxylic acid dianhydride has a structure according to Formula I:

(I)

where L comprises an alkyl group, a cycloalkyl group, an aryl group, or a combination thereof, each as described herein above. In some embodiments, L comprises an aryl group. In some embodiments, L comprises a phenyl group, a biphenyl group, or a diphenyl ether group. In some embodiments, the tetracarboxylic acid dianhydride of Formula I has a structure selected from one or more structures as provided in Table 1.

TABLE 1

| Non-limiting list of potential tetracarboxylic acid dianhydrides | | |
| --- | --- | --- |
| Structure | IUPAC Name | Common/Alternative Name |
| | 1H,3H-benzo[1,2-c:4,5-c']difuran-1,3,5,7-tetraone | pyromellitic anhydride (PMDA) |
| | [5,5'-biisobenzofuran]-1,1',3,3'-tetraone | 3,3',4,4'-bisphenyltetracarboxylic dianhydride; biphthalic dianhydride (BPDA) |
| | 5,5'-oxybis(isobenzofuran-1,3-dione) | 4,4'-oxydiphthalic dianhydride (ODPA) |
| | 5,5'-(propane-2,2-diyl)bis(isobenzofuran-1,3-dione) | 4,4'-(isopropylidene)diphathalic dianhydride |
| | 5,5'-(perfluoropropane-2,2-diyl)bis(isobenzofuran-1,3-dione) | 4,4'-(hexafluoroisopropylidene)diphathalic dianhydride (6FDA) |

TABLE 1-continued

Non-limiting list of potential tetracarboxylic acid dianhydrides

| Structure | IUPAC Name | Common/Alternative Name |
| --- | --- | --- |
| | 5,5'-carbonylbis (isobenzofuran-1,3-dione) | 3,3',4,4'-benzophenonetetracarboxylic dianhydride (BTDA) |
| | 5,5'-sulfonylbis (isobenzofuran-1,3-dione) | 3,3',4,4'-diphenylsulfonetetracarboxylic dianhydride |
| | isochromeno [6,5,4-deflisochromene-1,3,6,8-tetraone | 1,4,5,8-Naphthalenetetracarboxylic dianhydride |
| | anthra[2,1,9-def:6,5,10-d'e'f]diisochromene-1,3,8,10-tetraone | perylene tetracarboxylic anhydride |
| | 5-(2-(4-((1,3-dioxo-1,3-dihydroisobenzofuran-5-yl)oxy)phenyl)propan-2-yl)isobenzofuran-1,3-dione | |
| | 5,5'-((propane-2,2-diylbis(4,1-phenylene))bis(oxy)) bis(isobenzofuran-1,3-dione) | 4,4'-(4,4')-isopropylidenediphenoxy) bisphthalic dianhydride (BPADA) |

In some embodiments, the tetracarboxylic acid dianhydride is selected from the group consisting of pyromellitic anhydride (PMDA), biphthalic dianhydride (BPDA), oxydiphthalic dianhydride (ODPA), benzophenone tetracarboxylic dianhydride (BTDA), ethylenediaminetetraacetic dianhydride (EDDA), 1,4,5,8-naphthalenetetracarboxylic dianhydride, and combinations thereof. In some embodiments, the tetracarboxylic acid dianhydride is PMDA. Accordingly, the polyamic acid produced from such tetracarboxylic acid dianhydrides may be described as comprising a tetracarboxylic acid selected from the group consisting of benzene-1,2,4,5-tetracarboxylic c acid, [1,1'-biphenyl]-3,3', 4,4'-tetracarboxylic acid, 4,4'-oxydiphthalic acid, 4,4'-sulfonyldiphthalic acid, 4,4'-carbonyldiphthalic acid, 4,4'-(pro-pane-2,2-diyl)diphthalic acid, 4,4'-(perfluoropropane-2,2-diyl)diphthalic acid, naphthalene-1,4,5,8-tetracarboxylic acid, 4-(2-(4-(3,4-dicarboxyphenoxy)phenyl) propan-2-yl) phthalic acid, perylene tetracarboxylic acid, and combinations thereof.

As used herein, the term "multifunctional amine" refers to a molecule having at least two primary amino groups available for reaction as described herein below. In some embodiments, the multifunctional amine is a triamine, tetramine, pentamine, hexamine, or the like. In some embodiments, the multifunctional is a diamine. In some embodiments, a triamine, tetramine, pentamine, hexamine, or the like may be used in addition to the diamine in order to optimize the properties of the gel material. In some embodiments, the multifunctional amine comprises a triamine or is a triamine. Non-limiting examples of suitable triamines include propane-1,2,3-triamine, benzene-1,3,5-triamine, cyclohexane-1,3,5-triamine, 1,3,5-tris(4-aminophenoxy)benzene (TAPOB), tris(4-aminophenyl) methane, and 1,3,5-triazine-2,4,6-triamine (melamine). In some embodiments, the multifunctional amine is 1,3,5-tris(4-aminophenoxy)benzene (TAPOB), tris(4-aminophenyl) methane, melamine, or a combination thereof. In some embodiments, the multifunctional amine is melamine.

In preferred embodiments, the multifunctional amine is a diamine. Accordingly, the polyamic acid produced from a diamine may be described as comprising such a diamine. The structure of the diamine may vary. In some embodiments, the diamine has a structure according to Formula II:

$$H_2N\diagup{}^{Z}\diagdown NH_2, \tag{II}$$

where Z is aliphatic (i.e., alkyl, alkenyl, alkynyl, or cycloalkyl) or aryl, each as described herein above. In some embodiments, Z is alkyl, such as C2 to C12 alkyl. In some embodiments, the diamine is an alkane diamine, such as a C2 to C6 alkane diamine. Suitable alkane diamines include, but are not limited to, ethylenediamine, 1,3-diaminopropane, 1,4-diaminobutane, 1,5-diaminopentane, or 1,6-diaminohexane. In some embodiments, the C2 to C6 alkane diamine is substituted with one or more alkyl groups, such as methyl.

In some embodiments, Z is aryl, and the multifunctional amine is an aryldiamine. In some embodiments, the aryl diamine is 1,4-phenylenediamine (PDA), 4,4'-diaminodiphenyl ether, 4,4'-methylenedianiline, or a combination thereof. In some embodiments, the diamine is PDA. In some embodiments, the diamine is 4,4'-diaminodiphenyl ether. In some embodiments, the diamine is 4,4'-methylenedianiline.

The molecular weight of the polyamic acid and the corresponding organogel (i.e., a polyimide gel) may vary based on reaction conditions (e.g., concentration, temperature, duration of reaction, nature of diamine and dianhydride, etc.). The molecular weight is based on the number of polyamic acid repeat units. A repeat unit as defined herein is a part of the polyamic acid or polyimide whose repetition would produce the complete polymer chain (except for the terminal amino groups) by linking the repeat units together successively along the polymer chain.

The specific molecular weight range of polyimides produced by the disclosed method may vary. Generally, the noted reaction conditions may be varied to provide a polyimide with the desired physical properties without specific consideration of molecular weight. In some embodiments, a surrogate for molecular weight may be provided in the viscosity of the solution of the polyamic acid, which may be controlled by adjusting the described variables (temperature, concentrations, molar ratios of components, reaction time, solvents, presence of water, and the like) as disclosed further herein below.

The molar ratio of the multifunctional anhydride (e.g., tetracarboxylic acid dianhydride) to the multifunctional amine (e.g., diamine) may vary according to desired reaction time, reagent structure, and desired material properties. In some embodiments, the molar ratio is from about 0.9 to about 3, such as from about 0.9, or about 1, to about 2, or about 3. In some embodiments, the ratio is about 1 (i.e., stoichiometric), such as from about 0.9 to about 1.1. In specific embodiments, the ratio is from about 0.99 to about 1.01.

Generally, the multifunctional amine (e.g., diamine) and the multifunctional anhydride (e.g., tetracarboxylic acid dianhydride) are allowed to react for a period of time in order to complete the reaction between the amino groups and the anhydride groups, providing the polyamic acid. The reaction is generally allowed to proceed until all of the available reactants (e.g., diamine and dianhydride) have reacted with one another. The time required for complete reaction may vary based on reagent structures, concentration, temperature. In some embodiments, the reaction time is from about 1 minute to about 1 week, for example, from about 15 minutes to about 5 days, from about 30 minutes to about 3 days, or from about 1 hour to about 1 day. In some embodiments, the reaction time is from about 0.5 hour to about 17 hours. In some embodiments, the reaction time is from about 1 hour to about 12 hours.

The organic solvent used may vary, but is generally a polar, aprotic solvent. In some embodiments, the organic solvent is N,N-dimethylacetamide, N,N-dimethylformamide, N-methylpyrrolidone, tetrahydrofuran, or ethyl acetate. In some embodiments, the organic solvent is N,N-dimethylacetamide.

In some embodiments, the organic solvent is anhydrous, meaning it contains no or substantially no water. In other embodiments, the organic solvent further comprises water. The amount of water present may vary based on multiple factors, such as target density, viscosity, intended particle size, scale, and the like. Surprisingly, it has been found according to the present disclosure that inclusion of low levels of water in the organic solvent, prior to gelation, provides smaller organogel droplets, leading to smaller beads sizes (i.e., smaller organogel and the corresponding porous carbon bead sizes). Without wishing to be bound by any particular theory, it is believed that the presence of water reduces viscosity of the medium, and retards gelation of the organogel precursor (e.g., polyamic acid). In some embodiments, water is present in the organic solvent in an amount from about 100 to about 1500 parts per million (ppm), such as from about 500 to about 1200 ppm, or about 500 to about 700 ppm. In some embodiments, water is present in the organic solvent in an amount of about 500, about 600, about 700, about 800, about 900, about 1000, about 1100, or about 1200 ppm.

The temperature at which the reaction between the multifunctional anhydride (e.g., tetracarboxylic acid dianhydride) and the multifunctional amine (e.g., diamine) is conducted may vary. A suitable range of temperatures is generally between about 10° C. and about 100° C. In some embodiments, the reaction temperature is from about 10 to about 100° C., or from about 15 to about 60° C., or from about 15 to about 50° C., or from about 15 to about 25° C.

The concentration of the resulting polyamic acid in the solution may vary. For example, in some embodiments, the concentration of the polyamic acid (i.e., the density of the polyamic acid in solution) is from about 0.01 to about 0.3 g/cm³. In some embodiments, the volume of solvent is chosen to provide a particular target density ($T_d$) of polyamic acid in the solution. Generally, a range of concentrations of polyamic acid present in solution is from about 0.01 to about 0.3 g/cm³, based on the weight of the polyamic acid.

In some embodiments, the porous carbon composition is a porous carbon-silicon composition comprising greater than about 10% by weight of silicon. In such embodiments, the method further comprises providing a mixture of the organogel precursor and silicon in the organic solvent. Generally, the silicon is in particle form, and the silicon particles are incorporated during the sol-gel process. A general, non-limiting flow diagram for preparing porous organogel-silicon composite beads is provided in FIG. 49B. With reference to FIG. 49B, the method comprises providing a mixture of silicon and the organogel precursor in the organic solvent. In some embodiments, silicon particles are dispersed in a solvent, e.g., a polar, aprotic solvent, before combination with the organogel precursor. In one non-limiting embodiment, silicon particles are dispersed in a polyamic acid sol prior to imidization. In another non-limiting embodiment, silicon particles are dispersed in the polyamic acid sol during the imidization process.

Within the context of the present disclosure, the term "silicon particles" refers to silicon with a range of particle sizes suitable for use with organo- (e.g., polyimide) or carbon gels as disclosed herein. Silicon particles of the present disclosure can be nanoparticles, e.g., particles with two or three dimensions in the range of about 1 nm to about 150 nm. Silicon particles of the present disclosure can be fine particles, e.g., micron-sized particles with a maximum dimension, e.g., a diameter for a substantially spherical particle, in the range of about 150 nm to about 10 microm- eters or larger. For example, silicon particles of the present disclosure can have a maximum dimension, e.g., a diameter for a substantially spherical particle, of about 10 nm, 50 nm, 100 nm, 150 nm, 200 nm, 500 nm, 1 micrometer, 1.5 micrometers, 2 micrometers, 3 micrometers, 5 micrometers, 10 micrometers, 20 micrometers, 40 micrometers, 50 micrometers, 100 micrometers, or in a range between any two of these values. In some embodiments, the particles are flat fragmented shapes, e.g., platelets, having two dimen- sions, e.g., a length and a width, of about 10 nm, 50 nm, 100 nm, 150 nm, 200 nm, 500 nm, 1 micrometer, 1.5 microm- eters, 2 micrometers, 3 micrometers, 5 micrometers, 10 micrometers, 20 micrometers, 40 micrometers, 50 microm- eters, 100 micrometers, or in a range between any two of these values. In some embodiments, the silicon particles can be monodispersed or substantially monodispersed. In other embodiments, the silicon particles can have a particle size distribution. Within the context of the present disclosure, the dimensions of silicon particles are provided based upon the median of the particle size distribution, i.e., the D50.

Silicon particles can be produced by various techniques, including electrochemical reduction and mechanical mill- ing, i.e., grinding. Grinding can be conducted using wet or dry processes. In dry grinding processes, powder is added to a vessel, together with grinding media. The grinding media typically includes balls or rods of zirconium oxide (yttrium stabilized), silicon carbide, silicon oxide, quartz, or stainless steel. The particle size distribution of the resulting ground material is controlled by the energy applied to the system and by matching the starting material particle size to the grinding media size. However, dry grinding is an inefficient and energy consuming process. Wet grinding is similar to dry grinding with the addition of a grinding liquid. An advantage of wet grinding is that the energy consumption for producing the same result is 15-50% lower than for dry grinding. A further advantage of wet grinding is that the grinding liquid can protect the grinding material from oxi- dizing. It has also been found that wet grinding can produce finer particles and result in less particle agglomeration.

Wet grinding can be performed using a wide variety of liquid components. In an exemplary embodiment, the grind- ing liquid or components included in the grinding liquid are selected to reduce or eliminate chemical functionalization on the surface of the silicon particles during or after grinding. In other embodiments, the grinding liquid or components included in the grinding liquid are selected to provide a desired surface chemical functionalization of the particles, e.g., the silicon particles, during or after grinding. The grinding liquid or components included in the grinding liquid can also be selected to control the chemical reactivity or crystalline morphology of the particles, e.g., the silicon particles. In exemplary embodiments, the grinding liquid or components included in the grinding liquid can be selected based on compatibility or reactivity with downstream mate- rials, processing steps or uses for the particles, e.g., the silicon particles. For example, the grinding liquid or com- ponents included in the grinding liquid can be compatible with, useful in, or identical to the liquid or solvent used in a process for forming or manufacturing organic or inorganic aerogel materials. In yet another embodiment, the grinding liquid can be selected such that the grinding liquid or components included in the grinding liquid produce a coat- ing on the silicon particle surface or an intermediary species, such as an aliphatic or aromatic hydrocarbon, or by cross- linking or producing cross-functional compounds, that react with the organic or inorganic aerogel material.

The solvent or mixture of solvents used for grinding can be selected to control the chemical functionalization of the particles during or after grinding. Using silicon as an example, and without being bound by theory, grinding silicon in alcohol-based solvents, such as isopropanol, can functionalize the surface of the silicon and covalently bond alkoxide surface groups, e.g., isopropoxide onto the surface of the silicon particles. In exemplary embodiments, grinding can be carried out in polar aprotic solvents such as DMSO, DMF, NMP, DMAC, THF, 1,4-dioxane, diglyme, acetoni- trile, water or any combination thereof, which has numerous advantages. For example, grinding in a solvent compatible with a process for manufacturing aerogel materials, such as the aforementioned polar aprotic solvents, can eliminate the need to remove the grinding liquid from the particles before addition to an aerogel manufacturing process because the grinding liquid is the same as or compatible with the solvents used in the aerogel process. In other embodiments, the grinding liquid can include a monomer, oligomer, or polymer precursor. For example, the grinding liquid can include a polyimide precursor monomer, such as polyacrylic acid (PAA). For another example, the grinding liquid can include the sol-gel liquid. In these embodiments, the grind- ing liquid including precursor components or sol-gel liquid can impart the sol-gel functionality to the surface of the particles, e.g., the silicon particles. In further embodiments, the grinding liquid can be selected to impart functionality to the surface of the particles, e.g., the silicon particles, such that the functionalized particles react or interact with each other during or following the grinding process.

Silicon particles of the present disclosure can be silicon wires, crystalline silicon, amorphous silicon, silicon alloys, coated silicon, e.g., carbon coated silicon, and any combi- nations of silicon particle materials disclosed herein. In some embodiments, silicon particles can be substantially planar flakes, i.e., having a flat fragmented shape, which can also be referred to as a platelet shape. For example, the particles have two substantially flat major surfaces con- nected by a minor surface defining the thickness between the major surfaces. In other embodiments, particles of silicon or other electroactive materials can be substantially spherical, cubic, obloid, elliptical, disk-shaped, or toroidal.

The quantity of silicon (e.g., silicon particles) present in the organic solvent-solution of the organogel precursor may vary, but is generally selected such that the final porous carbon-silicon composition comprises from about 20% to about 65% by weight of silicon.

With continued reference to FIGS. 49A and 49B, after completion of the reaction forming or dissolving the organogel precursor (for example, forming a polyamic acid, or following dissolution of a preformed polyamic acid in the organic solvent), gelation is initiated. Generally, initiating of gelation is performed before combining the gelling organogel precursor, or a mixture of the gelling organogel precursor and the silicon, with an immiscible medium. Gelation (and the initiation thereof) may be conducted chemically, thermally, or via a combination thereof. In some embodiments, the organogel precursor is a polyamic acid, and initiating gelation comprises chemical imidization of the polyamic acid, forming the corresponding polyimide gel. In some embodiments, performing chemical imidization of the polyamic acid comprises adding a dehydrating agent and an amine base to the polyamic acid sol. The presence of the dehydrating agent and amine base initiates and drives imidization of the polyamic acid carboxylic acid and amide groups, thus forming the polyimide gel.

The structure of the dehydrating agent may vary, but it is generally a reagent that is reactive with the carboxylate groups of the polyamic acid, and capable of driving the imidization of the polyamic acid carboxyl and amide groups. One suitable example of a class of suitable dehydrating agents is the carboxylic acid anhydrides, such as acetic anhydride, propionic anhydride, and the like. In some embodiments, the dehydrating agent is a carboxylic acid anhydride. In some embodiments, the carboxylic acid anhydride is acetic anhydride.

In some embodiments, the quantity of dehydrating agent may vary based on the quantity of multifunctional anhydride (e.g., tetracarboxylic dianhydride). For example, in some embodiments, the dehydrating agent is present in various molar ratios with the dianhydride. The molar ratio of the dehydrating agent to the tetracarboxylic acid dianhydride may vary according to desired reaction time, reagent structure, and desired material properties. In some embodiments, the molar ratio is from about 2 to about 10, such as from about 2, about 3, about 4, or about 5, to about 6, about 7, about 8, about 9, or about 10. In some embodiments, the ratio is from about 3 to about 6, or from about 4 to about 5. In some embodiments, the ratio is 4.3.

The term "amine base" in the context of the present disclosure refers to a molecule having a single amino group with a lone pair of electrons available for accepting a proton. Suitable amine bases include tertiary alkyl amines, tertiary cycloalkyl amines, heteroaromatic amines, guanidines, and quaternary ammonium hydroxides.

In some embodiments, the amine base is a tertiary alkyl or cycloalkyl amine. As used herein in the context of amines, "tertiary" means that the amine nitrogen atom has three organic (i.e., carbon) substituents attached thereto. In some embodiments, the tertiary amine is triethylamine, trimethylamine, tri-n-butylamine, N-methylpyrrolidine, N-methylpiperidine, or diisopropyl ethyl amine.

In some embodiments, the amine base is a heteroaromatic amine. The term "heteroaromatic amine" as used herein refer to an aromatic ring system in which one or more ring atoms is a nitrogen. A heteroaromatic amine generally comprises from 2 to 20 carbon atoms and 1 to 3 heteroatoms selected from N, O, P, and S, wherein at least one heteroatom is nitrogen. A heteroaromatic amine may be a monocycle having 3 to 7 ring members (2 to 6 carbon atoms and 1 to 3 heteroatoms selected) or a bicycle having 7 to 10 ring members (4 to 9 carbon atoms and 1 to 3 heteroatoms), for example, a bicyclo[4,5], [5,5], [5,6], or [6,6] system. A heteroaromatic amine can be unsubstituted or substituted. Particularly suitable are heteroaromatic amines having a monocyclic ring structure comprising 5 carbon atoms and one nitrogen atom, e.g., a pyridine. In some embodiments, the amine base is pyridine. In some embodiments, the amine base is pyridine bearing one or more alkyl substituents at suitable positions on the aromatic ring. For example, suitable pyridines include those substituted with one or more methyl groups, t-butyl groups, or combinations thereof. Non-limiting examples include 2-, 3-, and 4-picolines, 2,6-lutidine, 2,6-di-tert-butylpyridine, and the like. In some embodiments, the amine base is pyridine.

The quantity of the amine base added may vary. The quantity of amine base added may be based on a molar ratio, for example, a molar ratio with respect to the polyamic acid. The molar ratio of the amine base to the polyamic acid may vary according to desired reaction time, reagent structure, and desired material properties. In some embodiments, the molar ratio is from about 0.1 to about 8. In some embodiments, the molar ratio is from about 0.1, about 0.2, about 0.3, about 0.43, about 0.5, about 0.6, about 0.7, about 0.8, about 0.9, or about 1, to about 2, about 3, about 4, about 5, about 6, about 7, or about 8.

With continued reference to FIGS. 49A and 49B, the process of forming organogel beads comprises combining the organogel precursor solution (e.g., a polyamic acid solution), in which gelation has been initiated, with a medium, e.g., a dispersion medium, that is non-miscible with the solution.

The dispersion medium may have a range of viscosities. In some embodiments, the medium has a viscosity of about 100 to about 150 centipoise (cP). In some embodiments, the organic solvent solution of the organogel precursor (i.e., the organogel sol) has a viscosity in a range of about 5 to about 30 cP. In some embodiments, the medium has a viscosity of about 100 to about 150 cP, and the organic solvent solution of the organogel precursor (i.e., the organogel sol) has a viscosity in a range of about 5 to about 30 cP. Surprisingly, according to the present disclosure, it has been found that in some embodiments, combining a low viscosity organogel solution with a higher viscosity dispersion medium produces droplets (i.e., beads) of a small diameter, which may be desirable in certain embodiments. Without wishing to be bound by any particular theory, it is believed that in some embodiments, a differential in viscosities between the medium and the organogel sol may drive the reduction in droplet size. Accordingly, in some embodiments, the ratio of viscosity of the medium to the viscosity of the organogel sol is in a range from about 3 to about 50, or from about 3 to about 30, such as from about 5 to about 20. In some embodiments, the ratio is from about 3, about 4, about 5, about 6, about 7, about 8, about 9, or about 10, to about 15, about 20, about 25, or about 30. In some embodiments, the ratio is about 3, about 4, about 5, about 6, about 7, about 8, about 9, about 10, about 11, about 12, about 13, about 14, about 15, about 16, about 17, about 18, about 19, about 20, about 21, about 22, about 23, about 24, about 25, about 26, about 27, about 28, about 29, or about 30.

In some embodiments, the medium is mineral oil, silicone oil, or a C5-C12 hydrocarbon. In some embodiments, the medium is an aliphatic hydrocarbon, an aromatic hydrocarbon, or a chlorinated hydrocarbon. In some embodiments, the medium is hexane or mineral spirits.

The gelling solution (i.e., the organogel sol) can be added, e.g., by pouring, or may otherwise be combined with the non-miscible dispersion medium. In some embodiments, the non-miscible dispersion medium and, optionally a surfactant (s), are added to the sol. In some embodiments, the sol is added to the non-miscible dispersion medium and optionally, surfactant(s).

Agitation, e.g., by mixing, of the combined dispersion medium and the gelling solution can be used to promote droplet, e.g., bead, formation before or during the process of transitioning gel-forming components into a gel material. For example, the combination of dispersion medium and gelling organogel sol can form an emulsion with the organogel sol as the dispersed phase. Exemplary methods of gel bead production can be found in U.S. Patent Application Publication No. 2006/0084707 of Ou et al., which is incorporated herein by reference in its entirety.

Exemplary embodiments of mixing to provide gel beads from the sol mixture in a dispersion medium include magnetic stirring (up to about 600 rpm), mechanical mixing (up to about 800 rpm) and homogenization (up to about 9000 rpm). The mixing may be high or low shear. In some embodiments, the mixing is high shear (e.g., at speeds of about 4000 to about 9000 rpm). Spherical droplets of organogel precursor form in the dispersion medium by virtue of the interface tension. The droplets gel and strengthen during the time in the dispersion medium. Agitation of the mixture is typically used to prevent the droplets from agglomerating. For example, the combination of organogel sol and dispersion medium can be stirred for a period of time to prevent the droplets from agglomerating.

In some embodiments, the medium further comprises one or more surfactants. As used herein, the term "surfactant" refers to a substance which aids in the formation and stabilization of emulsions by promoting dispersion of hydrophobic and hydrophilic (e.g., oil and water) components. The surfactant, when present, may vary. Suitable surfactants are generally non-ionic, and include, but are not limited to, polyethylene glycol esters of fatty acids, propylene glycol esters of fatty acids, polysorbates, polyglycerol esters of fatty acids, sorbitan esters of fatty acid, and the like. Suitable surfactants have an HLB number ranging from about 0 to about 20. In some embodiments, the HLB number is from about 3.5 to about 6. As will be understood by one skilled in the art, HLB is the hydrophilic-lipophilic balance of an emulsifying agent or surfactant is a measure of the degree to which it is hydrophilic or lipophilic. The HLB value may be determined by calculating values for the different regions of the molecule, as described by Griffin in Griffin, William C. (1949), "Classification of Surface-Active Agents by 'HLB'" (PDF), Journal of the Society of Cosmetic Chemists, 1 (5): 311-26 and Griffin, William C. (1954), "Calculation of HLB Values of Non-Ionic Surfactants" (PDF), Journal of the Society of Cosmetic Chemists, 5 (4): 249-56, and by Davies in Davies JT (1957), "A quantitative kinetic theory of emulsion type, I. Physical chemistry of the emulsifying agent" (PDF), Gas/Liquid and Liquid/Liquid Interface, Proceedings of the International Congress of Surface Activity, pp. 426-38. HLB value may be determined in accordance with the industry standard textbook, namely "The HLB SYSTEM, a time-saving guide to emulsifier selection" ICI Americas Inc., Published 1976 and Revised, March 1980.

Examples of suitable surfactants generally include, but are not limited to: polyoxyethylene-sorbitan-fatty acid esters; e.g., mono- and tri-lauryl, palmityl, stearyl and oleyl esters; e.g., products of the type known as polysorbates and commercially available under the trade name Tween®;

polyoxyethylene fatty acid esters, e.g., polyoxyethylene stearic acid esters of the type known and commercially available under the trade name Myrj®; polyoxyethylene ethers, such as those available under the trade name Brij®; polyoxyethylene castor oil derivatives, e.g., products of the type known and commercially available as Cremophors®, sorbitan fatty acid esters, such as the type known and commercially available under the name Span® (e.g., Span 80); polyoxyethylene-polyoxypropylene co-polymers, e.g., products of the type known and commercially available as Pluronic® or Poloxamer®; glycerol triacetate; and mono-glycerides and acetylated monoglycerides, e.g., glycerol monodicocoate (Imwitor® 928), glycerol monocaprylate (Imwitor® 308), and mono- and di-acetylated monoglycerides. In some embodiments, the one or surfactants comprise a commercially available polymeric polyester-polyol surfactant of the type known under the trade name Hypermer® (Croda Industrial Chemicals; Edison, NJ, USA).

In some embodiments, the one or more surfactants comprise Tween 20, Tween 80, Span 20, Span 40, Span 60, Span 80, or a combination thereof. In some embodiments, the surfactant is Span 20, Tween 80, or a mixture thereof. In some embodiments, the one or more surfactants is Hypermer® B246SF. In some embodiments, the one or more surfactants is Hypermer® A70.

The concentration of the surfactant may vary. In some embodiments, the surfactant, or a mixture of surfactants, is present in the medium in amount by weight from about 1 to about 5%, such as about 1, about 2, about 3, about 4, or about 5%.

In some embodiments, a low-viscosity solvent is added. In some embodiments, the low-viscosity solvent is a C1 to C3 alcohol. In some embodiments, the low-viscosity solvent is ethanol. When utilized, the low-viscosity solvent (e.g., ethanol) is added to the mixture of droplets and dispersion medium after gelation. In some embodiments, the addition produces smaller beads and reduces agglomeration of large clusters of beads. The amount of low-viscosity solvent added and the manner of addition may vary. In some embodiments, the low-viscosity solvent is added in a single portion in an amount up to about 10% by volume of the medium. In some embodiments, the low-viscosity solvent is added in two or more portions, comprising a first portion in an amount up to about 10% by volume of the medium, and a further one or more portions, wherein a total amount of the low-viscosity solvent added is up to about 50% by volume of the medium. In some embodiments, the low-viscosity solvent is added in a continuous manner, wherein a total amount of the low viscosity solvent added is up to about 50% by volume of the medium.

The process further includes removing the organogel beads from the dispersion medium, e.g., silicone oil. The organogel beads are filtered from the dispersion medium and then washed or rinsed with fluids, e.g., hydrocarbon solvents, such as heptane, and/or alcohols such as ethanol, methanol, isopropanol, or higher alcohols. A basic requirement for the rinsing liquid is that it can remove the dispersing medium (e.g., oil or silicone oil) while not reacting chemically with the organogel, and is volatile enough to be readily removed from the organogel bead subsequently.

The process of transitioning gel-forming components into an organogel material can also include an aging step (also referred to as curing) prior to performing a liquid phase extraction. Aging an organogel material after it reaches its gel point can further strengthen the gel framework by increasing the number of cross-linkages within the network. The duration of gel aging can be adjusted to control various properties within the resulting aerogel material. This aging procedure can be useful in preventing potential volume loss and shrinkage during liquid phase extraction. Aging can involve: maintaining the gel (prior to extraction) at a quiescent state for an extended period; maintaining the gel at elevated temperatures; adding cross-linkage promoting compounds; or any combination thereof. The preferred temperatures for aging are usually between about 10° C. and about 200° C. The aging of a gel material typically continues up to the liquid phase extraction of the wet-gel material. In some embodiments, the organogel beads are aged in ethanol.

The time period for transitioning gel-forming materials into a gel material includes both the duration of the initial gel formation (from initiation of gelation up to the gel point), as well as the duration of any subsequent curing and aging of the gel material prior to liquid phase extraction (from the gel point up to the initiation of liquid phase extraction). The total time period for transitioning gel-forming materials into a gel material is typically between about 1 minute and several days, preferably about 30 hours or less, about 24 hours or less, about 15 hours or less, about 10 hours or less, about 6 hours or less, about 4 hours or less, about 2 hours or less, about 1 hour or less, about 30 minutes or less, or about 15 minutes or less.

The resulting organogel material may be washed in a suitable secondary solvent to replace the primary reaction solvent present in the wet-gel. Such secondary solvents may be linear monohydric alcohols with 1 or more aliphatic carbon atoms, dihydric alcohols with 2 or more carbon atoms, branched alcohols, cyclic alcohols, alicyclic alcohols, aromatic alcohols, polyhydric alcohols, ethers, ketones, cyclic ethers, or their derivative.

After removal of the organogel beads from the dispersion medium, the gel beads can undergo a process of aging and rinsing. In exemplary embodiments, the first step includes rinsing the organogel beads with a solvent, e.g., ethanol or a hydrocarbon solvent such as hexane or octane, under a low vacuum filtration. A second step can include aging the organogel beads in solvent, e.g., ethanol, for about 24 to 48 hours at a temperature in the range of about 50° C. to 70° C. The aging fluid bath can be changed during the aging period to remove unreacted compounds and substitute the sol-gel solvent, e.g., DMAC, with the aging solvent, e.g., ethanol, referred to herein as solvent exchange.

Following the aging step, the organogel beads are typically clustered as wet gel agglomerates. These agglomerates are, in exemplary embodiments, dispersed by sonication in a solvent, such as ethanol. For example, a probe sonicator can be used to disperse the agglomerated beads. In certain embodiments, a decanting step can be employed to remove the fine, non-settling beads from the upper part of the bead suspension following sonication. The remaining bead suspension can then be diluted with more ethanol and sonicated again. The steps of sonication, decanting, and dilution can be repeated until most of the organogel beads are dispersed. The dispersed beads can then be filtered to yield a wet cake of organogel beads. The wet cake of organogel beads is then dried according to the embodiments disclosed herein.

The size of the wet-gel beads may vary. In some embodiments, the wet-gel beads have a size ranging from about 5 to about 500 microns in diameter, for example from about 5, about 10, about 20, about 30, about 40, or about 50, to about 60, about 70, about 80, about 90, about 100, about 200, about 300, about 400, or about 500 microns in diameter.

While the method of forming organogel beads and organogel-silicon composite beads disclosed herein above has been described with particular reference to imidization of polyamic acid organogel precursor materials with a dehydrating agent, other suitable methods of producing polyimide organogels and the corresponding aerogels are contemplated herein as well, for example as described in U.S. Pat. No. 6,399,669 to Suzuki et al.; U.S. Pat. No. 9,745,198 to Leventis et al.; Leventis et al., Polyimide Aerogels by Ring-Opening Metathesis Polymerization (ROMP), Chem. Mater. 2011, 23, 8, 2250-2261; Leventis et al., Isocyanate-Derived Organic Aerogels: Polyureas, Polyimides, Polyamides, MRS Proceedings, 1306 (2011), Mrsf10-1306-bb03-01. doi: 10.1557/opl.2011.90; Chidambareswarapattar et al., One-step room-temperature synthesis of fibrous polyimide aerogels from anhydrides and isocyanates and conversion to isomorphic carbons, J. Mater. Chem., 2010, 20, 9666-9678; Guo et al., Polyimide Aerogels Cross-Linked through Amine Functionalized Polyoligomeric Silsesquioxane, ACS Appl. Mater. Interfaces 2011, 3, 546-552; Nguyen et al., Development of High Temperature, Flexible Polyimide Aerogels, American Chemical Society, proceedings published 2011; Meador et al., Mechanically Strong, Flexible Polyimide Aerogels Cross-Linked with Aromatic Triamine, ACS Appl. Mater. Interfaces, 2012, 4 (2), pp 536-544; Meador et al., Polyimide Aerogels with Amide Cross-Links: A Low Cost Alternative for Mechanically Strong Polymer Aerogels, ACS Appl. Mater. Interfaces 2015, 7, 1240-1249; Pei et al., Preparation and Characterization of Highly Cross-Linked Polyimide Aerogels Based on Polyimide Containing Trimethoxysilane Side Groups, Langmuir 2014, 30, 13375-13383.

Further, while the method disclosed herein above has been described with particular reference to polyamic acids as the organogel precursor material, and a corresponding polyimide as the organogel, one of skill in the art will recognize that other suitable organogel precursor materials may be utilized in the present method. Accordingly, gelation may be performed under conditions appropriate for any individual organogel precursor. Examples of suitable organogels include, but are not limited to, resorcinol-formaldehyde (RF), phenol-formaldehyde (PF), polyamides, polyacrylates, polymethyl methacrylates, acrylate oligomers, polyoxyalkylenes, polyurethanes, polyphenols, polybutadienes, trialkoxysilyl-terminated polydimethylsiloxanes, polystyrenes, polyacrylonitriles, polyfurfurals, melamineformaldehydes, cresol formaldehydes, phenol-furfurals, polyethers, polyols, polyisocyanates, polyhydroxybenzenes, polyvinyl alcohol dialdehydes, polycyanurates, polyacrylamides, various epoxies, agar, agarose, chitosan, and combinations and derivatives thereof. Any precursors of these materials may be used to create and use the resulting materials. For example, organogel materials can be formed from synthetic polymers or from biopolymer precursor materials. Synthetic polymers useful for producing organogels include phenolic resins, polymers formed from isocyanates or amines (e.g., the polyimide compositions disclosed herein), polyolefins, and conducting polymers. Phenolic resins suitable for producing organogels include phenolformaldehyde (PF), resorcinol-formaldehyde (RF), polyurea-crosslinked RF, pholoroglucinol-formaldehyde (FPOL), cresol-formaldehyde, phenol-furfural, resorcinolfurfural, phloroglucinol-furfural (PF), phloroglucinol-terephthalaldehyde (TPOL), polybenzoxazines (PBO), and melamine-formaldehyde (MF). Isocyanates and amines suitable for producing organogels can include polyurethane (PU), polyurea (PUA), polyimide (PI), and polyamides (PA). Polyolefins suitable for producing organogels include polydicyclopentadiene (PDCPD) and polyacrylonitrile (PAN). Conducting polymers suitable for producing organogels include polypyrrole (PPY). Benzimidazole can also be used to produce organogels. Biopolymers, such as polysaccharides and proteins, can also be used to produce organogels. For example, suitable polysaccharides useful for producing organogels include cellulose, chitin, chitosan, starch, pectin, alginate.

A non-limiting listing of suitable organogel precursors, gelation catalysts, and the corresponding aerogel material type are provided in Table 2 below.

TABLE 2

Alternative organogel precursors

| Precursor(s) | Gelation catalyst | Organogel Type |
|---|---|---|
| Resorcinol and Formaldehyde | Acid or Base | RF |
| Phloroglucinol, Furaldehyde | Acid or Base | PF |
| Cellulose and isocyanate | Amine base | Modified Cellulose |
| Diisocyanate and polyamine | | Polyurea |
| Diisocyanate and polyol | Amine base, or Lewis acid | Polyurethane |
| Sodium alginate | Metal ions | Cross-linked Alginate |
| acrylonitrile | — | Polyacrylonitrile (PAN) |

In some embodiments, the porous carbon or porous carbon-silicon composition in bead form is obtained from pyrolyzation of an organogel bead (e.g., a xerogel or aerogel) which comprises RF, PF, cellulose, a polyuria, a polyurethane, an alginate, or polyacrylonitrile.

Methods of Forming Aerogels and Xerogels from Organogels

In some embodiments, the porous carbon or the porous carbon-silicon composition in bead form comprises a carbon aerogel. In some embodiments, the porous carbon or the porous carbon-silicon composition in bead form comprises a carbon xerogel. In other words, in some embodiments an initial porous organogel or organogel-silicon composite (e.g., polyimide or polyimide-silicon) material as described herein is converted to the corresponding aerogel or xerogel, and then pyrolyzed to provide a corresponding carbon or carbon-silicon composite in the form of an aerogel or xerogel bead composite.

Once an organogel material (e.g., an organogel or organogel-silicon composite, such as a polyimide or polyimide-silicon composite bead) has been formed and processed, the liquid phase of the organogel can then be at least partially extracted from the wet-gel using extraction methods, including processing and extraction techniques, to form a porous or highly porous material, such as a xerogel or an aerogel bead. Liquid phase extraction, among other factors, plays an important role in engineering the characteristics of aerogels, such as porosity and density, as well as related properties such as thermal conductivity.

In some embodiments, the method further comprises converting an organogel, e.g., a polyimide or polyimide-silicon composite bead, obtained as described herein above, to an organic aerogel or xerogel. Generally, aerogels are obtained when a liquid phase is extracted from a gel in a manner that causes low shrinkage to the porous network and framework of the wet gel. Aerogels (e.g., polyimide aerogels) are commonly formed by removing the liquid mobile phase from the wet organogel material at a temperature and pressure near or above the critical point of the liquid mobile phase. Once the critical point is reached (near critical) or surpassed (supercritical) (i.e., pressure and temperature of the system is at or higher than the critical pressure and critical temperature respectively) a new supercritical phase appears in the fluid that is distinct from the liquid or vapor phase. The solvent can then be removed without introducing a liquid-vapor interface, capillary pressure, or any associated mass transfer limitations typically associated with liquid-vapor boundaries. Additionally, the supercritical phase is more miscible with organic solvents in general, thus having the capacity for better extraction. Co-solvents and solvent exchanges are also commonly used to optimize the supercritical fluid drying process.

If evaporation or extraction occurs below the supercritical point, capillary forces generated by liquid evaporation can cause shrinkage and pore collapse within the gel material. Maintaining the mobile phase near or above the critical pressure and temperature during the solvent extraction process reduces the negative effects of such capillary forces. In certain embodiments of the present disclosure, the use of near-critical conditions just below the critical point of the solvent system may allow production of aerogel materials or compositions with sufficiently low shrinkage, thus producing a commercially viable end-product.

As discussed herein, wet gel beads can be dried using various techniques to provide an aerogel bead. In exemplary embodiments, organogel beads can be dried at ambient pressure, at subcritical conditions, or at supercritical conditions.

Both room temperature and high temperature processes can be used to dry beads at ambient pressure. In some embodiments, a slow ambient pressure drying process can be used in which the wet gel beads are spread in a thin layer and exposed to air in an open container for a period of time sufficient to remove solvent from the beads, e.g., for a period of time in the range of 24 to 36 hours. The thickness of the bead layer can be in the range of about 5 mm to about 15 mm. The beads can optionally be stirred or fluffed up manually during the drying process to prevent the beads from fusing together during the drying process.

Fluidized bed methods can also be used for ambient temperature drying of gels. In an exemplary embodiment, a fritted funnel is secured on top of a filtration flask, the wet cake or gel slurry is placed on the frit, the top of the funnel is covered with a tissue, and compressed air hooked to the filtration's flask inlet and admitted through the pores of the frit. The beads are maintained in the fluidized bed until the solvent is removed. The dry powder material can then be collected from the funnel.

In another embodiment, the organogel beads are dried by heating. For example, the gel beads can be heated in a convection oven. For another example, the gel beads can be spread in a layer and placed on a hot plate. The hot plate can be at a temperature from 50° C. to about 100° C. and the beads can be heated for a period of time in the range of about 2 to about 5 minutes to evaporate most of the ethanol. After partially drying, the beads can be left at ambient temperature to dry completely for a period of time in the range of about 6 hours to about 12 hours, or can be heated at a temperature from 50° C. to about 100° C. Without being bound by theory, the volatile solvent can act as a fluidizer or separator as the solvent rapidly leaves the gel bead material, which leads to a reduction in bead agglomeration.

Organogel Beads (e.g., Polyimide or Polyimide-Silicon Composite Gel Beads) Dried at Ambient Conditions can be Referred to as Xerogel Beads. Exemplary Polyimide Xerogels Having a Target Density of about 0.05 g/Cc have Surface Areas in the Range of about 0.00 m²/g to about 1.5 m²/g, for Example in the Range of about 0.10 m²/g to about 1.10 $m^2/g$, about 0.10 $m^2/g$ to about 1.00 $m^2/g$, about 0.10 $m^2/g$ to about 0.50 $m^2/g$, or about 0.10 $m^2/g$ to about 0.20 $m^2/g$.

Both supercritical and sub-critical drying can be used to dry beads. In an exemplary embodiment of supercritical drying, the beads are filtered, collected and secured in a porous container having pores smaller than the size of the dried beads, e.g., 5 micron pores. The container having the beads can then be placed into a high-pressure vessel for extraction of solvent with supercritical $CO_2$. After removal of the solvent, e.g., ethanol, the vessel can be held above the critical point of $CO_2$ for a period of time, e.g., about 30 minutes. Following supercritical drying, the vessel is depressurized to atmospheric pressure.

In an exemplary embodiment of subcritical drying, the gel beads are dried using liquid $CO_2$ at a pressure in the range of about 800 psi to about 1200 psi at room temperature. This operation is quicker than supercritical drying, for example, the ethanol can be extracted in about 15 minutes. In the context of this disclosure, beads dried using subcritical drying are referred to as aerogel-like.

Several additional aerogel extraction techniques are known in the art, including a range of different approaches in the use of supercritical fluids in drying aerogels, as well as ambient drying techniques. For example, Kistler (J. Phys. Chem. (1932) 36:52-64) describes a simple supercritical extraction process where the gel solvent is maintained above its critical pressure and temperature, thereby reducing evaporative capillary forces and maintaining the structural integrity of the gel network. U.S. Pat. No. 4,610,863 describes an extraction process where the gel solvent is exchanged with liquid carbon dioxide and subsequently extracted at conditions where carbon dioxide is in a supercritical state. U.S. Pat. No. 6,670,402 teaches extracting a liquid phase from a gel via rapid solvent exchange by injecting supercritical (rather than liquid) carbon dioxide into an extractor that has been pre-heated and pre-pressurized to substantially supercritical conditions or above, thereby producing aerogels. U.S. Pat. No. 5,962,539 describes a process for obtaining an aerogel from a polymeric material that is in the form a sol-gel in an organic solvent, by exchanging the organic solvent for a fluid having a critical temperature below a temperature of polymer decomposition, and supercritically extracting the fluid/sol-gel. U.S. Pat. No. 6,315,971 discloses a process for producing gel compositions comprising: drying a wet gel comprising gel solids and a drying agent to remove the drying agent under drying conditions sufficient to reduce shrinkage of the gel during drying. U.S. Pat. No. 5,420,168 describes a process whereby Resorcinol/Formaldehyde aerogels can be manufactured using a simple air-drying procedure. U.S. Pat. No. 5,565,142 describes drying techniques in which the gel surface is modified to be stronger and more hydrophobic, such that the gel framework and pores can resist collapse during ambient drying or subcritical extraction. Other examples of extracting a liquid phase from gel materials can be found in U.S. Pat. Nos. 5,275,796 and 5,395,805.

One preferred embodiment of extracting a liquid phase from the wet-gel uses supercritical conditions of carbon dioxide, including, for example: first substantially exchanging the primary solvent present in the pore network of the gel with liquid carbon dioxide; and then heating the wet gel (typically in an autoclave) beyond the critical temperature of carbon dioxide (about 31.06° C.) and increasing the pressure of the system to a pressure greater than the critical pressure of carbon dioxide (about 1070 psig). The pressure around the gel material can be slightly fluctuated to facilitate removal of the supercritical carbon dioxide fluid from the gel. Carbon dioxide can be recirculated through the extraction system to facilitate the continual removal of the primary solvent from the wet gel. Finally, the temperature and pressure are slowly returned to ambient conditions to produce a dry aerogel material. Carbon dioxide can also be pre-processed into a supercritical state prior to being injected into an extraction chamber. In other embodiments, extraction can be performed using any suitable mechanism, for example altering the pressures, timings, and solvent discussed above.

In certain embodiments of the present disclosure, a dried polyimide aerogel composition can be subjected to one or more heat treatments for a duration of time of 3 hours or more, between 10 seconds and 3 hours, between 10 seconds and 2 hours, between 10 seconds and 1 hour, between 10 seconds and 45 minutes, between 10 seconds and 30 minutes, between 10 seconds and 15 minutes, between 10 seconds and 5 minutes, between 10 seconds and 1 minute, between 1 minute and 3 hours, between 1 minute and 1 hour, between 1 minute and 45 minutes, between 1 minute and 30 minutes, between 1 minute and 15 minutes, between 1 minute and 5 minutes, between 10 minutes and 3 hours, between 10 minutes and 1 hour, between 10 minutes and 45 minutes, between 10 minutes and 30 minutes, between 10 minutes and 15 minutes, between 30 minutes and 3 hours, between 30 minutes and 1 hour, between 30 minutes and 45 minutes, between 45 minutes and 3 hours, between 45 minutes and 90 minutes, between 45 minutes and 60 minutes, between 1 hour and 3 hours, between 1 hour and 2 hours, between 1 hour and 90 minutes, or in a range between any two of these values.

Methods of Forming Porous Carbon and Carbon-Silicon Compositions from Organogels Provided herein are porous carbon compositions and porous carbon-silicon compositions, which may also be referred to as nanoporous carbon and silicon-doped nanoporous carbon materials, respectively. Such compositions may be in the form of xerogel or aerogel beads. Organogel beads, such as polyimide gel beads as disclosed herein, may be converted to carbon materials. In some embodiments, a dried xerogel or aerogel (e.g., a polyimide xerogel or aerogel) as disclosed herein is pyrolyzed (i.e., carbonized), meaning the xero- or aerogel is heated at a temperature and for a time sufficient to convert substantially all of the organic material into carbon. The time and temperature required may vary. In some embodiments, the dried organic aerogel or xerogel is subjected to a treatment temperature of 400° C. or above, 600° C. or above, 800° C. or above, 1000° C. or above, 1200° C. or above, 1400° C. or above, 1600° C. or above, 1800° C. or above, 2000° C. or above, 2200° C. or above, 2400° C. or above, 2600° C. or above, 2800° C. or above, or in a range between any two of these values, for carbonization of the aerogel or xerogel. Without being bound by theory, it is contemplated herein that the electrical conductivity of an aerogel composition increases with carbonization temperature.

Carbon xerogels and aerogels according to exemplary embodiments of the present disclosure, e.g., polyimide-derived carbon aerogels, can have a residual nitrogen content. For example, carbon aerogels according to embodiments disclosed herein can have a residual nitrogen content of at least about 0.1 wt %, at least about 0.5 wt %, at least about 1 wt % at least about 2 wt %, at least about 3 wt %, at least about 4 wt %, at least about 5 wt %, at least about 6 wt %, at least about 7 wt %, at least about 8 wt %, at least about 9 wt %, at least about 10 wt %, or in a range between any two of these values.

Alternative Methods of Forming Porous Carbon-Silicon Compositions

As disclosed herein above, in some embodiments, silicon (e.g., silicon particles) is introduced into the carbon-silicon composite material prior to or during gelation of a corresponding organogel precursor, such as a polyamic acid. Alternatively, the silicon may be created, infiltrated, deposited, or otherwise formed within an organogel or carbon material as described herein (e.g., an organogel or organogel-derived carbon xerogel or aerogel).

In an exemplary alternative embodiment, silicon is created within pores of the carbon material (or a precursor material thereto, such as an organogel material) by subjecting the material to an elevated temperature in the presence of a silicon-containing gas, preferably silane ($SiH_4$), in order to achieve silicon deposition/infiltration via processes such as chemical vapor deposition (CVD) or chemical vapor infiltration (CVI). In some embodiments, silicon can be co-deposited or co-infiltrated simultaneously or, alternatively, sequentially with other electroactive materials. For example, silicon and tin may be deposited or infiltrated into the material simultaneously or, alternatively, sequentially. For another example, silicon and germanium or silicon and germanium alloys may be deposited or infiltrated into the material simultaneously or, alternatively, sequentially.

The silane gas can be mixed with other inert gases, for example, nitrogen gas. The temperature and time of processing can be varied, for example the temperature can be between 30° and 400° C., for example between 40° and 500° C., for example between 50° and 600° C., for example between 60° and 700° C., for example between 70° and 800° C., for example between 80° and 900° C. The mixture of gas can comprise between 0.1 and 1% silane and remainder inert gas. Alternatively, the mixture of gas can comprise between 1% and 10% silane and remainder inert gas. Alternatively, the mixture of gas can comprise between 10% and 20% silane and remainder inert gas. Alternatively, the mixture of gas can comprise between 20% and 50% silane and remainder inert gas. Alternatively, the mixture of gas can comprise above 50% silane and remainder inert gas. Alternatively, the gas can essentially be 100% silane gas. The reactor in which the CVD process is carried out is according to various designs as known in the art, for example in a fluid bed reactor, a static bed reactor, an elevator kiln, a rotary kiln, a box kiln, or other suitable reactor type. The reactor materials are suitable for this task, as known in the art. In a preferred embodiment, the carbon material is processed under condition that provide uniform access to the gas phase, for example a reactor wherein particles of the carbon material are fluidized, or otherwise agitated to provide said uniform gas access.

In some embodiments, the CVD process is a plasma-enhanced chemical vapor deposition (PECVD) process. This process is known in the art to provide utility for depositing thin films from a gas state (vapor) to a solid state on a substrate. Chemical reactions are involved in the process, which occur after creation of a plasma of the reacting gases. The plasma is generally created by radio frequency (RF; i.e., AC) or DC discharge between two electrodes, the space between which is filled with the reacting gases. In certain embodiments, the PECVD process is utilized for porous carbon that is coated on a substrate suitable for the purpose, for example a copper foil substrate. The PECVD can be carried out at various temperatures, for example between 30° and 800° C., for example between 30° and 600° C., for example between 30° and 500° C., for example between 30° and 400° C., for example at 350° C. The power can be varied, for example 25W RF, and the silane gas flow required for processing can be varied, and the processing time can be varied as known in the art.

CVD/CVI is generally accomplished by subjecting the carbon material or precursor thereof to an elevated temperature for a period of time in the presence of a suitable deposition gas containing carbon atoms. Suitable gases in this context include, but are not limited to methane, propane, butane, cyclohexane, ethane, propylene, and acetylene. The temperature can be varied, for example between 350 to 1050° C., for example between 35° and 450° C., for example between 45° and 550° C., for example between 55° and 650° C., for example between 65° and 750° C., for example between 75° and 850° C., for example between 85° and 950° C., for example between 950 and 1050 C. The deposition time can be varied, for example between 0 and 5 min, for example between 5 and 15 min, for example between 15 and 30 min, for example between 30 and 60 min, for example between 60 and 120 min, for example between 120 and 240 min. In some embodiments, the deposition time is greater than 240 min. In certain embodiments, the deposition gas is methane and the deposition temperature is greater than or equal to 950° C. In certain embodiments, the deposition gas is propane and the deposition temperature is less than or equal to 750° C. In certain embodiments, the deposition gas is cyclohexane and the deposition temperature is greater than or equal to 800° C.

In certain embodiments, the reactor itself can be agitated, in order to agitate the particles of carbon material to be silicon impregnated. For example, the impregnation process can be carried out in a static mode, wherein the particles are not agitated, and the silicon-containing reactant flows over, around, or otherwise comes in contact with the particles to be coated. In other exemplary modes, the particles can be fluidized, for example the impregnation with silicon-containing reactant can be carried out in a fluidized bed reactor. A variety of different reactor designs can be employed in this context as known in the art, including, but not limited to, elevator kiln, roller hearth kiln, rotary kiln, box kiln, and modified fluidized bed designs. Any extra or scrap silicon generated from the processes disclosed herein, i.e., silicon that is not deposited within the carbon material, can be isolated and re-used as an input material.

Properties of the Porous Carbon and Carbon-Silicon Compositions

As discussed herein above, the porous carbon and carbon-silicon compositions (e.g., silicon-doped nanoporous carbon materials) of the present disclosure may be in the form of xerogel or aerogel beads. The properties of the porous particulate carbon-silicon compositions may vary depending on the specific combination of variables utilized in their production, as described herein above.

The diameter of the particles (i.e., beads) may vary. For example, in some embodiments, the beads of the porous carbon or carbon-silicon composition have a diameter in a range from about 1 micrometer to about 50 micrometers, such as about 1 micrometer, about 2 micrometers, about 3 micrometers, about 4 micrometers, about 5 micrometers, about 6 micrometers, about 7 micrometers, about 8 micrometers, about 9 micrometers, about 10 micrometers, about 15 micrometers, about 20 micrometers, about 25 micrometers, about 30 micrometers, about 35 micrometers, about 40 micrometers, about 45 micrometers, about 50 micrometers, or in a range between any two of these values. In certain embodiments, the beads have a diameter in a range from about 1 to about 15 μm. In some embodiments, the beads have a particle size D10 in a range from about 5 to about 15 μm, or from about 5 to about 10 μm. In some embodiments, the beads have a particle size D50 in a range from about 5 to about 25 μm, or from about 10 to about 15 μm. In some embodiments, the beads have a particle size D90 in a range from about 15 to about 35 μm, or from about 10 to about 20 μm.

The density of the beads may vary. In some embodiments, the beads have a tap density in a range of about 0.2 g/cm³ to about 1.5 g/cm³, or from about 0.3 to about 1.3 g/cm³.

In some embodiments, the porous carbon-silicon composition comprises a pore structure, the pore structure comprising a fibrillar morphology and an array of pores that surround elemental silicon. In some embodiments, the elemental silicon is present at least partially within the pore structure of the carbon. Within the context of the present disclosure, the term "fibrillar morphology" refers to the structural morphology of a nanoporous carbon (e.g., aerogel) being inclusive of struts, rods, fibers, or filaments. For example, in an embodiment, choice of solvent, such as dimethylacetamide (DMAC), can affect the production of such morphology. Further, in certain embodiments, when a carbon aerogel is derived from a polyimide, a crystalline polyimide results from the polyimide forming a linear polymer. As will become clearer in the following examples, certain embodiments were observed surprisingly to include a fibrillar morphology as an interconnected polymeric structure, where a long linear structure was anticipated, based on the known behavior of the polyimide precursors. In comparison, the product form of the nanoporous carbon (e.g., porous carbon or carbon-silicon composite material) can alternatively be particulate in nature or powder wherein the fibrillar morphology of the carbon aerogel persists. As will become clearer as this specification continues, a fibrillar morphology can provide certain benefits over a particulate morphology, such as mechanical stability/strength and electrical conductivity, particularly when the nanoporous carbon is implemented in specific applications, for example as the anodic material in a lithium ion battery (LIB). It should be noted that this fibrillar morphology can be found in nanoporous carbons of both a monolithic form and a powder form; in other words, a monolithic carbon can have a fibrillar morphology, and aerogel powder/particles/beads can have a fibrillar morphology. Furthermore, in certain embodiments, when the nanoporous carbon material contains additives, such as silicon or others, the fibrillar nanostructure inherent to the carbon material is preserved and serves as a bridge between additive particles.

As described herein above, in some embodiments, the porous carbon composition further comprises silicon. The amount of silicon (e.g., elemental silicon) present in the composition (e.g., carbon-silicon composite aerogel beads) may vary. In some embodiments, the porous carbon-silicon composition contains greater than about 10% by weight of silicon. In some embodiments, the composition comprises from about 25% to 65% of silicon by weight, relative to the weight of the carbon material. In some embodiments, the composition comprises about 25, about 30, about 35, about 40, about 45, about 50, about 55, about 60, or about 65% by weight of silicon.

The particle size of the silicon (e.g., elemental silicon) present in the composition may vary. In some embodiments, the silicon has a particle size less than about 150 nm. In some embodiments, the silicon has a particle size in the range of about 150 nm to about 500 nm. In some embodiments, the silicon has a particle size greater than about 500 nm.

In some embodiments, the porous carbon-silicon composition in bead form comprises the silicon in a range from about 25 to about 65% by weight, wherein the silicon has a particle size in a range from about 100 nm to about 800 nm; and wherein the porous carbon-silicon composition beads have a tap density in the range of about 0.2 g/cm³ to about 1.5 g/cm³; a bead diameter in the range of about 1 μm to about 15 μm; an average pore diameter in a range from about 10 nm to about 50 nm; and a BET surface area in a range from about 0 to about 500 m²/g.

Electrode Materials and Energy Storage Devices Comprising the Porous Carbon or Carbon-Silicon Compositions In certain embodiments, the current invention involves the formation and use of nanoporous carbon-based scaffolds or structures, such as carbon or carbon-silicon aerogels, as electrode materials within an energy storage device, for example as the primary anodic material in a LIB. The pores of the nanoporous scaffold are designed, organized, and structured to accommodate particles of silicon or other metalloid or metal, and expansion of such particles upon lithiation in a LIB, for example. Alternatively, the pores of the nanoporous scaffold may be filled with sulfide, hydride, any suitable polymer, or other additive where there is benefit to contacting the additive with an electrically conductive material (i.e., the scaffold/aerogel) to provide for a more effective electrode. A general process utilizing a silicon-doped carbon aerogel in a battery application can be seen in FIG. 1.

To further expand on the exemplary application within LIBs, when a carbon aerogel material is utilized as the primary anodic material as in certain embodiments of the current invention, the aerogel nanoporous structure has a narrow pore size distribution, and provides for high electrical conductivity, high mechanical strength, and a morphology and sufficient pore volume (at a final density) to accommodate a high percentage by weight of silicon particles and expansion thereof. Structurally, certain embodiments of the current invention have a fibrillar morphology with a strut size that produces the aforementioned narrow pore size distribution, high pore volume, and enhanced connectedness, among other properties.

In additional or alternative embodiments, the carbon aerogel itself functions as a current collector due to its electrical conductivity and mechanical strength, thus, in a preferred embodiment, eliminating the need for a distinct current collector on the anode side (when the anode is formed of the carbon aerogel). It is noted that in conventional LIBs, a copper foil is coupled to the anode as its current collector. However, removal of one or both of these components, depending on the application of the carbon aerogel, derives additional space for more electrode material, resulting in even greater capacity of the cell/individual electrode and overall greater energy density of the packaged battery system. However, in certain embodiments, existing current collectors may be integrated with the anode materials of various other embodiments to augment the copper or aluminum foils' current collection capabilities or capacities.

In certain embodiments, nanoporous carbon-based scaffolds or structures, and specifically a carbon aerogel as described herein can be used as the conductive network or current collector on the anode side of an energy storage device. The fully interconnected carbon aerogel network is filled with electrochemically active species, where the electrochemically active species are in direct contact or physically connected to the carbon network. Loading of electro-chemically active species is tuned with respect to pore volume and porosity for high and stable capacity and improved energy storage device safety. When utilized on the anode side, the electrochemically active species may include, for example, silicon, graphite, lithium or other metalloids or metals. In yet another embodiment, the anode may comprise nanoporous carbon-based scaffolds or structures, and specifically a carbon aerogel bead as disclosed herein.

Within the context of the present disclosure, the term "collector-less" refers to the absence of a distinct current collector that is directly connected to an electrode. As noted, in conventional LIBs, a copper foil is typically coupled to the anode as its current collector. Electrodes formed from nanoporous carbon-based scaffolds or structures (e.g., carbon or carbon-silicon composite aerogels as described herein), according to embodiments of the current invention, can be a freestanding structure or otherwise have the capability of being collector-less since the scaffold or structure itself functions as the current collector, due to its high electrical conductivity. Within the electrochemical cell, a collector-less electrode can be connected to form a circuit by embedding solid, mesh, woven tabs during the solution step of making the continuous porous carbon; or by soldering, welding, or metal depositing leads onto a portion of the porous carbon surface. Other mechanisms of contacting the carbon to the remainder of the system are contemplated herein as well. In alternative embodiments, the nanoporous carbon-based scaffolds or structures, and specifically a carbon aerogel may be disposed on or otherwise in communication with a dedicated current-collecting substrate (e.g., copper foil, aluminum foil, etc.). In this scenario, the carbon aerogel can be attached to a solid current collector using a conductive adhesive and applied with varying amounts of pressure.

Figure 2:
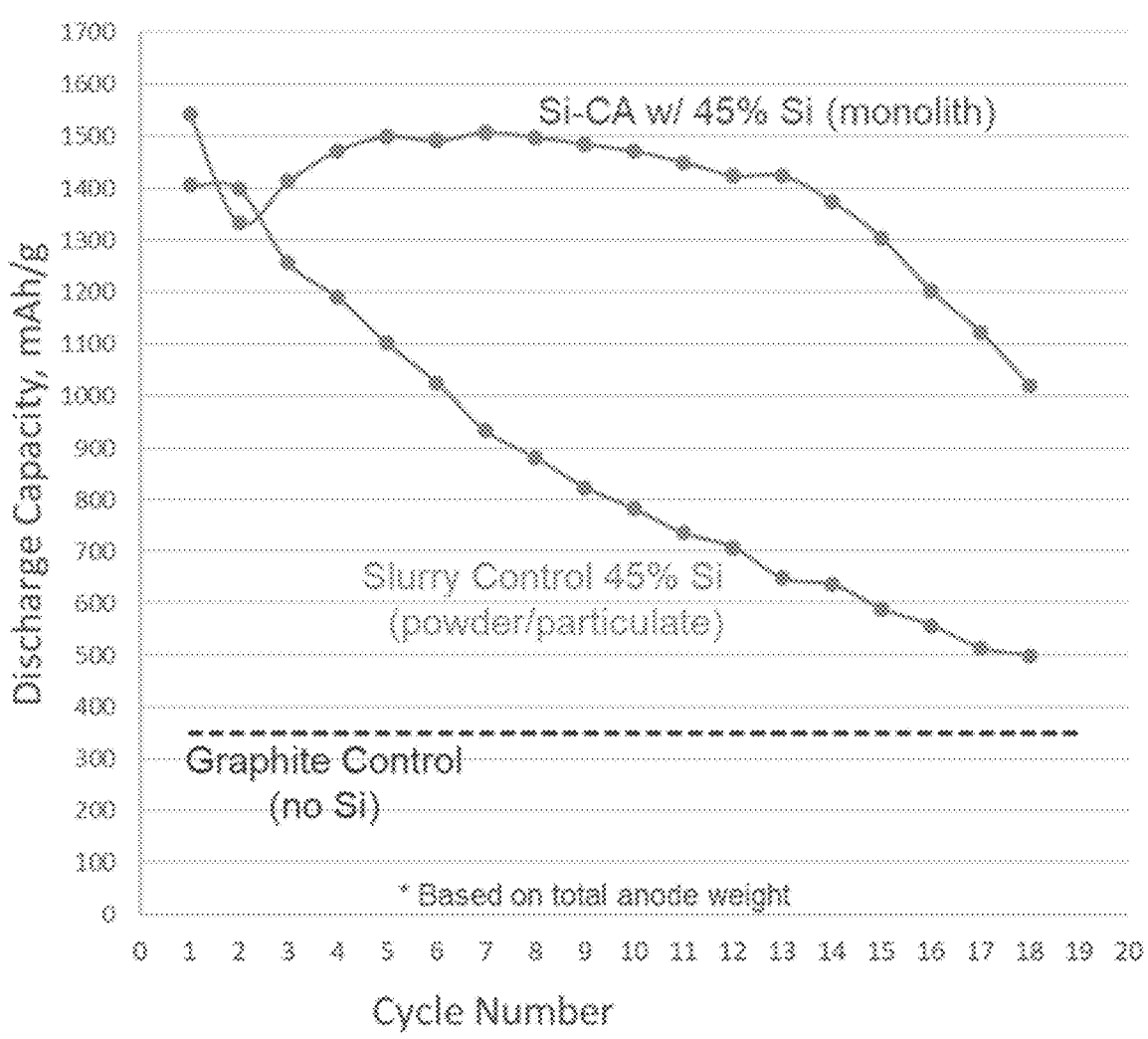
FIG. 2 depicts discharge capacity over several cycles, comparing silicon-doped monoliths and silicon particles incorporated by conventional slurry processing methods.

Furthermore, it is contemplated herein that the nanoporous carbon-based scaffolds or structures, and specifically carbon aerogels as described herein, can take the form of monolithic structures. When monolithic in nature, the carbon aerogel eliminates the need for any binders; in other words, the anode can be binder-less. As used herein, the term "monolithic" refers to aerogel materials in which a majority (by weight) of the aerogel included in the aerogel material or composition is in the form of a unitary, continuous, interconnected aerogel nanostructure. Monolithic aerogel materials include aerogel materials which are initially formed to have a unitary interconnected gel or aerogel nanostructure, but which can be subsequently cracked, fractured or segmented into non-unitary aerogel nanostructures. Monolithic aerogels may take the form of a freestanding structure or a reinforced (fiber or foam) material. In comparison, using silicon lithiation as an example, silicon incorporated into a monolithic aerogel can be utilized more effectively relative to theoretical capacity, as compared to the same amount of silicon incorporated into a slurry using conventional processes (see FIG. 2).

Monolithic aerogel materials are differentiated from particulate (e.g., bead) aerogel materials. The term "particulate aerogel material" refers to aerogel materials in which a majority (by weight) of the aerogel included in the aerogel material is in the form of particulates, particles, granules, beads, or powders, which can be combined together (i.e., via a binder, such as a polymer binder) or compressed together but which lack an interconnected aerogel nanostructure between individual particles. Collectively, aerogel materials of this form will be referred to as having a powder, particulate, or beaded form (as opposed to a monolithic form). It should be noted that despite an individual particle of a powder having a unitary structure, the individual particle is not considered herein as a monolith. Integration of aerogel powder into an electrochemical cell typically preparation of a paste or slurry from the powder, casting and drying onto a substrate, and may optionally include calendaring.

Particulate aerogel materials, e.g., aerogel beads, provide certain advantages. For example, particulate materials according to embodiments disclosed herein can be used as a direct replacement for other materials such as graphite in LIB anodes and anode manufacturing processes. Particulate materials according to embodiments disclosed herein can also provide improved lithium ion diffusion rates due to shorter diffusion paths within the particulate material. Particulate materials according to embodiments disclosed herein can also allow for electrodes with optimized packing densities, e.g., by tuning the particle size and packing arrangement. Particulate materials according to embodiments disclosed herein can also provide improved access to silicon due to inter-particle and intra-particle porosity.

Within the context of the present disclosure, the terms "binder-less" or "binder-free" (or derivatives thereof) refer to a material being substantially free of binders or adhesives to hold that material together. For example, a monolithic nanoporous carbon material is free of binder since its framework is formed as a unitary, continuous interconnected structure. Advantages of being binder-less include avoiding any effects of binders, such as on electrical conductivity and pore volume. On the other hand, aerogel particles require a binder to hold together to form a larger, functional material; such larger material is not contemplated herein to be a monolith. In addition, this "binder-free" terminology does not exclude all uses of binders. For example, a monolithic aerogel, according to the current invention, may be secured to another monolithic aerogel or a non-aerogel material by disposing a binder or adhesive onto a major surface of the aerogel material. In this way, the binder is used to create a laminate composite, but the binder has no function to maintain the stability of the monolithic aerogel framework itself.

Furthermore, monolithic polymeric aerogel materials or compositions of the present disclosure may be compressed up to 95% strain without significant breaking or fracturing of the aerogel framework, while densifying the aerogel and minimally reducing porosity. In certain embodiments, the compressed polymeric aerogel materials or compositions are subsequently carbonized using varying methods described herein, to form nanoporous carbon materials. It can be understood that amount of compression affects thickness of the resulting carbon material, where the thickness has an effect on capacity, as will become clearer as this specification continues. The examples, described infra, will illustrate varying thicknesses that are formed and contemplated by the current invention, where thickness is adjustable based on compression. As such, thickness of a composite (typically compressed) can be about 10-1000 micrometers, or any narrower range therein based on benefits needed of the final composite. The current invention also contemplates a powder or particle form of the carbon aerogel, where a binder would be needed and particle size optimized. A range of particle (e.g., bead) sizes may be about 1-50 micrometers.

Figure 3:
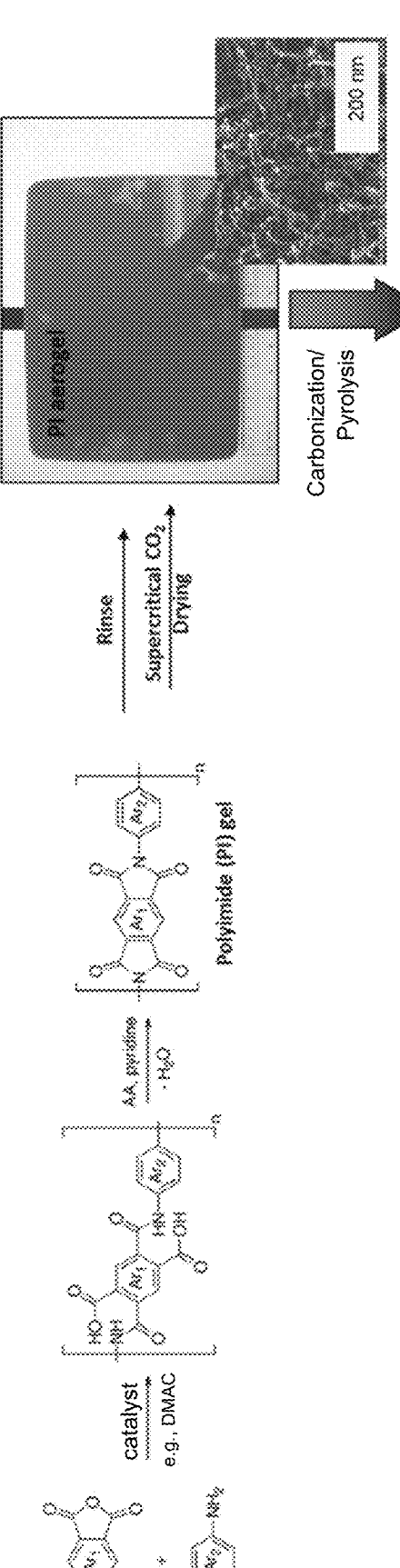
FIG. 3 is a flow diagram illustrating formation of a polyimide-derived carbon aerogel.

In an embodiment, the current invention is an anode of a LIB, comprising a silicon-doped, polyimide-derived carbon aerogel as disclosed herein, where silicon particles are contained at least partially within the pores of the carbon aerogel. A general reaction and process of developing a polyimide-derived carbon aerogel (i.e., without silicon) can be seen in FIG. 3, and is further described with reference to FIG. 49B. As will be seen, the structure of the carbon aerogel pores is tunable to have different properties (e.g., pore volume, pore size distribution) based on need (e.g., size or capacity of electrode in LIB). In another embodiment, the current invention is an electrode in a LIB or electrochemical cell thereof comprising such an anode. In yet further embodiments, the current invention is a device or system that incorporates such an energy storage device. Examples include, but are not limited to, electric vehicles and electronic devices (e.g., mobile devices and drones).

In certain embodiments, the current invention is a method of forming or manufacturing a continuous porous carbon silicon composite, such as a carbon aerogel. Polyimide precursors, such as diamine and dianhydride that can each include an aromatic group and/or an aliphatic group, are mixed in a suitable solvent (e.g., polar, aprotic solvent). Prior to adding imidization gelation catalysts, silicon particles are mixed into the polyimide precursors in solvent. The imidization gelation catalyst is then added to initiate the mixture for gelation. Such embodiments are described herein above with respect to bead formation.

In alternative embodiments, imidization can be accomplished via thermal imidization, where any suitable temperature and time range is contemplated (e.g., about 100° C.-200° C. for about 20 minutes to about 8 hours, followed by heating at about 300° C.-400° C. for about 20 minutes to about 1 hour). The gelled mixture is then dried to yield a continuous porous polyimide silicon composite, where the drying can be performed using subcritical and/or supercritical carbon dioxide. Optionally, the polyimide silicon composite can be compressed, preferably uniaxially (e.g., up to 95% strain), to increase density, adjustable up to about 1.5 g/cc based on the amount of compression. In exemplary embodiments, the polyimide silicon composite can be compressed to greater than about 80% strain prior to pyrolyzing the composite. Regardless of whether compression has taken place, the polyimide silicon composite is pyrolyzed to yield the continuous porous carbon silicon composite, where the resulting composite comprises greater than 0% and less than about 95% silicon by weight and comprises a porosity between about 5%-99%. In certain embodiments, pyrolysis can be performed at a maximum temperature of between about 750° C. and about 1600° C., optionally with graphitization from about 1600° C. up to about 3000° C.

In certain embodiments, the carbon-silicon composite can be a monolith or a freestanding structure, can be prepared on or off a substrate, can be micronized to a powder form, or can be prepared as a particulate material, e.g., as beads. Furthermore, the composite may be reinforced with or without a non-woven or woven material (e.g., fiber, foam, etc.). Optionally, the composite may be pre-doped with a metal or metal oxides, for example including, but not limited to, tin, sulfur, phosphorus, nickel, cobalt, manganese, lithium, magnesium, iron, zinc, boron, titanium, aluminum oxide, titanium oxide, niobium oxide, molybdenum oxide, silica, and aluminosilicate. Further, the silicon particles may be pre-doped with a p-type acceptor (e.g., boron, aluminum, gallium, and indium) or an n-type donor (e.g., phosphorous, lithium, arsenic, antimony, bismuth)

In alternative embodiments, the above methodology may be utilized to form or manufacture the porous carbon-silicon composite, with an exception that rather than silicon particles being mixed into the mixture of polyimide precursors in solvent, a silicate (e.g., silicon dioxide, aluminosilicate, and/or halloysite) and a reducing agent (e.g., magnesium, lithium, sodium, potassium, aluminum, calcium or a combination thereof) are mixed into the mixture of polyimide precursors in solvent. Upon drying, a continuous porous polyimide silicate and reducing agent composite is formed, which optionally can be compressed to adjust density. In this case (i.e., when using a silicate and reducing agent), the silicate and reducing agent react to form silicon in situ within the carbon composite under inert conditions with hydrogen gas at a temperature greater than about 700° C.

In further alternative embodiments, the above methodologies may be utilized, with an exception that rather than adding silicon or silicate+reducing agent to the polyimide precursors, a continuous porous carbon can be formed first (i.e., polyimide precursors, imidization using a catalyst or heat, drying, and pyrolysis), followed by depositing silicon onto or into the porous carbon. In this case, the silicon is deposited by dip coating the porous carbon into a silicon-forming silane precursor, followed by heating under inert conditions to decompose the silane to form a conformal silicon coating within the porous carbon. This dip processing can be performed multiple times to increase thickness and silicon content by weight up to about 95%. In other embodiments, the silicon can be deposited via atomic layer deposition or CVD.

Furthermore, it is contemplated herein that the pore size of the porous carbon composite material is tunable as needed. There are five primary methods of adjusting pore size taught herein. First, the amount of solids content, specifically the amount of polyimide precursor monomers (e.g., aromatic or aliphatic diamine and aromatic or aliphatic dianhydride), can adjust pore size. Smaller pore sizes result from a greater amount of solids per unit volume of fluid, due to less room being available such that interconnection takes place more closely. It should be noted that strut width does not change measurably, regardless of the amount of solids used. The amount of solids relates more so to how dense the network will be.

Another method of adjusting pore size is the use of radiation (e.g., radio wave, microwave, infrared, visible light, ultraviolet, X-ray, gamma ray) on the composite in either polyimide state or in carbon state. Radiation has an oxidizing effect, resulting in an increase in surface area, increase in pore size, and broadening of pore size distribution. Thirdly, pore size is affected by a macroscopic compression of the polyimide composite. As will be evidenced in the examples below, pore size reduces with compression.

Yet another method of adjusting pore size is ion bombardment of the composite in either polyimide state or carbon state. The effect of ion bombardment depends on the method designated. For example, there is additive ion bombardment (e.g., CVD), where something is added, resulting in a reduction of pore size. There is also destructive ion bombardment, where pore size would increase. Finally, pore size can be adjusted (increase or decrease) with heat treatment under different gas environments, for example presence of carbon dioxide or carbon monoxide, chemically active environments, hydrogen reducing environments, etc. A carbon dioxide environment, for example, is known to make activated carbon, where in instances of activation, mass is removed, pore size increases, and surface area increases.

Although each of the above methods of adjusting pore size is contemplated, the current disclosure will focus more on changing solids content (polyimide precursors) and compression of the polyimide composite prior to carbonization.

EXEMPLIFICATION

The following examples are described for illustrative purposes only and are not intended to be limiting the scope of the various embodiments of the current invention in any way.

Example 1: Carbonized Polyimide (CPI) Composites with Low Level of Doping

A. CPI with 9% Dopants Dispersed in the Polyimide

Polyimide (PI) gels were prepared from pyromellitic dianhydride (PMDA) and 1,4-phenylene diamine (PDA) in a 1:1 molar ratio in DMAC solvent at 0.06 g/cc target density. The precursors were mixed at room temperature for 3 hours, and then acetic anhydride (AA) was added at 4.3 molar ratio to PMDA and mixed with the solution for 2 hours. Powder dopants such as graphite CNGT0112 with a thickness of ~40 nm and length of ~400-600 nm, as well as silicon BASIC005 with spherical particles of ~30-nm diameter were acquired from ACS MATERIALS. The solutions were doped with graphite or silicon (Si) at 4.5% per total solids. Graphite was mixed with the solution for 10 minutes using magnetic bar stirring, and the doped mixture and the imidization was catalyzed with pyridine (Py). The graphite dispersed well, based on a visual assessment. After stirring the silicon with the polyimide solution for 10 minutes, the dispersion was visually poor (i.e., evidence of settling and/or particle agglomeration in the solution state) and the mixture was further sonicated for 3 minutes. Once the quality of the dispersion improved, pyridine catalyst was added to the mixture. The molar ratio of Py to PMDA was 4.0.

To prepare PI composites, the solutions were cast between glass plates with spacers on the edges to control thickness. Other suitable methods of casting the solutions are contemplated herein as well. The spacers were made of 200-micrometer thick aluminum foil. Monoliths of ~2-inch diameter were also cast in Teflon containers. The gelation time at ambient temperature was ~11.5 minutes for the graphite-doped samples and ~15.5 minutes for the silicon-doped samples. The gels were cured at room temperature overnight followed by 3 ethanol exchanges at 68° C. prior to the supercritical $CO_2$ extraction. The PI aerogel composites were compressed from about 250 micrometers to various thicknesses and pyrolyzed under inert atmosphere for 2 hours at 1050° C. for carbonization to form CPI composites. The % dopant in CPI was calculated to be ~9%, based on the amount of dopant in the formulation and the weight of the composite retained after pyrolysis.

Figure 4:
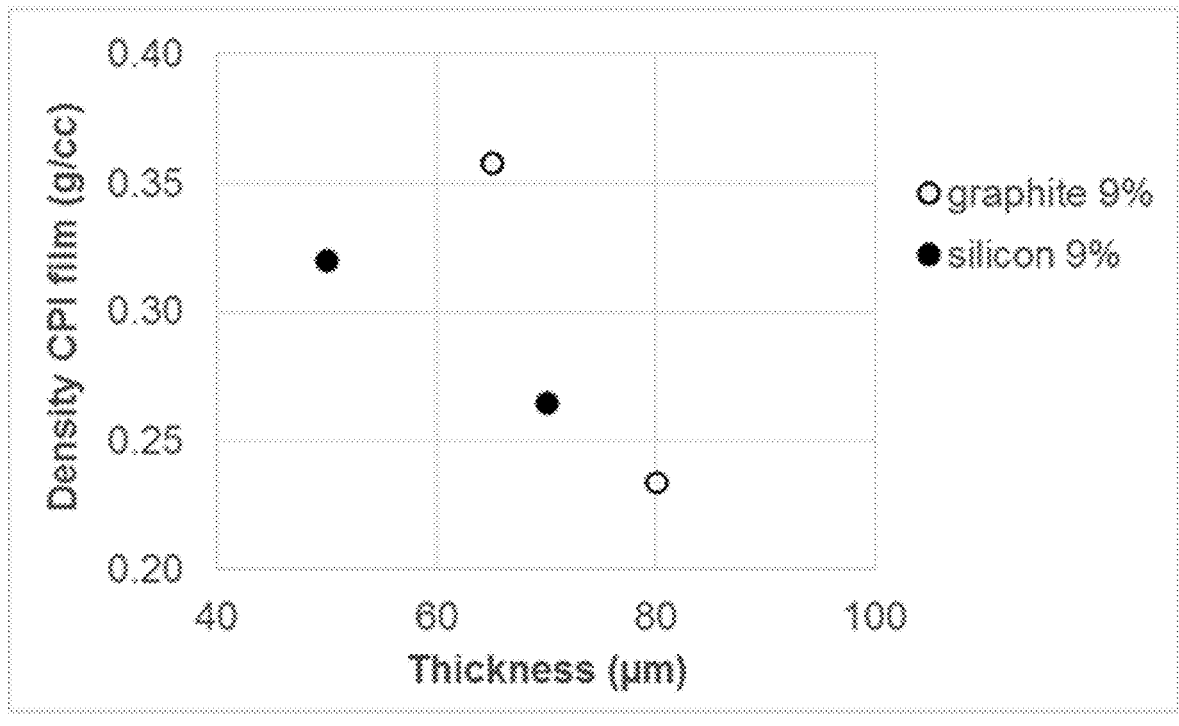
FIG. 4 depicts density of carbonized polyimide (CPI) composites as a function of the compressed thickness (initial thickness of about 250 micrometers).

The density of the compressed CPI composites of ~80-50 micrometer thickness ranged from ~0.24-0.36 g/cc (Table 3 and FIG. 4).

TABLE 3

Properties of low-density CPI composites doped with 9% graphite or Si.

| Dopant | Thickness CPI composite (µm) | Density (g/cc) | Porosity % |
|---|---|---|---|
| Graphite | 80 | 0.234 | 89.4 |
| | 65 | 0.358 | 83.7 |
| Silicon | 70 | 0.265 | 88.0 |
| | 50 | 0.320 | 85.5 |

The porosity was calculated based on the actual density of the CPI composite and the skeletal density. Since the density of amorphous carbon ranges from ~2.0-2.3 g/cc and that of silicon or graphite is ~2.3 g/cc, the skeletal density used in these calculations was ~2.2 g/cc for all composites. High porosities of 84-89% were calculated for these low density composites.

B. CPI with 9% Dopants Dispersed in the Solvent by Mixing

A similar experiment was performed using solutions of 0.10 g/cc polyimide target density. The dopants were mixed in this case with a portion of DMAC for 10 minutes, and added to the mixture prior to catalysis. Teflon spacers of 500-micrometer thickness were used for casting. The molar ratio of Py to PMDA was 2.0. The gelation time was ~2.5 minutes for the graphite-doped samples and ~4.0 minutes for the silicon-doped samples. The gels were extracted using supercritical $CO_2$. The PI aerogel composites were compressed from about 580 micrometers to various thicknesses and pyrolyzed for 2 hours at 1050° C. for carbonization to form CPI composites.

The properties of the CPI composites are shown in Table 4. As expected, the more compressed composites showed slightly lower porosity.

TABLE 4

Properties of high-density CPI composites doped with 9% graphite or Si.

| Dopant | Thickness CPI composite (µm) | Density (g/cc) | Porosity % |
|---|---|---|---|
| Graphite | 100 | 0.674 | 69.4 |
| | 80 | 0.848 | 61.5 |
| | 105 | 0.653 | 70.3 |
| | 90 | 0.800 | 63.6 |
| | 80 | 0.865 | 60.7 |
| | 90 | 0.822 | 62.6 |
| | 80 | 0.875 | 60.2 |
| Silicon | 90 | 0.622 | 71.7 |
| | 100 | 0.653 | 70.3 |
| | 115 | 0.579 | 73.7 |
| | 90 | 0.762 | 65.4 |
| | 105 | 0.622 | 71.7 |
| | 115 | 0.576 | 73.8 |
| | 90 | 0.725 | 67.0 |

Figure 5:
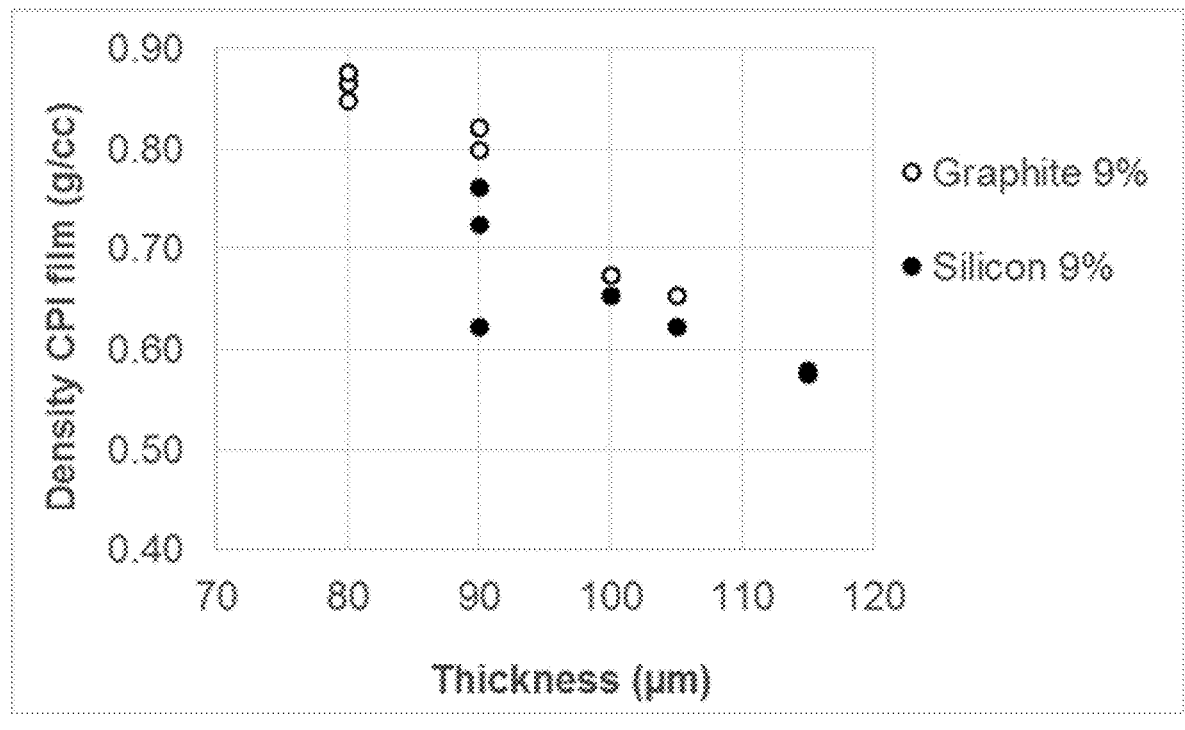
FIG. 5 depicts density of CPI composites as a function of the compressed thickness (initial thickness of about 580 micrometers).

The density of the compressed CPI composites (~115-80 micrometer thickness) ranged from ~0.57-0.87 g/cc. The silicon-doped CPI composites had slightly lower densities compared to the graphite-doped samples (FIG. 5).

The densities and shrinkages of the doped PI aerogel monoliths after pyrolysis are shown in Table 5. The densities of the non-compressed monoliths (LS1 & LG1) were lower compared to those of the compressed composites (LS2 & LG2).

TABLE 5

Density and shrinkage of doped CPI aerogel monoliths.

| ID | Dopant | % Dopant in CPI monolith | Target density (g/cc) | Density CPI monolith (g/cc) | % XY shrink-age | % Z shrink-age |
|---|---|---|---|---|---|---|
| LS1 | Si | 9 | 0.06 | 0.17 | 32.5 | 29.1 |
| LG1 | Graphite | 9 | 0.06 | 0.16 | 32.9 | 30.6 |
| LS2 | Si | 9 | 0.10 | 0.22 | 33.0 | 30.0 |
| LG2 | Graphite | 9 | 0.10 | 0.33 | 35.4 | 34.8 |

Figure 6A:
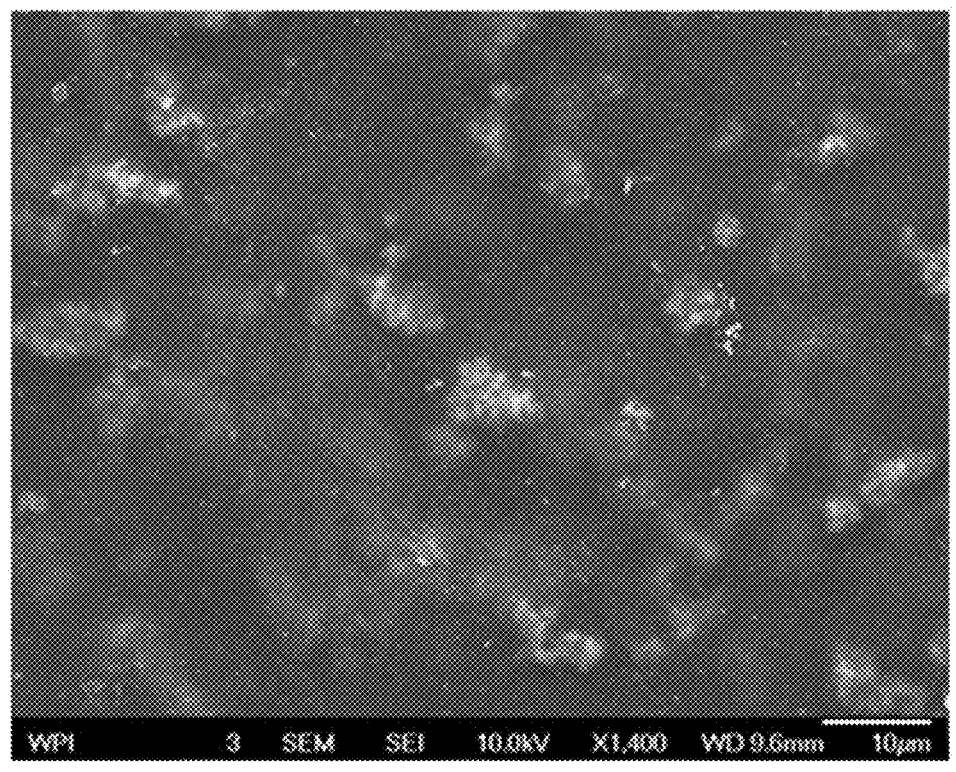
FIG. 6A is a scanning electron microscope (SEM) image of a silicon-doped, non-compressed PI aerogel (LS1)
Figure 6B:
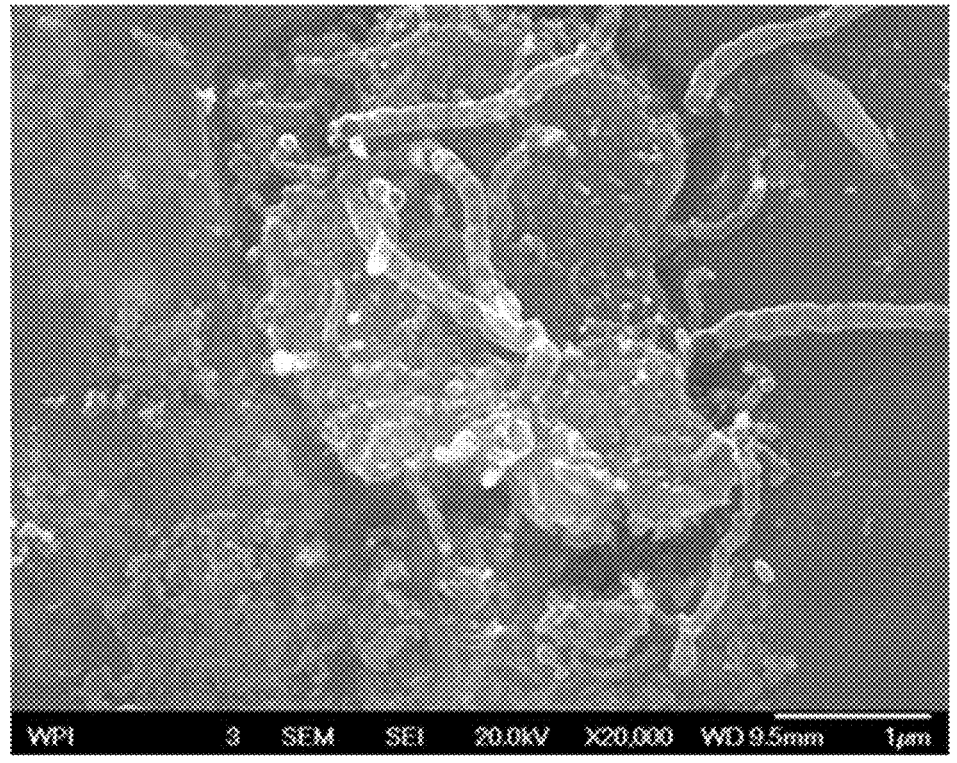
FIG. 6B is an SEM image of a silicon-doped, compressed PI aerogel (LS2).

SEM images of the pyrolyzed composites doped with silicon are shown in FIGS. 6A-6B; note that FIG. 6B shows the fibrillar morphology of the silicon-doped CPI composite.

Figure 7:
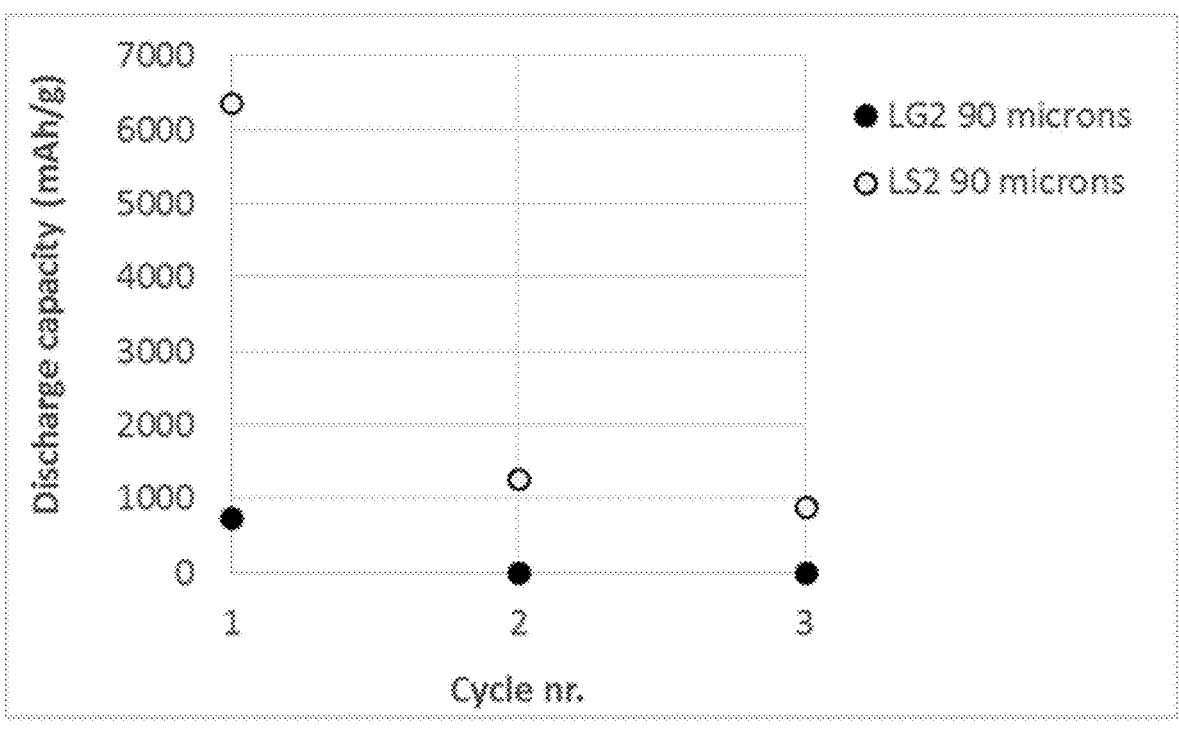
FIG. 7 depicts discharge capacities per dopant (silicon, LS2; graphite; LG2) compressed composites (half-cell battery test, 0.1° C. rate).

Pockets of silicon agglomerates and silicon nanowires were embedded in the carbon matrix. The anode discharge capacities per dopant content from the half-cell battery tests are shown in FIG. 7. The silicon provided a significantly higher initial capacity compared to the graphite dopant. Though initial capacity decreased with cycling, its reversible capacity was still dramatically higher than graphite alone as in conventional anodes. Furthermore, the capacity fading likely is due to the foil electrode used in these half-cell battery tests, such that that electrode was incapable of operating at the high capacity of the silicon-containing electrode.

Example 2: CPI Composites of High PI Solid Contents and High Level of Silicon Doping

A. CPI Doped with 27% Silicon Dispersed by Sonication in Solvent

Polyimide gels were prepared using 0.10 g/cc target density. The PMDA and PDA precursors were mixed at room temperature for 3 hours. Separately, silicon powder of 30 nm particle size was sonicated for 20 seconds in DMAC solvent, and added to the mixture at 15.0% per total solids and stirred for 15 minutes. AA was added to the doped mixture at 4.3 molar ratio to PMDA and mixed for 2 hours. Pyridine was used to catalyze the mixture at 2.0 molar ratio to PMDA. Composites were cast between glass plates using 500-micrometer thick Teflon spacers. Monoliths of 2-inch diameter were also cast in Teflon containers. The gelation time at ambient temperature was ~3.5 minutes. The gels were cured at room temperature overnight followed by three (3) ethanol exchanges at 68° C. prior to the supercritical $CO_2$ extraction. The PI aerogel composites were compressed, and pyrolyzed for 2 hours at 1050° C. for carbonization to form CPI composites.

B. CPI Doped with 46% and 64% Silicon Dispersed by Sonication in Solvent

Polyimide gels were prepared at 0.08 g/cc target density. PMDA and PDA precursors were mixed at room temperature for 4 hours. Then AA was added and mixed with the solution for 2 hours. Separately, silicon powder of 30 nm particle size was sonicated for 1 minute in DMAC solvent, and added to the mixture 5 minutes prior to the addition of pyridine catalyst. Silicon was added at ~29.7% and ~49.6% per total solids. The doped mixture was catalyzed using 3.2 molar ratio of Py to PMDA. Composites were cast using spacers of 500-micrometer thickness. The gelation time at ambient temperature was ~6.5 minutes. After processing and extraction, the PI aerogel composites were compressed and pyrolyzed for 2 hours at 1050° C. for carbonization to form CPI composites.

Figure 8:
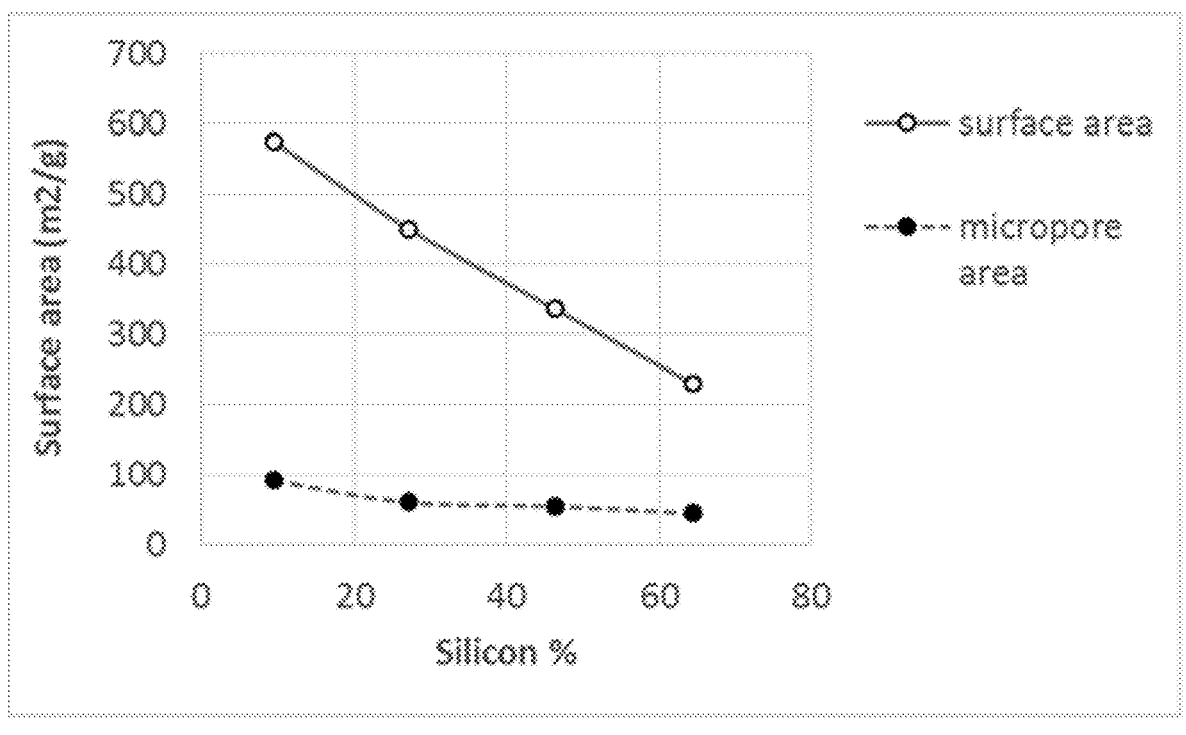
FIG. 8 depicts surface area and micropore area function of the silicon content in CPI monoliths.

A comparison of the surface area and porosimetry of the pyrolyzed, non-compressed monoliths doped with different amounts of silicon is given in Table 6 and FIG. 8. The surface area, micropore area, and the pore volume decreased with increasing silicon content in the CPI.

TABLE 6

Density and porosimetry of CPI monoliths doped with different Si amounts. In addition, pore volume can be seen to be at least about 1.5 cc/g.

| Td PI (g/cc) | Density CPI monolith (g/cc) | % Si per CPI | Surface Area (m²/g) | Micropore Area (m²/g) | Pore volume (cm³/g) |
|---|---|---|---|---|---|
| 0.10 | 0.221 | 9 | 574.7 | 91.8 | 3.6 |
| 0.10 | 0.339 | 27 | 450.9 | 61.5 | 2.4 |
| 0.08 | 0.295 | 46 | 336.2 | 55.7 | 2.3 |
| 0.08 | 0.270 | 64 | 230.9 | 46.0 | 1.5 |

Figure 9:
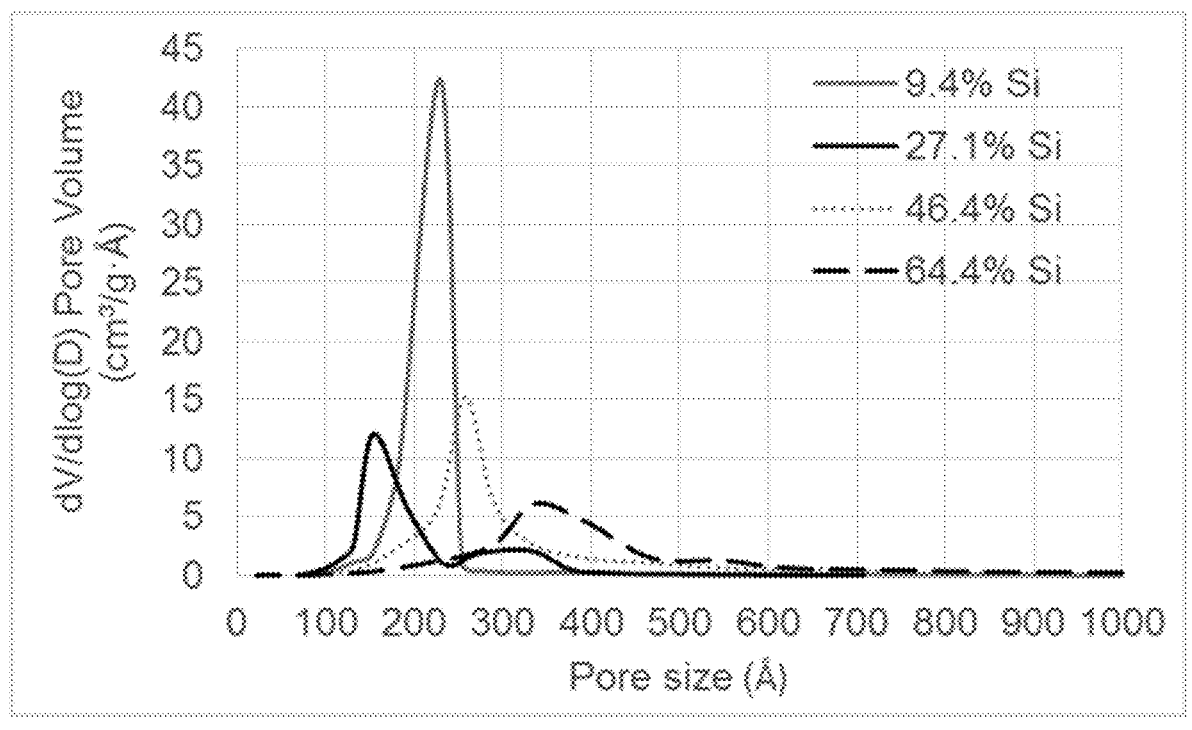
FIG. 9 depicts pore size distribution of Si-doped CPI monoliths.

Pore size distribution at maximum peak depended on the silicon content and the way the silicon was dispersed (FIG. 9). Generally, by increasing the silicon content, the pore size at max peak from distribution shifted to larger size. A shift of the main peak at maximum size distribution was observed from ~23 nm to ~26 nm to ~34 nm with increasing Si content from ~9% to ~46% to ~64%, respectively. The basal pore size distribution was broader with increasing silicon content as well.

However, comparing the Td 0.10 g/cc samples, the 27% Si monolith prepared by adding the silicon prior to AA and long mixing with solution showed a shift of the main peak to ~15 nm pore size vs. ~23 nm for the 9% Si monolith prepared by short Si mixing with solution. The sample doped with 27% Si content showed a bimodal pore size distribution, with another small broad band centered around 30 nm. This could be due to incomplete dispersion of silicon in a high target density, high viscosity mixture. This was also the case for the higher silicon content (64%) sample in this series, which also showed a bimodal pore size distribution.

The compressed, pyrolyzed composites had higher density, lower surface area, and pore volume compared to their non-compressed monolith counterparts (Table 7). The density was calculated as average of six (6) samples.

TABLE 7

Density and porosimetry of CPI compressed composites with variable Si doping. In addition, pore volume can be seen to be at least about 0.3 cc/g.

| % Si per CPI | Density (g/cc) | Surface area (m²/g) | Micropore area (m²/g) | Pore volume (cm³/g) |
|---|---|---|---|---|
| 9 | 0.648 | 255 | 62 | 0.47 |
| 27 | 0.860 | 137 | 38 | 0.35 |
| 46 | 0.733 | 147 | 40 | 0.43 |
| 64 | 0.755 | 126 | 34 | 0.53 |

Half-cell units (2032-coin cells) were built with the CPI composites as the electrode, lithium foil as the counter electrode, and CELGARD 2500 as the microporous separator between the electrodes. The electrolyte was 1.0M LiPF6 in EC: EMC (3:7) by weight. All the cells were tested with an ARBIN BT2043 tester and a charge/discharge rate of 0.1C, unless otherwise stated. The discharge capacities of the compressed CPI composites at the 5th cycle are given in Table 8.

TABLE 8

| | % Si in CPI | Thick- ness (µm) | Density (g/cc) | Capacity per Si Cycle 5 (mAh/g) | Capacity per electrode Cycle 5 (mAh/g) | Silicon Utilization Cycle 5 |
|---|---|---|---|---|---|---|
| ID | | | | | | |
| LS2 | 9 | 90 | 0.622 | 833 | — | 19.83% |
| S27 | 27 | 100 | 0.845 | 3085 | 836 | 73.45% |
| S46 | 46 | 90 | 0.751 | 2802 | 1300 | 66.71% |
| S64 | 64 | 143 | 0.775 | 856 | 551 | 20.38% |

Discharge capacities of Si doped compressed CPI composites (half-cell battery test).

Figure 10:
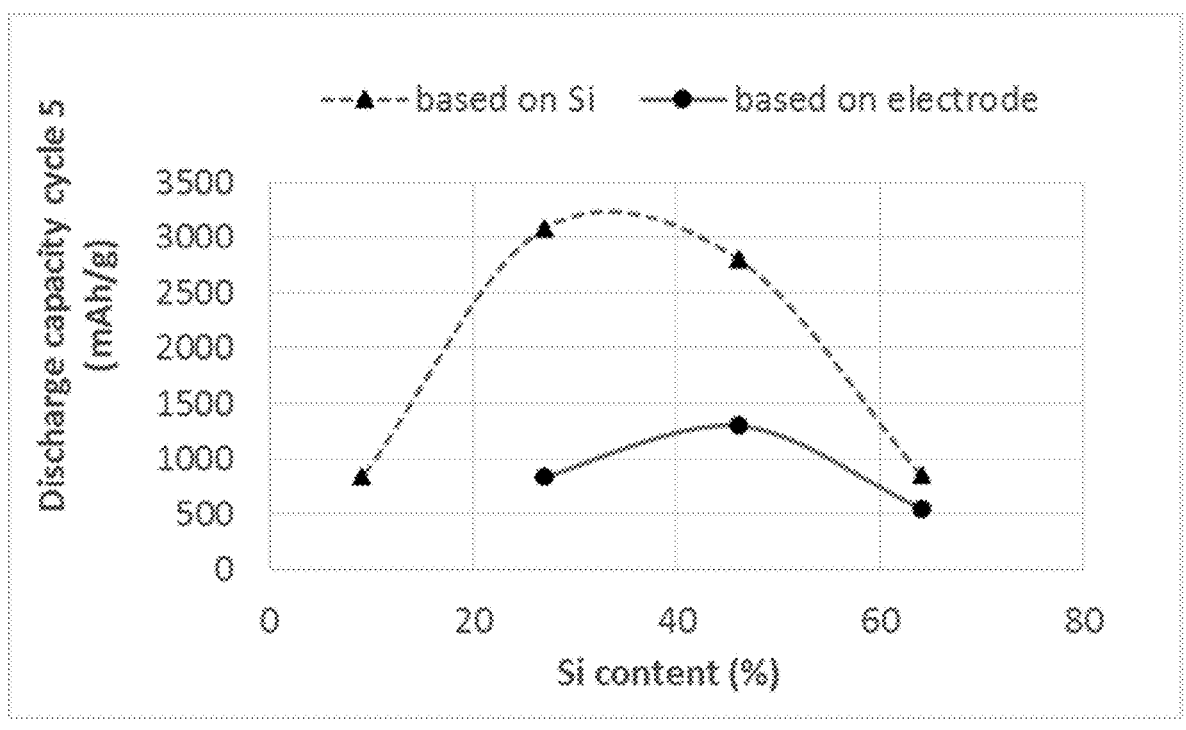
FIG. 10 depicts discharge capacities of CPI composites as a function of the Si content, at cycle 5.

The optimum performance for these samples was obtained at a Si content of 30-50% per CPI, as shown in FIG. 10.

Figure 11A:
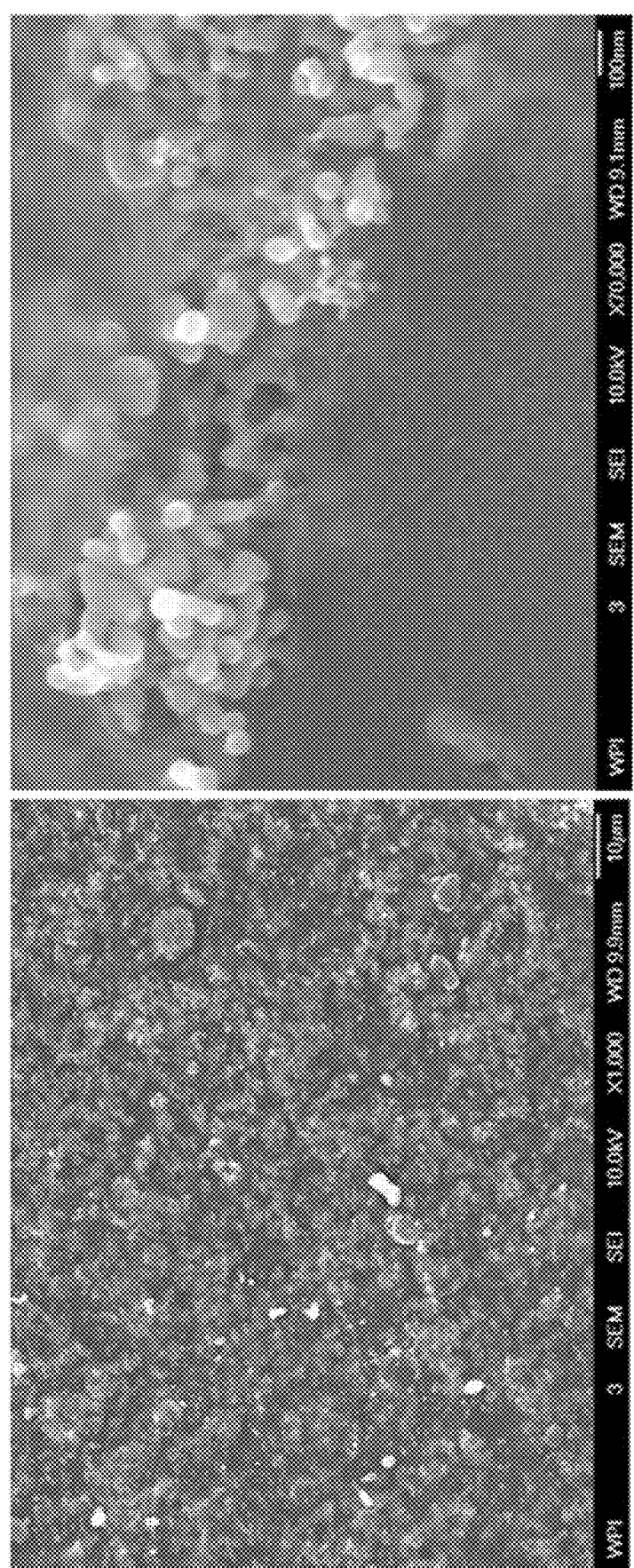
FIG. 11A is an SEM image of a CPI composite with Si loading of 27% Si in the composite.
Figure 11B:
FIG. 11B is an SEM image of a CPI composite with Si loading of 46% Si in the composite.
Figure 11C:
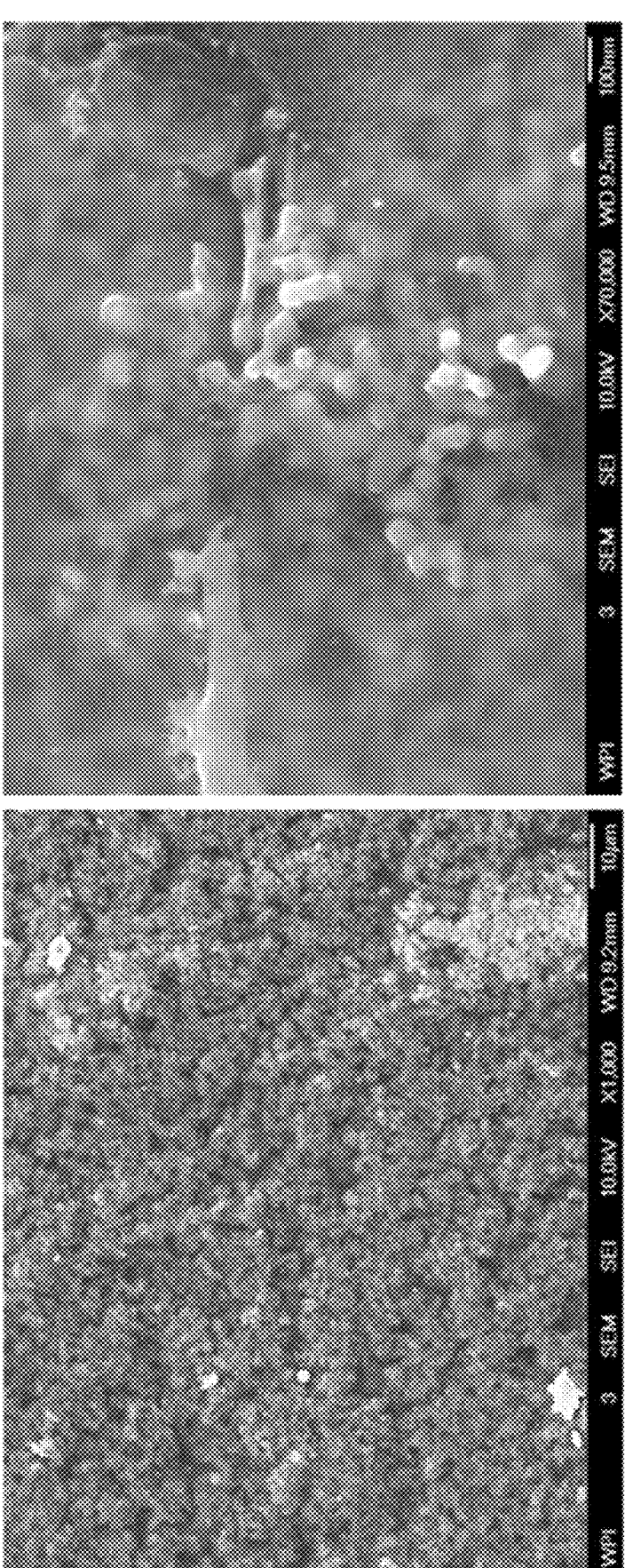
FIG. 11C is an SEM image of a CPI composite with Si loading of 64% Si in the composite.
Figure 12A:
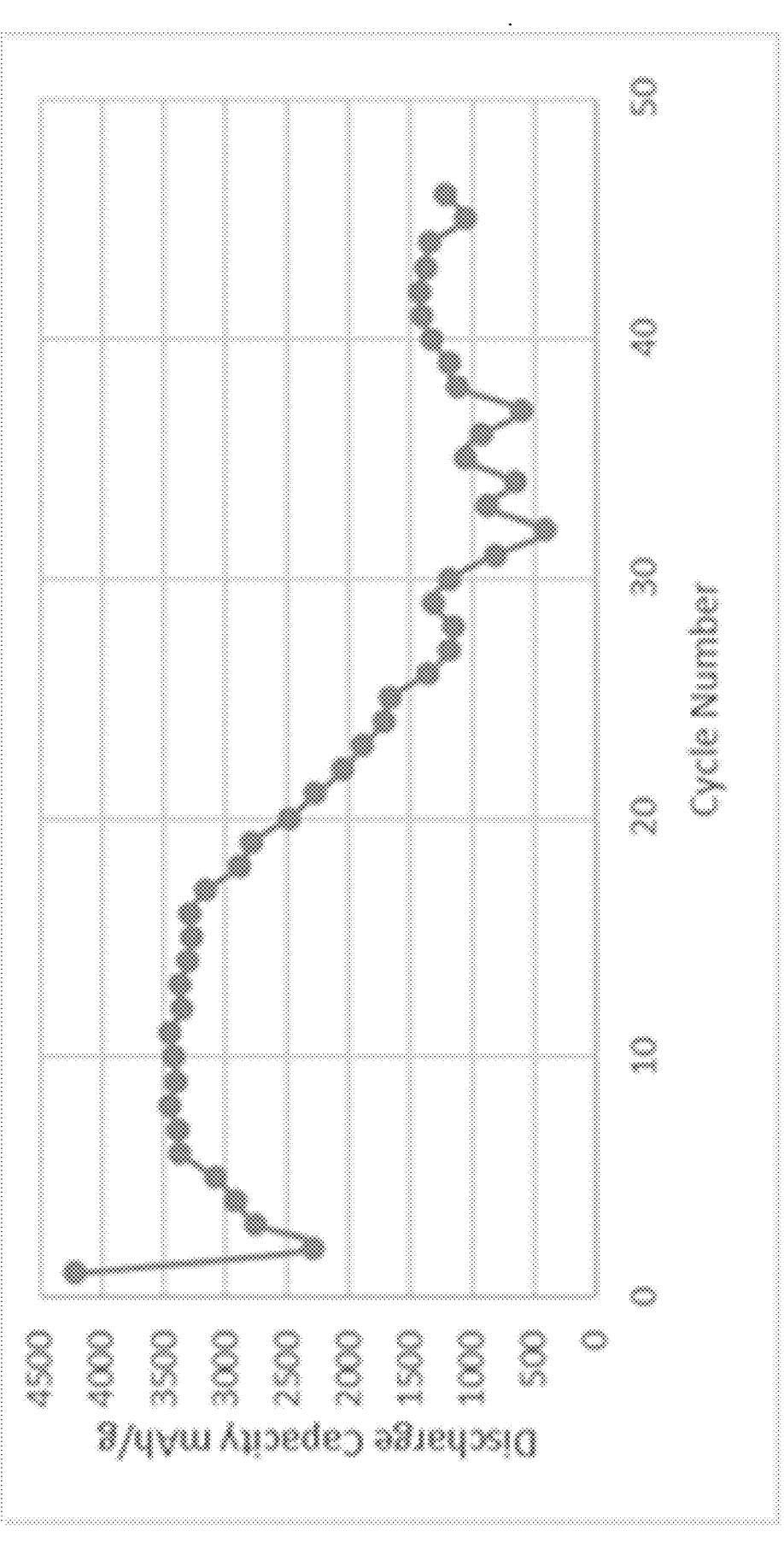
FIG. 12A depicts cycling capacities based on 27% Si content (S27).
Figure 12B:
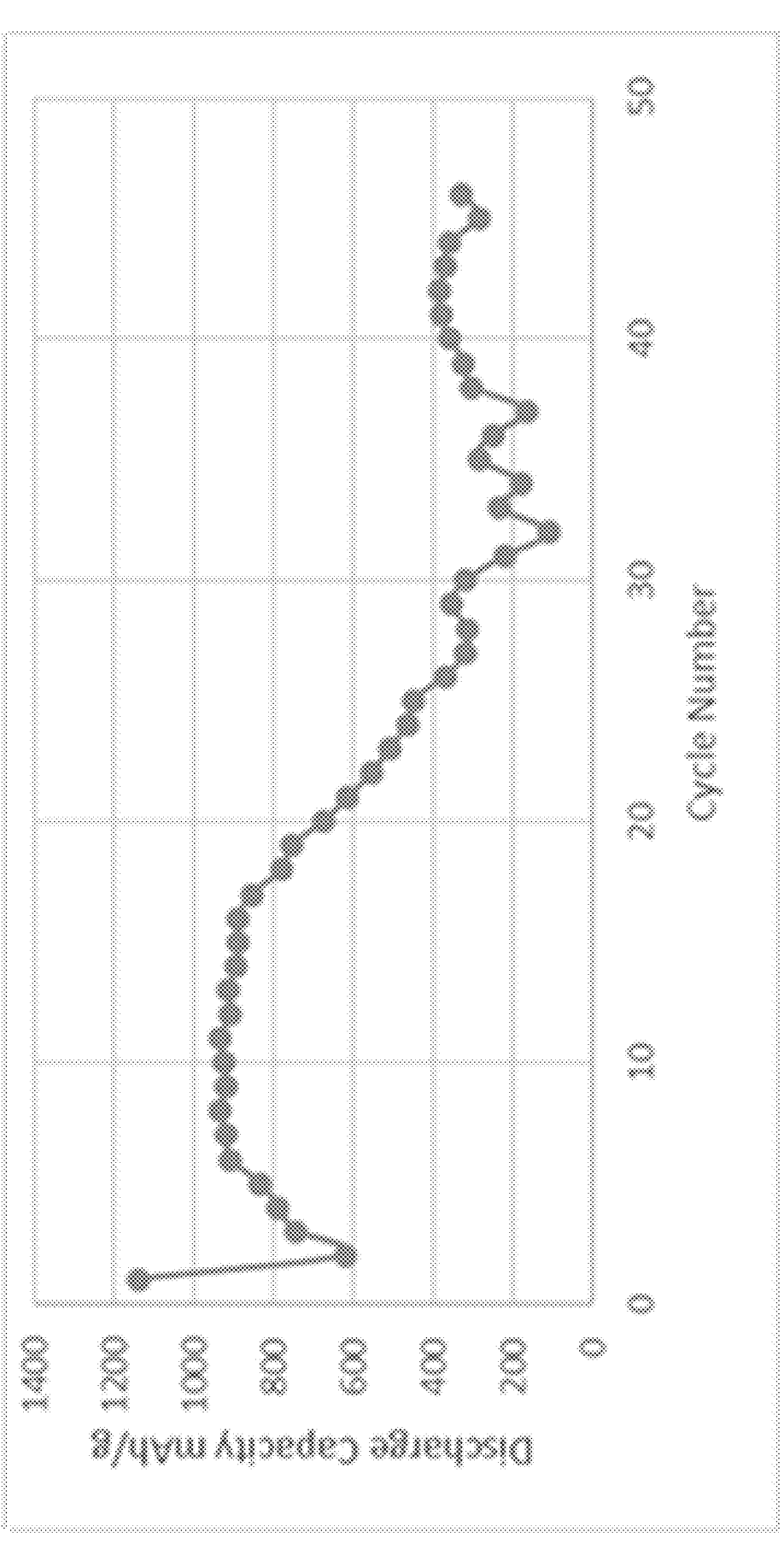
FIG. 12B depicts cycling capacities based on the electrode, as compared to FIG. 12A.
Figure 12C:
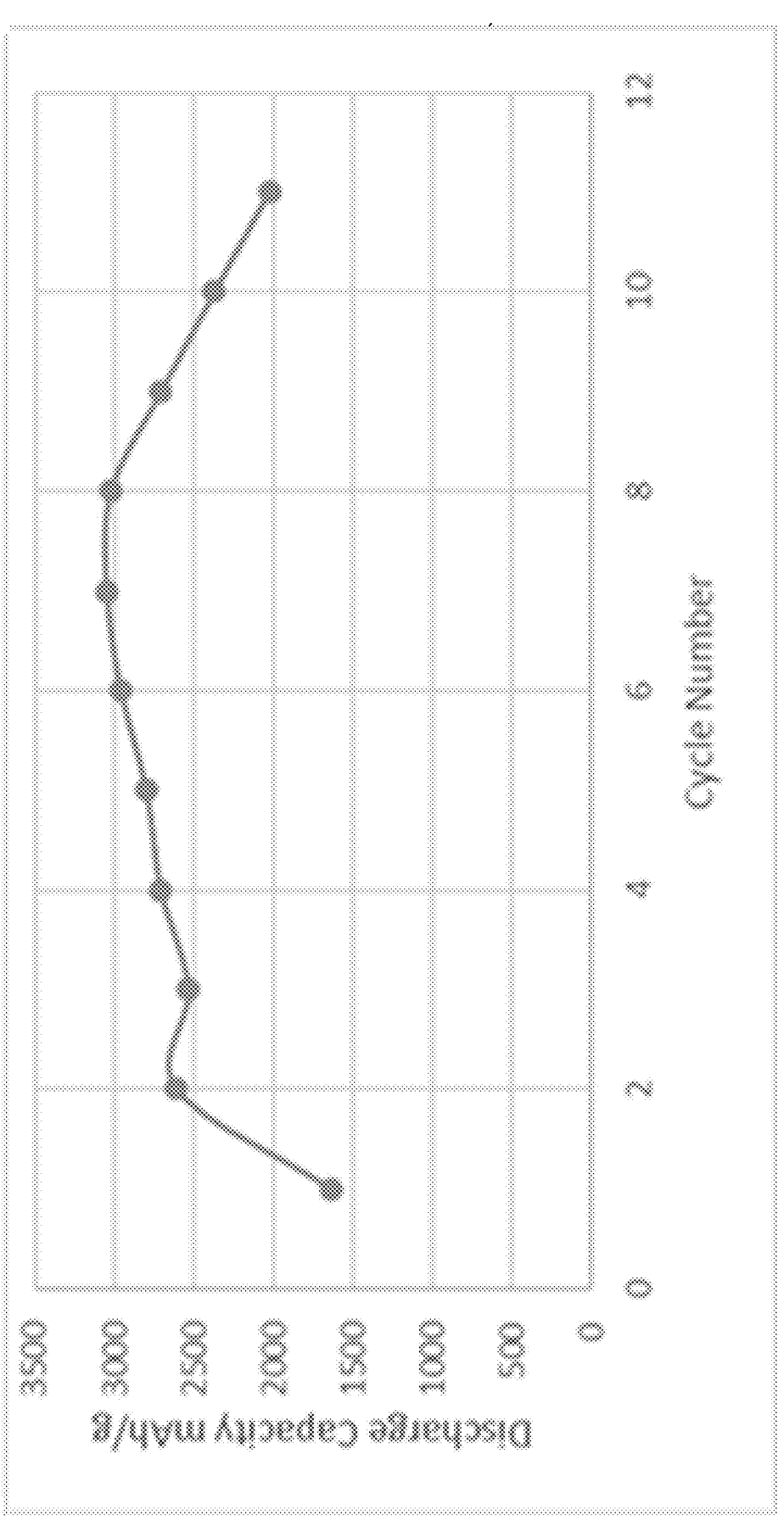
FIG. 12C depicts cycling capacities based on 46% Si content (S46).
Figure 12D:
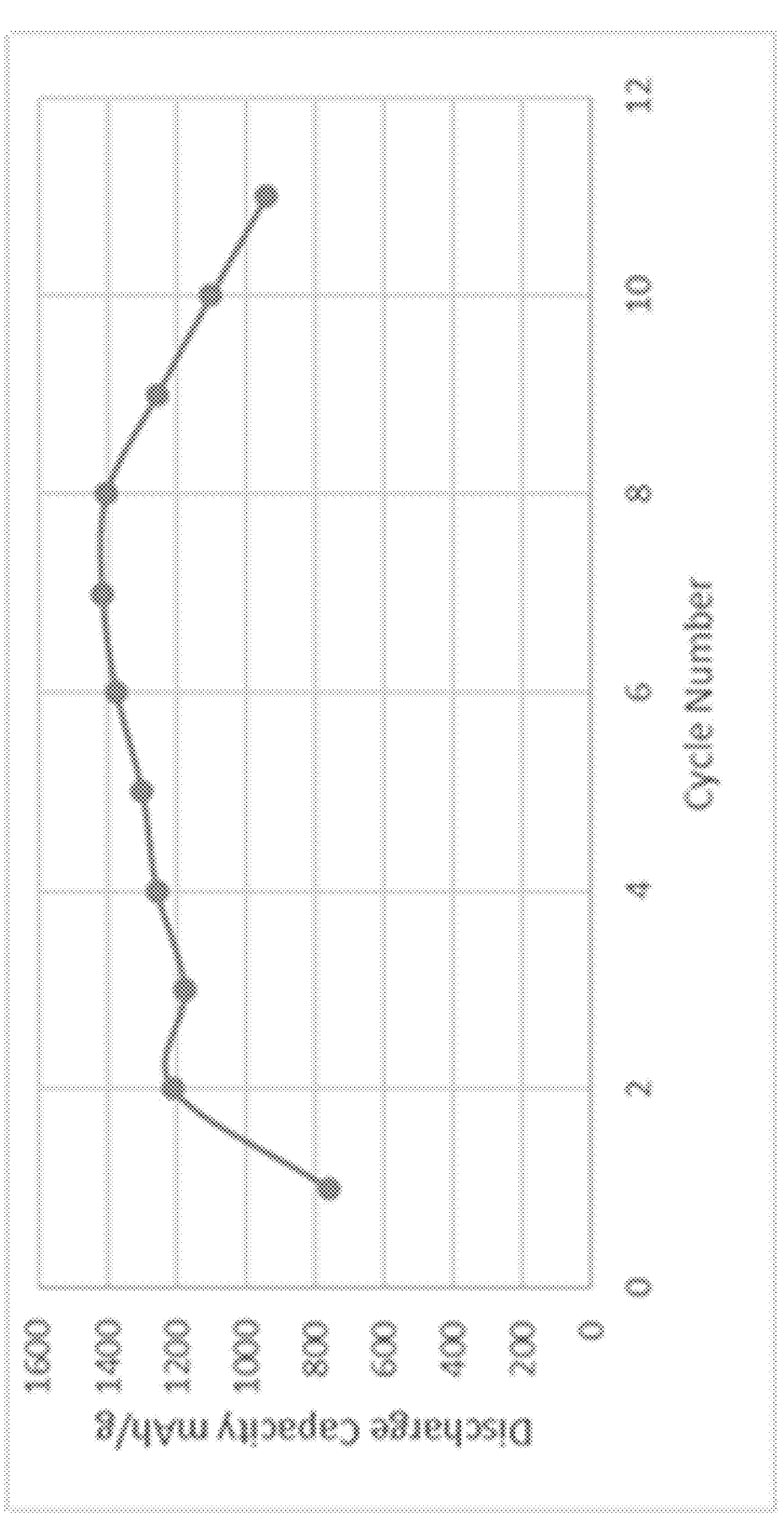
FIG. 12D depicts cycling capacities based on the electrode, as compared to FIG. 12C.
Figure 12E:
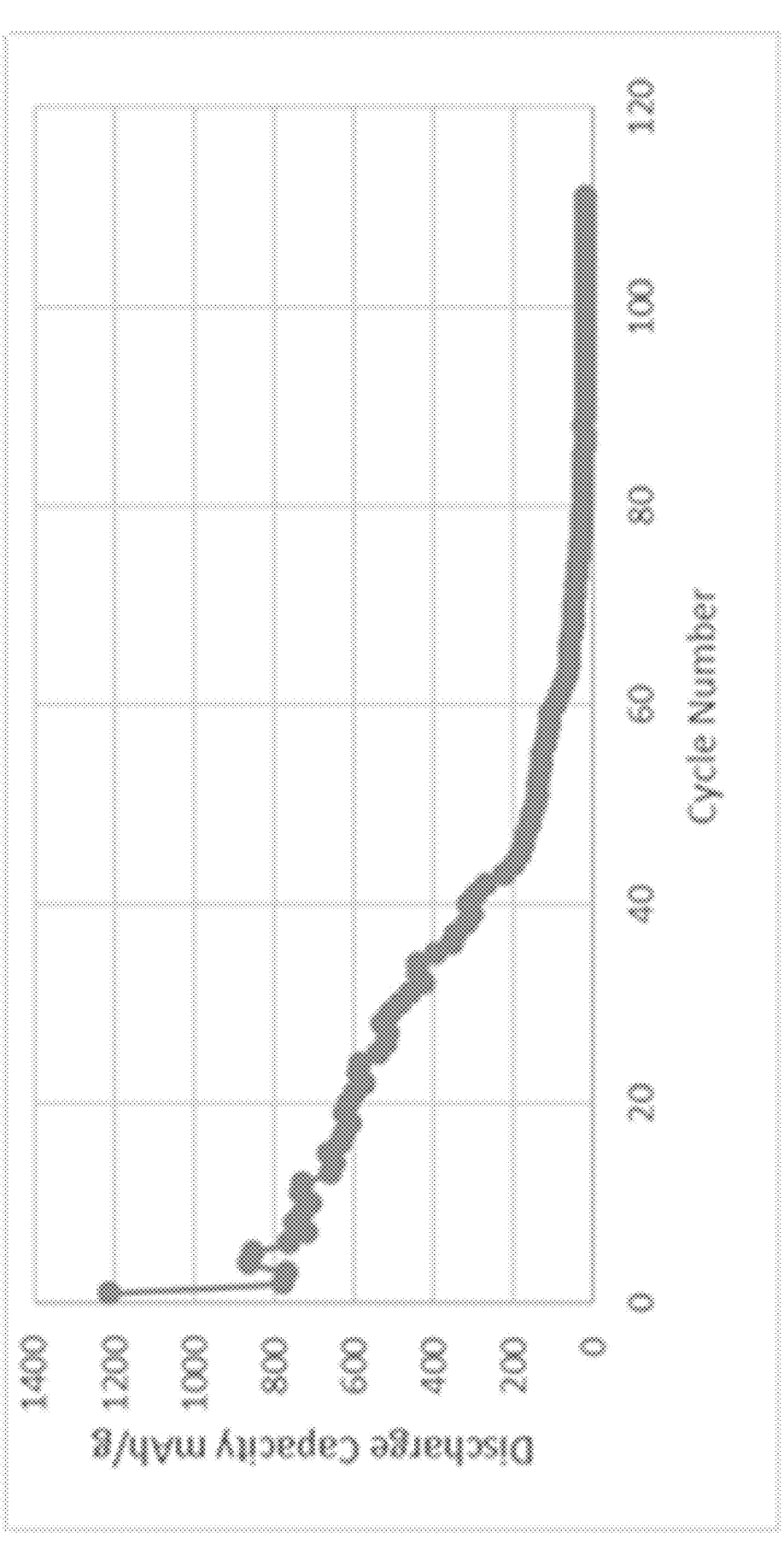
FIG. 12E depicts cycling capacities based on 64% Si content (S64).
Figure 12F:
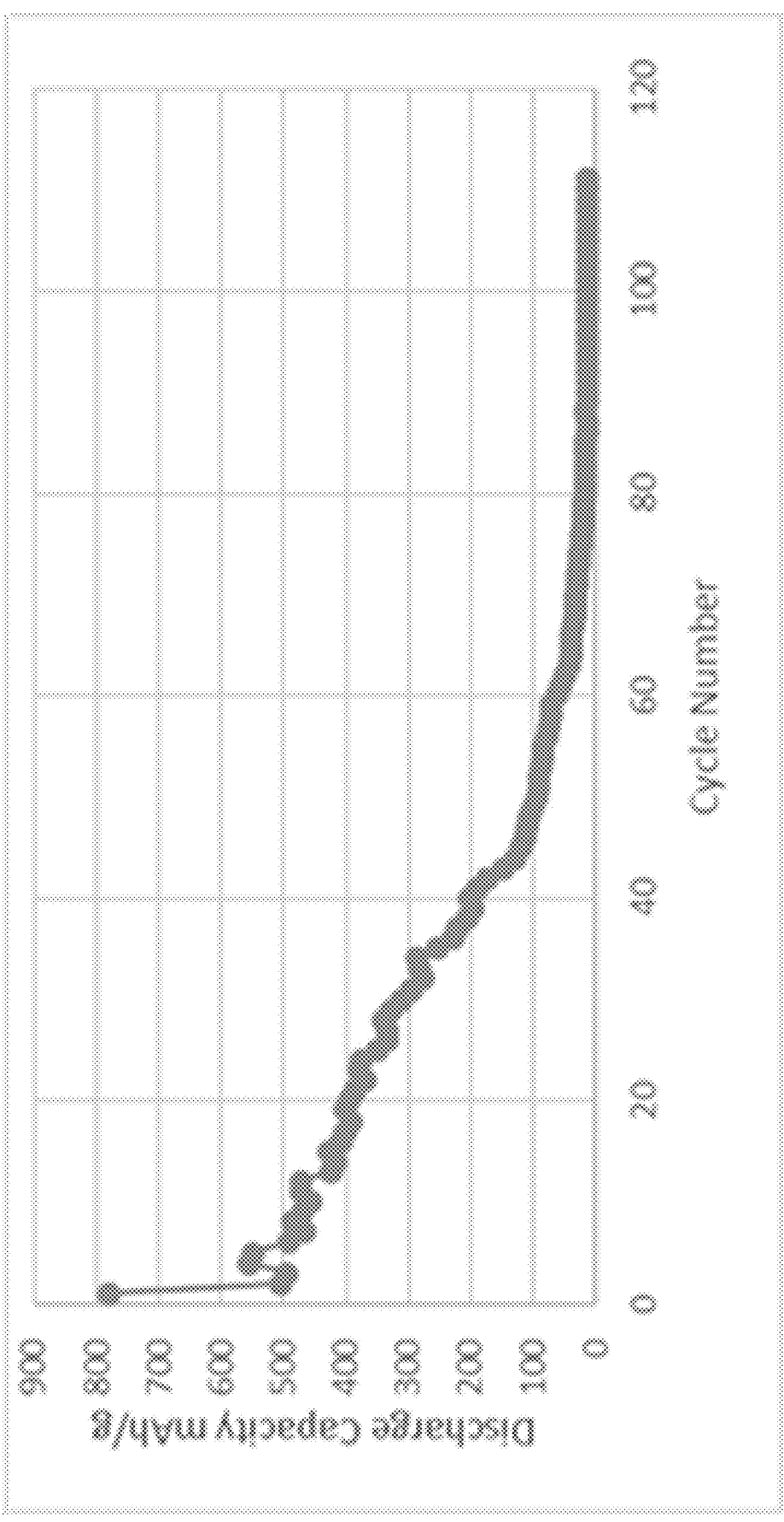
FIG. 12F depicts cycling capacities based on the electrode, as compared to FIG. 12E.
Figure 13A:
FIG. 13A is SEM images of CPI composites with a thickness of about 337 micrometers.

SEM images of the composites doped with high Si content are given in FIGS. 11A-11C, which also show the fibrillar morphology of the composites. The silicon (lighter areas) is more compacted in the samples with higher doping levels. Si nanowires can be observed in all samples at high magnification. As can be seen, there is direct contact and interpenetration of the silicon with the carbon porous structure (darker areas).

The cycling capacities based on the Si and electrode content are shown in FIGS. 12A-12F with the raw data seen in Table 9. Increasing the Si loading of the CPI composites resulted faster decreases of capacity with cycling. With that said, the capacity fading likely is due to the foil electrode used in these half-cell battery tests, such that that electrode was incapable of operating at the high capacity of the silicon-containing electrode.

TABLE 9

Data comparing discharge capacities of silicon (at different concentrations) and the overall electrode.

| Sample | Cycle | Discharge capacity based on Si (mAh/g) | Discharge capacity based on electrode (mAh/g) | Silicon Utilization |
|---|---|---|---|---|
| S27 | 2 | 2296.67 | 622.40 | 54.96% |
| | 10 | 3414.54 | 925.34 | 81.30% |
| | 25 | 1669.11 | 452.33 | 39.74% |
| | 50 | 838.88 | 243.60 | 21.40% |
| S46 | 2 | 2610.44 | 1211.24 | 62.15% |
| | 10 | 2371.09 | 1100.19 | 56.45% |
| | 25 | 876.95 | 406.91 | 20.88% |
| | 50 | 46.36 | 21.51 | 1.10% |
| S64 | 2 | 782.22 | 503.75 | 18.62% |
| | 10 | 710.71 | 457.70 | 16.92% |
| | 25 | 541.96 | 349.02 | 12.90% |
| | 50 | 146.08 | 94.07 | 3.48% |

As can be seen in Table 9, silicon utilization can be calculated to be between about 20% and about 90%, depending on amount of silicon incorporated into the electrode, or even more optimally between about 50% and about 90%. A narrower range is contemplated herein as well, based on benefits needed of the final composite (e.g., amount of silicon desired). In total, this broader range is significantly higher than that seen in the conventional art. In addition, capacity at cycle 10 can be seen to vary based on concentration of silicon, though beneficially can be around 800 mAh/g or more.

Example 3: Silicon Doped CPI Composites of Low PI Solid Contents

A. CPI Doped with 66% Silicon Dispersed in Solvent by Sonication

Polyimide gels were prepared at 0.05 g/cc target density. The PMDA and PDA precursors were mixed at room temperature for 3 hours. Then AA was added and mixed with the solution for 2 hours. Separately, silicon powder of ~30-nm particle size was sonicated for 2 minutes in DMAC solvent, and added to the mixture 30 minutes prior to the addition of pyridine catalyst. Silicon was added at ~60.5% per total solids. Py/PMDA molar ratio was 7.5. The gelation time at ambient temperature was ~5.5 minutes. Composites were cast using spacers of 500-micrometer thickness. After processing and extraction, the PI aerogel composites were compressed and pyrolyzed for 2 hours at 1050° C. for carbonization to form CPI composites. The Si content per CPI was 66%.

Figure 16A:
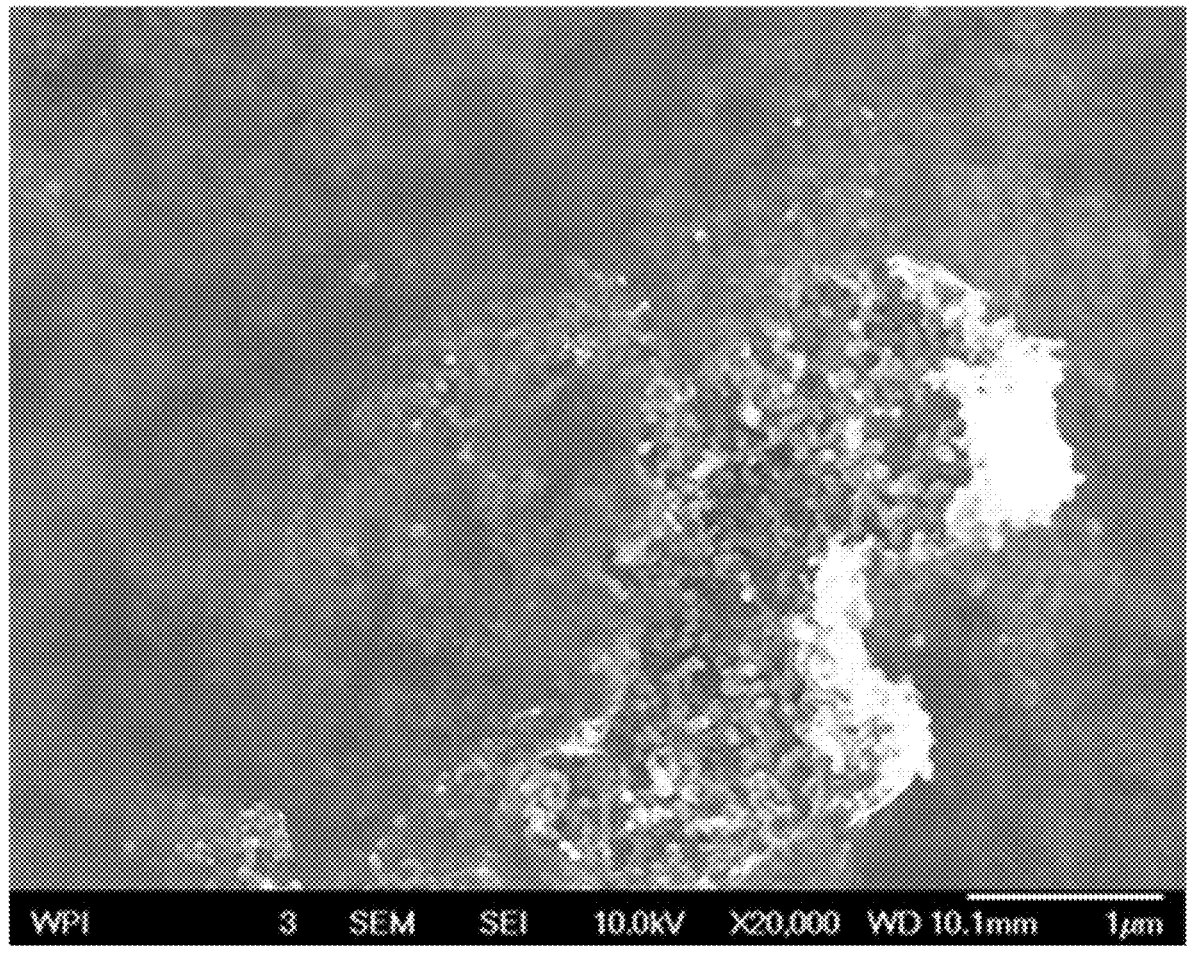
FIG. 16A is an SEM image of a CPI composite prepared without dispersing agent (C45-control).
Figure 16B:
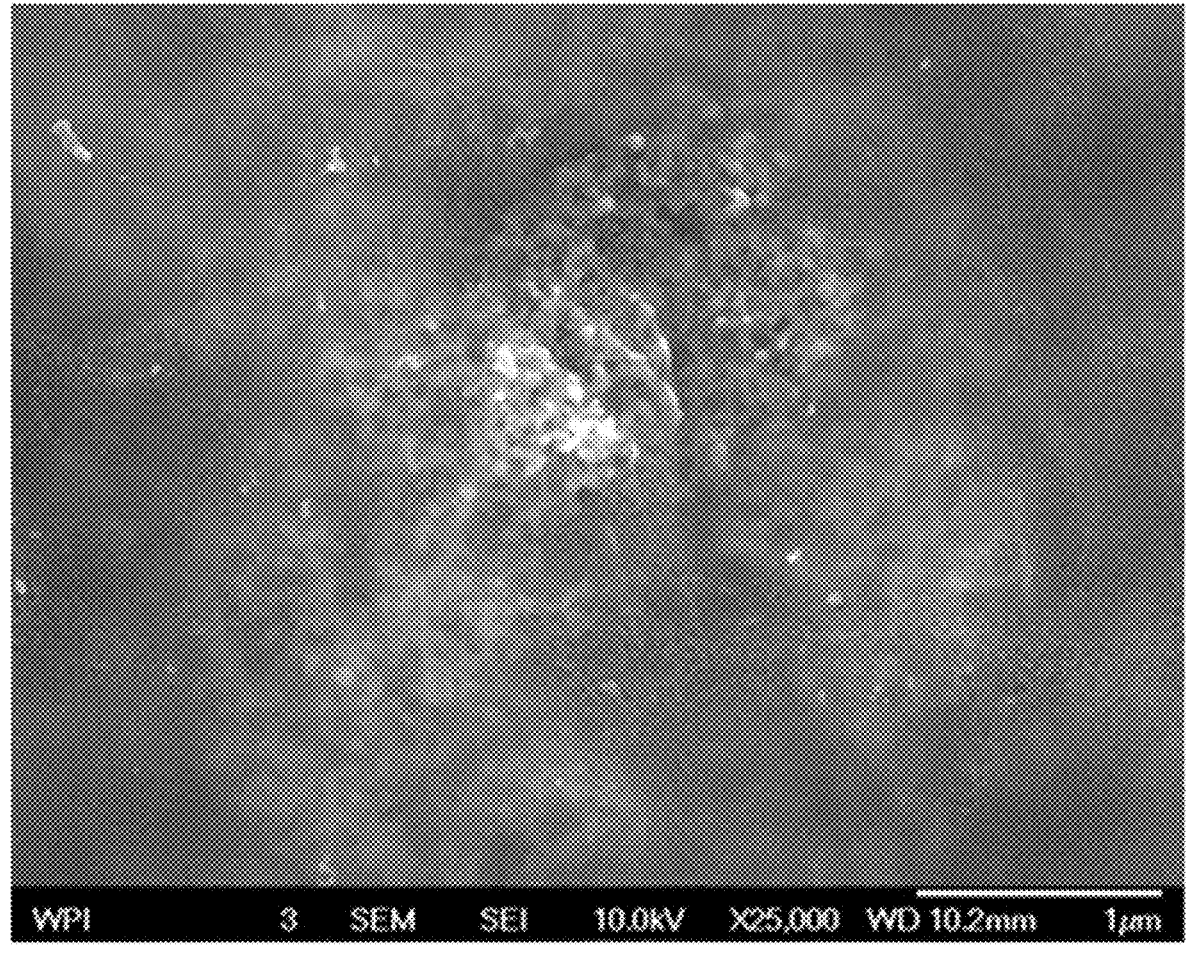
FIG. 16B is an SEM image of a CPI composite prepared with BYK 384 dispersing agent (B45).

CPI composites compressed to different thicknesses were examined by SEM, as shown in FIGS. 16A-16B, which depict the fibrillar morphology of the CPI composites. No silicon nanowires were observed in these images. The properties of the less compressed (LC) and more compressed (MC) composites tested in half-cell batteries are shown in Table 10.

TABLE 10

Properties of CPI composites doped with 66% Si.

| ID | Thickness (µm) | Density (g/cc) | Weight (g) | Length (diameter) (cm) | Width (cm) |
|---|---|---|---|---|---|
| LC | 323 | 0.366 | 0.0202 | 1.340 | 1.275 |
| MC | 170 | 0.628 | 0.0194 | 1.431 | 1.269 |

Figure 14A:
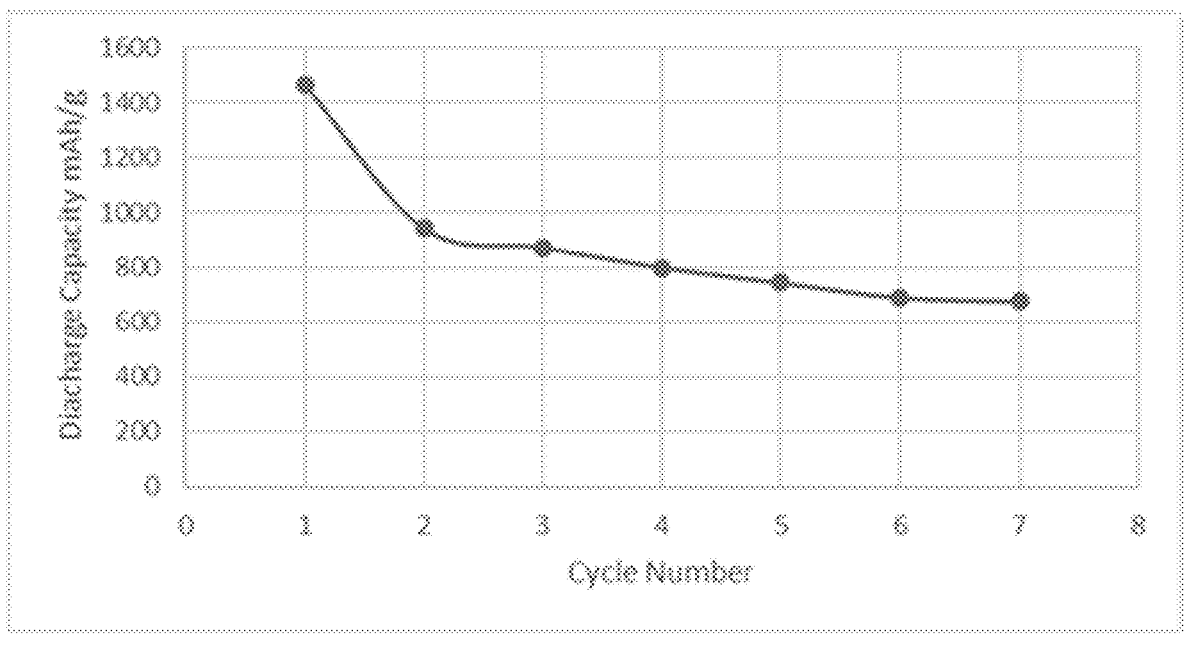
FIG. 14A depicts discharge capacity based on electrode weight (thickness of about 323 μm).
Figure 14B:
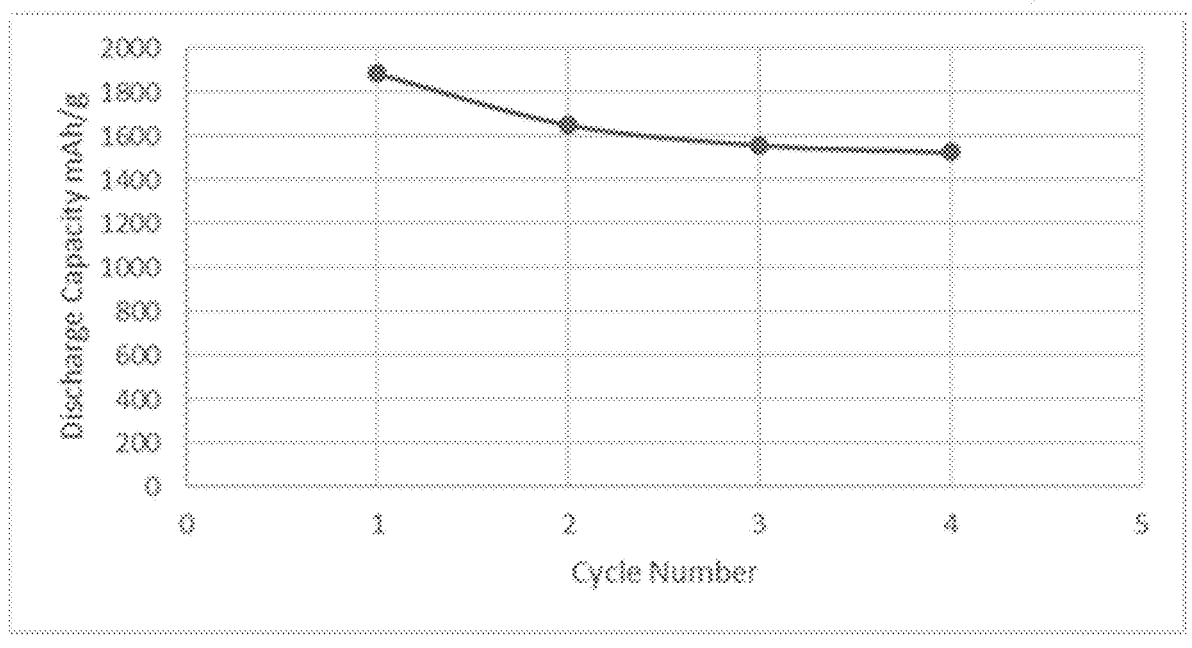
FIG. 14B depicts discharge capacity based on electrode weight (thickness of about 170 μm).

FIGS. 14A-14B show that thickness played a role on the performance of the anode. By reducing the thickness by about half, the electrode capacity essentially doubled, and the 170-micrometer thick electrode showed a discharge capacity of over 1500 mAh/g after the 4th cycle. Though these high capacity CPI composites loaded with high amounts of silicon (66%) were not stable over multiple cycles, the capacity fading likely is due to the foil electrode used in these half-cell battery tests, such that that electrode was incapable of operating at the high capacity of the silicon-containing electrode.

B. CPI Doped with 45% Silicon Dispersed by Mixing in Solvent with and without Dispersing Agents Polyimide gels were prepared at 0.05 g/cc target density. The PMDA and PDA precursors were mixed at room temperature for 17 hours. Then AA was added and mixed with the solution for 3 hours. Separately, silicon powder of 30 nm particle size was mixed for 20 hours in DMAC solvent with or without dispersing agents. The control C45 sample was prepared in the absence of dispersing agents. BYK 384 was used as dispersing agent in sample B45 at 20% weight per weight of Si. Pluronic F87 was used as nonionic surfactant in sample P45 at 20% weight per weight of Si. The dispersions were added to the mixture 30 minutes prior to the addition of pyridine catalyst. Silicon was added at 27.3% per total solids. Py/PMDA molar ratio was 7.0. The gelation time at ambient temperature was about 11 minutes. Composites were cast using spacers of 500-micrometer thickness. After processing and extraction, the PI aerogel composites were compressed, and pyrolyzed for 2 hours at 1050° C. for carbonization to form CPI composites. The Si content per CPI was about 45%.

Figure 15A:
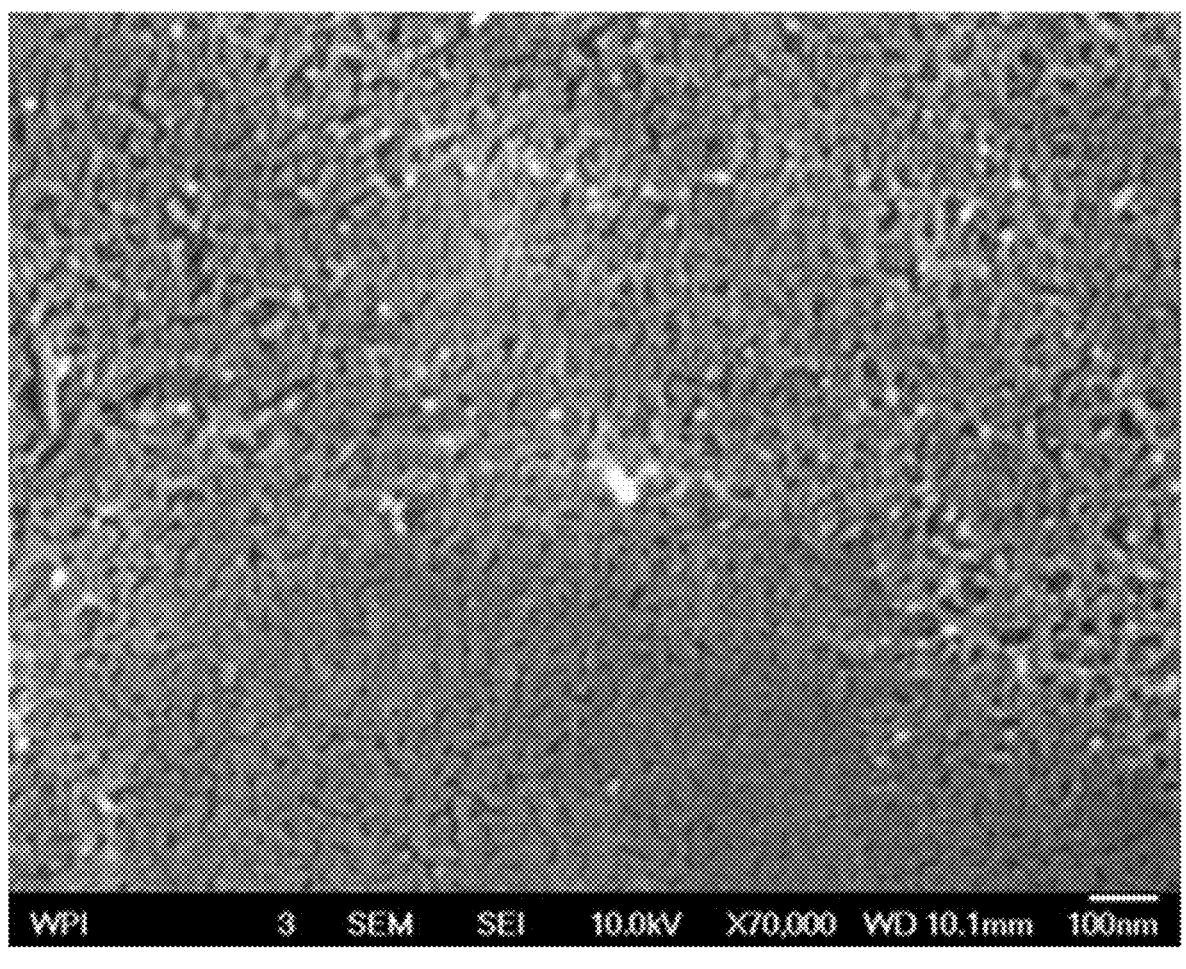
FIG. 15A is a pre-pyrolysis SEM image of a CPI composite prepared without dispersing agent (C45).
Figure 15B:
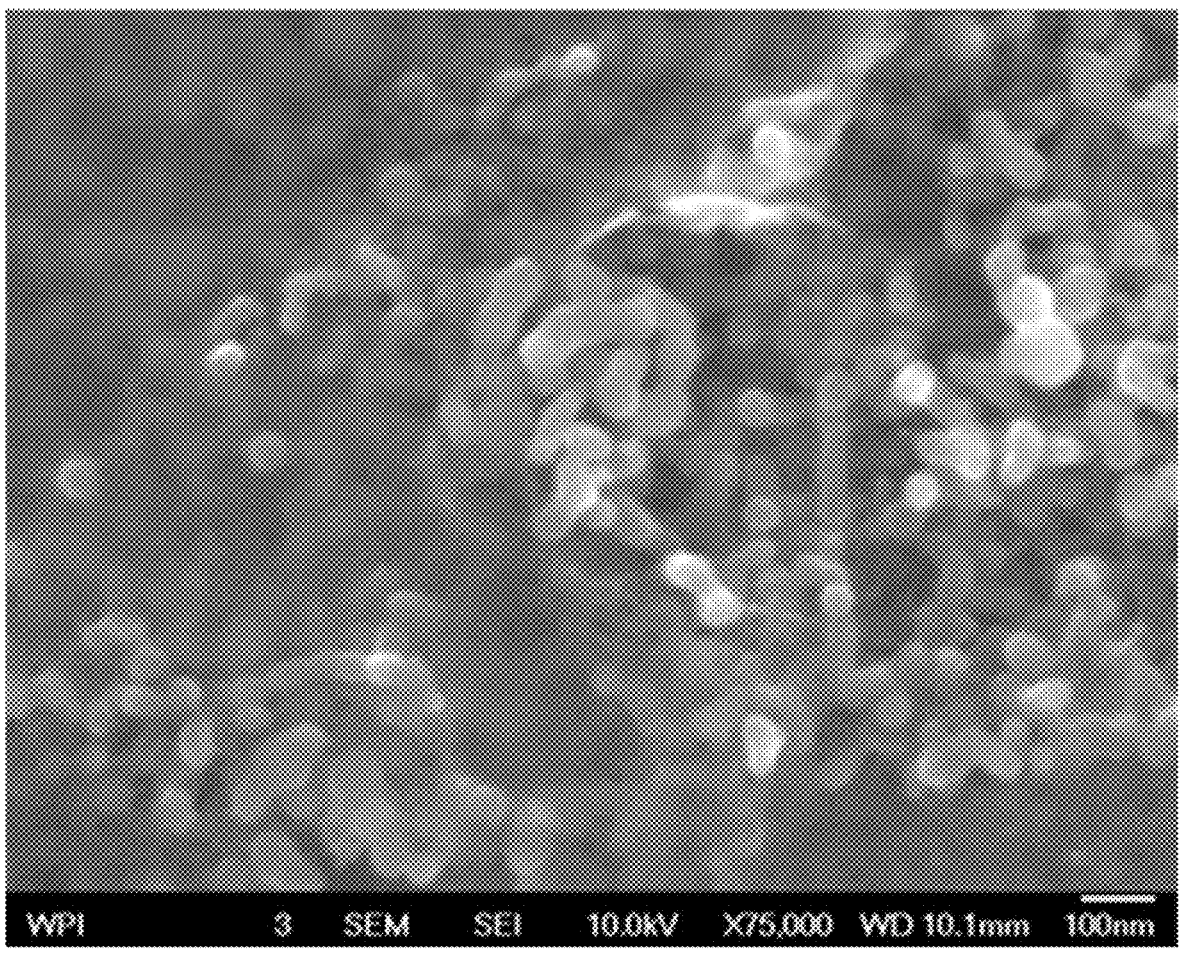
FIG. 15B is an SEM image of the composite of FIG. 15A after pyrolysis.
Figure 16C:
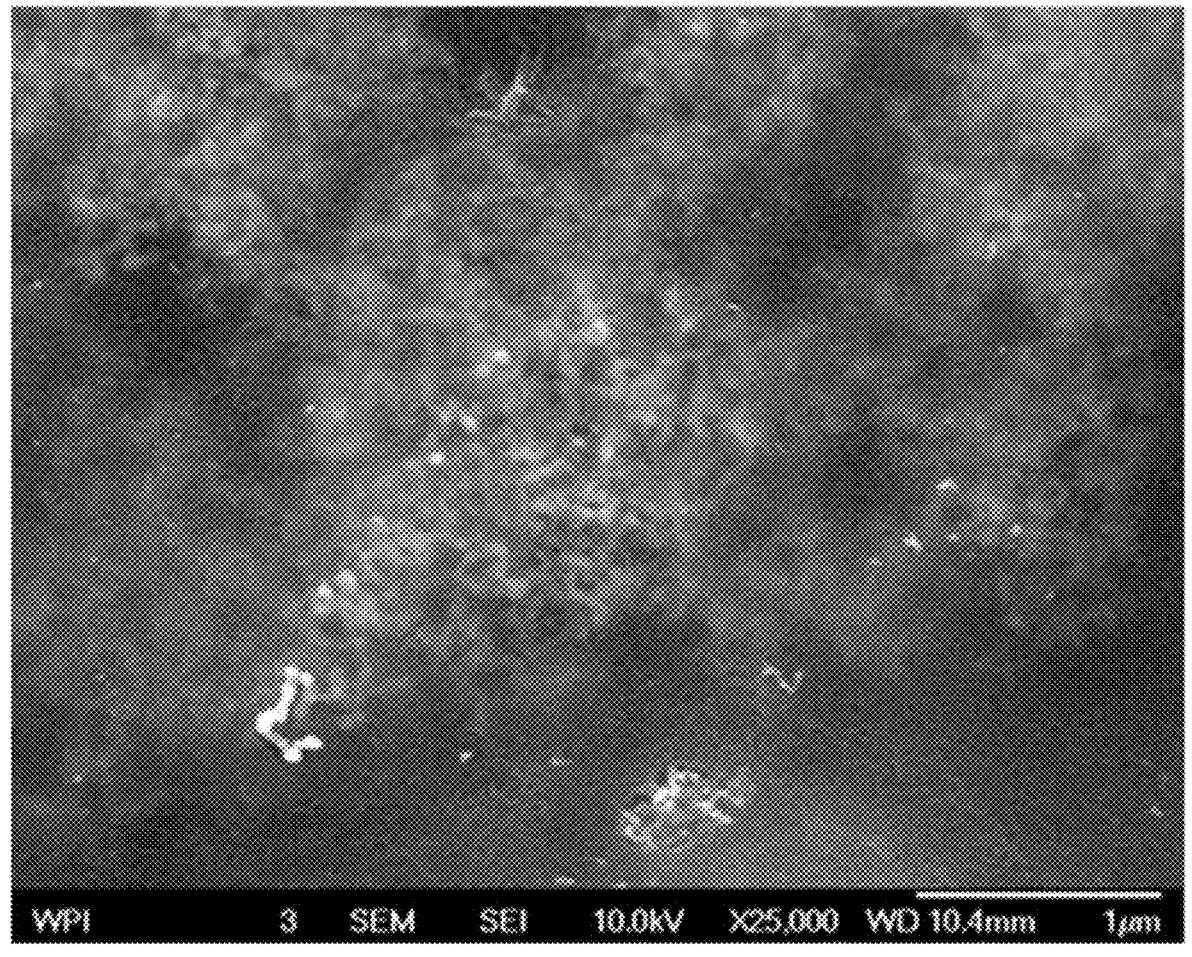
FIG. 16C is an SEM image of a CPI composite prepared with Pluronic F87 dispersing agent (P45).

SEM images of the compressed C45 polyimide composite before and after pyrolysis are shown in FIGS. 15A-15B, where FIG. 15B also shows the fibrillar morphology of the CPI composite. Si nanowires were not visible in the non-pyrolyzed composite, only in the CPI. SEM images of the CPI composites with and without dispersing agents are shown in FIGS. 16A-16C. The properties of the CPI composites submitted for battery testing are shown in Table 11. Conductivities of ~26-27 S/cm were obtained for these samples.

TABLE 11

CPI composites prepared with and without
dispersing agent for battery testing.

| ID | Thickness (μm) | Density (g/cc) | Conductivity (S/cm) | Silicon Utilization Cycle 10 |
|---|---|---|---|---|
| C45 | 75 | 0.597 | 27.0 ± 0.2 | — |
| B45 | 95 | 0.584 | 26.8 ± 1.0 | 69.66% |
| P45 | 90 | 0.512 | 26.0 ± 7.1 | 78.71% |

Figure 17A:
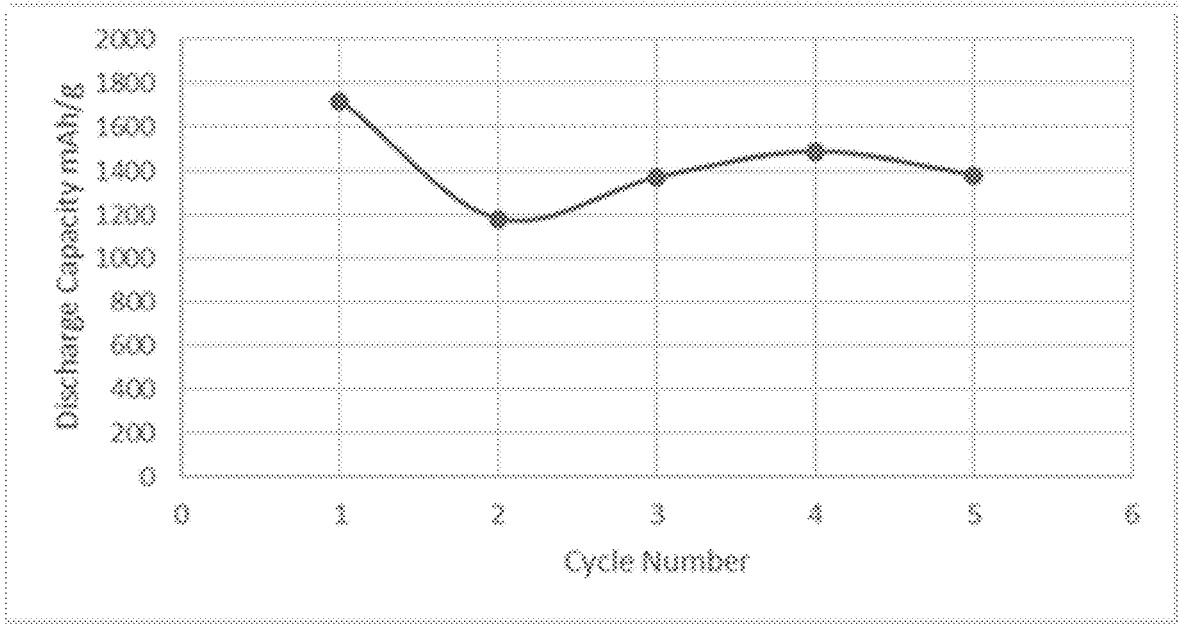
FIG. 17A depicts discharge capacity of C45 composite of FIG. 16A.
Figure 17B:
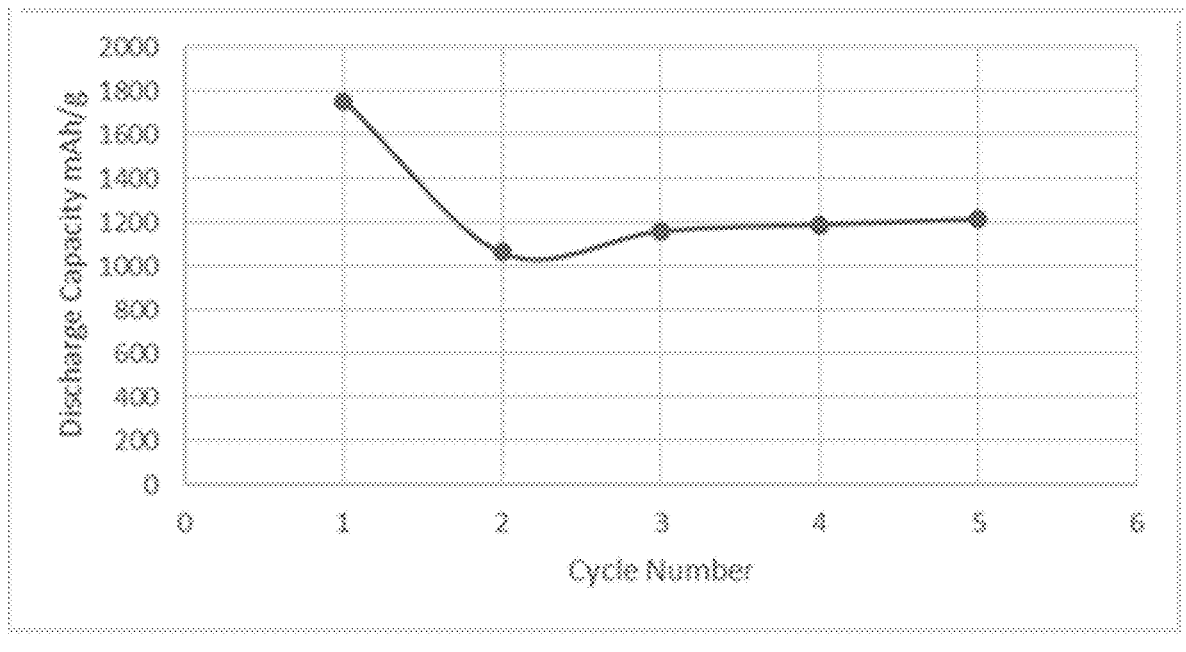
FIG. 17B depicts discharge capacity of B45 composite of FIG. 16B.
Figure 17C:
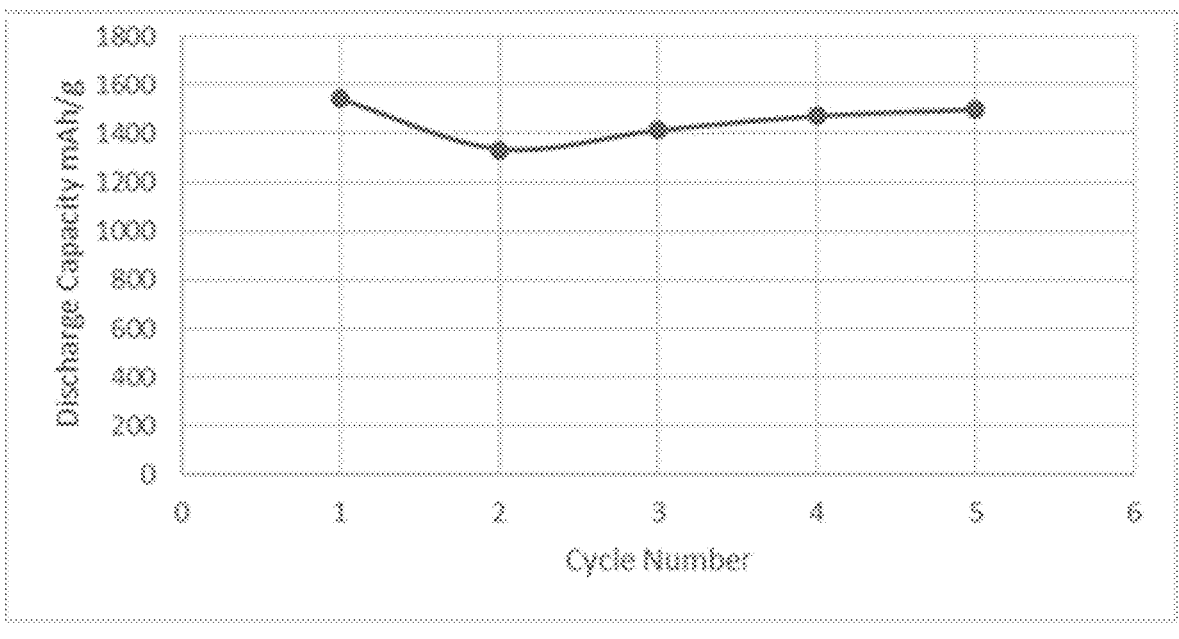
FIG. 17C depicts discharge capacity of P45 composite of FIG. 16C.

The half-cell battery test results showed that the P45 composite had higher discharge capacity and lower irreversible capacity loss compared to the other two samples (FIGS. 17A-17C). Also, the capacity fading likely is due to the foil electrode used in these half-cell battery tests, such that that electrode was incapable of operating at the high capacity of the silicon-containing electrode.

Composites of P45 formulation were cast at three (3) thicknesses: 780, 580, and 370 microns. Each of these PI batches was sectioned in pieces of about 0.5×0.5 square inch composites, which were compressed at three (3) different levels using a hydraulic press and then pyrolyzed. The results are shown in Table 12 and FIG. 18.

TABLE 12

Properties of the P45 CPI composites
compressed at different levels.

| Initial PI thickness (μm) | Final CPI thickness (μm) | Density CPI composite (g/cc) | Porosity (%) |
|---|---|---|---|
| 780 | 70 | 0.960 | 56.4 |
| 780 | 100 | 0.625 | 71.6 |
| 780 | 115 | 0.596 | 72.9 |
| 580 | 70 | 0.740 | 66.4 |
| 580 | 80 | 0.660 | 70.0 |
| 580 | 120 | 0.479 | 78.2 |
| 370 | 50 | 0.664 | 69.8 |
| 370 | 100 | 0.400 | 81.8 |
| 370 | 130 | 0.315 | 85.7 |

Figure 18:
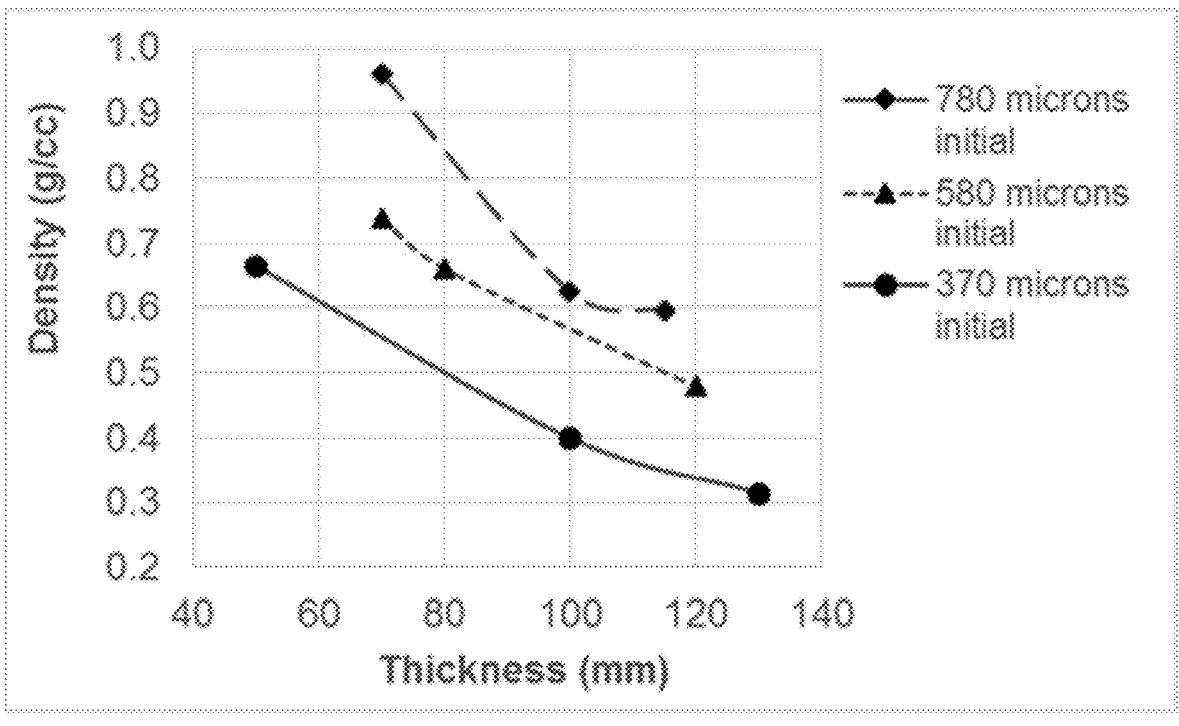
FIG. 18 depicts density as a function of thickness for the P45 CPI composites.

The densities of the Si doped CPI composites varied between 0.3 and 1.0 g/cc at thicknesses between ~50-130 micrometers (FIG. 18). The densities increased with increasing initial thickness of the PI composite. Porosities ranged between ~50-90%.

Electrical conductivities of silicon doped CPI composites. The conductivities of CPI composites pyrolyzed at 1050° C. doped with various levels of silicon were determined using a Keithley 4-point probe apparatus. The conductivities of the samples varied in the ~5-80 S/cm range (Table 13). The electrical conductivity of the non-doped carbon composite was about to be ~13.6 S/cm, which is in the expected range for amorphous carbon, as is known in the art. While the reported electrical conductivity of silicon is $1.6 \times 10^{-5}$ S/cm, silicon nanowires can exhibit conductivities three (3) orders of magnitude higher (0.03 S/cm) (Sabar D. Hutagalung, Mohammed M. Fadhali, Raed A. Areshi and Fui D. Tan, "Optical and Electrical Characteristics of Silicon Nanowires Prepared by Electroless Etching," Nanoscale Research Letters, 2017, 12:425).

TABLE 13

Densities and electrical conductivities of CPI
composites with various Si concentrations.

| Si per CPI % | Target density (g/cc) | Density (g/cc) | Conductivity (S/cm) |
|---|---|---|---|
| 0 | 0.075 | 0.310 | 13.6 |
| 9 | 0.100 | 0.680 | 56.8 |
| 27 | 0.100 | 0.862 | 78.1 |
| 45 | 0.050 | 0.525 | 26.9 |
| 64 | 0.080 | 0.550 | 15.9 |
| 66 | 0.050 | 0.712 | 5.5 |

Figure 19:
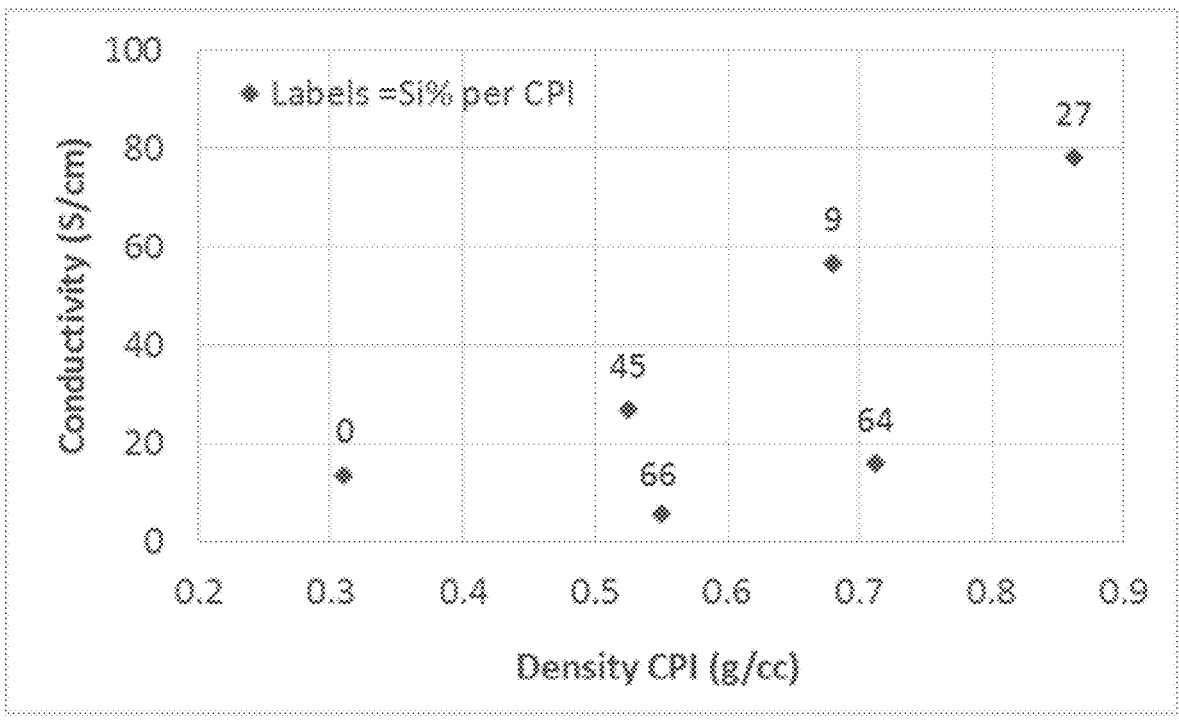
FIG. 19 depicts conductivities of CPI composites doped with various Si levels, as a function of the densities.
Figure 21:
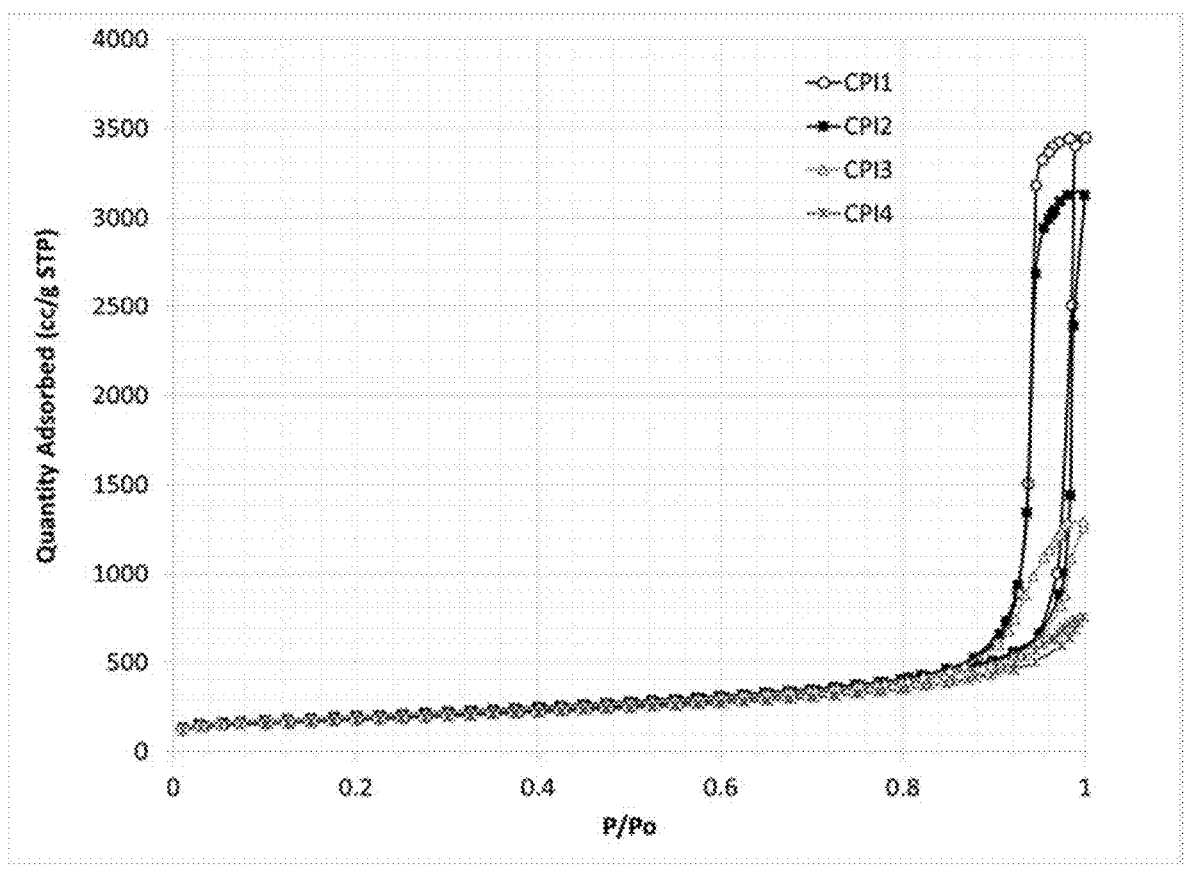
FIG. 21 depicts isotherms of four (4) CPI samples.
Figure 22:
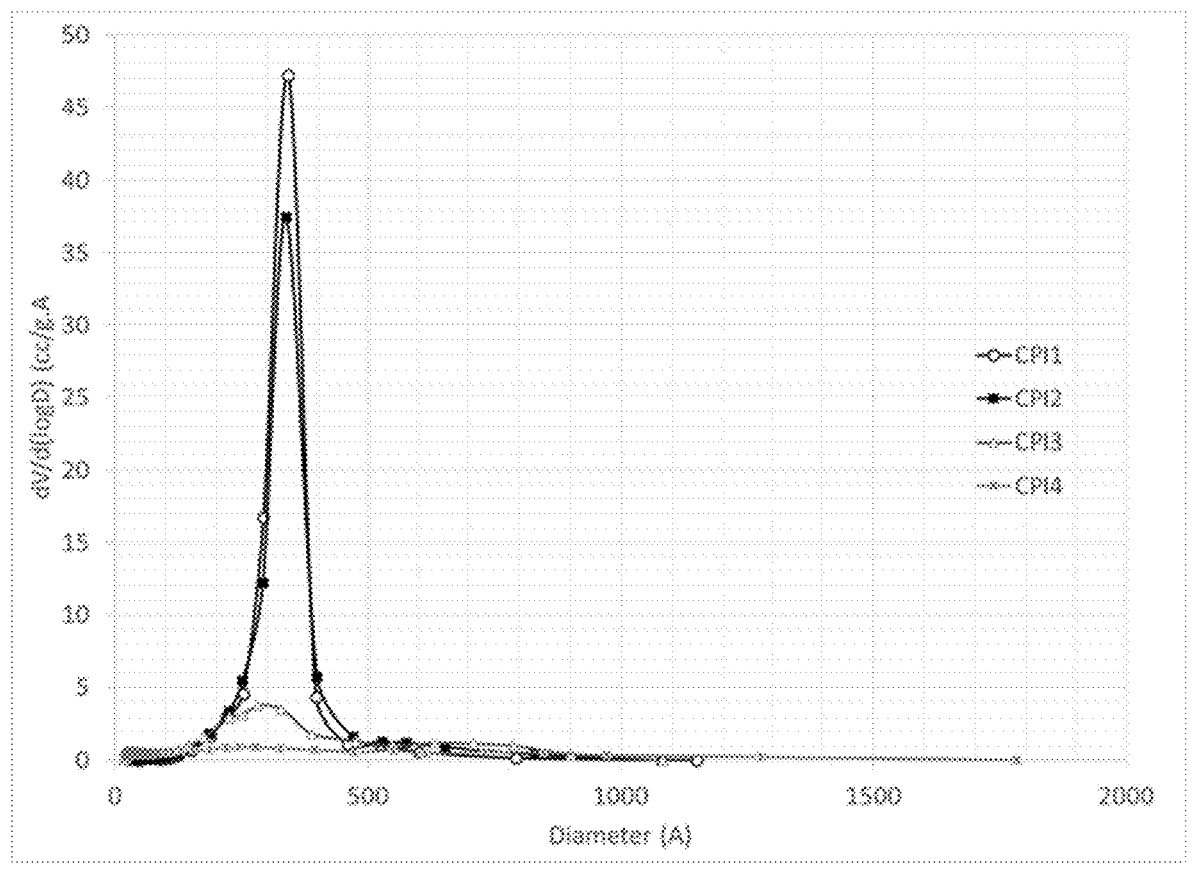
FIG. 22 depicts pore size distributions of the CPI samples of FIG. 21.

Generally, the electrical conductivities increased with increasing densities. At silicon concentrations over 60%, however, the conductivities were lower than expected (FIG. 19). At this high silicon content, the connectivity of the carbon network was disrupted, which resulted in a decrease of the conductivity. The sample doped with 27% wt Si per CPI showed the highest conductivity, suggesting an optimum dispersion of silicon for purposes of high electrical conductivity. A broader optimal range can be seen to be between about 5% and about 80% wt Si per CPI, or more particularly between about 5% and 50% wt Si per CPI. It can be seen in Table 11 and Table 13 that changing the silicon content can adjust electrical conductivity up to about 80 S/cm. It is thus contemplated that electrical conductivity can be above about 5 S/cm, 10 S/cm, 15 S/cm, 25 S/cm, 50 S/cm, and 75 S/cm, where the broader range and a more precise conductivity is adjustable based on silicon content.

Figure 20:
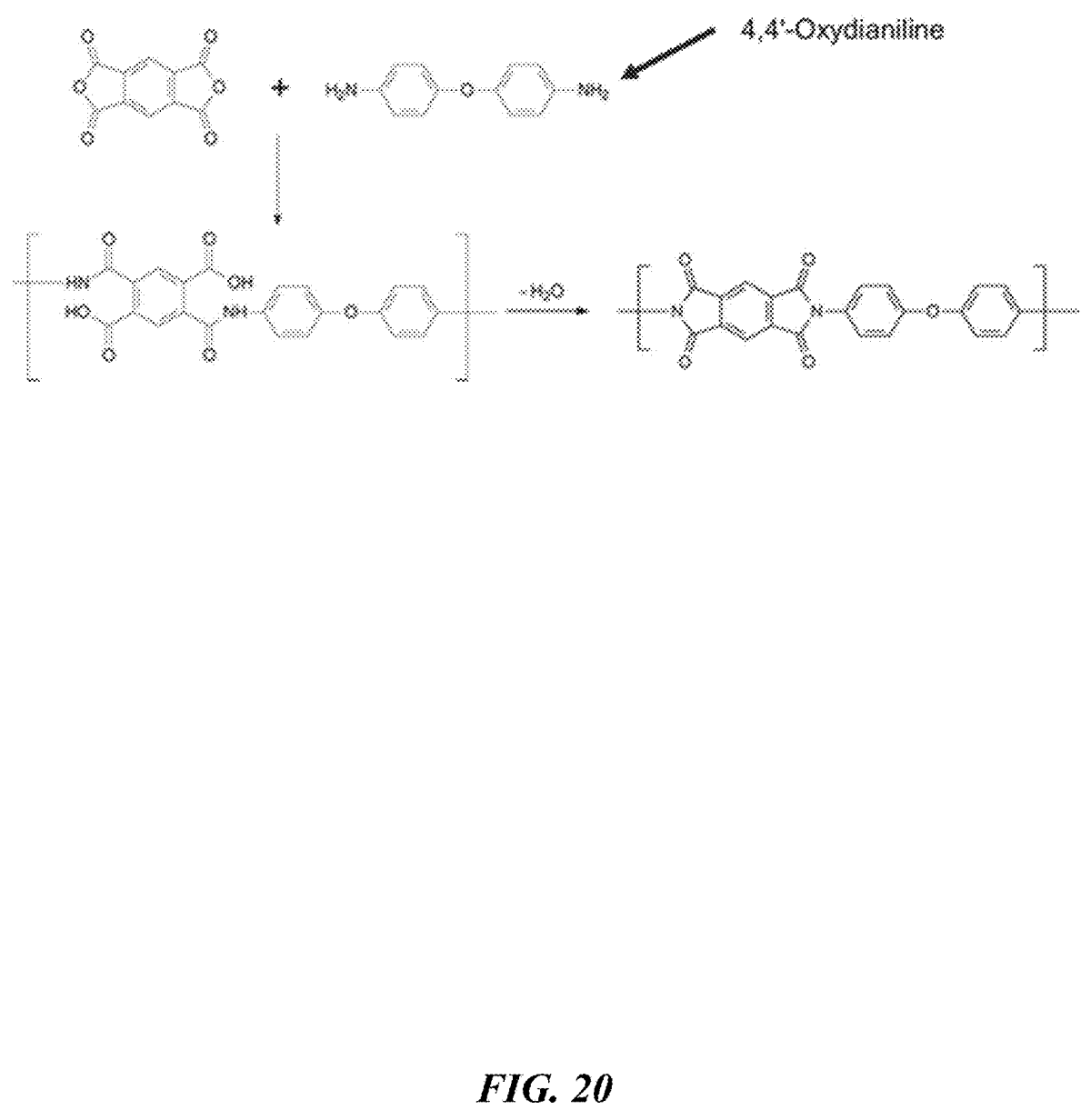

Example 4: Carbonized Polyimide Aerogel with
High Pore Volume and Narrow Pore Size
Distribution Polyimide gels are prepared by reacting 6 g of PMDA with 3 g of PDA to form polyamic acid in 100 mL of DMAC at room temperature for 2-24 hrs. Subsequently, 8.86 g of AA is added as chemical imidization reagent to the polyamic acid solution (see FIG. 20). The acidified polyamic solution is mixed vigorously for at least 2 hrs. The obtained mixture is diluted with DMAC to the desired target density of the PI aerogel. 1-4 g of Py per 100 mL of mixture is added to the final solution to promote gelation, which occurs in 4-25 min. Prior to gelation, the mixture is casted in desired form (e.g., film, monolith, in reinforced fiber, etc.). The gels obtained are then aged in the oven at 65-70° C. and washed/rinsed with ethanol several times prior supercritical drying. The PI aerogel is converted into carbon aerogel by pyrolysis at 1050° C. for 2 hrs in inert environment (nitrogen gas flow). Without being bound by theory, the physical and structural properties of the carbonized PI aerogel depend on the precursors mixing time and the amount of Py.

Structural properties of four CPI aerogels tested by nitrogen adsorption desorption technique are reported in Table 14. The four samples differ by time mixing and amount of Py. Target density was fixed at 0.05 g/cc. Interestingly, all the samples show relatively similar surface BET, but pore size distribution and pore volume appear to be affected by the parameters of synthesis.

TABLE 14

Physical and structural properties of different CPI aerogels.

| Sample ID | Final density (g/cc) | Mixing time [1] (hrs) | Pyridine concen- tration [2] | Surface area (m²/g) | Micropore area (m²/g) | Pore volume (cm³/g) |
|---|---|---|---|---|---|---|
| CPI1 | 0.09 | 24 | 1 | 655 | 105 | 5.34 |
| CPI2 | 0.09 | 24 | 2 | 696 | 122 | 4.84 |
| CPI3 | 0.09 | 2 | 1 | 682 | 134 | 1.99 |
| CPI4 | 0.09 | 2 | 2 | 612 | 114 | 1.15 |

[1] mixing time of the two precursors.
[2] amount of pyridine added for gelation (g/100 mL of solution)

Example 5: Carbonized Polyimide Aerogel Loaded with Si

Silicon particles (30 nm) were added to the polyamic acid solution at different concentrations. Synthesis of the solution is the same as the one described in Example 4. However, in the present composite system (PI/Si), silicon particles were first dispersed in DMAC, for at least 2 hrs, prior to admixing them with polyamic acid solution. To avoid Si settlement, gel time of Si/polyamic acid solution remained relatively short (4-6 min). For that, 4 g of pyridine/100 mL mixture was used to meet the targeted gel time. Prior to gelation, the mixture was casted in desired form (e.g., film, monolith, or reinforced fiber, etc.). The gels obtained were then aged in the oven at 65-70° C. and washed/rinsed with ethanol several times prior supercritical drying.

A. 22-25 wt % Silicon in Polyimide Carbon Aerogel Composite

Target density of the composite was fixed at 0.06 g/cc, and Si loading was around 11.88 wt %, at polymerization step. Silicon content was adjusted after pyrolysis of the polyimide aerogel at 1050° C. for 2 hrs, since no less than 50% wt loss was recorded on all samples. Composites with four different thickness were produced:

MT (medium thick composite ~0.3-0.4 mm)
T (thick composite ~0.6-0.8 mm)
MTC (medium thick compressed composite ~0.07-0.09 mm)
TC (thick compressed composite ~0.12-0.16 mm)

The different PI/Si samples were pyrolyzed at 1050° C. for 2 hrs and battery tested. The physical properties of the samples are listed in Table 15.

TABLE 15

Physical characteristics of different C/Si composites.

| ID samples | Material Description | weight (g) | 1 (cm) | L (cm) | Thick- ness (mm) | Density (g/cc) |
|---|---|---|---|---|---|---|
| MT1 | Medium thick | 0.0058 | 1.050 | 1.000 | 0.29 | 0.190 |
| MT2 | composite | 0.0064 | 1.100 | 1.100 | 0.28 | 0.189 |
| MT3 | (Si content | 0.0056 | 1.100 | 1.100 | 0.32 | 0.145 |
| MT4 | ~25.05 wt %) | 0.0069 | 1.150 | 1.150 | 0.29 | 0.180 |
| MT5 | | 0.0070 | 1.100 | 1.100 | 0.29 | 0.199 |
| MTC1 | Medium thick | 0.0073 | 1.100 | 1.300 | 0.06 | 0.851 |
| MTC2 | compressed | 0.0070 | 1.200 | 1.200 | 0.08 | 0.608 |
| MTC3 | composite | 0.0053 | 1.000 | 1.150 | 0.07 | 0.658 |
| MTC4 | (Si content | 0.0070 | 1.200 | 1.300 | 0.08 | 0.561 |
| MTC5 | ~22.29 wt %) | 0.0074 | 1.200 | 1.250 | 0.06 | 0.822 |

TABLE 15-continued

Physical characteristics of different C/Si composites.

| ID samples | Material Description | weight (g) | 1 (cm) | L (cm) | Thick- ness (mm) | Density (g/cc) |
|---|---|---|---|---|---|---|
| 1T | Thick composite | 0.0131 | 1.000 | 1.000 | 0.55 | 0.238 |
| 2T | (Si content | 0.0125 | 1.100 | 1.000 | 0.51 | 0.223 |
| 3T | ~23.45 wt %) | 0.0129 | 1.000 | 1.100 | 0.46 | 0.255 |
| 4T | | 0.0125 | 1.100 | 1.100 | 0.46 | 0.225 |
| 5T | | 0.0111 | 1.100 | 1.000 | 0.46 | 0.219 |
| 2TC | Thick | 0.0159 | 1.400 | 1.200 | 0.21 | 0.451 |
| 3TC | compressed | 0.0139 | 1.300 | 1.300 | 0.34 | 0.242 |
| 4TC | composite (Si content ~21.89 wt %) | 0.0123 | 1.200 | 1.200 | 0.28 | 0.305 |

Figure 23:
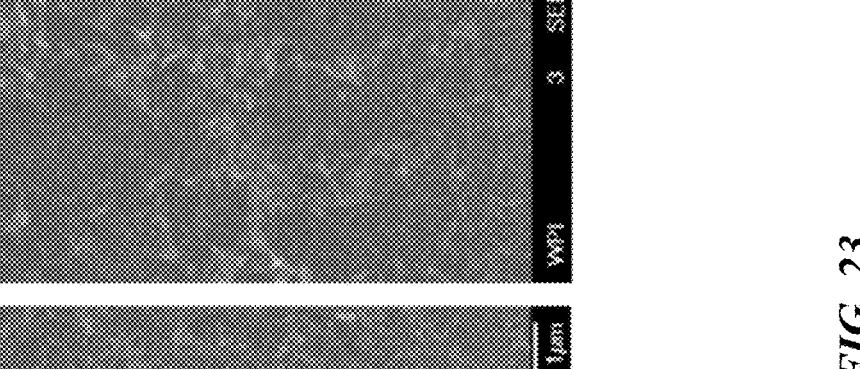
FIG. 23 is SEM images of the MT materials (non-compressed).
Figure 24:
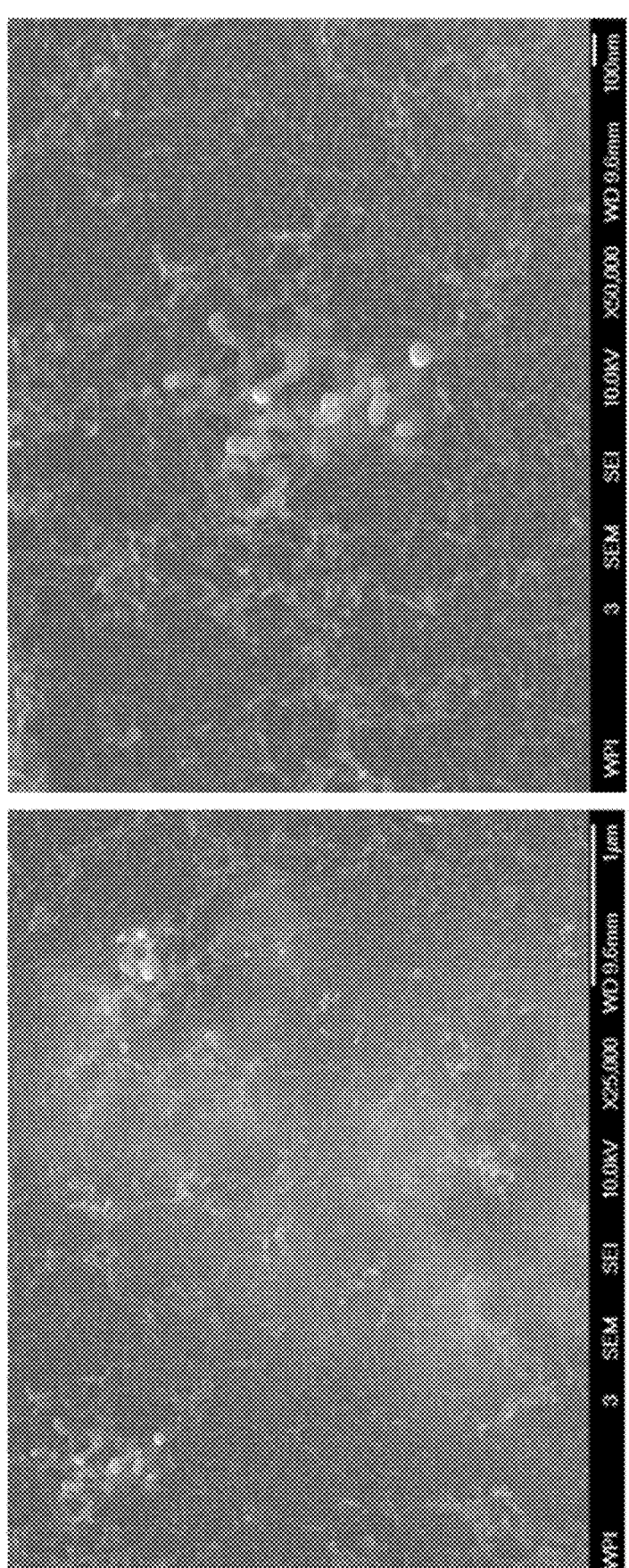
FIG. 24 is SEM images of the MTC materials (compressed).

SEM images of the pyrolyzed composites (MT material) doped with ~25% Si can be seen in FIG. 23. The SEM images show some agglomeration of Si and silicon nanowires, at high magnification, embedded in the carbon matrix.

Figure 25A:
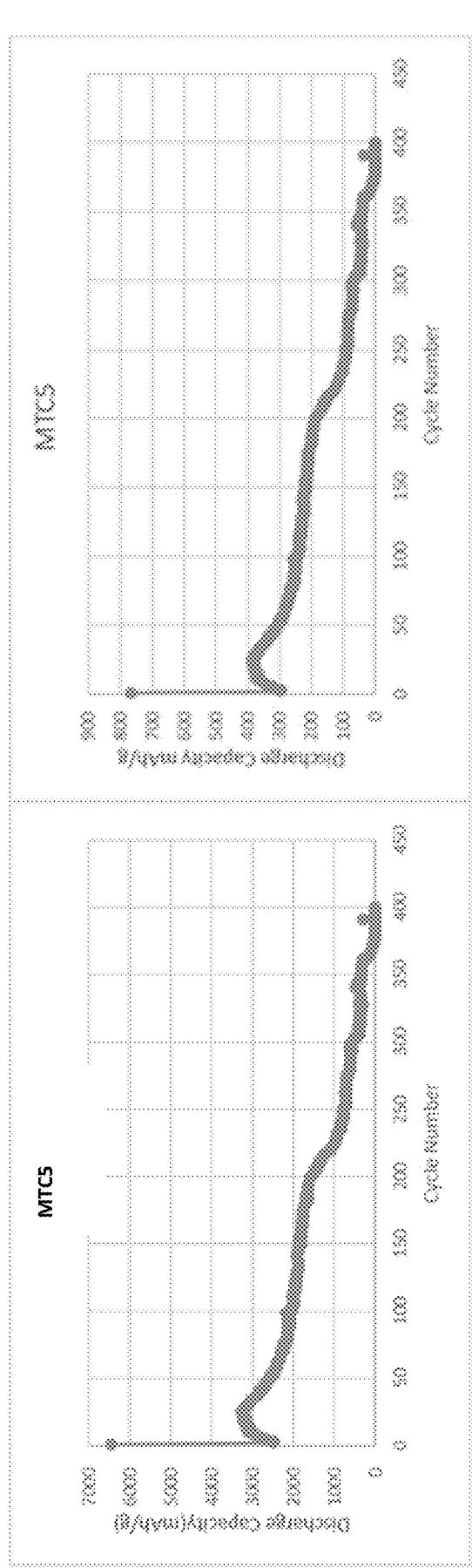
FIG. 25A depicts cycling capacities based on Si content (left) and on the electrode (right), for compressed CPI samples.
Figure 25B:
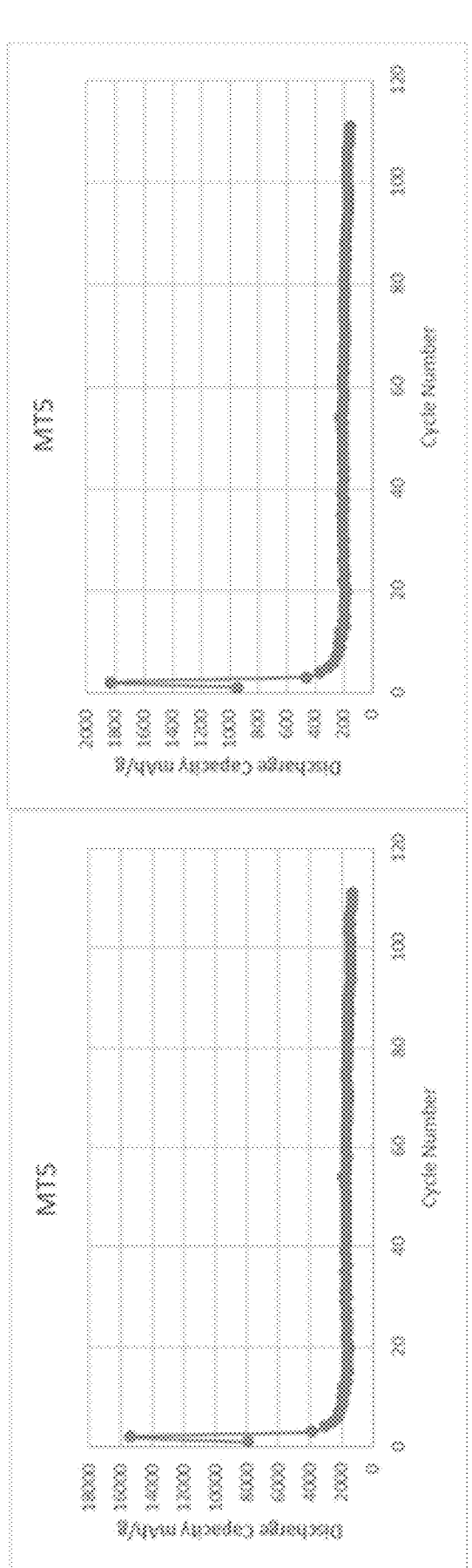
FIG. 25B depicts cycling capacities based on Si content (left) and on the electrode (right), for non-compressed CPI samples.

The cycling capacities of MTC5 and MT5 samples, based on the Si and electrode content, are shown in FIGS. 25A-25B. Cycling was performed up to 400 cycles for MTC5 (compressed CPI aerogel) and up to 150 for MT5 (non-compressed CPI aerogel). The two samples showed different behavior. MTC5 demonstrated relatively stable capacity discharge up to 200 cycles, followed by capacity decrease, likely due to the foil electrode in the half-cell battery test, as previously discussed.

B. 39 wt % Silicon in Polyimide Carbon Aerogel Composite

In the next round of synthesis, Si content was increased to 39 wt %, expecting to decrease the capacity loss during the first discharges. Polyimide gels were prepared at 0.05 g/cc target density. Polyamic acid solution was prepared over 16 hours by mixing PMDA and PDA precursors in DMAC. Separately, silicon powder was dispersed in DMAC for 2 hours, and then added to the polyamic acid solution prior the addition of pyridine. After addition of pyridine, composites were prepared between Teflon plates using 500 microns spacer. The aerogel composites were compressed and then pyrolyzed for 2 hours at 1050° C. Silicon content was 39 wt % per total solids.

The properties of the compressed (PISi1NC(C)) and non-compressed (PISi7NC) composites tested in half-cell batteries are shown in Table 16.

TABLE 16

Physical characteristics of C/Si (Si ~39 wt %) composites.

| ID samples | Material Description | Weight (g) | 1 (cm) | L (cm) | Thick- ness (mm) | Density (g/cc) |
|---|---|---|---|---|---|---|
| PISi1NC (C) | Compressed CPI/Si aerogel (Si ~39 wt %) | 0.0086 | 1.216 | 1.311 | 0.14 | 0.385 |
| PISi7NC | Compressed CPI/Si aerogel (Si ~39 wt %) | 0.0082 | 1.058 | 1.071 | 0.43 | 0.168 |

Figure 26A:
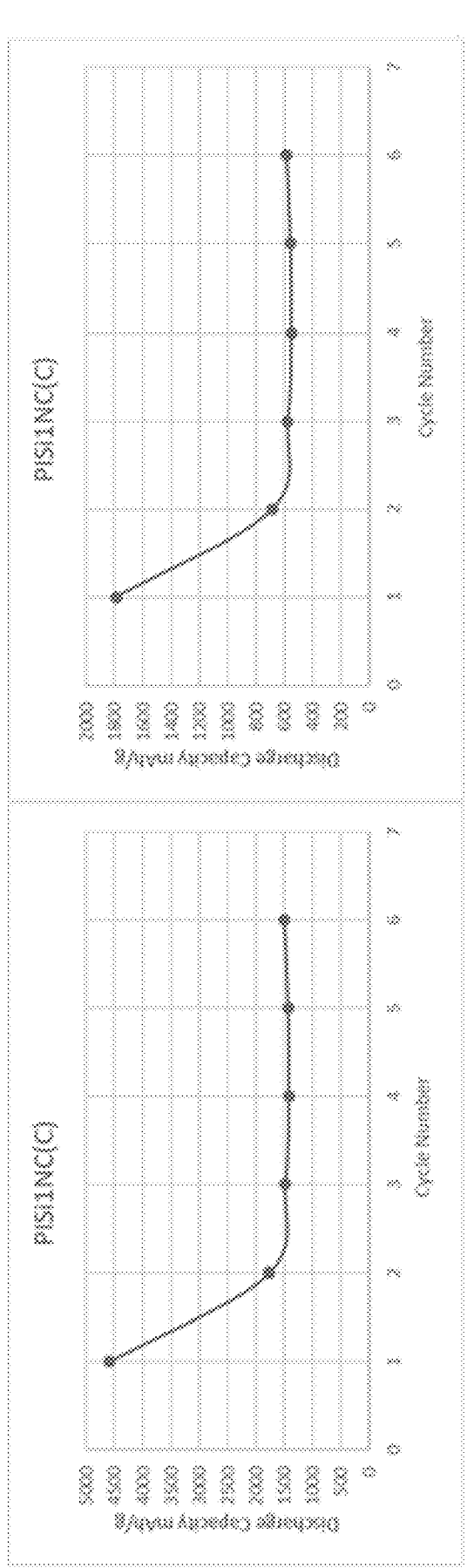
FIG. 26A depicts cycling capacities based on Si content (left) and on the electrode (right), for compressed CPI samples with 29 wt % silicon per total solids.
Figure 26B:
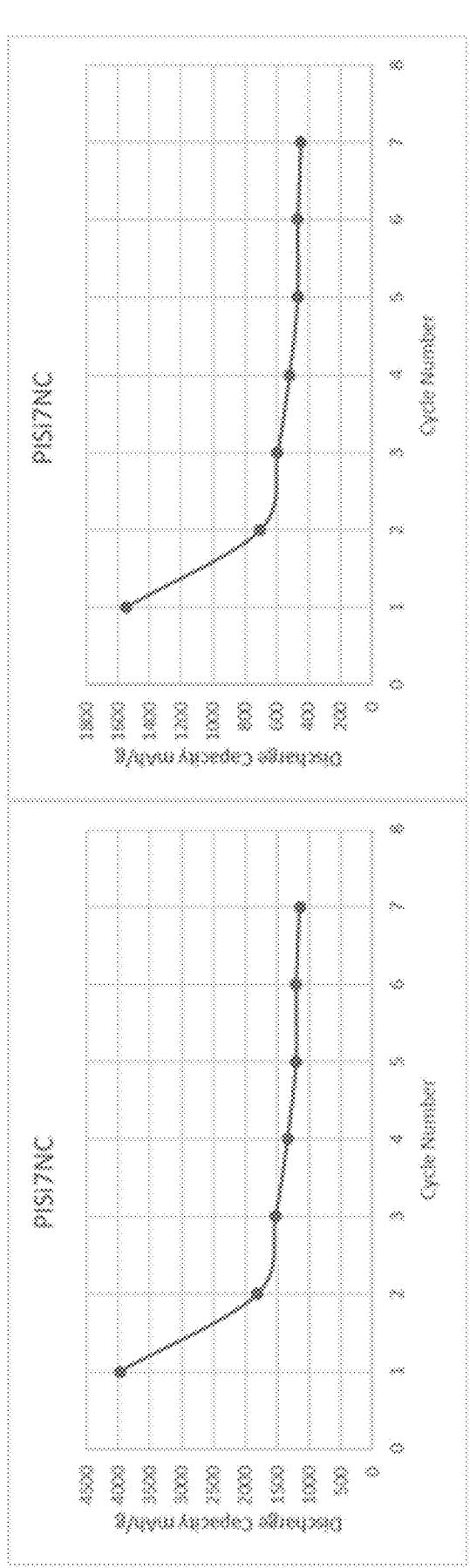
FIG. 26B depicts cycling capacities based on Si content (left) and on the electrode (right), for non-compressed CPI samples with 29 wt % silicon per total solids.

FIGS. 26A-26B illustrate the discharge capacities as a function of cycling the anodes made with the two materials reported in Table 16. A clear improvement of the discharge capacity based on the anode is noticeable when silicon content was increased from 25 wt % (previous materials, i.e., MT5 and MTC5) to 39 wt %.

Example 6: Fiber Reinforced C/Si Aerogel

Figure 27:
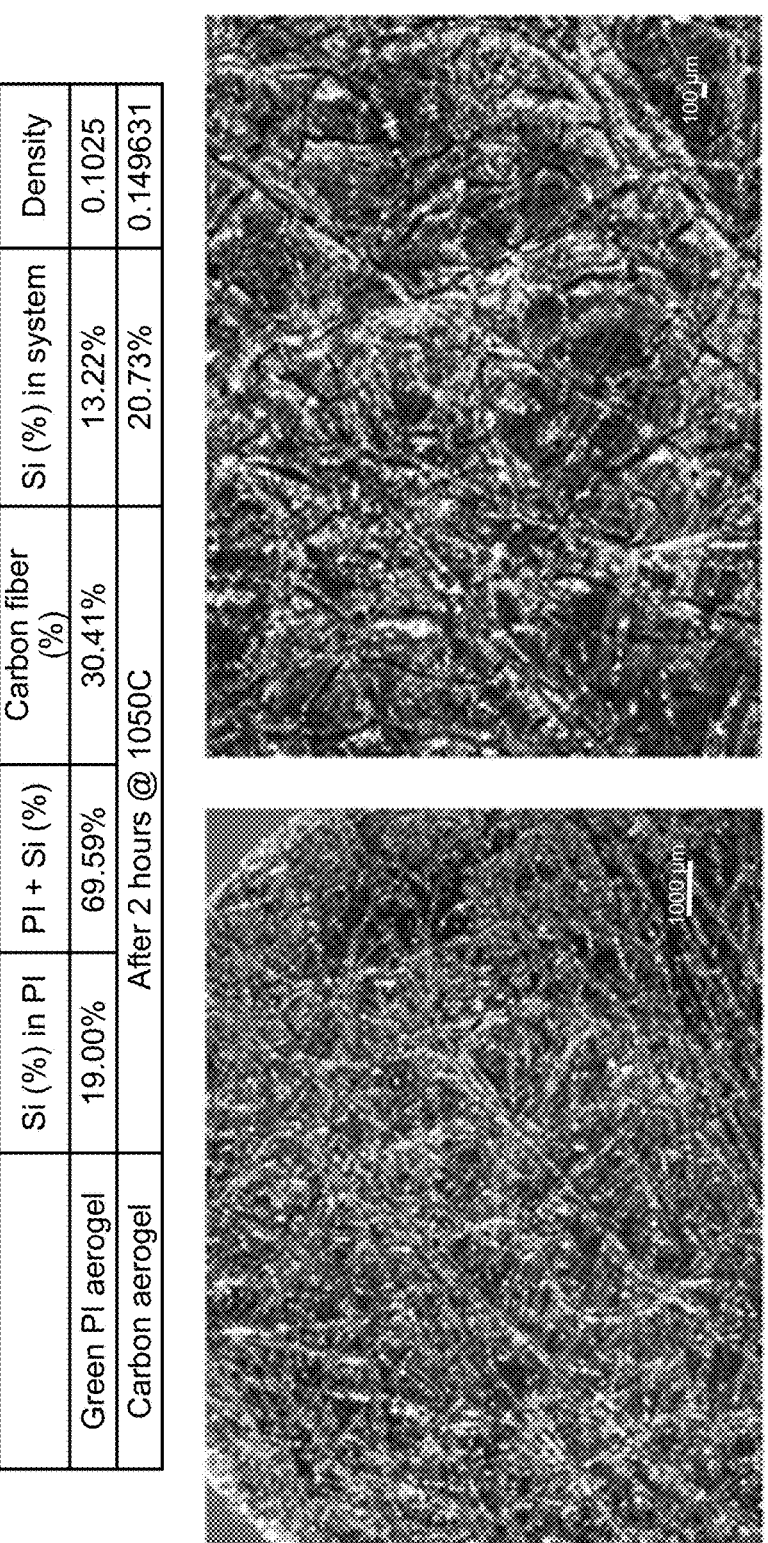
FIG. 27 depicts properties and microscopy pictures of carbon/Si infiltrated in carbon fiber (10 g/m$^2$).

Three different carbon fiber reinforcements with different areal density (2, 4, and 10 g/m$^2$) were tested as reinforcement for C/Si aerogels. The synthesis and processing of the PI/Si aerogels are the same as described previously, with one exception. During the gelation step, the mixture is casted into the fiber. After supercritical drying, the PI/Si composite reinforced with carbon fiber is cut into 15-mm (inner diameter (ID)) circular samples using dye cutter, and pyrolyzed at 1050° C. for 2 hrs. FIGS. 27-29 show the properties and microscopy pictures of the carbonized PI/Si/carbon fiber samples.

Figure 30:
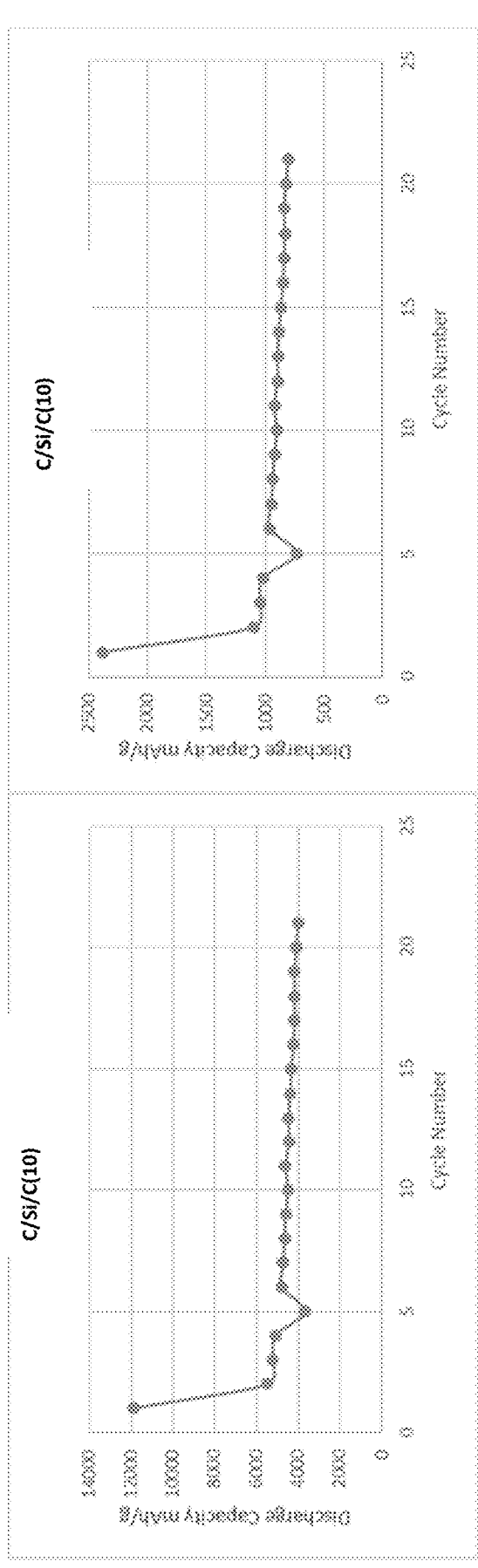
FIG. 30 depicts cycling capacities of C/Si reinforced with carbon fiber based on the Si content (left) and on the electrode (right).

After pyrolysis, the samples reinforced with 2- and 4-g/m$^2$ carbon fibers experienced high shrinkage of the carbon aerogel and reinforcement. FIGS. 28-29 show the high voids that characterize these two materials as not particularly suitable for battery testing. In FIG. 27, C/Si reinforced with 10-g/m$^2$ carbon fiber showed a better microstructure and no evidence of voids. However, the Si content was low (~21%) and fiber density was high (>30 wt %). This composite was tested for charge and discharge capacities within such a system. The cycling capacities of the sample shown in FIG. 27, based on the Si and electrode content, are reported in FIG. 30.

In another experiment, cellulose fiber was also tested as reinforcement for C/Si. The synthesis route is the same as the one used for the carbon fiber. Cellulose fiber constitutes 68% (by weight) of C/Si composite, though much of this fiber is decomposed after pyrolysis, since the % Si increased from 6% to 24% after pyrolysis. The physical characteristics of C/Si reinforced with cellulose fiber are reported in Table 17.

TABLE 17

Physical characteristics and composition of C/Si reinforced with cellulose fiber.

| Si (%) in PI | PI + Si (%) | Cellulose fiber (%) | Si (%) in system | density (g/cc) |
|---|---|---|---|---|
| 19% | 32% | 68% | 6% | 0.103 |
| | | After 2 hrs at 1050° C. | 24% | 0.206 |

Figure 31:
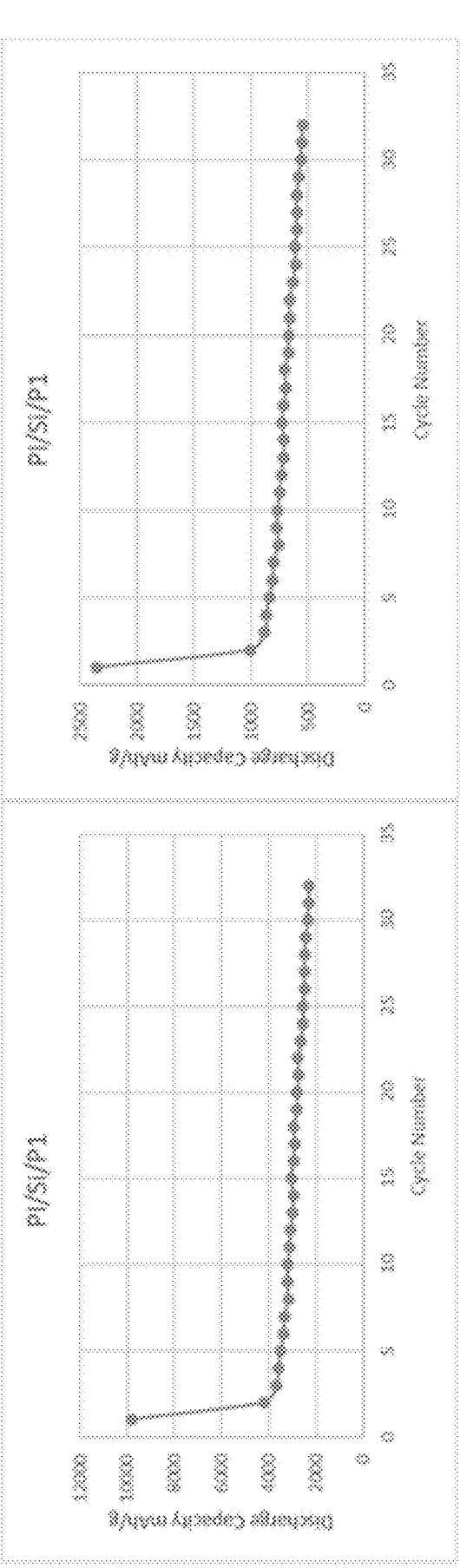
FIG. 31 depicts cycling capacities of C/Si reinforced with cellulose fiber, based on the Si content (left) and on the electrode (right).

The cycling capacities of C/Si reinforced with cellulose fiber, based on the Si and electrode content are reported in FIG. 31. The performance of this material is similar to that seen with the C/Si reinforced with carbon fiber.

Example 7: Silicon Dispersion Improvement within PI Aerogel

Polyimide composites and monolith gels loaded with 47% silicon, with target density of 0.05 g/cc, were prepared. A route for a better dispersion of silicon within the polyimide matrix was performed, to avoid agglomeration. Silicon was dispersed and mixed with PMDA and PDA, from the beginning of synthesis of the solution. Polyamic acid solution+ silicon were mixed for 16 hrs. Acetic anhydride was added and mixed with the solution for 4 hours. Fast gelation (~4 min) was assured by adding the appropriate amount of Py to the acidified polyamic/Si mixture. Composites with thickness of ~200-300 microns, and thick monoliths were casted. After supercritical drying, PI/Si aerogel composites were compressed and then pyrolyzed for 2 hours at 1050° C. Subsequently, a number of different samples (e.g., compressed, non-compressed, monoliths, etc.) were analyzed by SEM to evaluate the dispersion of silicon in the carbon matrix. FIG. 32 shows three cross-sectional SEM images of thick non-compressed composite (0.60 mm). At low magnification (image on the left), uniform and well-distributed silicon is illustrated. Large clusters of silicon are shown, as well. At higher magnification (right image), high-density silicon can be seen to have embedded well into the carbon matrix. FIG. 33 shows three cross-sectional SEM images of thin composite (0.12 mm). The same observations are made, namely good Si dispersion and rightly impregnated into the carbon matrix. The cross-sectional SEM images of a monolith (FIG. 34) clearly confirm the same structures shown in the thick and thin composites.

FIGS. 35-36 show side-by-side comparisons of two C/Si composites that were processed differently. The left images (in both figures) are for a monolith and composite casted from a Si/polyamic acid solution mixed for 16 hrs (long contact). The right pictures are for monolith and composite made from Si/polyamic acid solution mixed for 4-6 min (brief contact). The distributions of the silicon are observed to be different in the two processes. Long contact assured a better Si dispersion than brief contact.

Half-cell testing of compressed and non-compressed C/Si composite was performed. Both samples, PISi3 (non-compressed) and PISi6C (compressed), had well dispersion of the Si in the carbon aerogel matrix. The physical properties of the two samples are reported in Table 18.

TABLE 18

Physical characteristics of C/Si (mixed for 16 hrs) submitted for half-cell testing.

| ID | % Si in composite | Thick. (mm) | Density (g/cc) | Weight (g) | Length (cm) | Width (cm) |
|---|---|---|---|---|---|---|
| PISi3 | 47 | 0.59 | 0.226 | 0.0158 | 1.072 | 1.102 |
| PISi6C | 47 | 0.16 | 0.587 | 0.0170 | 1.311 | 1.380 |

Figure 37:
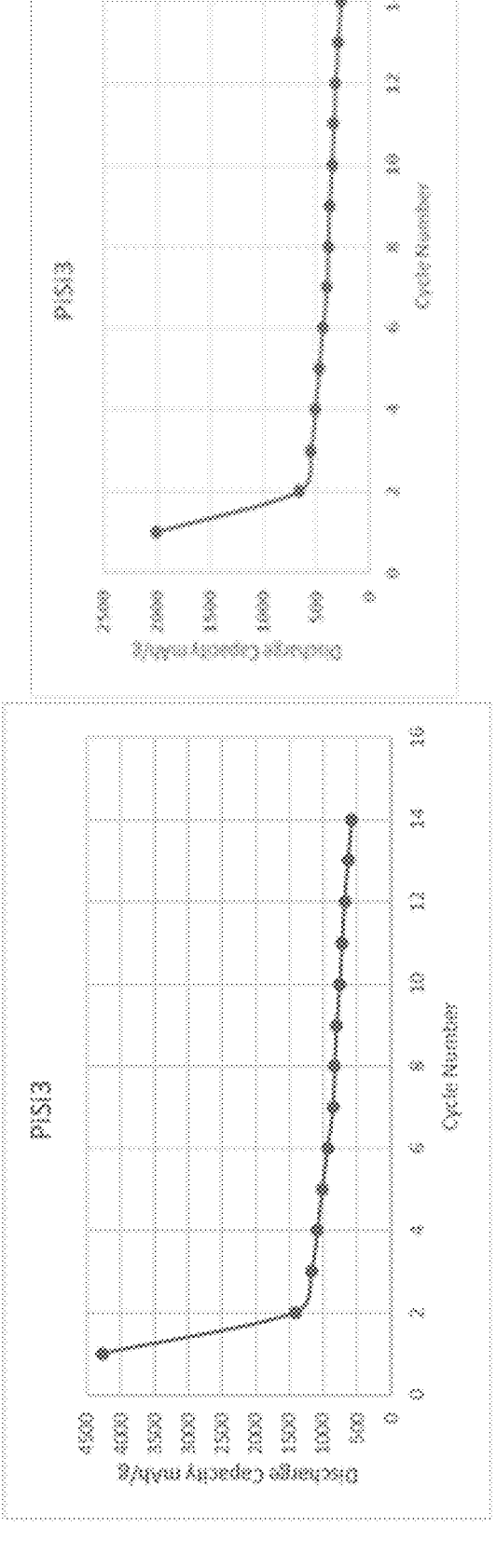
FIG. 37 depicts cycling capacities of non-compressed C/Si (mixing 16 hrs) based on Si content (left) and based on the electrode (right).
Figure 38:
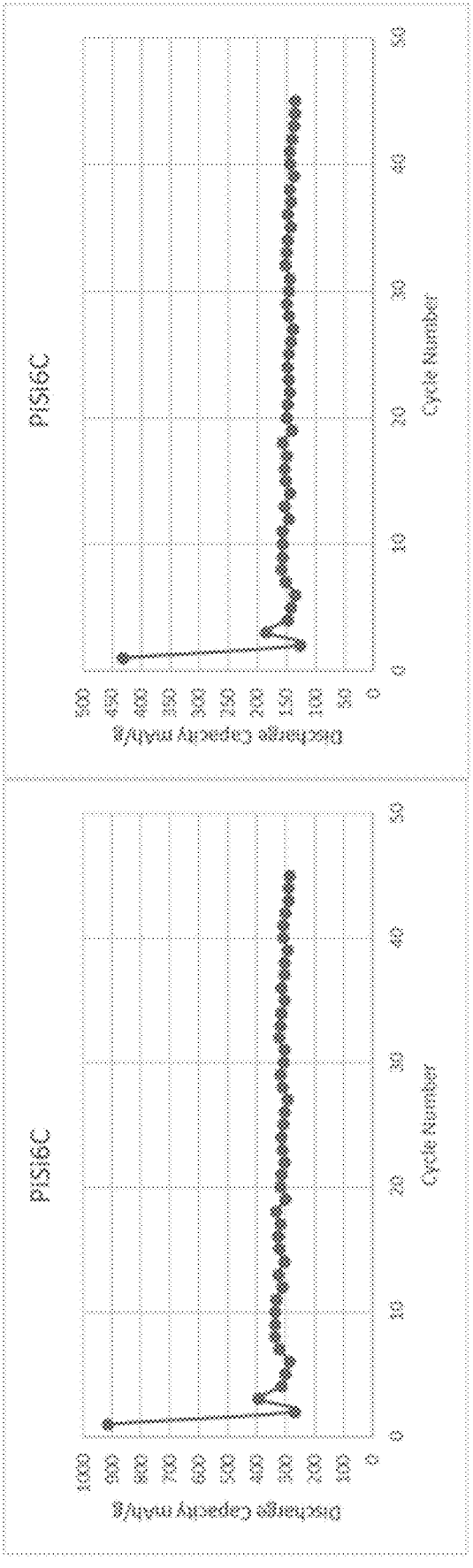
FIG. 38 depicts cycling capacities of compressed C/Si (mixing 16 hrs) based on Si content (left) and based on the electrode (right).

The charge-discharge cycles of the two samples are shown in FIGS. 37-38. The samples performed surprisingly well, with the compressed sample (PISi6C) showing stable cycle performance.

Example 8: C/Si Circular Electrode Fabrication

In previous examples, the C/Si electrodes were in the form of a square (~1 cm$^2$) and tested for battery performance in a circular cell (ID=15 mm). For higher efficiency and more reliable test results, testing circular C/Si electrodes is required. Therefore, a route to make circular electrodes was performed using a die cutter.

Figure 39:
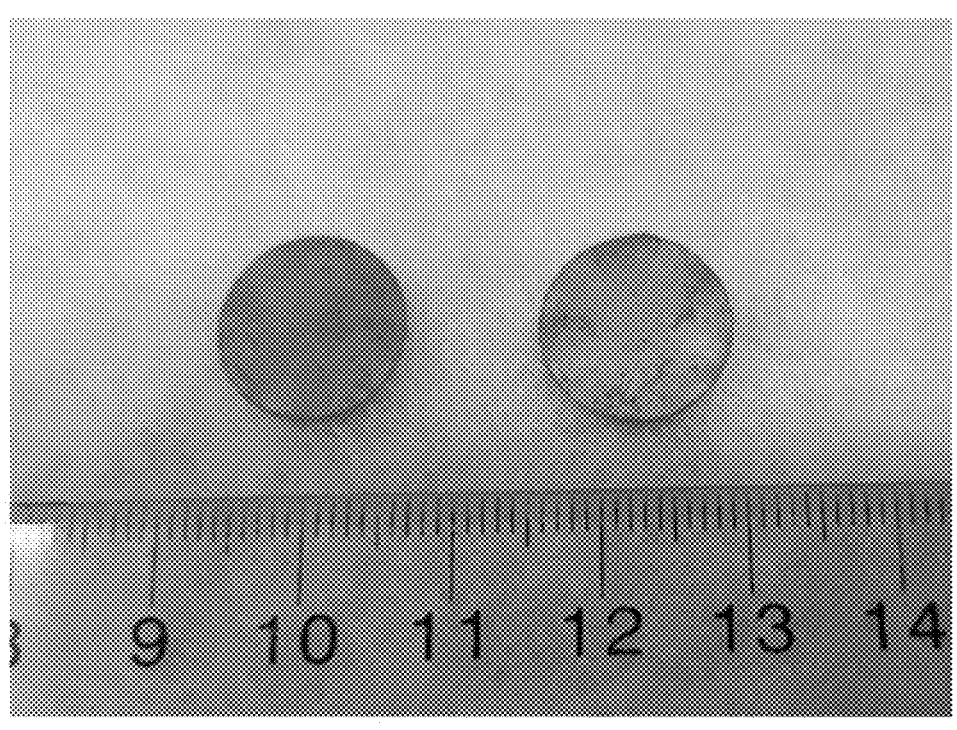
FIG. 39 depicts compressed and circular Si/C electrodes made using a die cutter on aerogel.

PI aerogel composites having 0.13 g/cc target density and loaded with 31.4% Si (using 16 hrs mixing) were fabricated. After extraction, the density of the final aerogel was measured to be about 0.213 g/cc. Using a die cutter, a plurality of circular aerogel composites with ID of 15 mm were produced (see FIG. 39). The thickness of the samples was around 0.43 mm. Some of the samples were compressed prior to pyrolysis at 1050° C. for 2 hrs. The characteristics of the pyrolyzed circular electrodes are as followed:

Weight loss: ~41%

Non-compressed samples: ~0.261 g/cc (1.1 cm ID, 0.38 mm thick)

Compressed samples: ~0.652 g/cc (1.35 cm ID, 0.11 mm thick)

Figure 40:
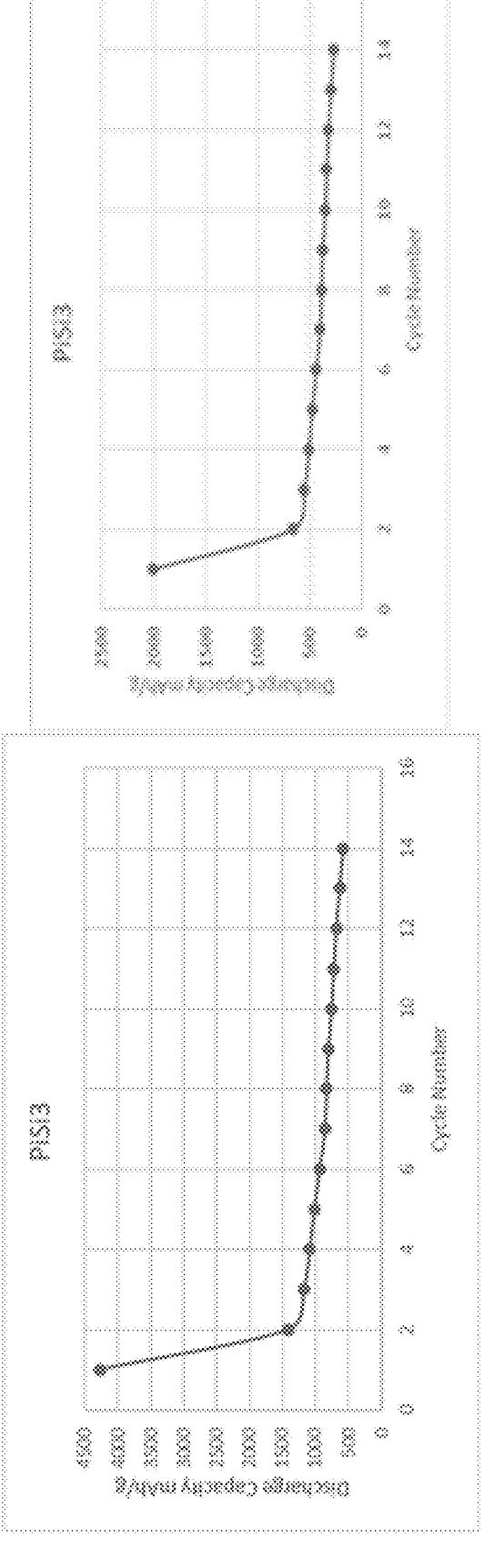
FIG. 40 depicts cycling capacities of non-compressed and circular C/Si aerogel based on Si content (left) and based on the electrode (right).
Figure 41:
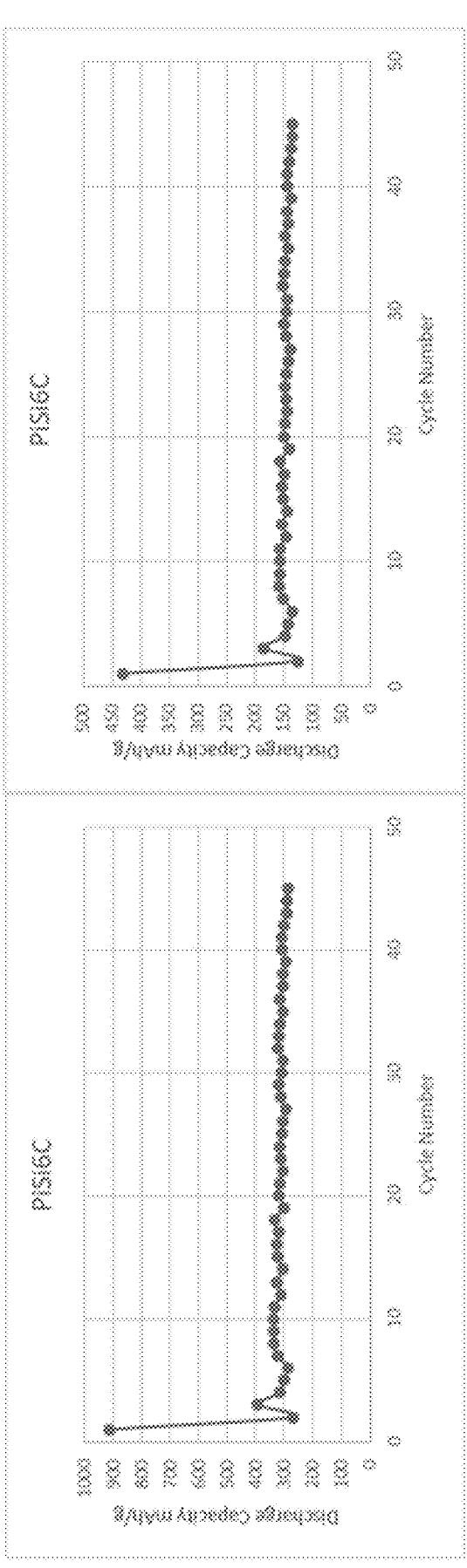
FIG. 41 depicts cycling capacities of compressed and circular C/Si aerogel based on Si content (left) and based on the electrode (right).

The half-cell battery performance of the compressed and non-compressed are shown in FIGS. 40-41. The capacity of the non-compressed sample appears to be higher than the compressed sample, though the non-compressed sample also produced a more unstable capacity.

Example 9. Carbonized Phloroglucinol/Formaldehyde (PF) Aerogel Loaded with Si Carbon aerogels made from PF are also contemplated herein for C/Si aerogel electrode fabrication. For the PF system, high target density (>0.7 g/cc) aerogels can be achieved through a synthetic route. The aerogel obtained does not need to be compressed. The aerogel obtained does not need to be compressed. High-density PF gel composite was fabricated as follow. Phloroglucinol (22 g) was dissolved in 100 mL ethanol, and 44 mL of 2-furaldehyde was added to the phloroglucinol solution. The obtained solution was mixed for 30 min. To the mixture, 5 wt % of silicon was added, and mixed vigorously for another 30 min. The PF mixture can be gelled by a base (diamine or triamine) and the gel time is around 20-40 min, depending on the concentration of the base. In this case and in presence of silicon, the gel time should be shorter (less than 1 min) to avoid any settling of silicon during gelation. Hydrochloric acid (HCl) was used to catalyze the gelation of PF with a gel time as short as 20 seconds. Accordingly, 0.012 g of concentrated HCl per 100 mL of mixture was added to the mixture, mixed for 20 seconds and cast between Teflon plates for gel fabrication. After aging and solvent exchange, PF gel composites were dried with supercritical $CO_2$. The obtained PF/Si aerogel had the following properties:

Two thicknesses of composites: ~0.2 mm and ~0.1 mm

Final density aerogel: ~0.7 g/cc

Figure 42:
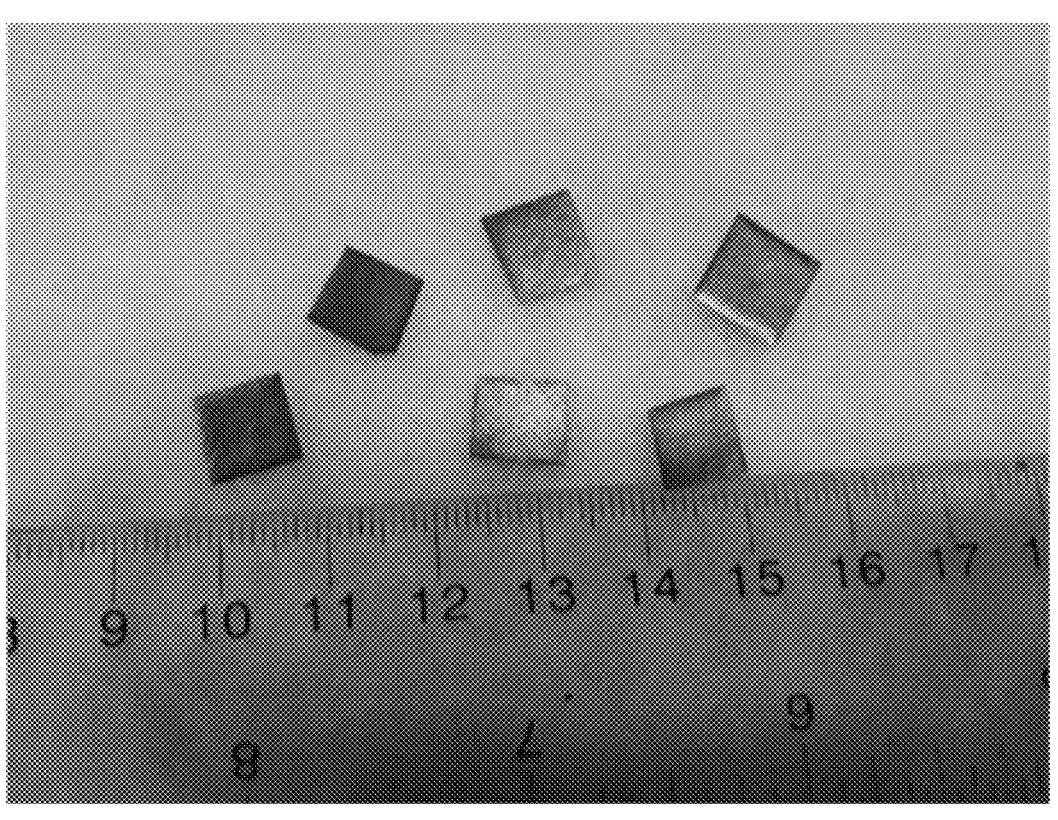
FIG. 42 depicts C/Si aerogel samples resulting from PF/Si aerogel.

After, pyrolysis under inert gas at 1050° C./2 hrs, the resulting C/Si aerogel had a density of 0.77 g/cc and an adjusted % Si of 10 wt %. Pre-cut samples (1 cm$^2$) (see FIG. 42) were prepared.

Figure 44:
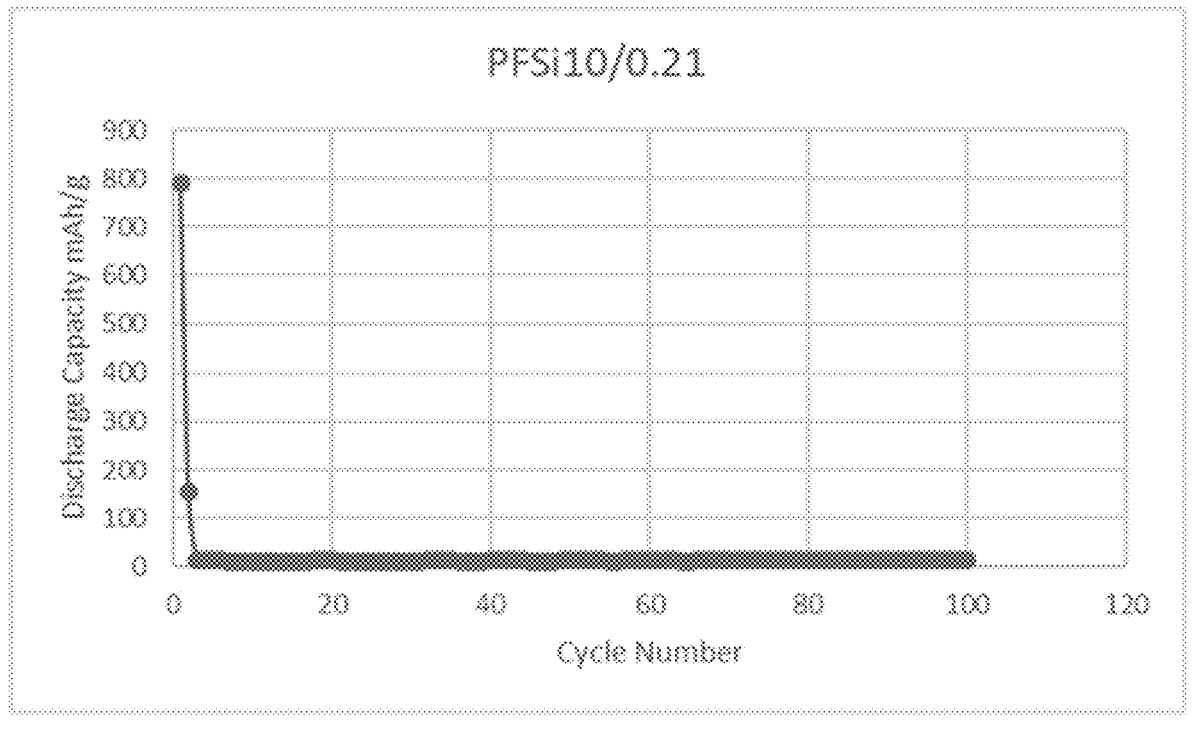
FIG. 44 depicts cycling capacities of PF aerogel composite with Si based on the electrode.

The C/Si aerogel, tested by liquid nitrogen adsorption-desorption, developed a high surface area of 541 m$^2$/g and a pore volume of 0.32 cc/g. Interestingly, micropore area represented 80% of total surface area, which confirms the dense and compact structure shown in SEM images (see FIG. 43). In addition, carbon aerogel composite samples containing Si, where the carbon was derived from the PF, resulted in high capacity loss after the first cycle and very low overall capacity (see FIG. 44). These results highlight the unique nature of the Si to perform better in a fibrillar morphology, such as that seen in polyimide-derived nanoporous carbons/carbon aerogels.

Example 10: Nanoindentation as a Measure of Mechanical Strength

Figure 45:
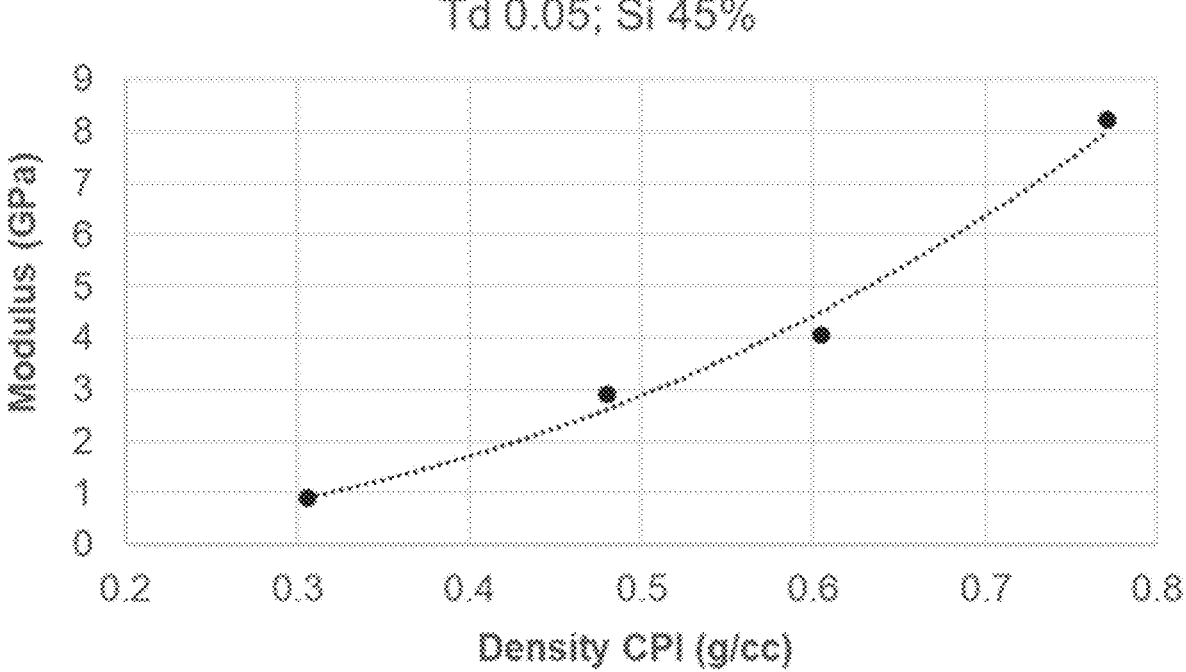
FIG. 45 depicts the effect of silicon content on Young modulus in samples tested with nanoindentation methods.
Figure 46:
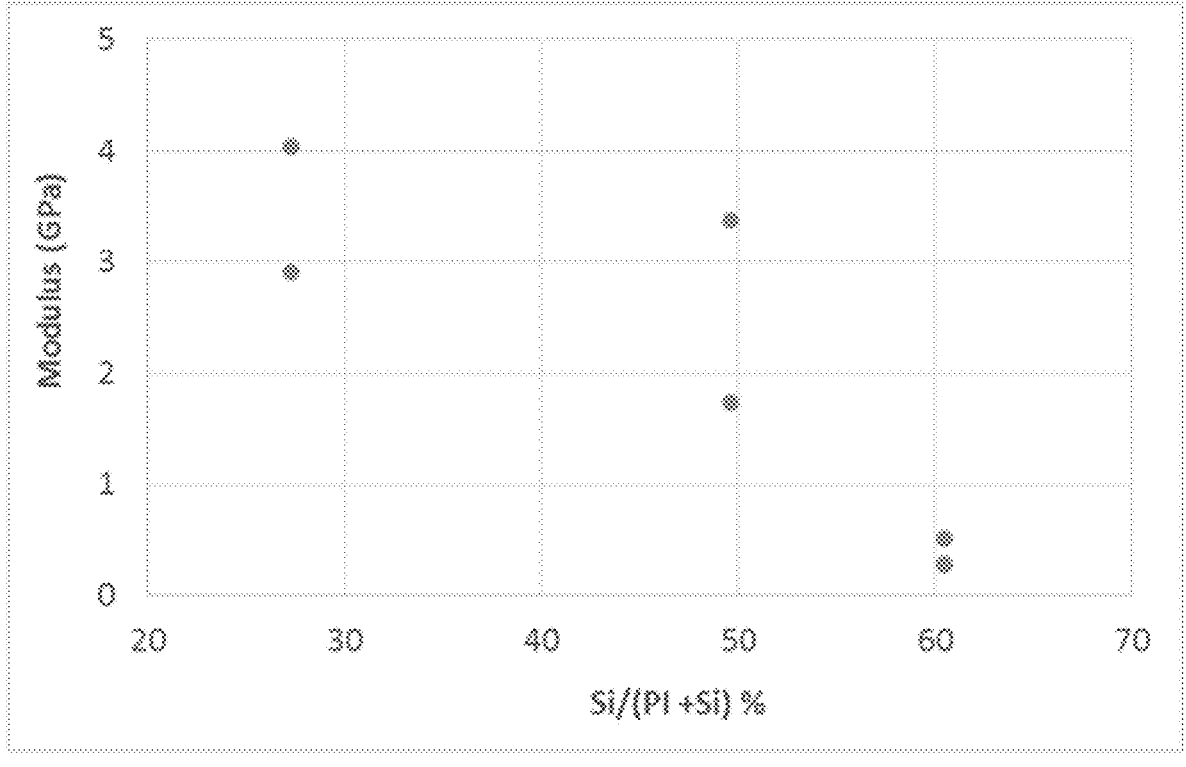
FIG. 46 depicts the effect of density on Young modulus tested with nanoindentation methods.

A plurality of CPI composite samples was made using the above-described methodologies, where variables within the samples included silicon content and densities. Each sample's Young modulus was measured using nanoindentation, which tests the hardness of the material. More specifically, twenty (20) indents were run across the sample surface. About 8-10 indents were selected to obtain average data as well as standard deviation for each mechanical property. The indentation locations were chosen under microscope, where surfaces were relatively clean and smooth and without many surface features, thus providing more reliable data. A 50-mN maximum load was selected for samples 1 and 2 since they were softer than other samples. A 300-mN indent load was employed for samples 3-7. Results and other properties are shown in Table 20. FIG. 45 depicts the modulus as a function of density, and FIG. 46 depicts the modulus as a function of density.

TABLE 20

| | Physical characteristics of CPI samples tested with nanoindentation methods. | | | | |
|---|---|---|---|---|---|
| # | % Si/ (C + Si) | % Si/ (PI + Si) | Td (g/cc) | Density (g/cc) | Young Modulus (GPa) |
| 1 | 66 | 60.5 | 0.05 | 0.644 | 0.279 ± 0.022 |
| 2 | 66 | 60.5 | 0.05 | 0.608 | 0.504 ± 0.038 |
| 3 | 45 | 27.3 | 0.05 | 0.605 | 4.049 ± 0.317 |
| 4 | 45 | 27.3 | 0.05 | 0.480 | 2.911 ± 0.428 |
| 5 | 64 | 49.6 | 0.08 | 0.739 | 1.735 ± 0.173 |
| 6 | 64 | 49.6 | 0.08 | 0.658 | 3.381 ± 0.168 |
| 7 | 45 | 27.3 | 0.05 | 0.771 | 8.218 ± 0.657 |
| 8 | 45 | 27.3 | 0.05 | 0.306 | 0.883 ± 0.053 |

Example 11: CPI Beads Doped with 45% Silicon

Polyimide gel beads were prepared at 0.10 g/cc target density. PMDA and PDA precursors were mixed in DMAC solvent at room temperature for 3 hours. Then, AA was added and mixed with the solution for 2 hours. Separately, silicon powder of 30 nm particle size was sonicated for 1 minute in DMAC solvent, and added to the mixture 5 minutes prior to the addition of pyridine catalyst. Silicon was added at ~24% per total solids. The doped mixture was catalyzed using a 3.2 molar ratio of Py to PMDA. Prior to gelation, the catalyzed sol containing silicon particles was poured into an already-agitated container of silicone oil as the dispersion medium (at a volume ratio of 10:1 silicone oil: catalyzed sol). Gelled PI beads were isolated from the silicone oil by filtration, subsequently rinsed using ethanol and then dried by supercritical $CO_2$ extraction. The PI aerogel-silicon composite beads were then pyrolyzed for 2 hours at 1050° C. to form CPI silicon composite beads, having a tap density of 0.7 g/cc and D50=15 μm.

Example 12: Electrode Prepared from CPI Beads

An anode electrode was prepared using CPI silicon composite beads prepared according to Example 11 on Cu foil as the current collector with a slurry containing 80 wt % CPI silicon composite beads, 10 wt % polyacrylic acid (PAA) binder, and 10 wt % hard carbon conductive additive (C65), mixed in water at a total solids content of approximately 36 wt %. The slurry was cast onto Cu foil using a doctor blade. After drying and calendaring, an electrode with a loading of 3.1 mg/cm$^2$ and a density of 0.7 g/cc was obtained.

Example 13: Half-Cell Units Built from CPI Electrode

Figure 48:
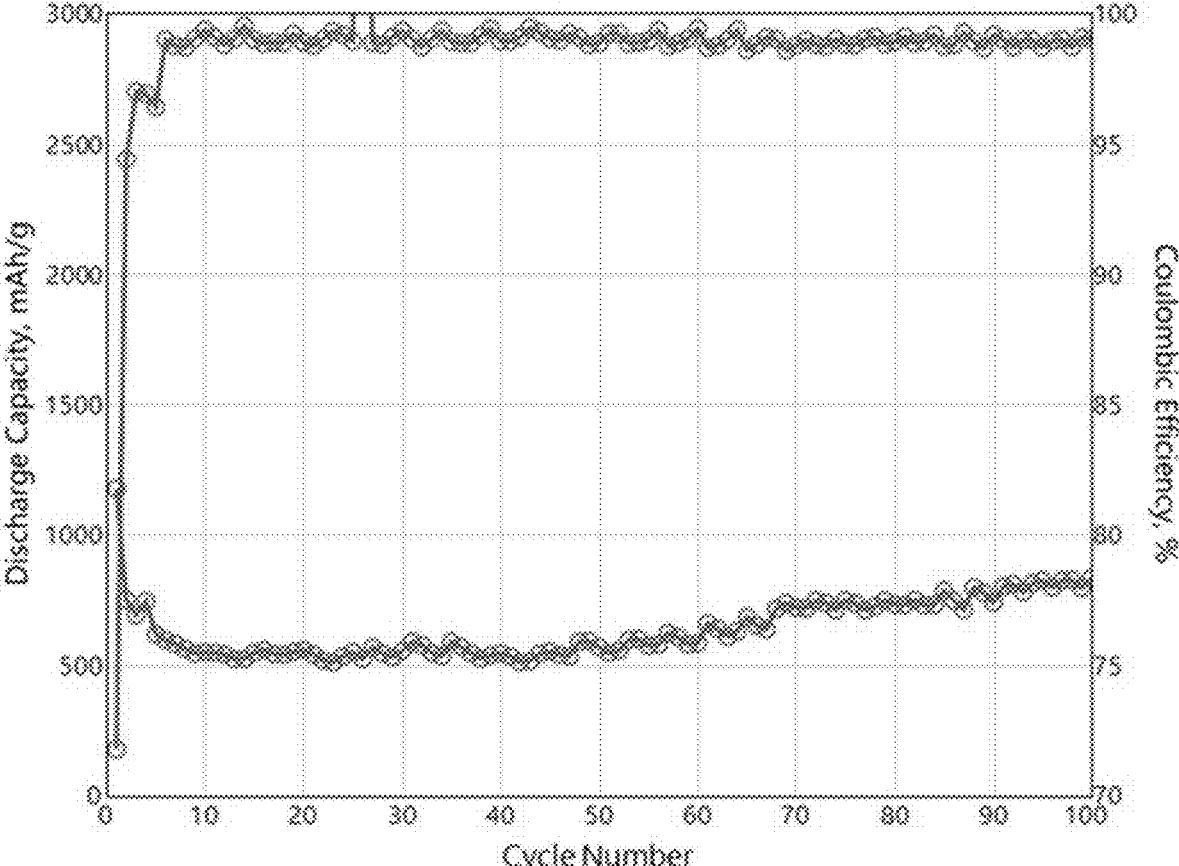
FIG. 48 depicts cycling performance of an electrode including CPI silicon beads according to embodiments disclosed herein.

Half-cell units (2032 coin cells) were built with the CPI composite electrodes prepared according to Example 12 with lithium foil as the counter electrode and CELGARD 2500 as the microporous separator between the electrodes. The electrolyte was 1.0 M LiPF6 in ethylene carbonate (EC)/ethylmethyl carbonate (EMC) (3:7 weight ratio) and 5 wt % fluoroethylene carbonate (FEC). All cells were tested with an ARBIN BT2043 tester. The protocol for testing cells included 4 formation cycles at a charge/discharge rate of C/20. Subsequent cycling occurred at various rates between C/20 and 5 C. FIG. 48 shows half-cell cycling performance of CPI composite electrodes containing 30 wt % silicon particles prepared as electrode from slurry containing 80 wt % CPI silicon composite beads, 10 wt % polyacrylic acid (PAA) binder, and 10 wt % hard carbon conductive additive (C65). The chart of FIG. 48 shows discharge capacity (mAh/g based on total weight of the electrode) and Coulombic efficiency versus cycle number in 1.0 M LiPF6 in ethylene carbonate (EC)/ethylmethyl carbonate (EMC) (3:7 weight ratio) and 5 wt % fluoroethylene carbonate (FEC).

Example 14: Low Density Silicon Doped Carbonized Polyimide Beads with Standard Precursor Addition and Low Shear Bead Process Silicon doped polyimide (PI) sols were prepared at 0.03-0.05 g/cc target density. Pyromellitic dianhydride (PMDA) and p-phenylene diamine (PDA) were mixed at a 1:1 molar ratio in dimethylacetamide (DMAC) solvent to obtain a polyamic acid (PAA) sol. The PMDA precursor was stirred in DMAC for 5-30 minutes at room temperature, during which time complete dissolution occurred. PDA powder was added to the PMDA solution and the mixture was stirred for 2-17 hours at room temperature. The process of adding diamine over the dianhydride is referred to as the standard addition process. Chemical imidization of the polyamic acid to polyimide was performed using acetic anhydride and pyridine. Acetic anhydride (AA) at 4.3 molar ratio vs. PMDA was added to the sol and mixed for 2-4 hours. Separately, silicon (Si) nanopowder of 30 nm size from ACS Material was dispersed in DMAC for 1 hour using a sonicator bath. Molar ratios of about 2:1 silicon to PMDA were used to dope the sol. The Si dispersion was mixed with the sol for 5 to 30 minutes at room temperature. Pyridine (Py) catalyst was added to the sol at 2.4 to 5.4 molar ratio of Py to PMDA. The catalyst was mixed with the sol for 2 minutes prior to casting.

To prepare the gel beads, the silicon doped PI sols were poured into silicone oil of 10 cSt viscosity, stirred by means of magnetic bar or mechanical mixer at 400 rpm. The volume ratio of silicone oil to the sol was 10/1 or 20/1. The higher oil to sol ratio produced beads with less agglomeration and of a larger bead size. Gelation occurred in 20-45 minutes at room temperature, when spherical light brown beads emerged from the emulsion. The beads were stirred in the oil overnight at room temperature, decanted from the oil and filtered through 20-micron filter paper. The beads were kept moist by washing with ethanol during filtration. The gel beads collected from the filter paper was placed in a bath of ethanol, aged and rinsed at 68° C. for 1-3 days. After two hot ethanol rinses, the gel beads were filtered again and dried. Drying was performed for 1 day at ambient temperature by exposing the gel beads to air as spread in an open container to air. Occasionally, the beads were stirred and fluffed up manually with a spatula during the drying process.

After drying, the beads were placed in graphite crucibles and pyrolyzed in a CM box furnace under nitrogen flow of 10-40 scfh. Most of the samples were pyrolyzed at 1050° C. for 2 hours, using a 3 deg/min ramp rate. One sample was pyrolyzed up to 690° C. using a 3 deg/min ramp rate. These formulations targeted 10-35 wt % Si in the carbonized beads.

Example 15: Low Density Silicon Doped Carbonized Polyimide Beads with Reverse Precursor Addition and Low Shear Bead Process Silicon doped polyimide (PI) sol of 0.03 g/cc target density was prepared using the same precursors as in Example 14. After dissolving the PDA in DMAC, PMDA powder was added to the solution. The process of adding dianhydride over the diamine is referred to as the reverse addition process. The viscosity of the sol increased substantially and was significantly higher than for the standard addition process. The mixture was stirred overnight at room temperature, then acetic anhydride was added at 4.3 molar ratio to the PMDA. After 3 hours, the sol was doped with silicon of 30 nm particle size from ACS Material. The silicon dispersion was prepared using a Dual Asymmetric Centrifugal Mixer from FlackTek Inc. and 1 mm zirconia beads. A silicon amount corresponding to 2.0 molar ratio to PMDA was dispersed for 5 minutes at 3000 rpm in 40% weight of the total DMAC amount. After mixing the resulting Si dispersion with the sol for 1 minute, pyridine catalyst was added at 5.4 molar ratio to PMDA.

The silicon doped PI sol was poured into silicone oil of 10 cSt viscosity stirred by means of a mechanical mixer at 400 rpm. The gelation time was 21 minutes at room temperature, about twice as fast gelation compared to a counterpart formulation prepared by the standard addition process. The gel beads were processed as in Example 14. After drying, the xerogel beads were pyrolyzed under nitrogen up to 690° C. using a 3 deg/min ramp rate. The PI beads lost 39% weight after pyrolysis. These formulations targeted 30 wt % of Si in the carbonized beads.

Example 16: Low Density Silicon Doped Carbonized Polyimide Beads with Standard Precursor Addition and High Shear Bead Process Silicon doped polyimide (PI) sols were prepared at 0.05 g/cc target density from the same precursors as in Example 14, using the standard addition process. The PMDA precursor was stirred in DMAC for 30 minutes at room temperature, during which time complete dissolution occurred. The mixing time is of critical importance to the outcome of the process. Mixing PMDA in DMAC less than 30 minutes has resulted in higher viscosity sols, which in turn gave larger size beads. PDA was added to the dianhydride solution in DMAC and stirred for 2-17 hours at room temperature. The resulting polyamic acid sol was chemically imidized with acetic anhydride (4.3 molar ratio vs. PMDA) and pyridine (4.2-8.1 molar ratio vs. PMDA).

Various silicon sources and particle sizes were used to dope the PI beads. Polycrystalline silicon of 30 nm size from ACS Material was dispersed in DMAC solvent either as sonicated in bath for 1 hour or using a FlackTek mixer for 5 minutes at 2500-3000 rpm. Zirconia beads of 1 or 2 mm diameter were used at 5-20% weight ratio vs. the Si weight. Amorphous silicon from Evonik (VP Si a) with a particle size D50 of 230 nm was dispersed in the polyamic acid sol using the FlackTek mixer for 5 minutes.

Polycrystalline silicon with a particle size of 1-5 microns from Silrec was prepared by different grinding approaches. Using an Across International high energy ball mill, the Silrec Si particle size was reduced to about 500 nm. A FlackTek mixer was also used to reduce the particle size of Si in DMAC by operating for times in the range of about 20 to about 60 minutes with zirconia beads. By this approach, the particle size was reduced to about 700-1000 nm. In another embodiment, the Si was ground in ethanol using a FlackTek mixer and ceramic media, then dried and redispersed in DMAC using the same FlackTek process. In these embodiments, the Si particles had a particle size of about 760 nm.

The Si particle dispersions prepared as described above were mixed with the PAA sol for 2-20 minutes at room temperature. After chemical imidization with acetic anhydride and pyridine, the sol was stirred for 1-2 minutes and poured slowly into the stirred oil bath. The silicone oil had viscosities of 10 or 100 cSt and the volume ratios of oil to PI sol were 5/1 or 10/1. The higher the oil viscosity and the lower the sol viscosity, the smaller the size of the beads produced. Although the 5/1 oil to sol ratio resulted in some bead agglomeration, this was preferred relative to the 10/1 ratio for scale-up purposes and also for simplified separation of the beads from the oil.

The oil bath with PAA sol was stirred at high shear using a Ross mixer at 3800-9400 rpm. Generally, higher shear resulted in smaller beads. Due to the high shear, the temperature of the oil increased rapidly to 50-70° C. in 5-10 minutes. During this time the bead droplets gelled and usually were clustered together. In general, due to overheating, the total time of stirring with the Ross mixer was below 30 minutes. Ethanol was poured over the oil several minutes after gelation and stirred for a couple more minutes to minimize bead agglomeration and clustering. The beads remained in the top ethanol layer and could be separated from the oil. Especially in case of the higher viscosity oil of 100 cSt, separation by decanting or by the separator funnel was possible. After filtering through 20 micron filter paper, and washing with ethanol multiple times, the gel beads were placed one to two days in ethanol at 68° C., then rinsed with ethanol 2 times at the same temperature.

Drying was performed either at ambient pressure, leading to xerogels, or at subcritical $CO_2$ conditions leading to aerogels. Several methods were used to dry at ambient pressure: stirring occasionally the wet cake spread onto a surface at room temperature for 1-3 days, heating in the oven at 110° C. in a closed container with small vents for several hours and finally, heating the spread wet cake on a hot plate at 100° C. for 2-5 minutes, followed by room temperature drying overnight. A fluidized bed method was also used for room temperature drying of the gels. A fritted Buchner funnel was secured on top of a filtration flask. The wet cake or gel slurry was placed on the frit and the top of the funnel was covered with a lab tissue. Compressed air hooked to the filtration's flask inlet was admitted through the pores of the frit. The beads were maintained in the fluidized bed until the volatiles were removed, then the xerogel was collected from the funnel. PI xerogel or aerogel bead yields of 75-96% were obtained.

After drying, the beads placed in graphite crucibles were pyrolyzed in the box furnace at 1050° C. for 2 hours, using a 3 deg/min ramp rate. The PI beads lost 42-47% weight after pyrolysis. The targeted Si in the carbonized beads was 30%.

Example 17: Low Density Silicon Doped Carbonized Polyimide Beads with Surfactant Mediated Process Silicon doped polyimide (PI) sols were prepared at 0.05 g/cc target density from the same precursors as in Example 14, using the standard addition process with the addition of surfactants. Generally, the surfactants were added to modify the surface of the beads in order to reduce their clustering during and after gelation while stirring in the oil bath.

In one embodiment, cetyltrimethylammonium bromide (CTAB) surfactant at a concentration of 0.09 moles per mole of PMDA was added to the sol after the acetic anhydride addition. The surfactant was not completely soluble in the sol. Silicon particles of 1-micron size from US Nano Research, previously sonicated in a portion of the total DMAC solvent, were added to the CTAB/sol mixture. The silicon was added at 2.1 mole per mole of PMDA. After mixing with pyridine for 2 minutes, the sol was cast in an oil bath stirred at 6500 rpm using the Ross homogenizer. The oil was previously chilled to 10° C. and the temperature of the oil increased to 50° C. during the 7 minutes in which gelation occurred. After processing the beads by separating from oil, rinsing and aging them in ethanol at 68° C., the beads were sonicated for 1 minute in ethanol using a sonicator probe to disperse the gel clusters. Drying of the beads was performed in ambient air, as described in Example 16.

The PI xerogel beads lost 46% weight during pyrolysis at 1050° C. The target weight of Si in the pyrolyzed beads was 30 wt %. The tap density of the beads was 0.65 g/cc.

Example 18: Low Density Silicon Doped Carbonized Polyimide Beads with Reverse Precursor Addition and High Shear Bead Process An aerogel of 0.02 g/cc target density was prepared by reverse addition protocol, as shown in Example 15. The precursors were mixed for 17 hours, then acetic anhydride was added and mixed for 2.5 hours. The Si powder from Silrec of 1-5 micron size was first ground as dry in the FlackTek with zirconia beads, then dispersed for 5 minutes in a portion of the PAA sol using the same apparatus at 2500 rpm. The Si dispersion (after zirconia beads removal by filtration) was mixed with the rest of the sol and pyridine catalyst was added at 10.1 molar ratio vs. PMDA. The mixture was stirred for 25 minutes prior to casting.

The silicon doped PI sol was slowly poured into silicone oil of 100 cSt viscosity stirred by means of the Ross mixer at 6000 rpm. The beads gelled after 5 minutes in the oil bath which reached 50° C. After 2 more minutes of stirring in oil, the beads were decanted from oil, washed 3 times with ethanol at room temperature and then placed in ethanol at 68° C. for 1 day. The hot rinsing procedure was repeated 3 times, using a volume ratio ethanol to gel beads of 800/1. The beads filtered from ethanol were exposed to air for 25 minutes, to form a skin with less porosity than the core. These beads were extracted using subcritical $CO_2$ conditions. The resulting beads were measured as having a high surface area of about 200 $m^2/g$, indicating the beads were mostly aerogel-like.

The beads were pyrolyzed under nitrogen up to 1050° C. using a 3 deg/min ramp rate. The PI beads lost 40% weight after pyrolysis. The targeted weight of Si was 50 wt % in the carbonized beads. The tap density of the beads was 0.37 g/cc.

Example 19: High Density Silicon Doped Carbonized Polyimide Beads with Standard Precursor Addition Silicon doped polyimide (PI) sols were prepared at 0.1 g/cc target density and 60 wt % silicon loading. The PMDA precursor was dissolved in DMAC by stirring with a magnetic mixer for about 30 minutes. PDA was added to the PMDA solution in a 1:1 molar ratio of PDA to PMDA and stirred using a magnetic mixture for 2-17 hours at room temperature. The resulting polyamic acid sol was chemically imidized with acetic anhydride (4.3 molar ratio vs. PMDA) and mixed for 1-4 hours. Separately, silicon of 1 micron size in a molar ratio of 9:1 silicon to PMDA was dispersed in a portion of the polyamic acid sol. In this example, 10 g of silicon was dispersed in 70 g of the polyamic acid sol in the presence of 25 g of 1 mm and 0.25 mm Zirconium beads, in ratio 1:1, to prevent agglomeration and provide dispersion of silicon. The silicon dispersion was mixed with the sol for about 5 minutes using a Flackteck mixer at about 2500 rpm. The dispersed silicon solution was poured back into the mother solution (the other part of polyamic acid sol) and stirred for another 30-60 minutes using a magnetic mixer.

Pyridine (Py) catalyst was added to the sol at 5:1 molar ratio of Py to PMDA. Py was mixed with the sol for about 1 min prior to pouring into silicon oil under high shear mixing (using a Ross mixer). Silicon oil (Polydimethylsiloxane, 100 cSt) was used as medium for bead gel formation and the volume ratio of oil to sol was about 10:1. For this example, about 100 ml of catalyzed silicon doped polyamic acid sol was poured in about 1000 ml of silicon oil mixed at about 9400 rpm. A suspension of gel beads began forming in about 2-3 minutes at about 9400 rpm and a temperature in the range of about 60-70 C. For comparison, the remaining sol in a separate un-mixed container gelled in about 7 minutes at room temperature. After formation of the gel beads, the mixture was kept under high rpm (of about 9400 rpm) for another 4-5 min.

The bulk of the oil was decanted and the gel beads were then filtered from the rest of the oil using 20 micron filter paper. The gel beads were rinsed with ethanol during filtration. The gel beads collected from the filter paper were placed in a bath of ethanol, aged and rinsed at 68° C. for 1-3 days.

After completion of the aging and rinsing process, the silicon doped polyimide gel beads were filtered, collected, and secured in 2 layers of lab tissue. Before loading into high pressure vessel for sub-critical drying, the gel beads protected with lab tissue were placed in 5-micron filter bags. The silicon doped polyimide gel beads were then dried using sub-critical liquid $CO_2$ by exchanging the solvent in the gel beads with liquid $CO_2$ in a vessel at pressures in the range of about 800 to 1200 psi for at least about 15 minutes. The vessel was then depressurized to atmospheric pressure. The resulting aerogel-like silicon doped polyimide beads were less than about 70 microns in size with no agglomerates or clusters of beads.

The aerogel-like silicon doped polyimide beads were the carbonized at 1050° C. under nitrogen flow for 2 hours. Physical and structural properties (surface area, pore size, and average pore diameter) of the silicon doped carbonized polyimide beads, are reported in Tables 21 and 22 below.

TABLE 21

| Physical Properties of the Beads of Example 18 | | | | |
|---|---|---|---|---|
| Tap density (g/cc) | Si (% wt.) | C Bead Size (D10, um) | C Bead Size (D50, um) | C Bead Size (D90, um) |
| 0.923 | 60 | 13.126 | 20.093 | 28.8 |

TABLE 22

| Structural Properties of the Beads of Example 18 | | | |
|---|---|---|---|
| $S_{BET}$ (m²/g) | Micropore area (m²/g) | Pore volume cc/g | Average pore size (nm) |
| 85.9 | 51.0 | 0.18 | 8.4 |

Example 20. C/Si Composite Beads Prepared from Polyimide in DMAC/Silicone Oil Emulsion; 0 ppm Water Carbon/Si composite beads containing 55% by weight of silicon were prepared from polyimide at a target density of 0.085. To dimethylacetamide (97.6 mL; anhydrous) was added benzene-1,2,4,5-tetracarboxylic anhydride (Pyromellitic dianhydride; PMDA; 8.30 g). The mixture was heated at 35° C. until all solids were dissolved, followed by 30 minutes of stirring at room temperature. Solid p-phenylenediamine (PDA; 4.1 g; 1 molar equivalent) was added to the solution and the resulting mixture stirred for 2 hours. To the stirred solution was added acetic anhydride (16.7 g, 4.3 molar equivalents) followed by stirring for 2 hours. Silicon particles (6.2 g) and 1 mm diameter zirconia beads (7 g) were dispersed in 12 g of the above sol by stirring at 2500 rpm for 2 minutes. After the zirconia media was removed by filtration, the Si suspension was added to the above sol, followed by stirring for 10 minutes.

Pyridine (10.8 mL; 8% by volume) was added to initiate gelation, forming a polyamic acid pre-sol. After 1 minute, this pre-sol was rapidly poured into silicone oil (polydimethylsiloxane; 100 cSt; 650 mL) while stirring with a Ross mixer at 9000 rpm. Approximately 6 minutes after the pyridine addition, when gelation occurred, 750 ml of ethanol was added and the stirring speed was reduced to 7000 rpm. After stirring for 2 more minutes, the phases were separated and the beads isolated using a separatory funnel. The gel beads accumulated in the lighter ethanol phase and the oil was separated as the heavier phase. After filtration from ethanol, the beads were mixed with heptane (150 mL) for about 10 min, then collected by filtration. The heptane wash was repeated, followed by a wash with a mixture of 120 mL of heptane and 120 mL of ethanol. The resulting filter cake was stirred in 150 mL of ethanol for 15 minutes, and allowed to stand overnight at room temperature.

Figure 50:
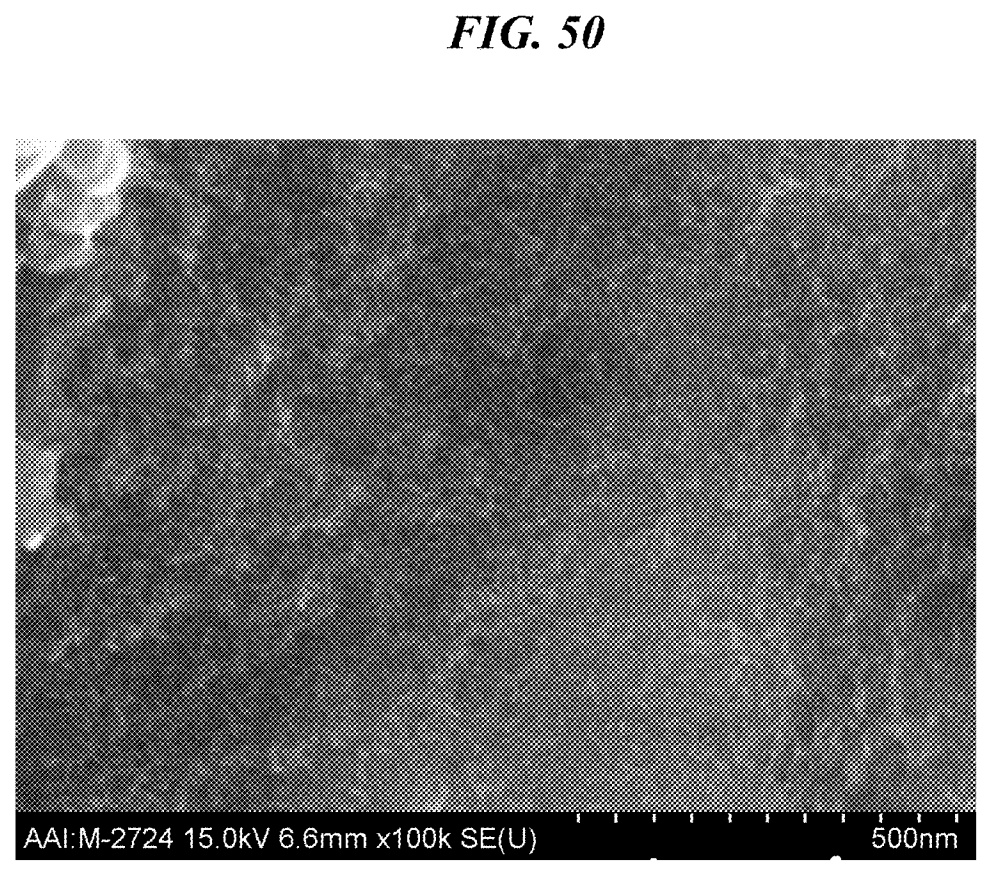

A portion of the polyimide/Si gel beads was dried using sub-critical liquid $CO_2$ by exchanging the solvent in the gel beads with liquid $CO_2$ in a vessel at pressures in the range of about 800 to 1200 psi for at least about 15 minutes. The vessel was then depressurized to atmospheric pressure to give polyimide/Si aerogel beads. The polyimide/Si aerogel beads were then carbonized at 1050° C. under nitrogen flow for 2 hours to provide C/Si aerogel beads (Example 20A). Properties of the aerogel beads are provided in Table 1 below. An SEM image showing the inner surface of a C/Si aerogel bead is provided in FIG. 50.

Another portion of the beads was oven dried at 68° C. to give polyimide/Si xerogel beads. The polyimide/Si xerogel beads were then carbonized at 1050° C. under nitrogen flow for 2 hours to provide C/Si xerogel beads (Example 20B).

Example 21. C/Si Composite Beads Prepared from Polyimide in DMAC/Silicone Oil Emulsion; 716 ppm Water Carbon/Si composite beads containing 35% by weight of silicon were prepared from polyimide at a target density of 0.085. To dimethylacetamide (88.5 mL; containing 237 ppm water) was added water (0.07 g) and benzene-1,2,4,5-tetracarboxylic anhydride (Pyromellitic dianhydride; PMDA; 8.30 g) followed by 30 minutes of stirring. Solid p-phenylenediamine (PDA; 4.1 g; 1 molar equivalent) was added to the solution and the mixture stirred for 2 hours. To the stirred solution was added acetic anhydride (16.7 g, 4.3 molar equivalents) followed by stirring for 2 hours.

Separately, a silicon dispersion was prepared by suspending a dispersion of silicon in isopropanol (71% by weight; 9.4 g) in dimethylacetamide (14.6 g). The mixture was heated at 120° C. with stirring until the isopropanol was completely evaporated (measured by a weight loss of 6.7 g; approximately 30 minutes). This silicon dispersion was added to the PDA/PMDA/acetic anhydride mixture. After 5 minutes of stirring, pyridine (10.4 mL; 8% by volume) was added to initiate gelation, forming a polyamic acid pre-sol. This pre-sol was rapidly poured into silicone oil (polydimethylsiloxane; 100 cSt; 650 mL; pre-chilled to 14° C.) while stirring with a Ross mixer at 9000 rpm. Approximately 5 minutes after the pyridine addition, 200 mL of ethanol was added. Approximately 9 minutes after the addition of the pre-sol to the silicone oil, the temperature had risen to about 65° C., and gelation occurred. The polyimide/Si bead suspension was transferred to a 2 L beaker and ethanol was added (400 mL) followed by stirring at 7000 rpm for 3 minutes. The phases were separated and the beads isolated by filtration. The beads were mixed with heptane (150 mL) for about 10 min, and collected by filtration. The heptane wash was repeated, followed by a wash with a mixture of 120 mL of heptane and 120 mL of ethanol. The resulting filter cake was stirred in 400 mL of ethanol for 30 minutes, and allowed to stand overnight at room temperature. This was followed by a further ethanol exchange (400 mL; 3 hours at room temperature).

Figure 51B:
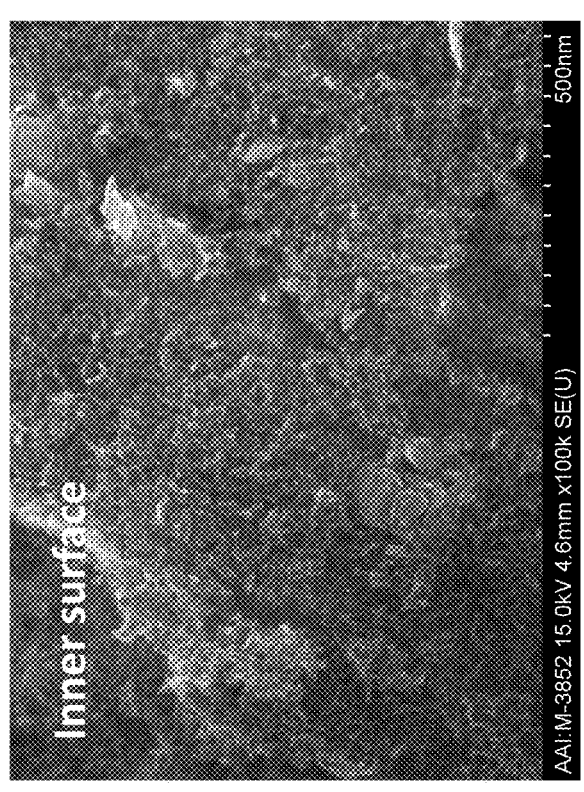
FIGS. 51A and 51B are SEM images showing the outer and inner surface, respectively, of a C/Si aerogel bead according to embodiments disclosed herein.
Figure 51A:
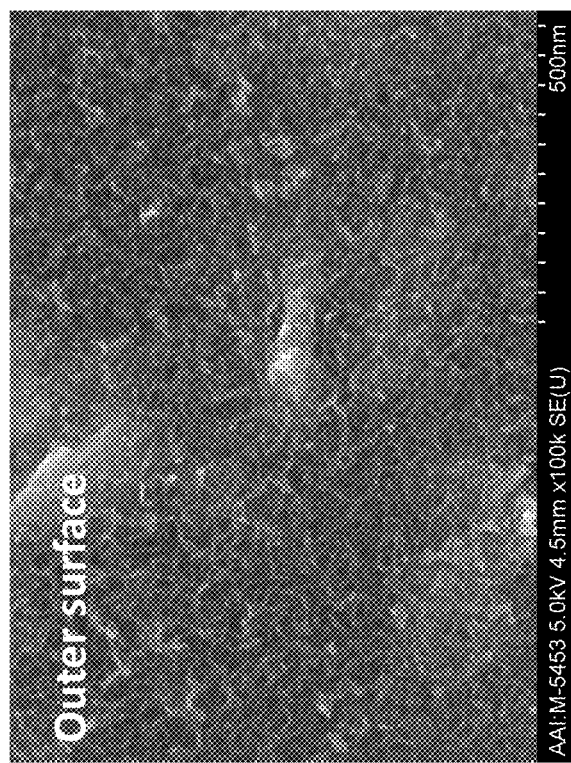

A portion of the polyimide/Si gel beads was dried using sub-critical liquid $CO_2$ by exchanging the solvent in the gel beads with liquid $CO_2$ in a vessel at pressures in the range of about 800 to 1200 psi for at least about 15 minutes. The vessel was then depressurized to atmospheric pressure to give polyimide/Si aerogel beads. The polyimide/Si aerogel beads were then carbonized at 1050° C. under nitrogen flow for 2 hours to provide C/Si aerogel beads (Example 21A). Properties of the aerogel beads are provided in Table 21 below. SEM images showing the outer and inner surface of a C/Si aerogel bead is provided in FIGS. 51A and 51B, respectively.

Another portion of the beads were oven dried at 68° C. to give polyimide/Si xerogel beads. The polyimide/Si xerogel beads were then carbonized at 1050° C. under nitrogen flow for 2 hours to provide C/Si xerogel beads (Example 21B). An SEM image of a C/Si xerogel bead is provided in FIG. 52.

Example 22. C/Si Composite Beads Prepared from Polyimide in DMAC/Mineral Spirits Emulsion with Surfactant; 550 ppm Water Carbon/Si composite gel beads containing 14% by weight of silicon were prepared at a target density of 0.085. To dimethylacetamide (104 mL; containing 145 ppm water) was added water (0.07 g) and benzene-1,2,4,5-tetracarboxylic anhydride (Pyromellitic dianhydride; PMDA; 8.30 g) followed by 30 minutes of stirring. Solid p-phenylenediamine (PDA; 4.1 g; 1 molar equivalent) was added to the solution and the mixture stirred for 2 hours. To the stirred solution was added acetic anhydride (16.7 g, 4.3 molar equivalents) followed by stirring for 2 hours to provide a polyamic acid sol.

Separately, mineral spirits (650 mL) was stirred with Hypermer A70® (13 g) for 1 hour at room temperature with a magnetic stir bar.

Silicon particles (2.74 g) and 1 mm diameter zirconia beads (4 g) were dispersed in 40 g of the above sol by stirring at 2500 rpm for 5 minutes. This suspension (after zirconia beads removal by filtration) was then added to the above sol, followed by stirring for 10 minutes.

Pyridine (10.4 mL; 8% by volume) was then added to the sol while stirring (4500 rpm) and the mixture stirred for 50 seconds to initiate gelation of the sol. The sol was then rapidly poured into the mineral spirit/surfactant mixture. Six minutes after adding the pyridine, ethanol (150 ml) was added followed by stirring at 5500 rpm for 3 minutes. Stirring was stopped and the polyimide/Si gel bead suspension allowed to stand for 30 minutes. The polyimide/Si gel beads were isolated by filtration and washed in 400 mL of ethanol. Three additional ethanol washes were performed. A photomicrograph of the resulting polyimide/Si gel beads is provided in FIG. 53A.

Figure 54B:
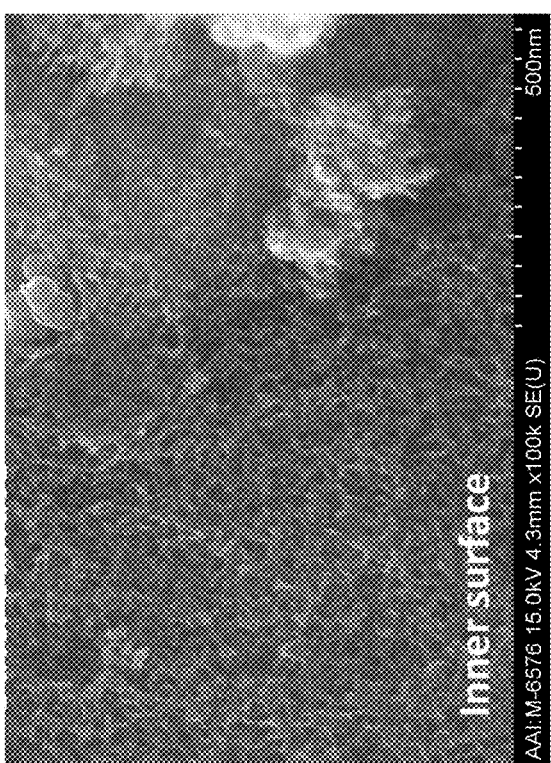
FIGS. 54A and 54B are SEM images showing the outer and inner surface, respectively, of a C/Si aerogel bead according to embodiments disclosed herein.
Figure 54A:
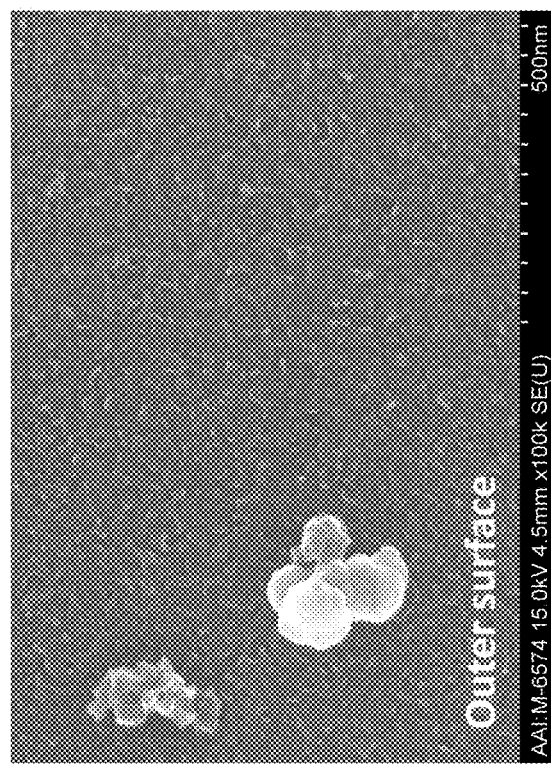

A portion of the polyimide/Si gel beads were dried using sub-critical liquid $CO_2$ by exchanging the solvent in the gel beads with liquid $CO_2$ in a vessel at pressures in the range of about 800 to 1200 psi for at least about 15 minutes. The vessel was then depressurized to atmospheric pressure to give polyimide aerogel beads. The polyimide/Si aerogel beads were then carbonized at 1050° C. under nitrogen flow for 2 hours to provide C/Si aerogel beads (Example 22A). Properties of the aerogel and xerogel beads are provided in Table 23 below. SEM images showing the outer and inner surface of a C/Si aerogel bead is provided in FIGS. 54A and 54B, respectively.

Figure 52:
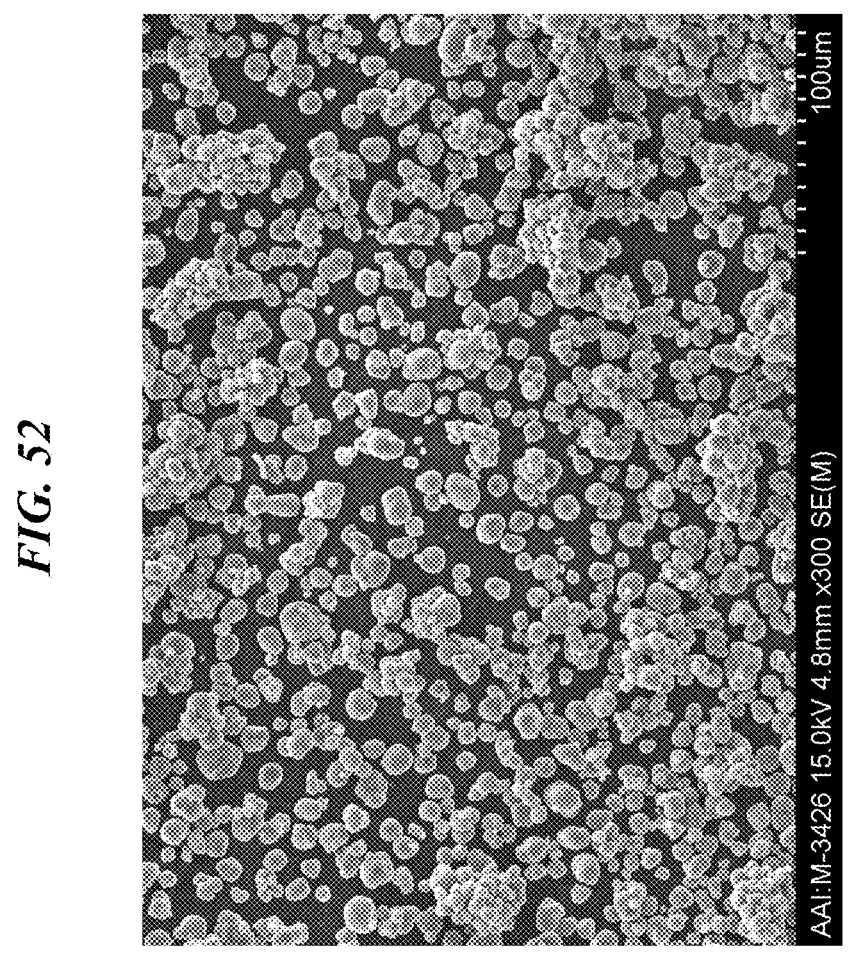
Figure 55:
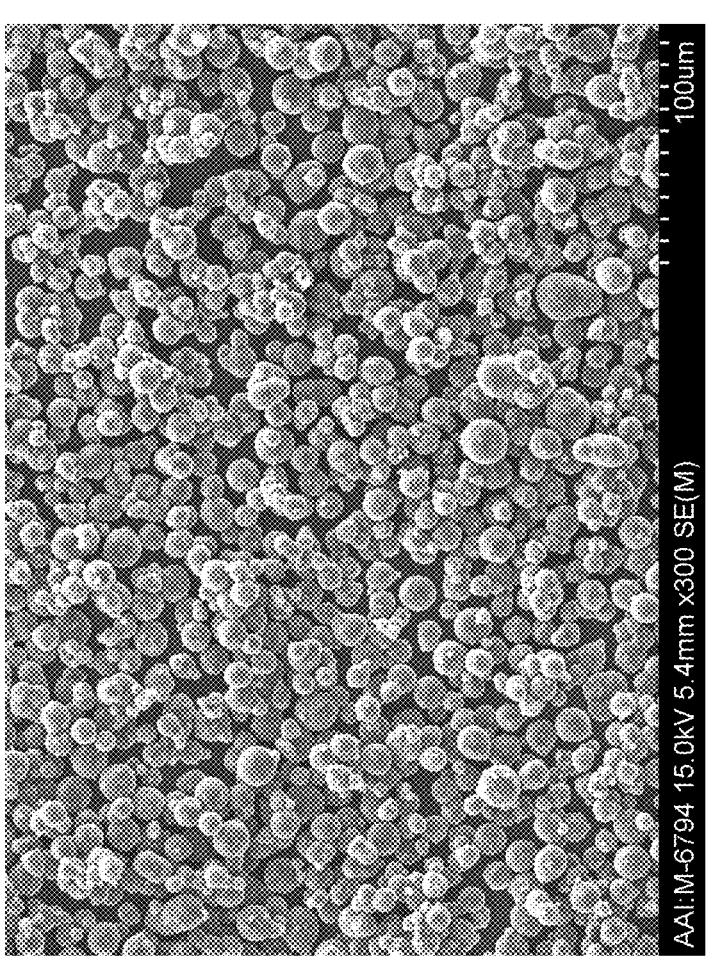
FIG. 55 is an SEM image of a C/Si xerogel bead according to embodiments disclosed herein.
Figure 56B:
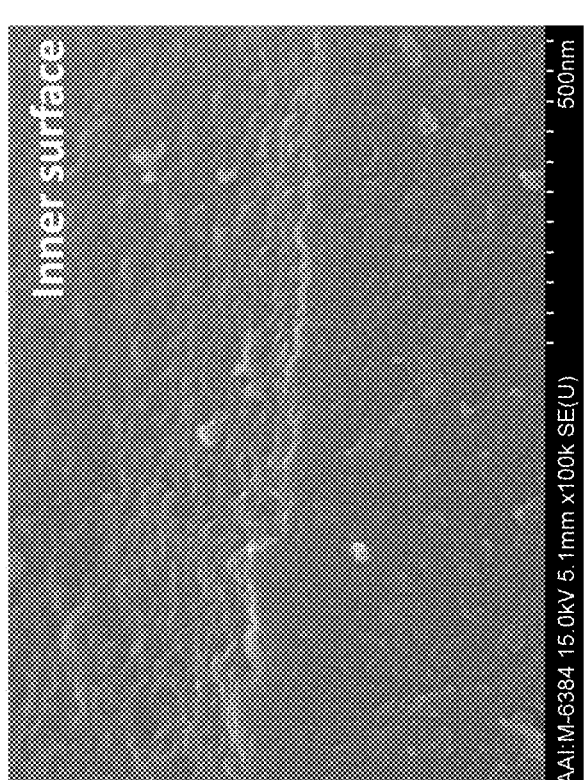
FIGS. 56A and 56B are SEM images showing the outer and inner surface, respectively, of a C/Si xerogel bead according to embodiments disclosed herein.
Figure 56A:
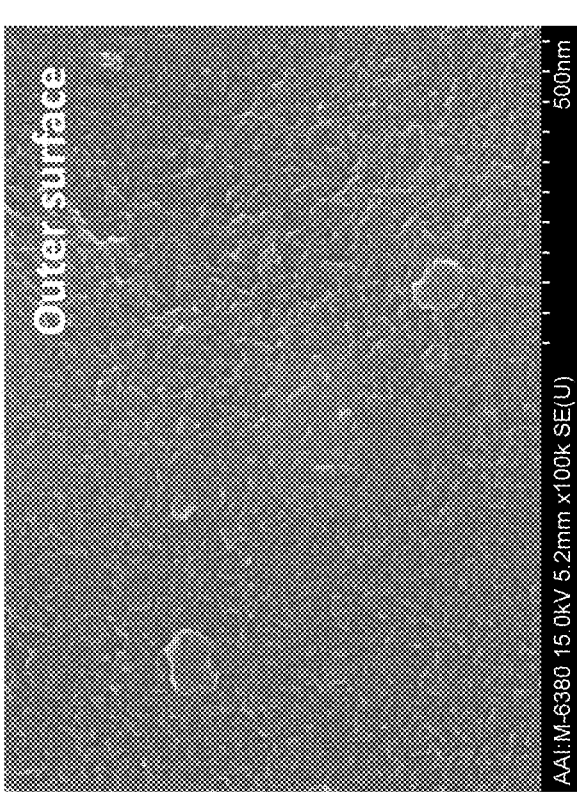

Another portion of the beads were oven dried at 68° C. to give polyimide/Si xerogel beads. The polyimide/Si xerogel beads were then carbonized at 1050° C. under nitrogen flow for 2 hours to provide C/Si xerogel beads (Example 22B). An SEM image of a C/Si xerogel bead is provided in FIG. 55. Notably, with reference to FIG. 55, less xerogel agglomeration and larger bead sizes were obtained for beads prepared according to Example 22 as compared to those prepared according to Example 21 (FIG. 52). SEM images showing the outer and inner surface of the C/Si xerogel bead is provided in FIGS. 56A and 56B, respectively. No BET surface area was detected for xerogels prepared according to Example 22B.

Figure 53B:
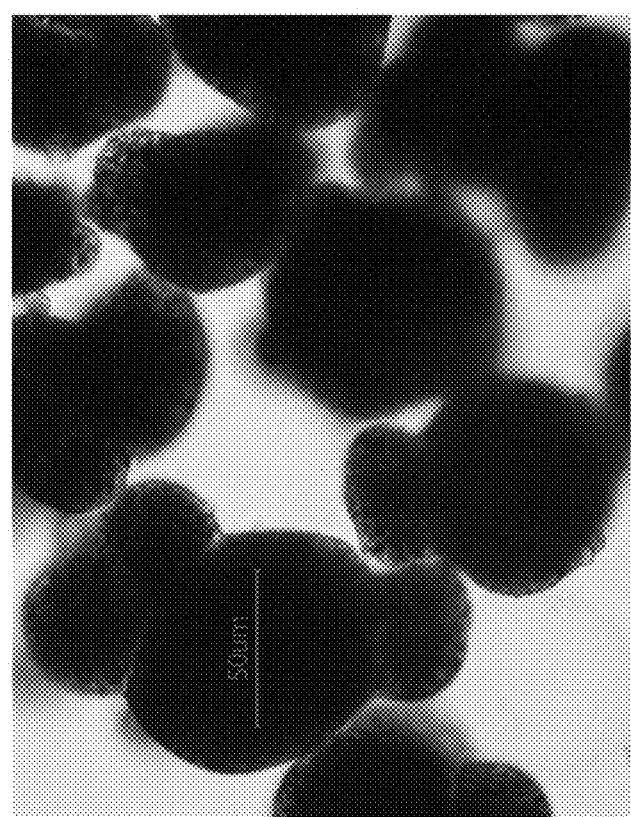
FIGS. 53A and 53B are photomicrographs of polyimide/Si composite gel beads according to embodiments disclosed herein.
Figure 53A:
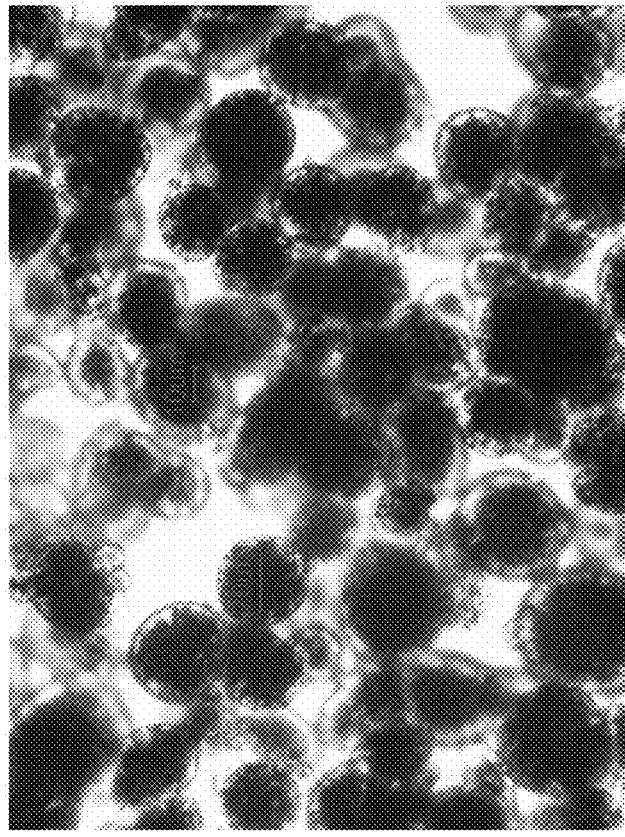

Example 23. Polyimide/Silicon Composite Beads Prepared from Polyimide in DMAC/Mineral Spirits Emulsion without Surfactant; 550 ppm Water Polyimide/Si composite gel beads containing 14% by weight of silicon were prepared at a target density of 0.085 using the procedure of Example 22A, but in the absence of the surfactant. A photomicrograph of the resulting polyimide/Si gel beads is provided in FIG. 53B, which shows a bead size 2 to 5 times greater than that produced in the presence of surfactant (FIG. 53A).

Example 24. Carbon Beads Prepared from Polyimide in DMAC/Mineral Oil Emulsion; 330 ppm Water Carbon acro- and xerogel beads were prepared from polyimide at a target density of 0.085. To dimethylacetamide (106.7 mL; containing 145 ppm water) was added benzene-1,2,4,5-tetracarboxylic anhydride (Pyromellitic dianhydride; PMDA; 8.30 g). The mixture was heated at 35° C. until all solids were dissolved, followed by 30 minutes of stirring at room temperature. After 28 minutes of stirring at room temperature, water (0.042 g) was added to the mixture. Solid p-phenylenediamine (PDA; 4.1 g; 1 molar equivalent) was added to the solution and the mixture stirred for 2 hours. To the stirred solution was added acetic anhydride (16.7 g, 4.3 molar equivalents) followed by stirring for 2 hours. Pyridine (7.8 mL; 6% by volume) was added to initiate gelation, forming a polyamic acid pre-sol. After stirring for 1 minute, this pre-sol was rapidly poured into mineral oil while stirring with a Ross mixer at 9000 rpm. Approximately 4.5 minutes after the pyridine addition, 100 mL of ethanol was added and stirring was continued for another 2 minutes at 9000 rpm. Room temperature gelation occurred in 7.5 minutes after pyridine addition. The polyimide gel bead suspension was transferred to a 2 L beaker and ethanol was added (500 mL) followed by stirring at 6500 rpm for 3 minutes. After stirring was stopped, the gel beads settled at the bottom of the beaker. The top oil layer was removed and the gel beads were rinsed with ethanol 3 times. The beads were mixed with ethanol (500 mL) for about 10 min, then let to settle. After decanting the ethanol, the beads were washed with heptane (150 ml) two times. The gel was separated from the heptane phase by filtration.

Figure 57B:
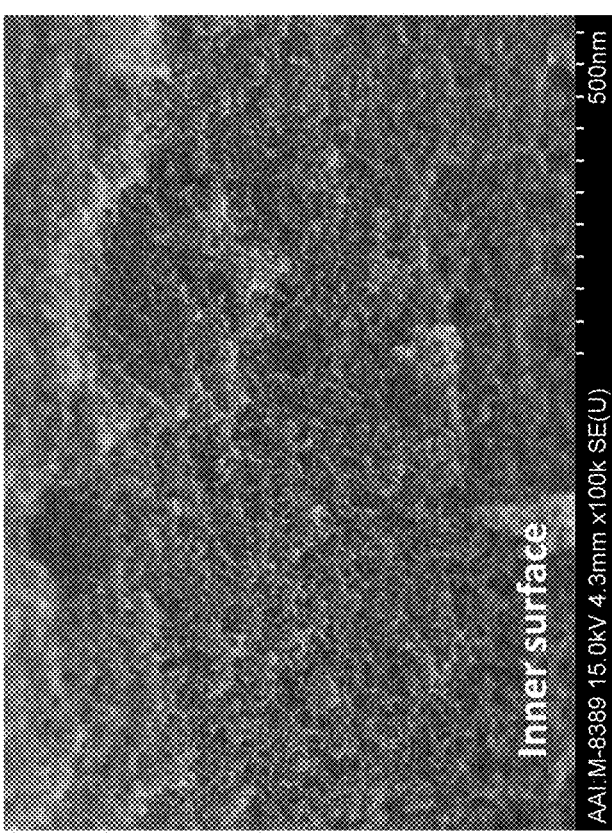
FIGS. 57A and 57B are SEM images showing the outer and inner surface, respectively, of a C/Si aerogel bead according to embodiments disclosed herein.
Figure 57A:
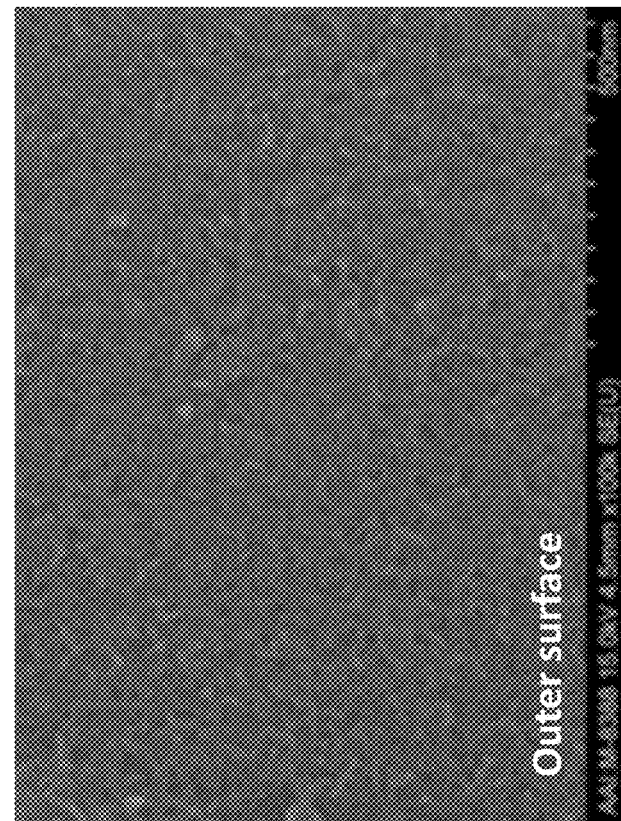

A portion of the polyimide gel beads was dried using sub-critical liquid $CO_2$ by exchanging the solvent in the gel beads with liquid $CO_2$ in a vessel at pressures in the range of about 800 to 1200 psi for at least about 15 minutes. The vessel was then depressurized to atmospheric pressure to give polyimide aerogel beads. The polyimide aerogel beads were then carbonized at 1050° C. under nitrogen flow for 2 hours to provide carbon aerogel beads (Example 24A). Properties of the aerogel beads are provided in Table 23. SEM images showing the outer and inner surface of a carbon aerogel bead is provided in FIGS. 57A and 57B, respectively.

Figure 58B:
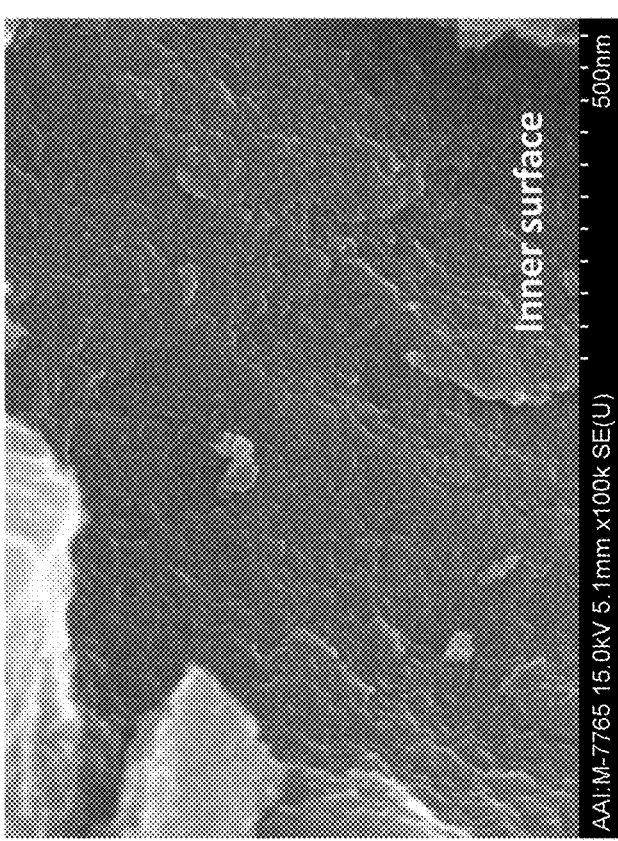
FIGS. 58A and 58B are SEM images showing the outer and inner surface, respectively, of a C/Si xerogel bead according to embodiments disclosed herein.
Figure 58A:
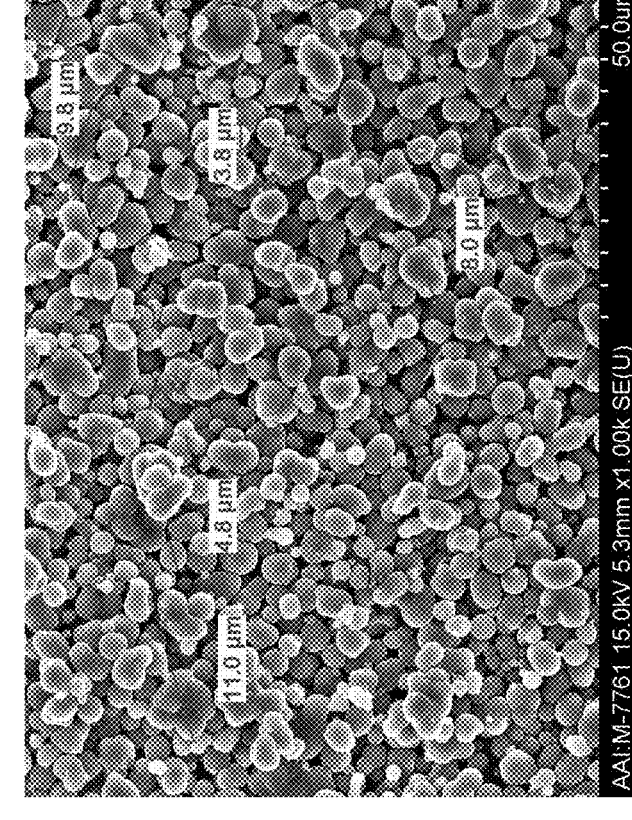

Another portion of the polyimide gel beads was oven dried at 68° C. to give polyimide xerogel beads. The polyimide xerogel beads were then carbonized at 1050° C. under nitrogen flow for 2 hours to provide carbon xerogel beads (Example 24B) below. SEM images showing the outer and inner surface of a carbon xerogel bead is provided in FIGS. 58A and 58B, respectively.

TABLE 23

| | | | | | | |
|---|---|---|---|---|---|---|
| | | | | C and C/Si aerogel bead properties | | |
| Example # | % Si | Sol water content, ppm | BET Surface Area, m²/g | Bead tap density | Average Pore Diameter (BJH Desorption; 4V/A; nm) | Bead Size D50 (μm) |
| 20A | 55 | 0 | 222 | 0.519 | 11 | 23 |
| 21A | 35 | 716 | 337 | 0.317 | 14.5 | 11.2 |
| 22A | 35 | 550 | 110 | N/A | 13 | 19.5 |
| 24A | 0 | 330 | 429 | N/A | N/A | 7.8 |

Example 25. C/Si Composite Beads Prepared from Polyimide in DMAC/Mineral Oil Emulsion; 330 ppm Water Carbon/Si composite beads containing 14% by weight of silicon are prepared at a target density of 0.085. To dimethylacetamide (106.7 mL, containing 145 ppm of water) 8.30 g of benzene-1,2,4,5-tetracarboxylic anhydride (pyromellitic dianhydride; PMDA) is added. The mixture is heated at 35° C. until all solids are dissolved, followed by 30 minutes of stirring at room temperature. After 28 minutes of stirring at room temperature, water (0.042 g) is added to the mixture. Solid p-phenylenediamine (PDA; 4.1 g; 1 mol equivalent) is added to the solution and the mixture is stirred for 2 hours. To the stirred solution is added acetic anhydride (16.7 g, 4.3 mol equivalents) followed by stirring for 2 hours.

Silicon particles (2.74 g) and 1 mm diameter zirconia beads (4 g) are dispersed in 40 g of the above sol by stirring at 2500 rpm for 5 minutes. Zirconia beads are used to break down silicon aggregates (if any) and assure a better dispersion of silicon in the sol. The suspension (after zirconia beads removal by filtration) is then added to the above sol, followed by stirring for 10 minutes.

Pyridine (7.8 mL; 6% by volume) is added to initiate gelation, forming a polyamic acid pre-sol. After stirring for 1 minute, this pre-sol is rapidly poured into mineral oil while stirring with a Ross mixer at 9000 rpm. Approximately 4.5 minutes after the pyridine addition, 100 mL of ethanol is added and stirring is continued for another 2 minutes at 9000 rpm. The polyimide/Si gel bead suspension is transferred to a 2 L beaker and ethanol is added (500 mL) followed by stirring at 6500 rpm for 3 minutes. After stirring is stopped, the gel beads settle at the bottom of the beaker. The top oil layer is removed and the gel beads are rinsed with ethanol 3 times. The beads are mixed with ethanol (500 mL) for about 10 min, then left to settle. After decanting the ethanol, the beads are washed with heptane (150 ml) two times. The gel is separated from the heptane phase by filtration.

A portion of the polyimide/Si gel beads are dried using sub-critical liquid $CO_2$ by exchanging the solvent in the gel beads with liquid $CO_2$ in a vessel at pressures in the range of about 800 to 1200 psi for at least about 15 minutes. The vessel is then depressurized to atmospheric pressure to give polyimide aerogel beads. The polyimide/Si aerogel beads are then carbonized at 1050° C. under nitrogen flow for 2 hours to provide C/Si aerogel beads.

Example 26. C/Si Composite Beads Prepared from Polyimide in DMAC/Silicone Oil Emulsion; 0 ppm Water Carbon/Si composite beads containing 35% by weight of silicon were prepared from polyimide at a target density of 0.085. To dimethylacetamide (79.7 mL) was added benzene-1,2,4,5-tetracarboxylic anhydride (Pyromellitic dianhydride; PMDA; 8.0 g) followed by 30 minutes of stirring. Solid p-phenylenediamine (PDA; 4.0 g; 1 molar equivalent) was added to the solution and the mixture stirred for 2 hours. To the stirred solution was added acetic anhydride (16.1 g, 4.3 molar equivalents) followed by stirring for 2 hours.

Separately, a silicon dispersion was prepared by suspending a dispersion of silicon in isopropanol (71% by weight; 9.1 g) in dimethylacetamide (14.1 g). The mixture was heated at 120° C. with stirring until the isopropanol was completely evaporated (measured by a weight loss of 6.4 g; approximately 30 minutes). This silicon dispersion was added to the PDA/PMDA/acetic anhydride mixture. After 5 minutes of stirring, pyridine (10.0 mL; 8% by volume) was added to initiate gelation, forming a polyamic acid pre-sol. This pre-sol was rapidly poured into silicone oil (polydimethylsiloxane; 100 cSt; 625 mL) while stirring with a Ross mixer at 9000 rpm. Approximately 5 minutes after the pyridine addition, when room temperature gelation occurred, 100 mL of ethanol was added and stirring was continued for another minute. Ethanol was added (300 mL) was followed by stirring at 7000 rpm for 3 minutes. The phases were separated and the beads isolated by filtration. The beads were mixed with heptane (150 mL) for about 10 min, and collected by filtration. The heptane wash was repeated, followed by a wash with a mixture of 120 mL of heptane and 120 mL of ethanol. The resulting filter cake was stirred in 300 mL of ethanol overnight.

A portion of the polyimide/Si gel beads was dried using sub-critical liquid $CO_2$ by exchanging the solvent in the gel beads with liquid $CO_2$ in a vessel at pressures in the range of about 800 to 1200 psi for at least about 15 minutes. The vessel was then depressurized to atmospheric pressure to give polyimide/Si aerogel beads. The polyimide/Si aerogel beads were then carbonized at 1050° C. under nitrogen flow for 2 hours to provide C/Si aerogel beads.

Example 27. C/Si Beads Prepared from Polyimide in DMAC/Silicone Oil Emulsion; 530 Ppm Water Carbon/Si composite beads containing 35% by weight of silicon were prepared from polyimide at a target density of 0.085. To dimethylacetamide (63.8 mL) was added water (0.046 g) and benzene-1,2,4,5-tetracarboxylic anhydride (Pyromellitic dianhydride; PMDA; 6.4 g) followed by 30 minutes of stirring. Solid p-phenylenediamine (PDA; 3.2 g; 1 molar equivalent) was added to the solution and the mixture stirred for 2 hours. To the stirred solution was added acetic anhydride (12.8 g, 4.3 molar equivalents) followed by stirring for 2 hours.

Separately, a silicon dispersion was prepared by suspending a dispersion of silicon in isopropanol (71% by weight; 7.3 g) in dimethylacetamide (11.3 g). The mixture was heated at 120° C. with stirring until the isopropanol was completely evaporated (measured by a weight loss of 4.6 g; approximately 30 minutes). This silicon dispersion was added to the PDA/PMDA/acetic anhydride mixture. After 5 minutes of stirring, pyridine (8.0 mL; 8% by volume) was added to initiate gelation, forming a polyamic acid pre-sol. This pre-sol was rapidly poured into silicone oil (polydimethylsiloxane; 100 cSt; 450 mL) while stirring with a Ross mixer at 9000 rpm. Approximately 5 minutes after the pyridine addition, 100 ml of ethanol was added and stirring was continued for another minute. Room temperature gelation occurred in 7 minutes. Ethanol was added (300 mL) was followed by stirring at 7000 rpm for 3 minutes. The phases were separated and the beads isolated by filtration. The beads were mixed with heptane (150 mL) for about 10 min, and collected by filtration. The heptane wash was repeated, followed by a wash with a mixture of 120 mL of heptane and 120 mL of ethanol. The resulting filter cake was stirred in 300 mL of ethanol for 30 minutes.

A portion of the polyimide/Si gel beads was dried using sub-critical liquid $CO_2$ by exchanging the solvent in the gel beads with liquid $CO_2$ in a vessel at pressures in the range of about 800 to 1200 psi for at least about 15 minutes. The vessel was then depressurized to atmospheric pressure to give polyimide/Si aerogel beads. The polyimide/Si aerogel beads were then carbonized at 1050° C. under nitrogen flow for 2 hours to provide C/Si aerogel beads.

Example 28. C/Si Beads Prepared from Polyimide in DMAC/Silicone Oil Emulsion; 1190 Ppm Water Carbon/Si composite beads containing 35% by weight of silicon were prepared from polyimide at a target density of 0.085 according to Example 27, but with a sol water content of 1190 ppm.

Example 29. C/Si Beads Prepared from Polyimide in DMAC/Silicone Oil Emulsion; 620 Ppm Water Carbon/Si composite beads containing 35% by weight of silicon were prepared from polyimide at a target density of 0.06 according to Example 27, but with a sol water content of 620 ppm.

Results

Figure 59B:
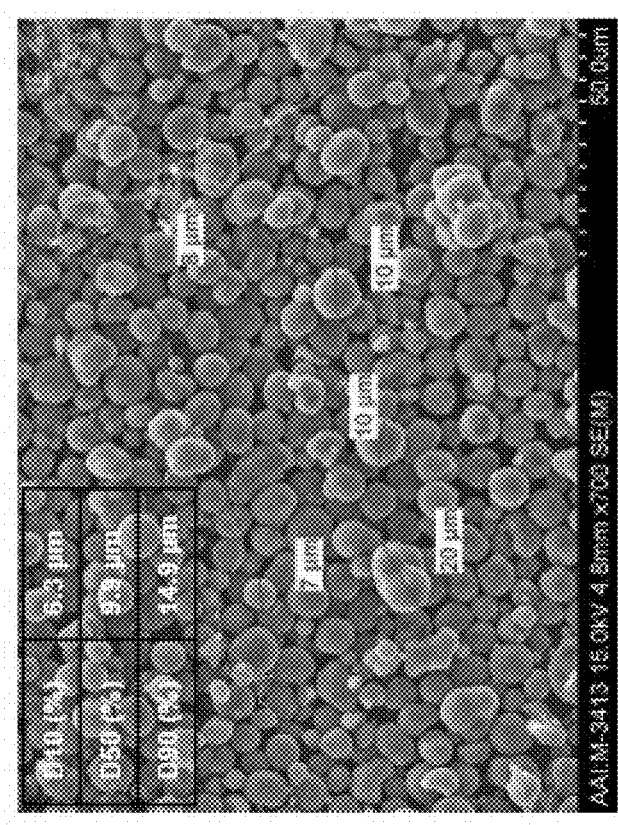
FIGS. 59A and 59B are SEM images showing the outer and inner surface, respectively, of a C/Si aerogel bead according to embodiments disclosed herein.
Figure 59A:
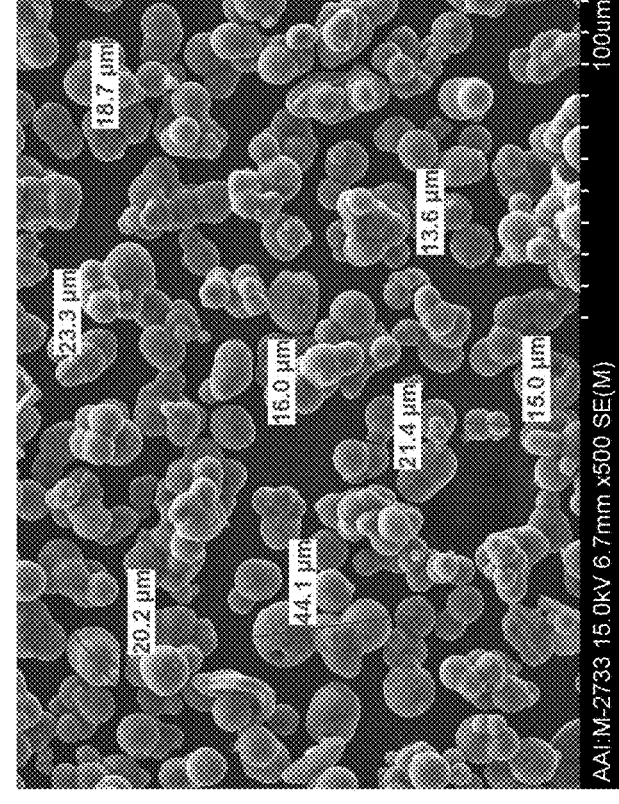
Figure 60:
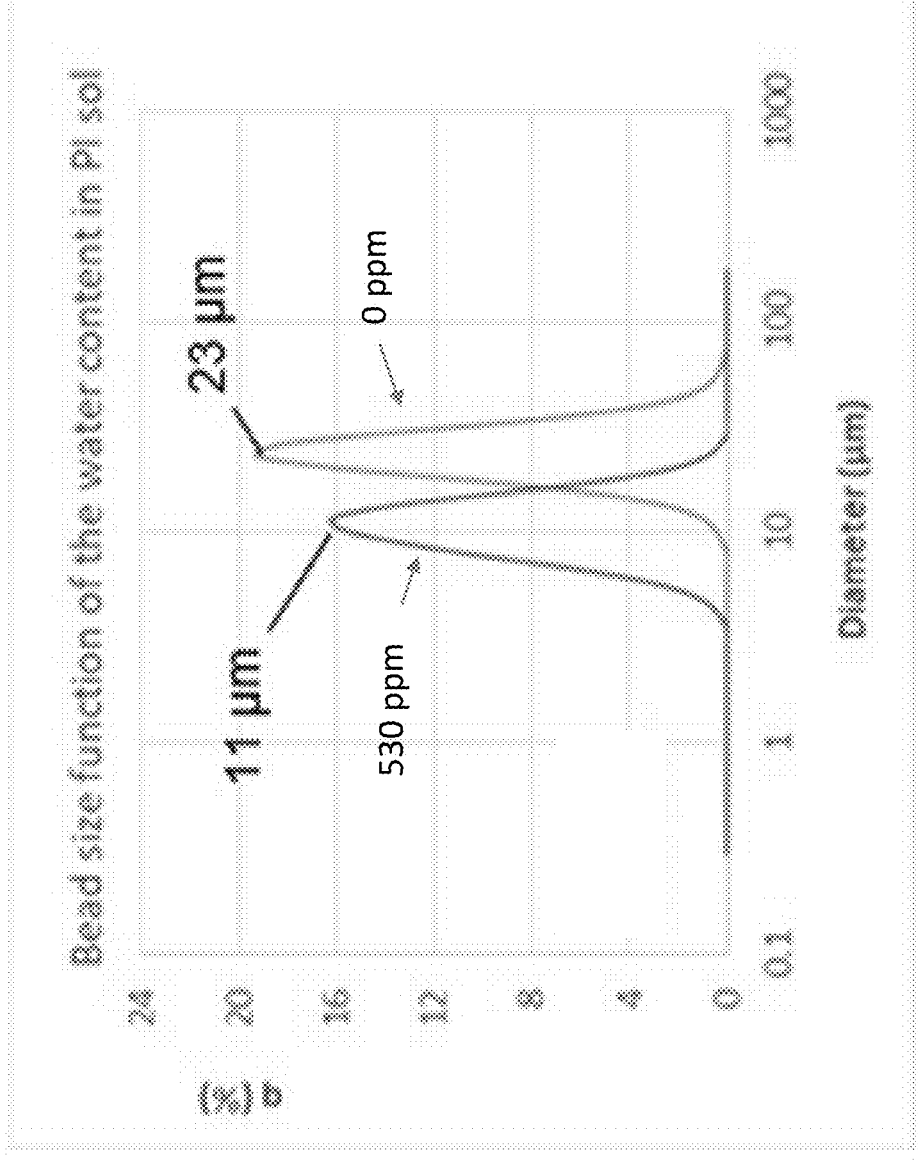
FIG. 60 is a chart showing the particle size distribution for aerogel beads according to embodiments disclosed herein.

In Example 26, beads were prepared with no water addition, and ethanol was added at the gelation point (5.3 minutes after pyridine addition). In contrast, in Example 27, 530 ppm water was added to the sol solvent, which both lowered the viscosity and delayed gelation. Consequently, ethanol addition at 5.3 minutes following pyridine addition was before the gelation point was reached. SEM images showing C/Si aerogel beads prepared according to Examples 26 and 27 are provided in FIGS. 59A and 59B, respectively, which show that beads produced in the presence of 530 ppm water were on the order of 50% smaller than those prepared in the absence of water. The average bead size distribution for Example 26 and 27 is provided in FIG. 60 (average size of 23 and 11 μm, respectively). Data for bead size D10, D50, and D90 are provided in Table 24, which demonstrates that water addition on the order of 500 to 600 ppm reduced bead size relative to bead size obtained in the absence of water, and that further increase of the water content in the sol (e.g., 1190 ppm) did not further reduce the bead size. Without wishing to be bound by theory, it is believed that addition of water reduces the molecular weight of the polyamic acid with the result of decreasing the sol viscosity, with a consequent reduction in bead size.

TABLE 24

| Particle size vs. water content | | | | | |
|---|---|---|---|---|---|
| Example # | Target density (g/cm³) | Water content, ppm | D10 (mm) | D50 (mm) | D90 (mm) |
| 7 | 0.09 | 0 | 15.3 | 22.1 | 32.1 |
| 8 | 0.09 | 530 | 6.3 | 9.9 | 14.9 |
| 9 | 0.09 | 1190 | 6.5 | 10.5 | 16.0 |
| 10 | 0.06 | 620 | 7.0 | 11.5 | 18.8 |

Example 30: Alternative Methods of Producing a Polyimide Aerogel

Previous examples discussed herein teach certain methodologies of forming a PI gel (e.g., an aerogel or xerogel). In certain embodiments, the current invention further contemplates alternative methods of forming a PI gel, which may be converted by pyrolyzation to a carbon aerogel or xerogel. A non-exhaustive and non-limiting set of examples of such alternative methodologies will now be discussed.

For example, U.S. Pat. No. 6,399,669 to Suzuki et al. teaches four (4) related methods of making a PI dry gel (aerogel). In a first method, a PI precursor is synthesized, followed by formation of an imide from PI precursor, resulting in production of polyimide. A PI solution or swollen bulk is prepared, and the solution/swollen bulk is gelled to produce a PI wet gel. This wet gel is dried, resulting in the PI dry gel (aerogel).

In a second method, a PI precursor is synthesized, followed by preparation of a PI precursor solution or swollen bulk. The solution/swollen bulk is gelled to produce a PI precursor wet gel. An imide is then formed from the PI precursor to form a PI wet gel. This wet gel is dried, resulting in the PI dry gel (aerogel). In a third method, a PI precursor is synthesized, followed by preparation of a PI precursor solution or swollen bulk. An imide is then formed from the PI precursor while gelling it to produce a PI wet gel.

In a third method, a PI precursor is synthesized, followed by preparation of a PI precursor solution or swollen bulk. The solution/swollen bulk is gelled to produce a PI precursor wet gel. This wet gel is then dried to produce a PI precursor dry gel. An imide is then formed from the PI precursor dry gel to form a PI dry gel (aerogel).

As a further example, Leventis et al. ("Polyimide Aerogels by Ring-Opening Metathesis Polymerization (ROMP)", Chem. Mater. 2011, 23, 8, 2250-2261) discusses the formation of PI aerogels using the ROMP method. Generally, low-molecular weight imidized oligomers that are end-capped with polymerizable groups are provided and mixed with a polymerization (e.g., ROMP) catalyst. Polymerization is thus initiated, creating a cross-linked polyimide. This polyimide is gelled and dried to form a PI aerogel.

As a further example, U.S. Pat. No. 9,745,198 to Leventis et al. and Chidambareswarapattar et al., "One-step room-temperature synthesis of fibrous polyimide aerogels from anhydrides and isocyanates and conversion to isomorphic carbons," J. Mater. Chem., 2010, 20, 9666-9678, teach formation of a PI aerogel by mixing a dianhydride (e.g., PMDA) with an isocyanate (e.g., 4,4'-diisocyanatodiphenyl-methane or methylene di-p-phenyldiisocyanate) to form a sol-gel material. The sol-gel material is then dried to produce the PI aerogel. Leventis et al. ("Isocyanate-Derived Organic Aerogels: Polyureas, Polyimides, Polyamides", MRS Proceedings, 1306 (2011), Mrsf10-1306-bb03-01. doi: 10.1557/opl.2011.90) also notes that DESMODUR® N 3300A, DESMODUR® RE, and MONDUR® CD, all available from Covestro AG, Pittsburgh, PA, US, may be utilized as the isocyanate.

In alternative methodologies, Guo et al. ("Polyimide Aerogels Cross-Linked through Amine Functionalized Polyoligomeric Silsesquioxane," ACS Appl. Mater. Interfaces 2011, 3, 546-552) discusses the formation of PI aerogels by reacting amino silsesquioxane with polyamic acid oligomers that are end-capped with anhydride groups. The product is imidized using pyridine (though thermal imidization is also contemplated) and gelled, followed by drying to obtain the PI aerogel. Nguyen et al. ("Development of High Temperature, Flexible Polyimide Aerogels," American Chemical Society, proceedings published 2011" discuss the creation of a branched polyimide by mixing diamine and dianhydride, and imidizing, followed by a reaction with a multi-amino compound (e.g., 1,3,5-tris(4-aminophenoxybenzene)). This product is then reacted with 4,4'-methylenediisocyanate, and dried to form a PI-urea aerogel.

In other embodiments, Meador et al. ("Mechanically Strong, Flexible Polyimide Aerogels Cross-Linked with Aromatic Triamine", ACS Appl. Mater. Interfaces, 2012, 4 (2), pp 536-544) discusses the production of PI gels by cross-linking polyamic acid oligomers that are end-capped with anhydride groups, with aromatic triamine in solution, followed by imidization. The resulting wet is dried to form a PI aerogel. Furthermore, Meador et al. ("Polyimide Aerogels with Amide Cross-Links: A Low Cost Alternative for Mechanically Strong Polymer Aerogels," ACS Appl. Mater. Interfaces 2015, 7, 1240-1249) discusses the formation of PI gels by cross-linking amine-capped oligomers with 1,3,5-benzenetricarbonyl trichloride. The resulting gel was dried to form the PI aerogel.

In yet another embodiment, Pei et al. ("Preparation and Characterization of Highly Cross-Linked Polyimide Aerogels Based on Polyimide Containing Trimethoxysilane Side Groups," Langmuir 2014, 30, 13375-13383) produces a PI aerogel from polyimide containing trimethoxysilane side groups, which was a condensation product of polyimide containing acid chloride side groups and 3-aminopropyltrimethoxysilane. The resulting gel was dried to form the PI aerogel.

In any one of these methods, suspension of graphene can be added (see Zhang et al., "Graphene/carbon aerogels derived from graphene crosslinked polyimide as electrode materials for supercapacitors," RSC Adv., 2015, 5, 1301).

Each of these methodologies can lead to a polyimide aerogel, and the current invention contemplates any suitable method for producing such polyimide aerogel. According to certain embodiments of the current invention, regardless of which methodology is utilized to produce the PI aerogel, the resulting PI aerogel can be pyrolyzed to form a PI-derived carbon aerogel. Additives such as silicon can be introduced as well, according to certain embodiments discussed herein.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference should be disregarded.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A porous carbon composition in the form of beads, the porous carbon composition comprising a composite material comprising a carbonized polyimide xerogel, the carbonized polyimide xerogel comprising a pore structure comprising a fibrillar morphology and an array of pores, the composite material further comprising silicon in an amount greater than about 10% by weight, based on the total weight of the composition, wherein the silicon is present at least partially within the pore structure, and wherein the porous carbon composition has a BET surface area in a range from about 0 to about 110 m²/g.

2. The porous carbon composition of claim 1, wherein the beads have a diameter in a range of about 1 μm to about 15 μm and a tap density in a range of about 0.3 g/cm³ to about 1.3 g/cm³.

3. The porous carbon composition of claim 1, wherein the composite material comprises from about 25% to about 65% by weight of silicon, based on the total weight of the composition.

4. The porous carbon composition of claim 1, wherein the silicon has a particle size less than about 150 nm.

5. The porous carbon composition of claim 1, wherein the silicon has a particle size in a range of about 150 nm to about 500 nm.

6. The porous carbon composition of claim 1, wherein the silicon has a particle size greater than about 500 nm.

7. The porous carbon composition of claim 1, wherein the silicon has a particle size in a range from about 30 nm to about 800 nm.

8. The porous carbon composition of claim 1, wherein the silicon is present as a conformal coating within the porous carbon composition.

9. The porous carbon composition of claim 1, wherein the beads have:

a tap density in a range of about 0.2 g/cm³ to about 1.5 g/cm³;

a diameter in a range of about 1 μm to about 15 μm; and an average pore diameter in a range from about 10 nm to about 50 nm.

10. The porous carbon composition of claim 1, having a pre-lithiation porosity between about 10% and about 80%.

11. The porous carbon composition of claim 1, wherein the carbonized polyimide xerogel has a residual nitrogen content of at least about 4 wt %.

12. The porous carbon composition of claim 1, wherein the fibrillar morphology includes struts having an average strut width of about 2 to about 10 nm.

13. The porous carbon composition of claim 12, wherein the average strut width is from about 2 to about 5 nm.

14. The porous carbon composition of claim 1, having a Young's modulus from about 0.2 GPa to about 8 GPa.

15. The porous carbon composition of claim 1, having a full width at half max pore size distribution of 50 nm or less.

16. The porous carbon composition of claim 1, having a pore size at max peak from distribution of 150 nm or less.

17. The porous carbon composition of claim 1, having a half-cell capacity of at least about 800 mAh/g.

18. An energy storage device comprising the porous carbon composition of claim 1.

19. The energy storage device of claim 18, which is a lithium-ion battery.

\* \* \* \* \*